United States Patent [19]

Tai et al.

[11] Patent Number: 5,484,685
[45] Date of Patent: * Jan. 16, 1996

[54] NAPHTHALOCYANINE DERIVATIVES, PRODUCTION THEREOF, OPTICAL RECORDING MEDIUM USING THE SAME, AND PRODUCTION THEREOF

[75] Inventors: Seiji Tai, Palo Alto, Calif.; Nobuyuki Hayashi, Hitachi, Japan; Koichi Kamijima, Hitachi, Japan; Mitsuo Katayose, Hitachi, Japan; Takayuki Akimoto, Hitachi, Japan; Shigeru Hayashida, Hitachi, Japan; Hideo Hagiwara, Hitachi, Japan; Susumu Era, Ichihara, Japan; Setsuo Kobayashi, Hitachi, Japan; Akio Mukoh, Mito, Japan

[73] Assignees: Hitachi, Ltd.; Hitachi Chemical Co., Ltd., both of Tokyo, Japan

[*] Notice: The portion of the term of this patent subsequent to Jul. 23, 2008, has been disclaimed.

[21] Appl. No.: 708,839

[22] Filed: May 30, 1991

Related U.S. Application Data

[63] Continuation of Ser. No. 425,405, Oct. 23, 1989, abandoned.

[30] Foreign Application Priority Data

Oct. 25, 1988 [JP] Japan .................................. 63-269114
Dec. 9, 1988 [JP] Japan .................................. 63-312589

[51] Int. Cl.⁶ .................... G03C 1/72; G11B 7/24; C09B 47/00
[52] U.S. Cl. .......................... 540/452; 430/495; 430/945; 430/270.17; 540/128; 540/131; 540/139; 540/142
[58] Field of Search .................... 430/945, 495, 430/270, 271; 540/128, 131, 139, 142

[56] References Cited

U.S. PATENT DOCUMENTS 4,798,781  1/1989  Hirose et al. .................... 430/270
4,960,538  10/1990  Itoh et al. ........................ 540/130
5,034,309  7/1991  Tai et al. ......................... 430/945
5,075,203  12/1991  Katayose et al. ................ 430/495

FOREIGN PATENT DOCUMENTS 0243205  10/1987  European Pat. Off. ........... 540/128
1105788  4/1989  Japan .

*Primary Examiner*—Thorl Chea
*Attorney, Agent, or Firm*—Antonelli, Terry, Stout & Kraus

[57] ABSTRACT

A naphthalocyanine derivative of the formula:

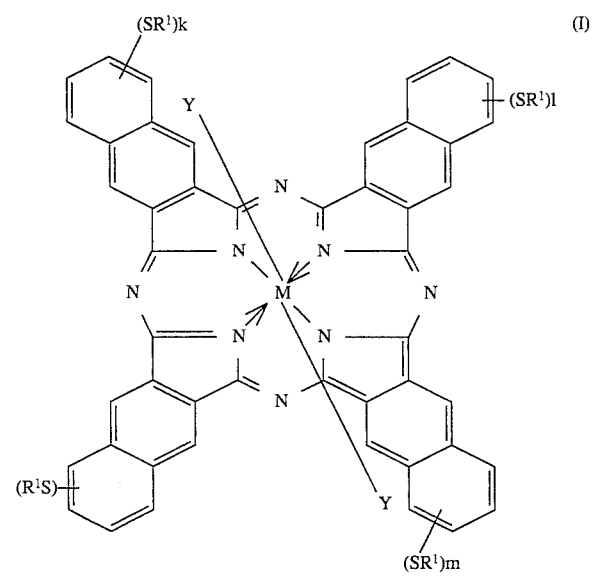

wherein M, Y, $R^1$, k, l, m, n are as defined in the specification, is an effective substance for forming a recording layer on a substrate of an optical recording medium having high sensitivity with good properties.

25 Claims, 89 Drawing Sheets

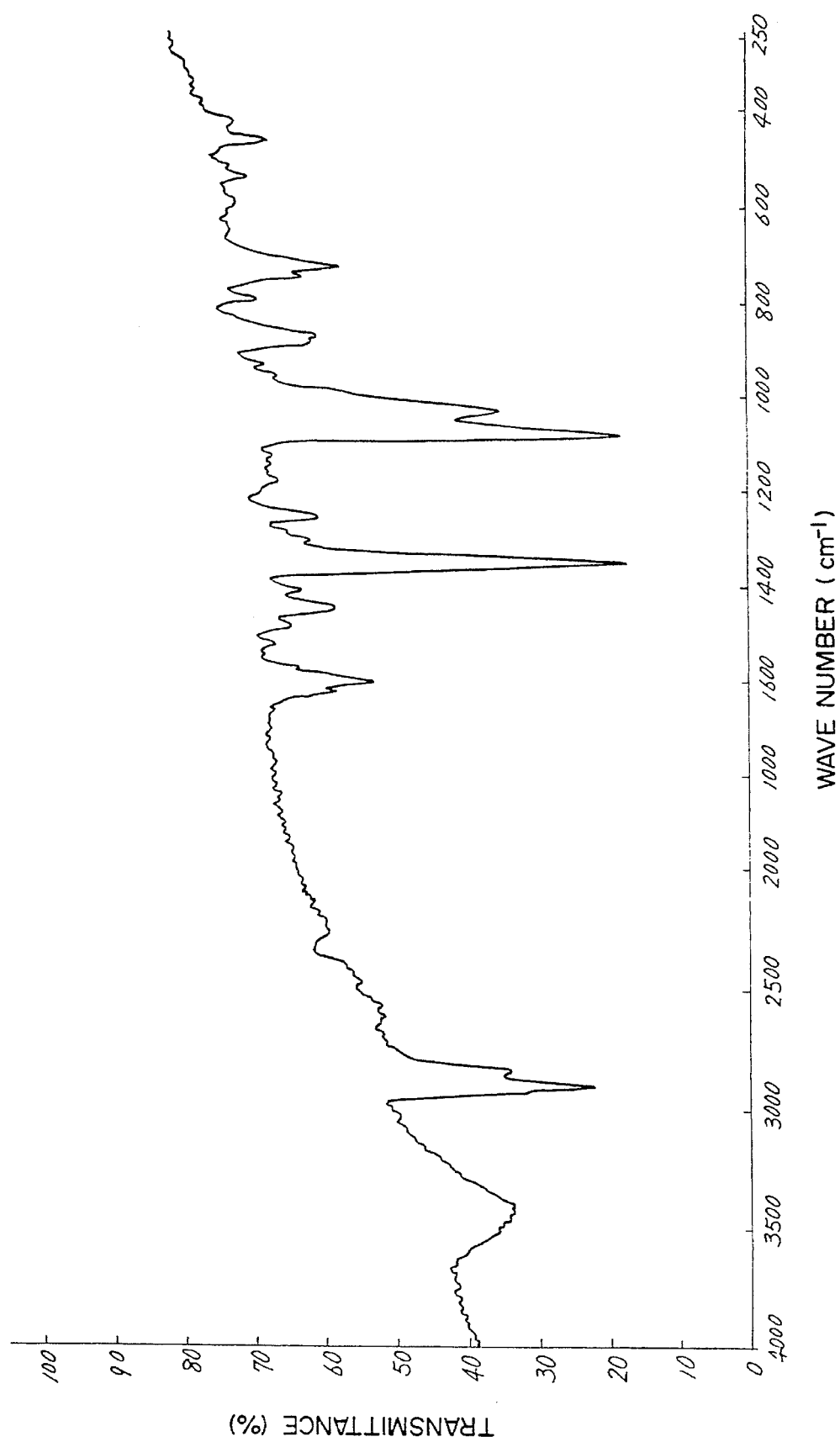
F I G. 52

NAPHTHALOCYANINE DERIVATIVES, PRODUCTION THEREOF, OPTICAL RECORDING MEDIUM USING THE SAME, AND PRODUCTION THEREOF

This application is a continuation of application Ser. No. 425,405, filed Oct. 23, 1989, now abandoned.

BACKGROUND OF THE INVENTION

This invention relates to novel naphthalocyanine derivatives, process for producing them, optical recording medium using them, and process for producing said optical recording medium.

Recently, the use of semiconductor laser light has been proposed as a means for writing-in or reading-out in compact disk, video disk, liquid crystal display, optical letter-reading machine, etc. or as a light source of electrophotography. Writing or reading by means of semiconductor laser light indispensably requires a substance capable of absorbing semiconductor laser light or near infrared light.

As the organic dye absorbing near infrared light, cyanine dye has been well known hitherto. Metal complexes of oximes and thiols and aminated quinone derivatives are also known as dyes capable of absorbing near infrared light (Yuki Gosei Kagaku Kyokai-shi, Vol. 43, Page 334 (1985); Shikizai Kyokai-shi, Vol. 53, Page 197 (198); and Shikizai Kyokai-shi, Vol. 58, Page 220 (1985)).

However, the use of cyanine dye is restricted in many points because of its extremely low fastness to light. Metal complexes of oximes and thiols are also disadvantageous in that the metal is eliminated from complex in some media and thereby the ability to absorb near infrared light is lost. Aminated quinone derivatives also have a problem that their ability to absorb near infrared light is quite low.

As a material capable of overcoming these disadvantages, naphthalocyanine derivatives have recently been disclosed. However, so far known unsubstituted metal naphthalocyanines (Zhurnal Obschei Khimii, Vol. 39, Page 2554 (1969); Mol. Cryst. Liq. cryst., Vol. 112, Page 345 (1984)) are quite difficult to purify because they are insoluble in organic solvents. Recently, synthesis of naphthalocyanine derivatives soluble in organic solvent have been reported (Japanese Patent Application Kokai (Laid-Open) 60-23451, 60-184565, 61-215662, 61-215663). However, solubility of these compounds in saturated hydrocarbon solvents is very low, though they are generally soluble in aromatic hydrocarbons and halogen-containing solvents, and therefore their film cannot directly be formed on polymethyl methacrylate and polycarbonate substrates by the wet coating method without providing a protecting layer on the substrate. Thus, it is desired to discover a naphthalocyanine compound exhibiting an excellent solubility in saturated hydrocarbon solvents.

Further, these naphthalocyanine derivatives are disadvantageous in that their absorption greatly varies depending on the kind of solvent, their concentration in solution and temperature so that their ability to absorb semiconductor laser light much decreases in a high-concentration solution or in solid film, and that their reflectance, important to the reading out of information recorded in an optical disk when a reflected light is used, is very low in the semiconductor laser region (780–830 nm).

In Japanese Patent Application Kokai (Laid-Open) 61-235188, only two compounds are disclosed as naphthalocyanine compounds having a high reflectance, and conception of their syntheses are mentioned in Japanese Patent Application Kokai (Laid-Open) 61-177287 and 61-77288. However, only a few working examples are presented in these patent gazettes, and only a few compounds can be synthesized actually in accordance with their descriptions. For example, in Reaction Scheme I (line 1, right upper section, page 8) of Japanese Patent Application Kokai (Laid-Open) 61-177288, the starting compound represented by the following formula:

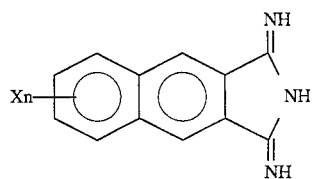

has too high a solubility when Xn is a long chain alkyl group, and this starting compound cannot be isolated from reaction mixture in its synthesis. Furthermore, in the synthesis of its raw material represented by the following formula:

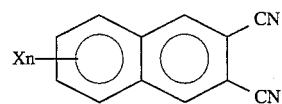

the reaction yields a complicated reaction mixture from which the raw material cannot be isolated and purified easily and is unusable in the intended naphthalocyanine synthesis. On the other hand, Reaction Scheme II (line 3, right upper section, page 8) of Japanese Patent Application Kokai (Laid-Open) 61-177288, is a nucleophilic reaction of naphthalocyanine ring resembling Friedel-Crafts reaction and not suitable for introduction of alkoxyl group, alkylthio group and amino group. In Reaction Scheme III (line 5, right upper section, page 8) of Japanese Patent Application Kokai (Laid-Open) 61-177288, the starting compound cannot be purified and the product is a very complicated mixture difficult to purify, so that the process is unsuitable for isolating a high-purity product. Further, the reaction itself is disturbed by the influence of hydroxyl group attached to Si in starting material, and the reaction cannot be advanced toward the intended direction. As has been mentioned above, it has been necessary to discover a new synthetic process in order to synthesize a naphthalocyanine compound soluble in organic solvent, excellent in the characteristic properties as optical recording medium and having a long chain alkyl group on the naphthalocyanine ring.

SUMMARY OF THE INVENTION

This invention provides a naphthalocyanine derivative represented by the following formula:

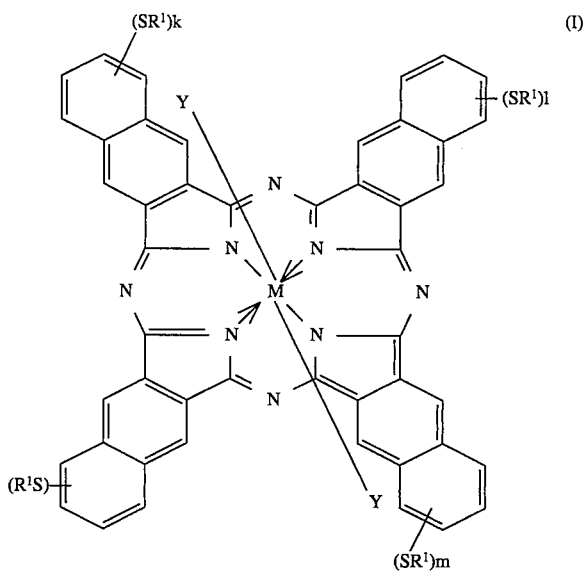

wherein M represents Si, Ge or Sn; the two symbols Y, identical or different, each represents a group of $R^2O$ or a group of $R^3R^4R^5SiO$; k, l, m and n, identical or different one another, each represents zero or an integer of 1–4 provided that a total of k+l+m+n is 1 or greater; the $R^1$ groups in number of (k+l+m+n) may be identical or different one another; $R^1$, $R^2$, $R^3$, $R^4$ and $R^5$, identical or different one another, each represents a cycloalkyl group, an alkyl group having a cycloalkyl group as a substituent, a hydrogen atom, an aryl group, an alkoxyl group, an aryloxyl group, a straight chain alkyl group, a branched chain alkyl group or an alkenyl group; provided that the above-mentioned formula must have at least one cycloalkyl group or alkyl group having a cycloalkyl group as a substituent.

This invention further provides a process for producing a naphthalocyanine derivative represented by formula (I).

This invention furthermore provides an otpical recording medium wherein a recording layer composed mainly of the naphthalocyanine derivative of formula (I) is formed on a substrate.

This invention yet furthermore provides a process for producing said optical recording medium.

BRIEF DESCRIPTION OF THE DRAWINGS

FIG. 52 is IR spectrum of Compound (54) (KBr method)

DESCRIPTION OF THE PREFERRED EMBODIMENTS

Figure 1:
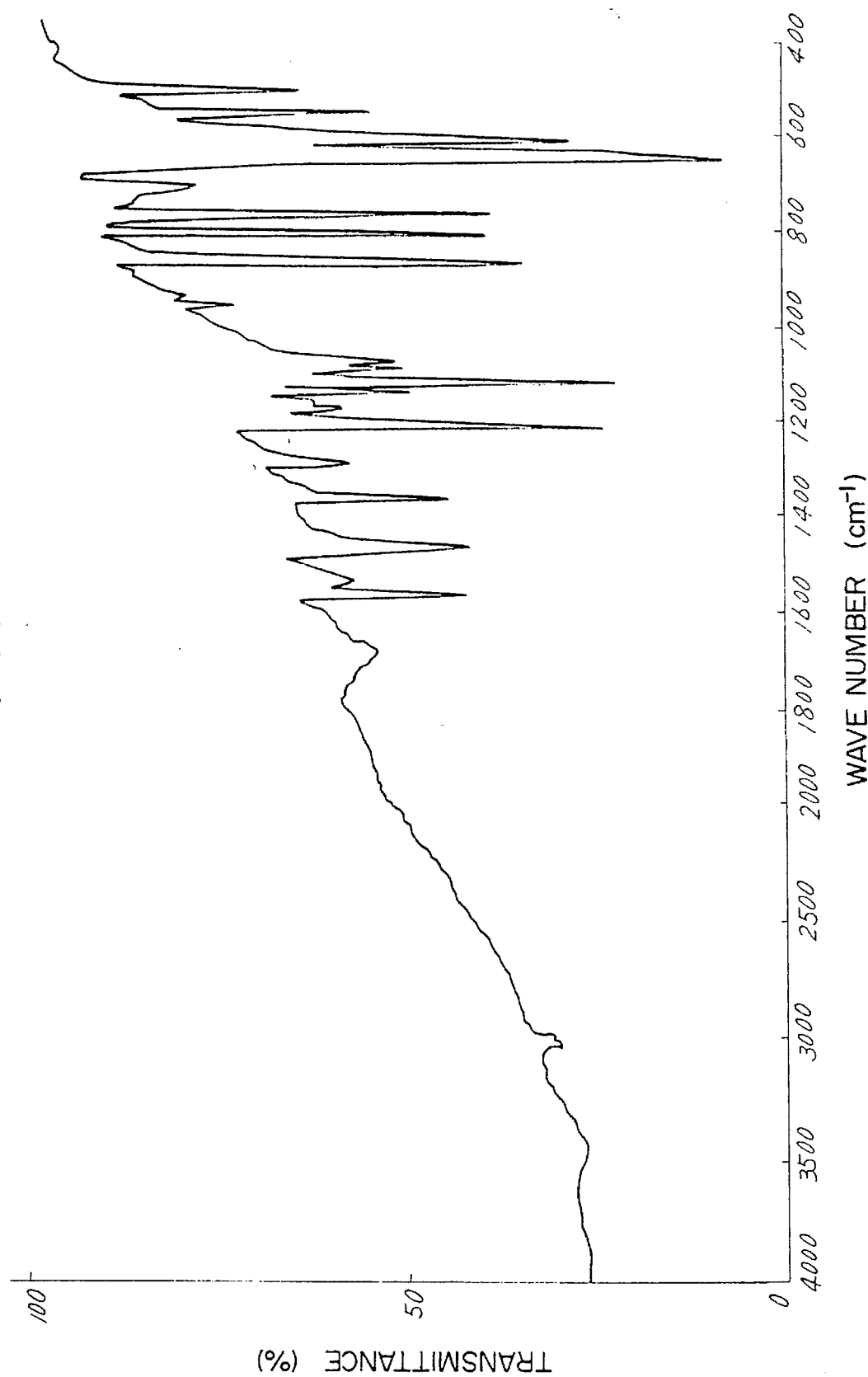
FIG. 1 is IR spectrum of 3,4-bis(dibromomethyl)bromobenzene.

The naphthalocyanine derivatives of this invention are represented by the following formula:

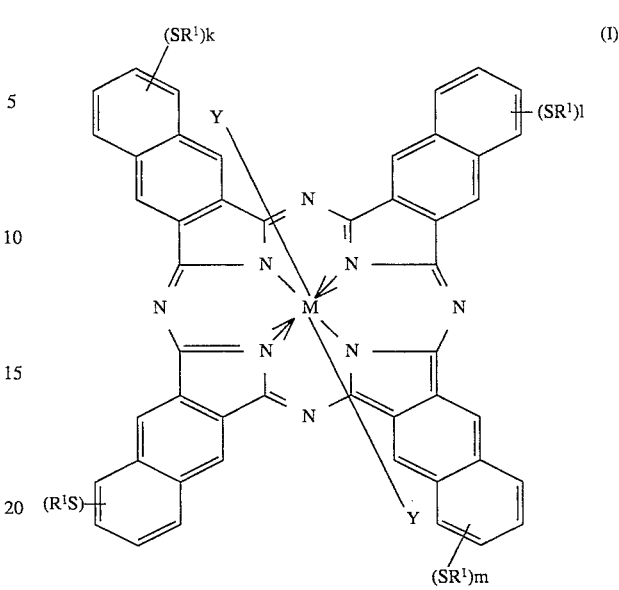

wherein M represents Si, Ge or Sn; the two symbols Y, identical or different each other, each represents group $R^2O$ or group $R^3R^4R^5SiO$; k, l, m and n are the same or different, and each is zero or an integer of 1–4, provided that (k+l+m+n) must be 1 or greater; $R^1$ in number of (k+l+m+n) may be identical or different; and $R^1$, $R^2$, $R^3$, $R^4$ and $R^5$ identical or different one another, each represents cycloalkyl group, alkyl group having cycloalkyl group as substituent, hydrogen atom, aryl group, alkoxyl group, aryloxyl group, straight chain alkyl group, branched chain alkyl group or alkenyl group, provided that the compound of the formula (I) must have at least one cycloalkyl group or alkyl group having cycloalkyl group as substituent.

The naphthalocyanine derivatives represented by general formula (I) are soluble in saturated hydrocarbon solvents, aromatic solvents, halogen-containing solvents, ether solvents and ketone solvents, owing to which (1) they can be purified and their purity can be improved easily, (2) absorption does not change with kind of solvent and concentration, and (3) they are quite excellent in the ability to absorb semiconductor laser light. There is a tendency that naphthalocyanine derivatives having at least one cycloalkyl group or alkyl group having cycloalkyl group as substituent in their molecule are higher in melting point and more improved in stability to regenerating laser light than naphthalocyanines having straight or branched chain alkyl group having equal number of carbon atoms in place of said cycloalkyl group or alkyl group having cycloalkyl group as substituent. The stability to regenerating laser light is influenced by melting point of compound. Thus, generally speaking, compounds having a higher melting point have a higher stability to regenerating light.

There is a general tendency that a naphthalocyanine having a higher melting point has a lower solubility. Thus, it is difficult to fulfil both the requirements of high stability to regenerating laser light and high solubility in saturated hydrocarbons not dissolving polycarbonate. The naphthalocyanine derivatives represented by formula (I), however, exhibit a high solubility in saturated hydrocarbon solvents in spite of their high melting point. Accordingly, they are excellent as a dye for optical recording medium.

Examples of said saturated hydrocarbon solvent include hexane, heptane, octane, nonane, decane, undecane, dodecane, cyclopentane, cyclohexane, cycloheptane and the like. Among them, alicyclic cyclopentane, cyclohexane, cycloheptane and the like are particularly preferable from the viewpoint of solubility of naphthalocyanine derivatives.

Examples of said aromatic solvent include benzene, toluene, xylene, chlorobenzene, dichlorobenzene, trimethylbenzene, 1-chloronaphthalene, quinoline and the like.

Examples of said halogen-containing solvent include methylene chloride, chloroform, carbon tetrachloride, trichlorethane and the like.

Examples of said ether solvent include diethyl ether, dibutyl ether, tetrahdyrofuran, ethylene glycol monomethyl ether, ethylene glycol dimethyl ether, diethylene glycol monomethyl ether, diethylene glycol dimethyl ether and the like.

Examples of said ketone solvent include acetone, methyl ethyl ketone, methyl propyl ketone, cyclopentanone, cyclohexanone, acetone alcohol and the like.

Examples of said cycloalkyl group in formula (I) include cyclopropyl, cyclobutyl, cyclopentyl, cyclohexyl, cycloheptyl, cyclooctyl, 2-methylcyclopentyl, 3-methylcyclopentyl, 4-methylcyclohexyl,

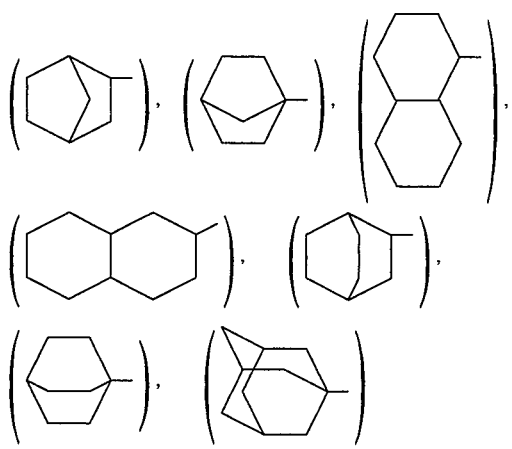

and the like.

Examples of said "alkyl group having cycloalkyl group as substituent" include dicyclohexylmethyl, dicyclopentylmethyl, cyclohexylmethyl, cyclopropylmethyl, 2-cyclohexylethyl, 2-cyclopentylethyl, 2-cyclohexylpropyl, 3-cyclohexylpropyl and the like.

Examples of said aryl group include phenyl, tolyl, anisyl and the like.

Examples of said alkoxyl group include amyloxyl, hexyloxyl, octyloxyl, nonyloxyl, decyloxyl, dodecyloxyl, tetradecyloxyl, hexadecyloxyl, octadecyloxyl, eicosyloxyl, docosyloxyl and the like.

Examples of said aryloxyl group include phenoxyl, tolyloxyl, anisyloxyl and the like.

Examples of said straight chain and branched chain alkyl groups include methyl, ethyl, n-propyl, isopropyl, n-butyl, sec-butyl, iso-butyl, t-butyl, amyl, hexyl, heptyl, neopentyl, octyl, nonyl, decyl, dodecyl, tetradecyl, hexadecyl, octadecyl, eicosyl, docosyl and the like.

Examples of said alkenyl group include butenyl, pentenyl, hexenyl, nonenyl, octenyl, dodecenyl and the like.

Concrete examples of group $R^3R^4R^5SiO$ include tributylsiloxyl, tri-iso-butylsiloxyl, triphenylsiloxyl, trimethylsiloxyl, triethylsiloxyl, tripropylsiloxyl, trihexylsiloxyl, trianisylsiloxyl, tritolylsiloxyl, trimethoxysiloxyl, triethoxysiloxyl, tripropoxysiloxyl, tributoxysiloxyl, trianisyloxysiloxyl, tritolyloxysiloxyl, trihexyloxysiloxyl, triphenoxysiloxyl, tributenylsiloxyl, dimethylhexenylsiloxyl, tricyclopropylsiloxyl, tricyclobutylsiloxyl, tricyclopentylsiloxyl, tricyclohexylsiloxyl, tricycloheptylsiloxyl, tricyclooctylsiloxyl, tri(2-methylcyclopentyl)siloxyl, tri(3-methylcyclopentyl)siloxyl, tri(4-methylcyclohexyl)siloxyl,

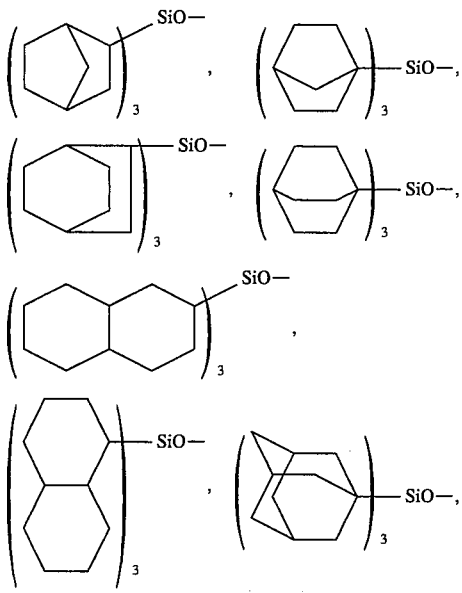

cyclopropyldimethylsiloxyl, cyclobutyldimethylsiloxyl, cyclopentyldimethylsiloxyl, cyclohexyldimethylsiloxyl, cycloheptyldimethylsiloxyl, cyclooctyldimethylsiloxyl, cyclopropyldiethylsiloxyl, cyclobutyldiethylsiloxyl, cyclopentyldiethylsiloxyl, cyclohexyldiethylsiloxyl, cycloheptyldiethylsiloxyl, cyclooctyldiethylsiloxyl, cyclopropyldipropylsiloxyl, cyclobutyldipropylsiloxyl, cyclopentyldipropylsiloxyl, cyclohexyldipropylsiloxyl, cycloheptyldipropylsiloxyl, cyclooctyldipropylsiloxyl, cyclopropyldibutylsiloxyl, cyclobutyldibutylsiloxyl, cyclopentyldibutylsiloxyl, cyclohexyldibutylsiloxyl, cycloheptyldibutylsiloxyl, cyclooctyldibutylsiloxyl, dicyclopropylmethylsiloxyl, dicyclobutylmethylsiloxyl, dicyclopentylmethylsiloxyl, dicyclohexylmethylsiloxyl, dicycloheptylmethylsiloxyl, dicyclooctylmethylsiloxyl, dicyclopropylethylsiloxyl, dicyclobutylethylsiloxyl, dicyclopentylethylsiloxyl, dicyclohexylethylsiloxyl, dicycloheptylethylsiloxyl, dicyclooctylethylsiloxyl, dicyclopropylpropylsiloxyl, dicyclobutylpropylsiloxyl, dicyclopentylpropylsiloxyl, dicyclohexylpropylsiloxyl, dicycloheptylpropylsiloxyl, dicyclooctylpropylsiloxyl, dicyclopropylbutylsiloxyl, dicyclobutylbutylsiloxyl, dicyclopentylbutylsiloxyl, dicyclohexylbutylsiloxyl, dicycloheptylbutylsiloxyl, dicyclooctylbutylsiloxyl,

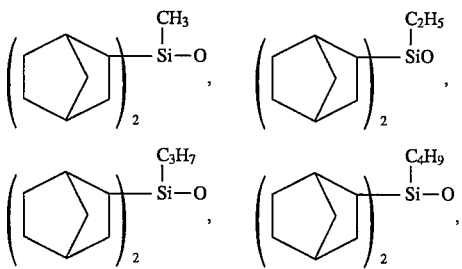

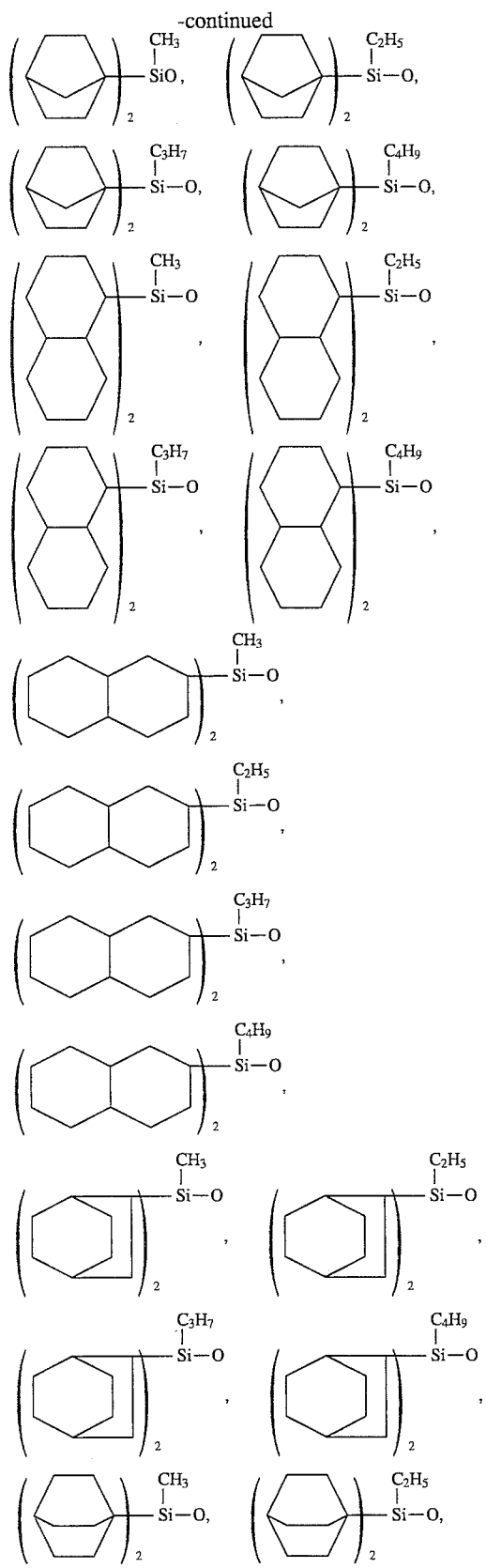

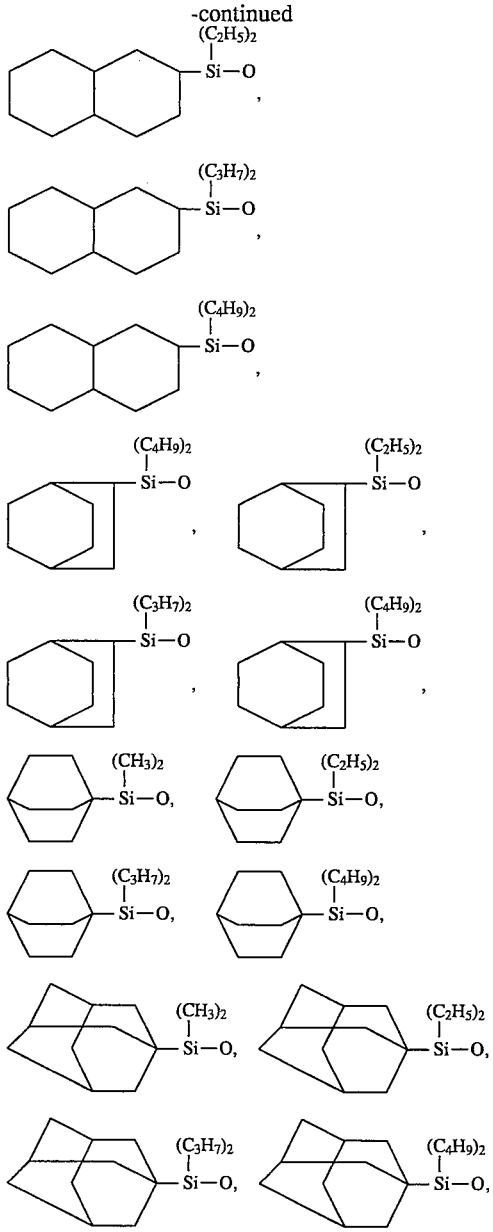

cyclopropyldimethoxysiloxyl, cyclobutyldimethoxysiloxyl, cyclopentyldimethoxysiloxyl, cyclohexyldimethoxysiloxyl, cycloheptyldimethoxysiloxyl, cyclooctyldimethoxysiloxyl, cyclopropyldiethoxysiloxyl, cyclobutyldiethoxysiloxyl, cyclopentyldiethoxysiloxyl, cyclohexyldiethoxysiloxyl, cycloheptyldiethoxysiloxyl, cyclooctyldiethoxysiloxyl, cyclopropyldipropoxysiloxyl, cyclobutyldipropoxysiloxyl, cyclopentyldipropoxysiloxyl, cyclohexyldipropoxysiloxyl, cycloheptyldipropoxysiloxyl, cyclooctyldipropoxysiloxyl, cyclopropyldibutoxysiloxyl, cyclobutyldibutoxysiloxyl, cyclopentyldibutoxysiloxyl, cyclohexyldibutoxysiloxyl, cycloheptyldibutoxysiloxyl, cyclooctyldibutoxysiloxyl, dicyclohexylmethoxysiloxyl, dicyclobutylmethoxysiloxyl, dicyclopentylmethoxysiloxyl, dicyclohexylmethoxysiloxyl, dicycloheptylmethoxysiloxyl, dicyclooctylmethoxysiloxyl, dicyclopropylethoxysiloxyl, dicyclobutylethoxysiloxyl, dicyclopentylethoxysiloxyl, dicyclohexylethoxysiloxyl, dicycloheptylethoxysiloxyl, dicyclooctylethoxysiloxyl, dicyclopropylpropoxysiloxyl, dicyclobutylpropoxysiloxyl, dicyclopentylpropoxysiloxyl, dicyclohexylpropoxysiloxyl, dicycloheptylpropoxysiloxyl, dicyclooctylpropoxysiloxyl, dicyclopropylbutoxysiloxyl, dicyclobutylbutoxysiloxyl, dicyclopentylbutoxysiloxyl, dicyclohexylbutoxysiloxyl, dicycloheptylbutoxysiloxyl, dicyclooctylbutoxysiloxyl and the like.

The length and shape of these cycloalkyl groups, alkyl groups having cycloalkyl group as substituent, straight chain alkyl groups and branched chain alkyl groups exercise a great influence not only upon the solubility of naphthalocyanine derivatives represented by formula (I) in organic solvents but also upon their melting points and further upon the absorption spectrum, transmission spectrum and reflection spectrum of amorphous film prepared by dissolving these compounds into an organic solvent and spin-coating the solution onto an appropriate substrate such as glass plate.

Particularly, the lengths of the cycloalkyl group, alkyl group having cycloalkyl group as substituent, straight chain alkyl group and branched chain alkyl group in the substituent Y bound to central metal M exercise a particularly great influence upon the spectrum of film composed mainly of naphthalocyanine derivative of formula (I). Accordingly, alkyl chain length and shape of substituent Y can be varied depending on the oscillating wavelength of the laser used.

On the other hand, alkyl chain length and shape of function $R^1$ serve to control the solubility in an organic solvent and melting point of a compound when alkyl chain length and shape of Y are varied.

Naphthalocyanine derivatives of formula (I) wherein M is Si or Ge are preferable in this invention.

Naphthalocyanine derivatives of formula (I) wherein k, l, m and n are all equal to 1 are preferable in this invention.

Naphthalocyanine derivatives of formula (I) wherein the two symbols Y both represent $R^3R^4R^5SiO$ are preferable in this invention.

Naphthalocyanine derivatives of formula (I) wherein all the symbols $R^1$ represent a cycloalkyl group having 3 to 22 carbon atoms are preferable in this invention.

Naphthalocyanine derivatives of formula (I) wherein all the symbols $R^1$ represent an alkyl group having cycloalkyl group as substituent are preferable in this invention.

Naphthalocyanine derivatives of formula (I) wherein all the symbols $R^1$ represent straight chain alkyl group are preferable in this invention.

Naphthalocyanine derivatives of formula (I) wherein all the symbols $R^1$ represent branched chain alkyl group are preferable in this invention.

Concrete examples of the naphthalocyanine derivative of this invention are listed in the following table, wherein Ph is phenyl group, Me is methyl group, Et is ethyl group, Pr is propyl group, and Bu is butyl group.

| Compound No. | M | Y | R¹ | k | l | m | n |
|---|---|---|---|---|---|---|---|
| 1 | Si | OSiPr₃ | 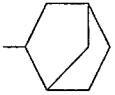 | 1 | 1 | 1 | 1 |
| 2 | " | OSiBu₃ | " | " | " | " | " |
| 3 | " | OSiPr₃ | 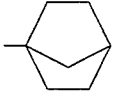 | " | " | " | " |
| 4 | " | OSiBu₃ | " | " | " | " | " |
| 5 | " | OSiEt₃ | " | " | " | " | " |
| 6 | " | OSiEt₃ | 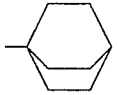 | " | " | " | " |
| 7 | Si | OSiEt₃ | 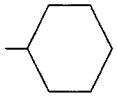 | 1 | 1 | 1 | 1 |
| 8 | " | " |  | " | " | " | " |
| 9 | " | OSiPr₃ | 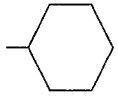 | " | " | " | " |
| 10 | " | " | 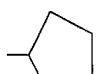 | " | " | " | " |
| 11 | " | OSiBu₃ | 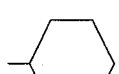 | " | " | " | " |
| 12 | " | " | 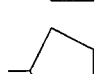 | " | " | " | " |
| 13 | Si | OSi(C₅H₁₁)₃ |  | 1 | 1 | 1 | 1 |
| 14 | " | " | 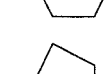 | " | " | " | " |
| 15 | " | OSi(C₆H₁₃)₃ |  | " | " | " | " |
| 16 | " | " |  | " | " | " | " |

-continued
| Compound No. | M | Y | R¹ | k | l | m | n |
|---|---|---|---|---|---|---|---|
| 17 | " | OSiEt₃ | 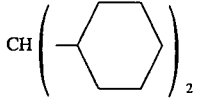 | " | " | " | " |
| 18 | Si | OSiEt₃ | 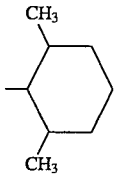 | 1 | 1 | 1 | 1 |
| 19 | " | OSiBu₃ | 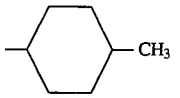 | " | " | " | " |
| 20 | " | OSiEt₃ | 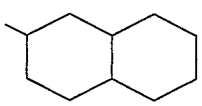 | " | " | " | " |
| 21 | " | " | 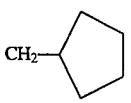 | " | " | " | " |
| 22 | Si | OSiPr₃ | 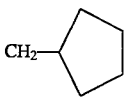 | 1 | 1 | 1 | 1 |
| 23 | " | OSiEt₃ | 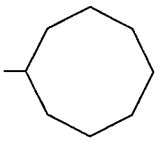 | " | " | " | " |
| 24 | " | OSiPr₃ | " | " | " | " | " |
| 25 | " | OSiEt₃ | 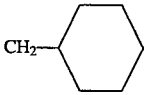 | " | " | " | " |
| 26 | " | OSiBu₃ | 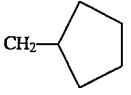 | " | " | " | " |
| 27 | Si | OSiEt₃ | 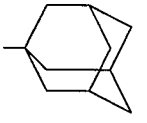 | 1 | 1 | 1 | 1 |
| 28 | " | OSiBu₃ | " | " | " | " | " |
| 29 | " | OSiPr₃ | " | " | " | " | " |
| 30 | " | OSiMe₃ | 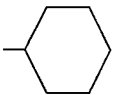 | " | " | " | " |
| 31 | " | OSiEt₃ | 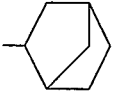 | " | " | " | " |

-continued
| Compound No. | M | Y | R¹ | k | l | m | n |
|---|---|---|---|---|---|---|---|
| 32 | Si | OSiEt₃ | 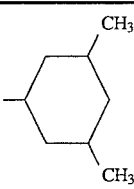 | 1 | 1 | 1 | 1 |
| 33 | Ge | OSiBu₃ |  | " | " | " | " |
| 34 | " | " | 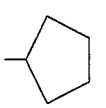 | " | " | " | " |
| 35 | " | " | 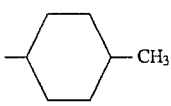 | " | " | " | " |
| 36 | Ge | OSiPr₃ | 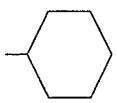 | 1 | 1 | 1 | 1 |
| 37 | " | " | 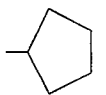 | " | " | " | " |
| 38 | " | " | 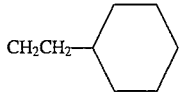 | " | " | " | " |
| 39 | " | " | 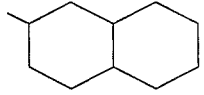 | " | " | " | " |
| 40 | " | " | 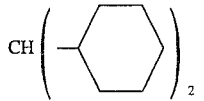 | " | " | " | " |
| 41 | Si | OSiBu₃ | 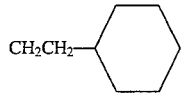 | 1 | 1 | 1 | 1 |
| 42 | " | OSiPr₃ | " | " | " | " | " |
| 43 | " | OSi(C₆H₁₃)₃ | 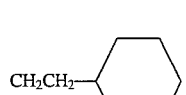 | " | " | " | " |
| 44 | Sn | OSiBu₃ | 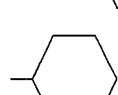 | " | " | " | " |
| 45 | " | " | 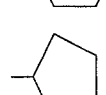 | " | " | " | " |

-continued
| Compound No. | M | Y | R¹ | k | l | m | n |
|---|---|---|---|---|---|---|---|
| 46 | Si | OSiPh₃ | 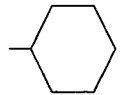 | 1 | 1 | 1 | 1 |
| 47 | " | " | 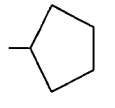 | " | " | " | " |
| 48 | " | OSi(OMe)₃ | 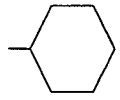 | " | " | " | " |
| 49 | " | OSi(OEt)₃ | " | " | " | " | " |
| 50 | " | OSiMe₂(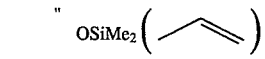) | " | " | " | " | " |
| 51 | Si | OSiMe₂(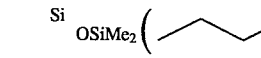) | 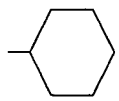 | 1 | 1 | 1 | 1 |
| 52 | " | OSiBu₃ | 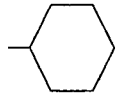 | 2 | 2 | 2 | 2 |
| 53 | " | " | 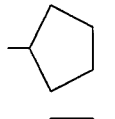 | " | " | " | " |
| 54 | " | " | 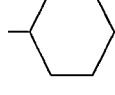 | " | " | " | " |
| 55 | " | OSi(C₆H₁₃)₃ | " | " | " | " | " |
| 56 | Ge | OSiBu₃ | 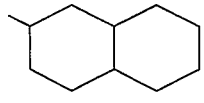 | 2 | 2 | 2 | 2 |
| 57 | Sn | " | " | " | " | " | " |
| 58 | Si | OC₁₀H₂₁ | 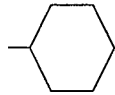 | " | " | " | " |
| 59 | " | " | " | 1 | 1 | 1 | 1 |
| 60 | " | OC₁₆H₃₃ | 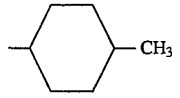 | " | " | " | " |
| 61 | Si | OSi(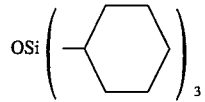)₃ | C₄H₉ | 1 | 1 | 1 | 1 |
| 62 | " | OSi(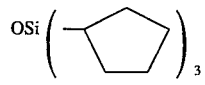)₃ | " | " | " | " | " |

-continued

| Compound No. | M | Y | R¹ | k | l | m | n |
|---|---|---|---|---|---|---|---|
| 63 | " | OSi(—⟨cycloheptyl⟩)₃ | " | " | " | " | " |
| 64 | " | OSi(—⟨cyclooctyl⟩)₃ | " | " | " | " | " |
| 65 | " | OSiMe₂(—⟨cyclohexyl⟩)₃ | $C_{16}H_{33}$ | " | " | " | " |
| 66 | Si | OSiMe₂(—⟨cyclopentyl⟩)₃ | $C_{14}H_{29}$ | 1 | 1 | 1 | 1 |
| 67 | " | OSiMe₂(—⟨cycloheptyl⟩) | $C_{12}H_{25}$ | " | " | " | " |
| 68 | " | OSiMe₂(—⟨cyclooctyl⟩) | $C_6H_{13}$ | " | " | " | " |
| 69 | " | OSiEt₂(—⟨cyclohexyl⟩) | $C_8H_{17}$ | " | " | " | " |
| 70 | " | OSiEt₂(—⟨cyclopentyl⟩) | $C_{10}H_{21}$ | " | " | " | " |
| 71 | Si | OSiEt₂(—⟨cyclooctyl⟩) | $C_8H_{17}$ | 1 | 1 | 1 | 1 |
| 72 | " | OSiEt₂(—⟨cycloheptyl⟩) | $C_{10}H_{21}$ | " | " | " | " |
| 73 | " | OSiPr₂(—⟨cyclohexyl⟩) | " | " | " | " | " |
| 74 | " | OSiPr₂(—⟨cyclopentyl⟩) | $C_{12}H_{25}$ | " | " | " | " |
| 75 | Si | OSiPr₂(—⟨cycloheptyl⟩) | $C_4H_9$ | 1 | 1 | 1 | 1 |
| 76 | " | OSiPr₂(—⟨cyclooctyl⟩) | $C_4H_9$ | " | " | " | " |

-continued

| Compound No. | M | Y | R¹ | k | l | m | n |
|---|---|---|---|---|---|---|---|
| 77 | " | OSiBu₂(–⬡) | –⬡ | " | " | " | " |
| 78 | " | OSiBu₂(–⬠) | –⬡(8) | " | " | " | " |
| 79 | Si | OSiBu₂(–⬡(8)) | –⬡ | 1 | 1 | 1 | 1 |
| 80 | " | OSiBu₂(–⬡(7)) | –⬠ | " | " | " | " |
| 81 | " | OSiMe(–⬡)₂ | $C_{14}H_{29}$ | " | " | " | " |
| 82 | " | OSiMe(–⬠)₂ | $C_{12}H_{25}$ | " | " | " | " |
| 83 | Si | OSiMe(–⬡(7))₂ | $C_{10}H_{21}$ | 1 | 1 | 1 | 1 |
| 84 | " | OSiMe(–⬡(8))₂ | $C_8H_{17}$ | " | " | " | " |
| 85 | " | OSiEt(–⬡)₂ | " | " | " | " | " |
| 86 | " | OSiEt(–⬠)₂ | $C_6H_{13}$ | " | " | " | " |
| 87 | Si | OSiEt(–⬡(8))₂ | $C_4H_9$ | 1 | 1 | 1 | 1 |
| 88 | " | OSiEt(–⬡(7))₂ | " | " | " | " | " |
| 89 | " | OSiPr(–⬡)₂ | –⬡ | " | " | " | " |

-continued

| Compound No. | M | Y | R¹ | k | l | m | n |
|---|---|---|---|---|---|---|---|
| 90 | " | OSiPr(cyclopentyl)₂ | 3,5-dimethylcyclohexyl | " | " | " | " |
| 91 | Si | OSiBu(cyclohexyl)₂ | decahydronaphthyl | 1 | 1 | 1 | 1 |
| 92 | " | OSiBu(cyclopentyl)₂ | decahydronaphthyl | " | " | " | " |
| 93 | " | OSiEt₂(cyclopentyl) | CH₂-cyclohexyl | " | " | " | " |
| 94 | " | " | CH₂-cyclopentyl | " | " | " | " |
| 95 | Si | OSiMe₂(CH₂-cyclohexyl) | CH(cyclohexyl)₂ | 1 | 1 | 1 | 1 |
| 96 | " | OSiBu(cyclohexyl)₂ | C₄H₉ | " | " | " | " |
| 97 | " | " | cyclohexyl | " | " | " | " |
| 98 | " | OSi(OMe)₂(cyclohexyl) | " | " | " | " | " |
| 99 | Ge | OSi(cyclohexyl)₃ | cyclohexyl | 1 | 1 | 1 | 1 |
| 100 | " | " | C₁₀H₂₁ | " | " | " | " |
| 101 | Sn | " | " | " | " | " | " |
| 102 | " | OSi(cyclohexyl)₃ | cyclohexyl | " | " | " | " |
| 103 | Si | OSi(cyclohexyl)₃ | cyclohexyl | 2 | 2 | 2 | 2 |

-continued

| Compound No. | M | Y | R¹ | k | l | m | n |
|---|---|---|---|---|---|---|---|
| 104 | " | " | —⟨cyclohexyl⟩—CH₃ | " | " | " | " |
| 105 | " | " | CH₂CH₂—⟨cyclohexyl⟩ | " | " | " | " |
| 106 | " | OSiEt₂(—⟨cyclohexyl⟩) | —⟨cyclohexyl⟩ | 1 | 1 | 1 | 1 |

This invention further provides a process for producing a naphthalocyanine derivative represented by formula (I) which comprises reacting a naphthalocyanine derivative represented by the following formula (II):

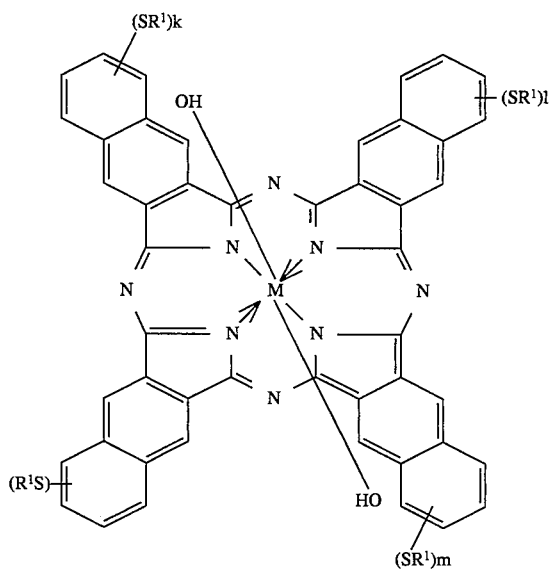

(k, l, m, n, R¹ and M are as defined in formula (I)) with an alcohol represented by the following formula (III):

$$R^2OH \qquad (III)$$

($R^2$ is as defined in formula (I)) or a chlorosilane compound represented by the following formula (IV):

$$R^3R^4R^5SiCl \qquad (IV)$$

or a silanol represented by the following formula (V):

$$R^3R^4R^5SiOH \qquad (V)$$

(in formulas (IV) and (V), $R^3$, $R^4$ and $R^5$ are as defined in formula (I)).

The naphthalocyanine derivative represented by formula (I) can be produced by reacting, at an elevated temperature, a compound represented by formula (II) with an excessive amount of a compound represented by formula (III), formula (IV) or formula (V). Temperature of this reaction is preferably 80°–250° C., and time of this reaction is preferably 30 minutes to 10 hours. Preferably, this is carried out either in the absence of solvent or in a solvent such as benzene, toluene, xylene, trimethylbenzene, chlorobenzene, dichlorobenzene, trichlorobenzene, 1-chloronaphthalene, tetralin, pyridine, β-picoline, quinoline or the like and , if necessary in the presence of an aliphatic amine such as triethylamine, tripropylamine, tributylamine, tripentylamine, trihexylamine and the like.

The naphthalocyanine derivative represented by formula (I) can be isolated from reaction mixture and purified, for example, by isolating it by chromatography and then purifying it by recrystallization.

The naphthalocyanine derivative of formula (II) can be obtained by hydrolyzing a naphthalocyanine derivative represented by the following formula (VIII):

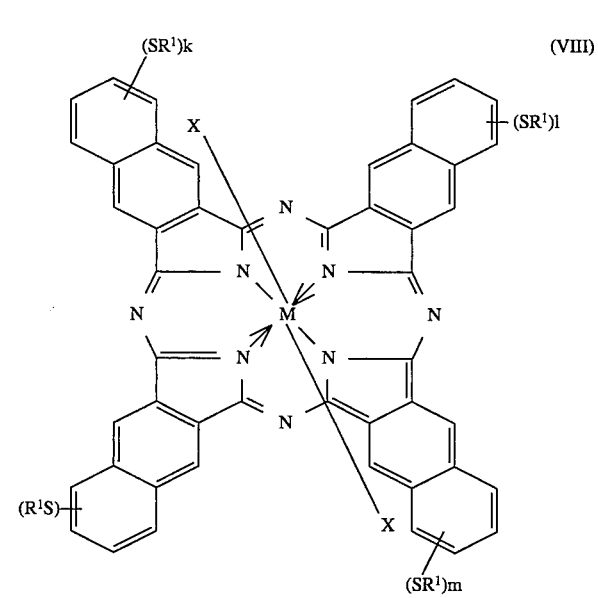

(k, l, m, n, R¹ and M are as defined in formula (I) and X represents halogen atom, provided that the two halogen atoms represented by x may be identical or different) at an elevated temperature. The reaction temperature is preferably 50°–150° C., and reaction time is preferably 30 minutes to 10 hours. For this reason, the reaction is preferably carried out in a solvent mixture such as pyridine/water, pyridine/aqueous ammonia, methanol/aqueous ammonia, ethanol/aqueous ammonia, propanol/aqueous ammonia, or the like.

The naphthalocyanine derivative represented by formula (VIII) can be obtained by reacting, at an elevated temperature, one mole of a 1,3-diiminobenz[f]-isoindoline derivative represented by the following formula (IX):

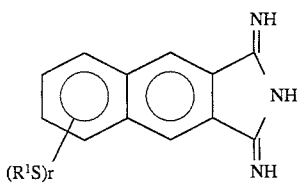

($R^1$ is as defined in formula (I) and r represents an integer of 0–4 provided that $R^1$ in number of r may be identical or different one another) or a 2,3-dicyano naphthalene derivative represented by the following formula (X):

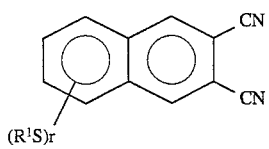

($R^1$ is as defined in formula (I) and r represents an integer of 0–4, provided that $R^1$ in number of r may be identical or different one another) with 1–100 moles of a metal halide represented by the following formula (XI):

$$MX_p \quad (XI)$$

(X represents halogen atom; p is a positive integer representing the number of X bound to metal M; and M represents Si, Ge or Sn). The reaction temperature is preferably 150°–300° C., and the reaction time is preferably 30 minutes to 10 hours. This reaction may be carried out either in the absence of solvent or in a solvent such as urea, tetralin, quinoline, 1-chloronaphthalene, 1-bromonaphthalene, trimethylbenzene, dichlorobenzene, trichlorobenzene or the like. This reaction is preferably carried out in the presence of an amine. The amines usable for this purpose include triethyleneamine, tripropylamine, tributylamine, tripentylamine, trihexylamine and the like. Examples of said metal halide include $SiCl_4$, $SiBr_4$, $SiI_4$, $GeCl_4$, $GeBr_4$, $SnCl_2$, $SnI_2$, and the like.

The 1,3-diiminobenz[f]isoindoline represented by formula (IX) can be obtained by refluxing a 2,3-dicyanonaphthalene derivative represented by formula (X) for 1–10 hours in methanol in the presence of sodium methoxide as a catalyst while bubbling ammonia gas.

The 2,3-dicyanonaphthalene derivative represented by formula (X) can be produced mainly according to the following two methods.

According to the first method, an o-xylene derivative represented by the following formula (XII):

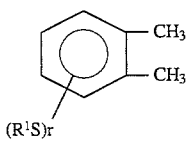

($R^1$ and r are defined in formula (X)) and N-bromosuccinimide represented by the following formula (XIII):

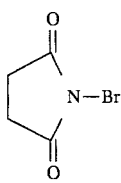

are irradiated with light at an elevated temperature to obtain a compound represented by the following formula (XIV):

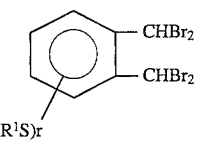

($R^1$ and r are as defined in formula (X)), and then the latter is reacted, at an elevated temperature, with fumaronitrile represented by the following formula (XV):

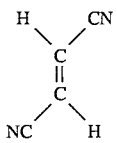

to obtain a 2,3-dicyanonaphthalene derivative represented by formula (X).

Generally speaking, the reaction of o-xylene derivative represented by formula (XII) and N-bromosuccinimide represented by formula (XIII) can be effected by refluxing 0.2 mole of o-xylene derivative and 0.8 mole of N-bromosuccinimide for 4–12 hours while irradiating the mixture with a high pressure mercury lamp, in a solvent inert to the irradiation. The reaction requires addition of a peroxide which is a radical generator, as a photo-reaction initiator. As the peroxides usable for this purpose, benzoyl peroxide, octanoyl peroxide, cyclohexanone peroxide, isobutyryl peroxide, 2,4-dichlorobenzoyl peroxide, methyl ethyl ketone peroxide and the like can be referred to. The peroxide is usually used in an amount of 500 mg to 2 g per 500 ml of solvent. Said solvent inert to irradiation is appropriately selected from halogen-containing solvents such as chloroform, carbon tetrachloride and the like or aromatic solvents such as benzene, chlorobenzene and the like.

The reaction of a compound represented by formula (XIV) and fumaronitrile represented by formula (XV) is carried out by using 1 mole of the compound of formula (XIV) and 1–2 mole of fumaronitrile represented by formula (XV). The reaction temperature is preferably 70°–100° C., and the reaction time is preferably 5–10 hours. As the solvent, polar organic solvents such as N,N-dimethylformamide, N,N-dimethylacetamide, dimethyl sulfoxide, N,N-diethylformamide, N,N-diethylacetamide and the like are preferable.

According to the second method, the 2,3-dicyanonaphthalene derivative of the formula (X) can be obtained by subjecting a bromo-2,3-dicyanonaphthalene represented by the following formula (XVI):

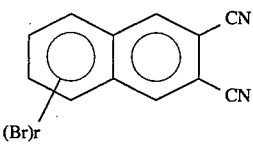

to a substitution reaction with an excessive amount of copper (I) thiolate represented by the following formula (VII):

CuSR¹  (VII)

(R¹ is as defined in formula (I)). The reaction temperature is preferably 80°–250° C., and the reaction time is preferably 1–30 hours. As the solvent of this reaction, benzene, toluene, xylene, trimethylbenzene, chlorobenzene, dichlorobenzene, trichlorobenzene, 1-chloronaphthalene, tetralin, pyridine, β-picoline, quinoline and the like can be used either as a single solvent or in the form of solvent mixture.

The bromo-2,3-dicyanonaphthalene represented by formula (XVI) can be synthesized, for example, according to the following reaction scheme, with reference to the procedure mentioned in Zhurnal Organicheskoi Khimii, Vol. 7, Page 369 (1971):

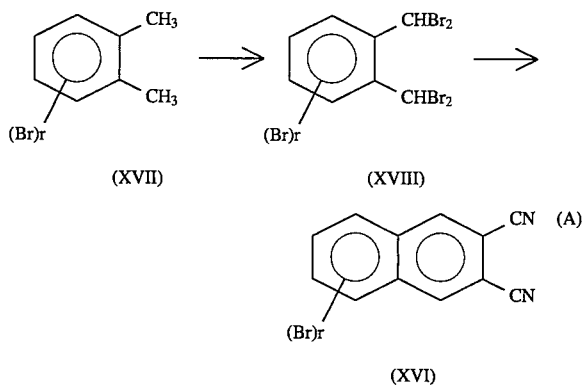

Thus, bromo-o-xylene (XVII) and N-bromosuccinimide represented by the following formula (XIII):

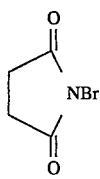

are irradiated with light with heating to obtain bis-(dibromomethyl)-bromobenzene (XVIII), and then the latter is reacted at an elevated temperature with fumaronitrile represented by the following formula (XV):

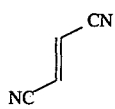

to obtain bromo-2,3-dicyanonaphthalene represented by formula (XVI).

Generally speaking, the reaction of bromo-o-xylene (XVII) and N-bromosuccinimide (XIII) is effected by heating, under reflux, 0.2 mole of bromo-o-xylene and 0.8 mole of N-bromosuccinimide for 4–12 hours while irradiating them with high pressure mercury lamp in a solvent inert to the irradiation. The reaction requires addition of a peroxide which is a radical generator, as a photo reaction initiator. As said peroxide, benzoyl peroxide, octanoyl peroxide, cyclohexanone peroxide, isobutyryl peroxide, 2,4-dichlorobenzoyl peroxide, methyl ethyl ketone peroxide and the like can be used. The peroxide is usually used in an amount of 500 mg to 2 g per 500 ml of solvent. Said solvent inert to irradiation is appropriately selected from halogen-containing solvents such as chloroform, carbon tetrachloride and the like or aromatic solvents such as benzene, chlorobenzene and the like.

The reaction of a compound represented by formula (XVIII) and fumaronitrile represented by formula (XV) is carried out by using 1 mole of compound (XVIII) and 1–2 moles of fumaronitrile (XV). The reaction temperature is preferably 70°–100° C., and the reaction time is preferably 5–10 hours. As the solvent, polar solvents such as N,N-dimethylformamide, N,N-dimethylacetamide, dimethyl sulfoxide, N,N-diethylformamide, N,N-diethylacetamide and the like are preferable.

This invention further provides a process for producing a naphthalocyanine derivative represented by formula (I) which comprises reacting a naphthalocyanine derivative represented by the following formula (VI):

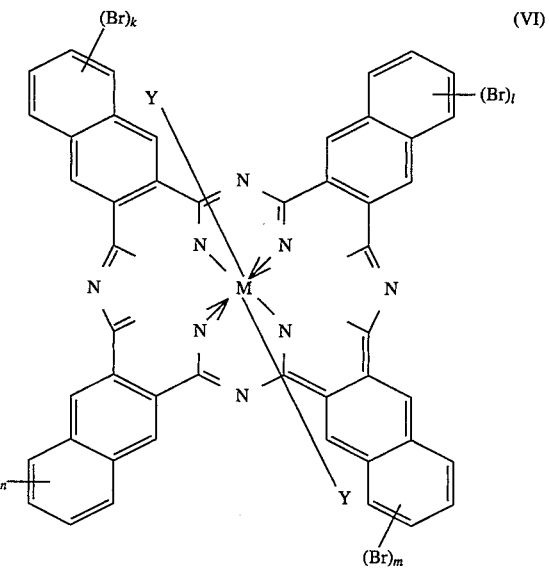

(k, l, m, n, M and Y are as defined in formula (I)) with copper (I) thiolate represented by the following formula (VII):

CuSR¹  (VII)

(R¹ is as defined in formula (I)).

The naphthalocyanine derivative represented by formula (I) can be obtained by subjecting a compound represented by formula (VI) to an substitution reaction with an excessive amount of copper (I) thiolate represented by formula (VII) with heating. The reaction temperature is preferably 80°–250° C. and the reaction time is preferably 1–30 hours. As the solvent for this reaction, benzene, toluene, xylene, trimethylbenzene, chlorobenzene, dichlorobenzene, trichlorobenzene, 1-chloronaphthalene, tetralin, pyridine, β-picoline, quinoline and the like can be used either as a single solvent or in the form of solvent mixture.

For producing a naphthalocyanine derivative of formula (I) wherein symbols R¹ represent different substituents, the compound of formula (VI) must be reacted with plural kinds of copper (I) thiolate (VII) having different substituents R¹.

The naphthalocyanine derivative represented by formula (I) can be isolated from reaction mixture and purified by isolating it from reaction mixture by column chromatography or thin layer chromatography and thereafter purifying it by recrystallization.

The naphthalocyanine derivative represented by formula (VI) can be obtained by reacting a naphthalocyanine derivative represented by the following formula (XIX):

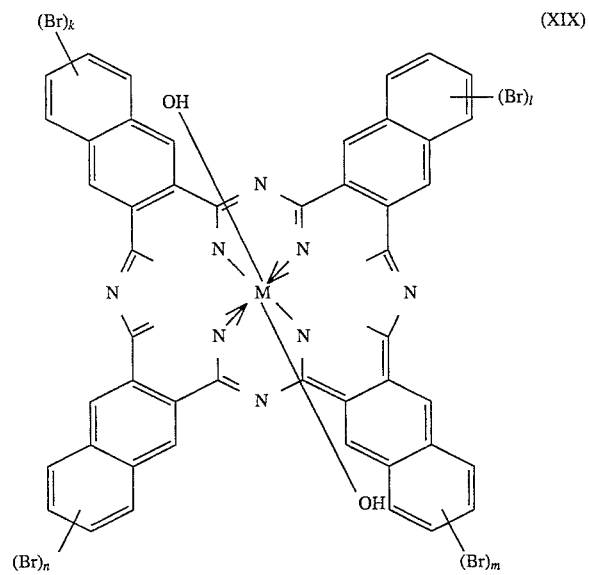

(XIX)

(k, l, m, n, and M are as defined in formula (I)) with an excessive amount of an alcohol represented by the following general formula (III):

 (III)

($R^2$ is as defined in formula (I)) or a chlorosilane compound represented by the following formula (IV):

 (IV)

or a compound represented by the following formula (V):

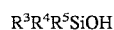 (V)

(in formulas (IV) and (V), $R^3$, $R^4$ and $R^5$ are as defined in formula (I)) with heating. The reaction temperature is preferably 80°–250° C., and the reaction time is preferably 30 minutes to 10 hours. Preferably, this reaction is carried out in the absence of solvent or in a solvent such as benzene, toluene, xylene, trimethylbenzene, chlorobenzene, dichlorobenzene, trichlorobenzene, 1-chloronaphthalene, tetralin, pyridine, β-picoline, quinoline and the like, optionally in the presence of an aliphatic amine such as triethylamine, triproipylamine, tributylamine, tripentylamine, trihexylamine and the like.

The naphthalocyanine derivative represented by formula (VI) can be isolated from reaction mixture and purified by isolating it by chromatography and purifying it by recrystallization.

The naphthalocyanine derivative represented by formula (XIX) can be obtained by treating a naphthalocyanine derivative represented by the following formula (XX):

(XX)

(k, l, m, n and M are as defined in formula (I) and X represents halogen atom, provided that the two symbols X may be identical or different each other) in concentrated sulfuric acid at room temperature for 1–10 hours and thereafter refluxing in concentrated aqueous ammonia for 30 minutes to 10 hours, or by refluxing in pyridine/water, pyridine/aqueous ammonia, methanol/aqueous ammonia, ethanol/aqueous ammonia or propanol/aqueous ammonia for a period of 30 minutes to 10 hours.

The naphthalocyanine derivative represented by formula (XX) can be obtained by refluxing one mole of bromo-1,3-diiminobenz[f]isoindoline represented by the following formula (XXI):

(XXI)

(r represents an integer of 0–4) in the presence of 1–100 moles of a metal halide represented by the following formula (XI):

 (XI)

(X represents halogen atom; p is a positive integer representing the number of X bound to metal M; and M represents Si, Ge or Sn). The reaction temperature is preferably 150°–300° C., and the reaction time is preferably 30 minutes to 10 hours. This reaction may be carried out either in the absence of solvent or in a solvent such as urea, tetralin, quinoline, 1-chloronaphthalene, 1-bromonaphthalene, trimethylbenzene, dichlorobenzene, trichlorobenzene or the like. This reaction is preferably carried out in the presence of an amine. The amines which can be used for this purpose include triethylamine, tripropylamine, tributylamine, tripentylamine, trihexylamine and the like. As said metal halide, $SiCl_4$, $SiBr_4$, $SiI_4$, $GeCl_4$, $GeBr_4$, $SnCl_2$, $SnI_2$ and the like can be used.

Bromo-1,3-diiminobenz[f]isoindoline represented by formula (XXI) can be obtained by refluxing bromo-2,3-dicyanonaphthalene represented by the following formula (XVI):

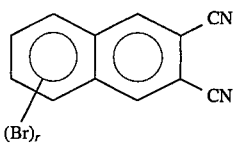 (XVI)

(r represents an integer of 0–4) for 1–10 hours in methanol in the presence of sodium methoxide as a catalyst while bubbling ammonia gas.

In the above-mentioned invention, processes for producing naphthalocyanine derivatives of formulas (II), (I), (VIII), (XI), (VI), (XIX) and (XX) wherein M is Si or Ge are preferable.

In the above-mentioned invention, processes for producing naphthalocyanine derivatives of formulas (II), (I), (VIII), (IX), (X), (XII), (XIV), (XVI), (XVII), (XVIII), (VI), (XIX), (XX) and (XXI) wherein k, l, m, n and r are all equal to 1 are preferable.

In the above-mentioned invention, processes for producing naphthalocyanine derivatives of formulas (I) and (VI) wherein the two symbols Y both represent $R^3R^4R^5SiO$ are preferable.

In the above-mentioned invention, processes for producing naphthalocyanine derivatives of formulas (II), (I), (VII), (VIII), (IX), (X), (XII) and (XIV) wherein all the symbols $R^1$ represent cycloalkyl group having 3–22 carbon atoms are preferable.

In the above-mentioned invention, processes for producing naphthalocyanine derivatives of formulas (II), (I), (VIII), (IX), (X), (XII), (XIV) and (VII) wherein all the symbols $R^1$ represent an alkyl group having secondary, tertiary or cyclic alkyl group as substituent are preferable.

In the above-mentioned invention, processes for producing naphthalocyanine derivatives of formulas (II), (I), (VII), (IX), (X), (XII), (XIV) and (VII) wherein all the symbols $R^1$ represent a straight chain alkyl group are preferable.

In the above-mentioned invention, processes for producing naphthalocyanine derivatives of formulas (II), (I), (VIII), (IX), (X), (XII), (XIV) and (VII) wherein all the symbols $R^1$ represent a branched chain alkyl group are preferable.

This invention further provides an optical recording medium comprising a recording layer composed mainly of a naphthalocyanine derivative represented by formula (I) which is formed on a substrate.

In the optical recording medium of this invention, a recording layer composed mainly of a naphthalocyanine derivative represented by formula (I) is provided on a substrate. If desired, other layers such as underlayer, protecting layer and the like can also be provided.

The substrate materials usable are those well known to specialists in the art. The substrate may be transparent or opaque to the used laser light. When writing or reading is carried out from the side of substrate, however, the substrate must be transparent to the laser light. On the other hand, when writing or reading is carried out from the other side, i.e. the side of recording layer, transparency to laser light is not necessary. Non-limitative examples of the usable substrate material include inorganic materials such as glass, quartz, mica, ceramics, plate or foil of metals, and the like; and plates of organic polymeric materials such as paper, polycarbonate, polyester, polyethylene terephthalate, cellulose acetate, nitrocellulose, polyethylene, polypropylene, polyvinyl chloride, vinylidene chloride copolymers, polyamide, polystyrene, polymethyl methacrylate, methyl methacrylate copolymers and the like. Supports made of organic polymers are preferable from the viewpoint of low heat loss at the time of recording and high sensitivity. If desired, a convex-concave guide channel may be provided on the substrate.

If desired, an under-film may be provided on the substrate.

In this invention, optical recording mediums wherein is formed a recording layer composed mainly of a naphthalocyanine derivative of general formula (I) (M is Si or Ge) are preferable.

In this invention, optical recording mediums wherein is formed a recording layer composed mainly of a naphthalocyanine derivative of formula (I) (k, l, m and n are all equal to 1) are preferable.

In this invention, optical recording mediums wherein is formed a recording layer composed mainly of a naphthalocyanine derivative (the two symbols Y both represent $R^3R^4R^5SiO$) are preferable.

In this invention, optical recording mediums wherein is formed a recording layer composed mainly of a naphthalocyanine derivative of formula (I) (all the symbols $R^1$ represent a cycloalkyl group having 3–22 carbon atoms) are preferable.

In this invention, optical recording mediums wherein is formed a recording layer composed mainly of a naphthalocyanine derivative of formula (I) (all the symbols $R^1$ represent an alkyl group having cycloalkyl group as substituent) are preferable.

In this invention, optical recording mediums wherein is formed a recording layer composed mainly of a naphthalocyanine derivative of formula (I) (all the symbols $R^1$ represent a straight chain alkyl group) are preferable.

In this invention, optical recording mediums wherein is formed a recording layer composed mainly of a naphthalocyanine derivative of formula (I) (all the symbols $R^1$ represent a branched chain alkyl group) are preferable.

This invention further provides a process for producing an optical recording medium which comprises forming a recording layer on a substrate by the use of a solution prepared by dissolving a naphthalocyanine derivative of formula (I) as a main component into an organic solvent.

Said organic solvent is selected from the above-mentioned aromatic, halogen-containing, ether type, ketone type and saturated hydrocarbon solvents capable of dissolving the naphthalocyanine derivatives represented by formula (I), and it may be any of single solvent or solvent mixture. It is preferable to use a solvent which does not attack the substrate used.

Among the solvents, halogen-containing organic solvents are preferable, and carbon tetrachloride is particularly preferable.

As the method for forming a recording layer by the use of a solution prepared by dissolving a naphthalocyanine derivative represented by formula (I) into an organic solvent, coating method, printing method and dipping method can be referred to. Concretely speaking, a dye is dissolved into the above-mentioned solvent, and a recording layer is formed by spraying, roller coating, spin coating or dipping. If desired, a binder such as polymer binder, a stabilizer, and the like may be added at the time of forming a recording layer. Non-limitative examples of said binder include polyimide resin, polyamide resin, polystyrene resin, acrylic resin and the like.

The material constituting the recording layer may be either a single material or combination of two or more materials. When combination of two or more materials is used, the structure of recording layer may be any of laminated structure or single layer structure composed of a mixture. Thickness of the recording layer is preferably 50 to 10,000 angstroms, and particularly 100 to 5,000 angstroms.

When information recorded is optically read out, a reflected light is often used. In this case, as an effective method for enhancing contrast, a metallic layer exhibiting a high reflectance may be provided on the surface of recording layer (opposite side of substrate) when writing or reading is carried out from the side of substrate. When writing or reading is carried out from the other side of substrate (i.e. recording layer side), a metallic layer exhibiting a high reflectance may be provided between substrate and recording layer. As the high-reflectance metal, Al, Cr, Au, Pt, Sn and the like can be used. Their films can be formed by known methods such as vapor deposition in vacuum, sputtering, plasma vapor deposition, etc., and the film thickness is in the range of 100 to 10,000 angstroms.

However, since naphthalocyanine derivative has a high reflectance in itself, it requires no metallic reflecting layer.

When surface smoothness of substrate itself is important, it is advisable to provide a uniform film of organic polymer on substrate. As the polymer, commercial polymers such as polyester, polyvinyl chloride and the like can be used.

It is also possible to provide a protecting layer as an outermost layer in order to improve stability and protection, decrease surface reflectance and thereby enchance sensitivity. Examples of the material usable for this purpose include polyvinylidene chloride, polyvinyl chloride, vinylidene chloride/acrylonitrile copolymer, polyvinyl acetate, polyimide, polymethyl methacrylate, polystyrene, polyisoprene, polybutadiene, polyurethane, polyvinyl butyral, fluororubber, polyester, epoxy resin, silicone resin, cellulose acetate and the like. They may be used either as a single material or in the form of polymer blend. Addition of silicone oil, antistatic agent, crosslinking agent and the like to the protecting layer is desirable from the viewpoint of improving film performances. The protecting layer may be formed into a superposed double layer. The above-mentioned materials used in the protecting layer can be applied by dissolving them into an appropriate solvent and coating the solution, or by laminating them as a thin film. Thickness of such protecting film is usually adjusted to 0.1–10 microns, and preferably 0.1–2 microns.

In this invention, a process for producing an optical recording medium using a naphthalocyanine derivative of formula (I) wherein M is Si or Ge is preferable.

In this invention, a process for producing an optical recording medium using a naphthalocyanine derivative of formula (I) wherein k, l, m and n are all equal to 1 is preferable.

In this invention, a process for producing an optical recording medium using a naphthalocyanine derivative of formula (I) wherein the two symbols Y both represent $R^3R^4R^5SiO$ is preferable.

In this invention, a process for producing an optical recording medium using a naphthalocyanine derivative of formula (I) wherein all the symbols $R^1$ represent a cycloalkyl group having 3–22 carbon atoms is preferable.

In this invention, a process for producing an optical recording medium using a naphthalocyanine derivative of formula (I) wherein all the symbols $R^1$ represent an alkyl group having cycloalkyl group as substituent is preferable.

In this invention, a process for producing an optical recording medium using a naphthalocyanine derivative of formula (I) wherein all the symbols $R^1$ represent a straight chain alkyl group is preferable.

In this invention, a process for producing an optical recording medium using a naphthalocyanine derivative of formula (I) wherein all the symbols $R^1$ represent a branched chain alkyl group is preferable.

Next, this invention will be illustrated by way of examples. This invention is by no means limited by these examples.

SYNTHESIS EXAMPLE 1

Synthesis of 3,4-bis(dibromomethyl)bromobenzene

One gram of benzoyl peroxide was added to a solution of 37 g (0.2 mole) of 4-bromo-o-xylene (75%) (manufactured by Aldrich Co.) and 142.4 g (0.8 mole) of N-bromosuccinimide in 500 ml carbon tetrachloride. And the resulting mixture was irradiated by a 100-W high pressure mercury arc lamp for 8 to 12 hours under reflux in an inner irradiating tube (manufactured by Ushio Inco.). After the mixture was allowed to cool, the white crystals precipitated was filtered off and the carbon tetrachloride solution i.e. the mother liquor was concentrated under reduced pressure. The solid thus obtained was recrystallized from hexane/methylene chloride to obtain 64 g of 3,4 -bis(dibromomethyl)bromobenzene as a colorless crystal. Its physical properties were as follows:

(1) Melting point 108.5°–110.5° C.

(2) Elementary analysis values:

|  | C | H | Br |
|---|---|---|---|
| Calcd. (%) | 19.19 | 1.01 | 79.80 |
| Found (%) | 19.12 | 0.88 | 79.84 |

(3) NMR: $CDCl_3$ solvent
  δ: 7.81 (1H, br-s)
  7.57 (1H, d, J=8.54 Hz)
  7.50 (1H, dd, J=8.54, 18.3 Hz)
  7.06 (1H, s)
  7.02 (1H, s)

(4) IR (KBr method): FIG. 1

SYNTHESIS EXAMPLE 2

Synthesis of 6-bromo-2,3-dicyanonaphthalene

Two hundred grams (0.67 mole) of sodium iodide was added to a solution of 100.2 g (0.2 mole) of 3,4-bis(dibromomethyl)bromobenzene and 27 g (0.346 mole) of fumaronitrile in 800 ml of anhydrous N,N-dimethylformamide, while stirring the solution thoroughly. The resulting mixture was stirred at about 75° C. for about 7 hours in an atmosphere of nitrogen. After completion of the reaction, the reaction mixture was poured into about 4 kg of ice, to which was slowly added sodium hydrogen sulfite until the red colored solution had turned to light yellow. After adding a slightly excessive quantity of sodium hydrogen sulfite and stirring the mixture for a while, it was allowed to stand overnight at room temperature. The light yellow solid precipitated was filtered, and thoroughly washed with water and then with methanol. The light yellow solid thus obtained was recrystallized from acetone/ethanol to obtain 33 g of colorless needle-like crystal. Referring to the analyses mentioned below, it was identified as 6-bromo-2,3-dicyanonaphthalene.

(1) Melting point: 254.5°–255.5° C.

(2) Elementary analyses

|  | C | H | N | Br |
|---|---|---|---|---|
| Calcd. (%) | 56.06 | 1.96 | 10.90 | 31.08 |
| Found (%) | 55.99 | 1.67 | 10.87 | 30.74 |

Figure 2:
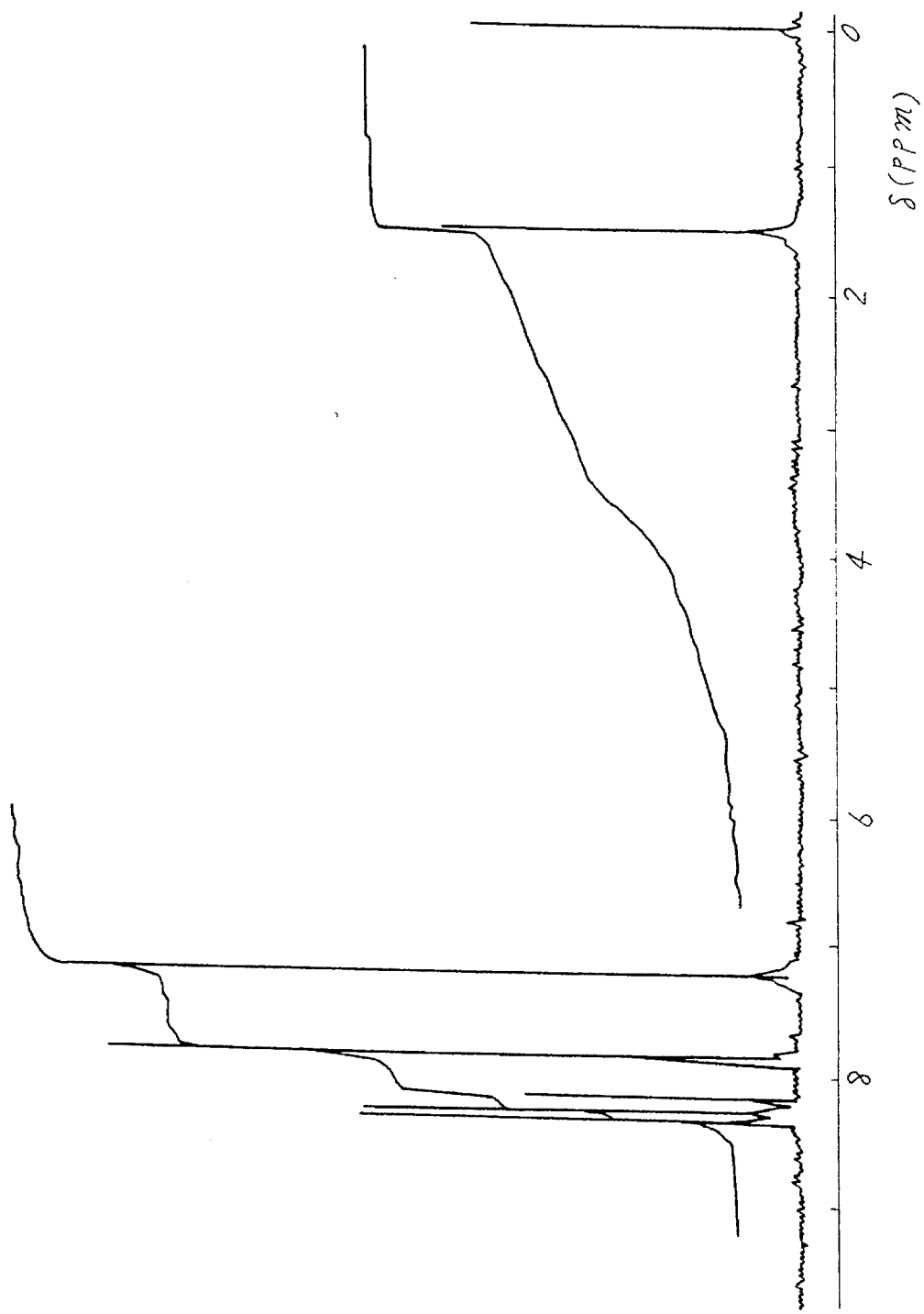
FIG. 2 is NMR spectrum of 6-bromo- 2,3-dicyanonaphthalene.

(3) NMR: CDCl$_3$ solvent (FIG. 2)
δ: 8.34 (1H, s)
8.27 (1H, s)
8.17 (1H, br-s)
7.88 (2H, m)

Figure 3:
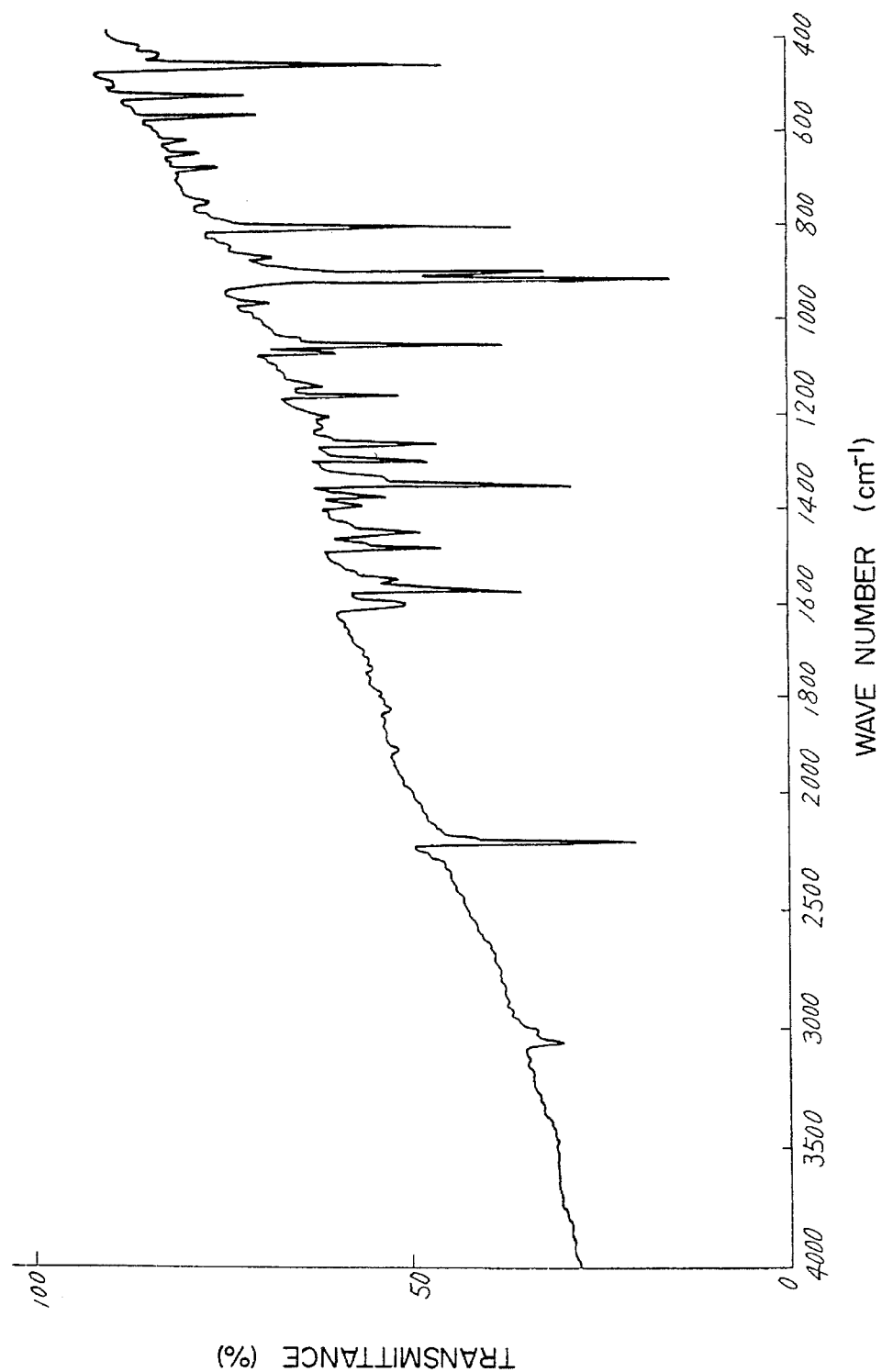
FIG. 3 is IR spectrum of 6-bromo-2,3-dicyanonaphthalene.

(4) IR (KBr method): FIG. 3

SYNTHESIS EXAMPLE 3

Synthesis of 6-n-butylthio-2,3-dicyanonaphthalene

To a solution of 32.4 g (0.126 mole) of 6-bromo-2,3-dicyanonaphthalene in 126 ml quinoline and 41 ml pyridine was added 21.1 g (0.138 mole) of cuprous n-butylthiolate synthesized according to the procedure mentioned in Organic Syntheses Vol. 42, Paragraph 22. The resulting mixture was refluxed at 160°–170° C. for 5 hours. After allowing the reaction mixture to cool, it was poured into a mixture of 900 ml methanol and 900 ml water and the resulting crude crystal was collected by filtration, dried and dissolved into toluene. After concentrating the solution, it was separated by column chromatography and recrystallized from toluene/n-hexane. Thus, 21.3 g of a white crystal was obtained. Referring to the following analyses, it was identified as 6-n-butylthio- 2,3-dicyanonaphthalene.

(1) Melting point: 134.5°–136.0° C.
(2) Elementary analyses

|  | C | H | N |
|---|---|---|---|
| Calcd. (%) | 72.15 | 5.30 | 10.52 |
| Found (%) | 72.09 | 5.16 | 10.22 |

Figure 4:
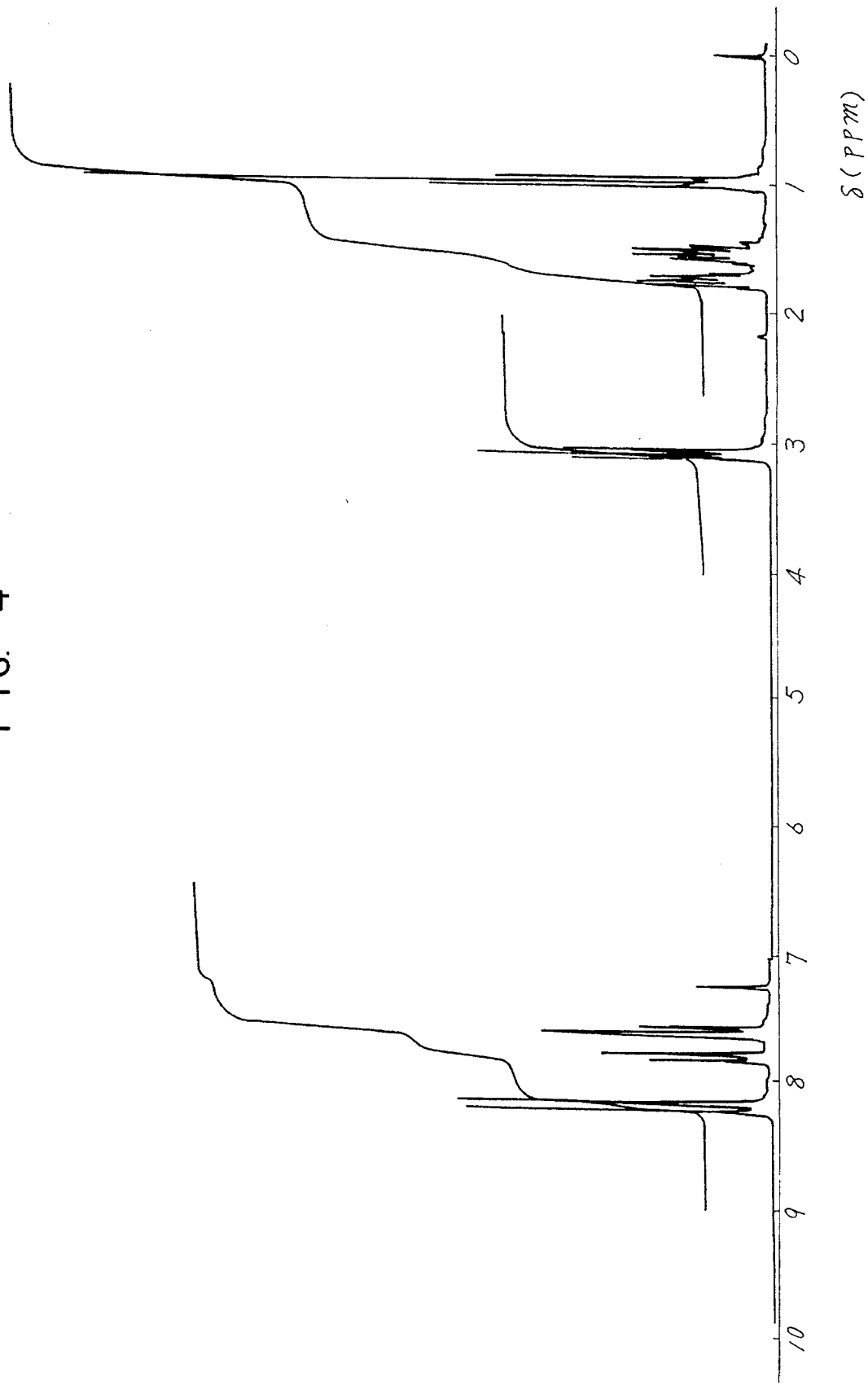
FIG. 4 is NMR spectrum of 6-n-butylthio-2,3-dicyanonaphthalene.

(3) NMR: CDCl$_3$ solution (FIG. 4)
δ: 8.25(1H, s)
8.19 (1H, s)
7.83 (1H, d, J=8.54 Hz)
7.65 (1H, s)
7.61 (1H, d, d, J=8.54, 1.83 Hz)
3.10 (2H, t, J=7.33 Hz)
1.76 (2H, quintet, J=7.33 Hz)
1.53 (2H, sextet, J=7.33 Hz)
0.98 (3H, t, J=7.33 Hz)

Figure 5:
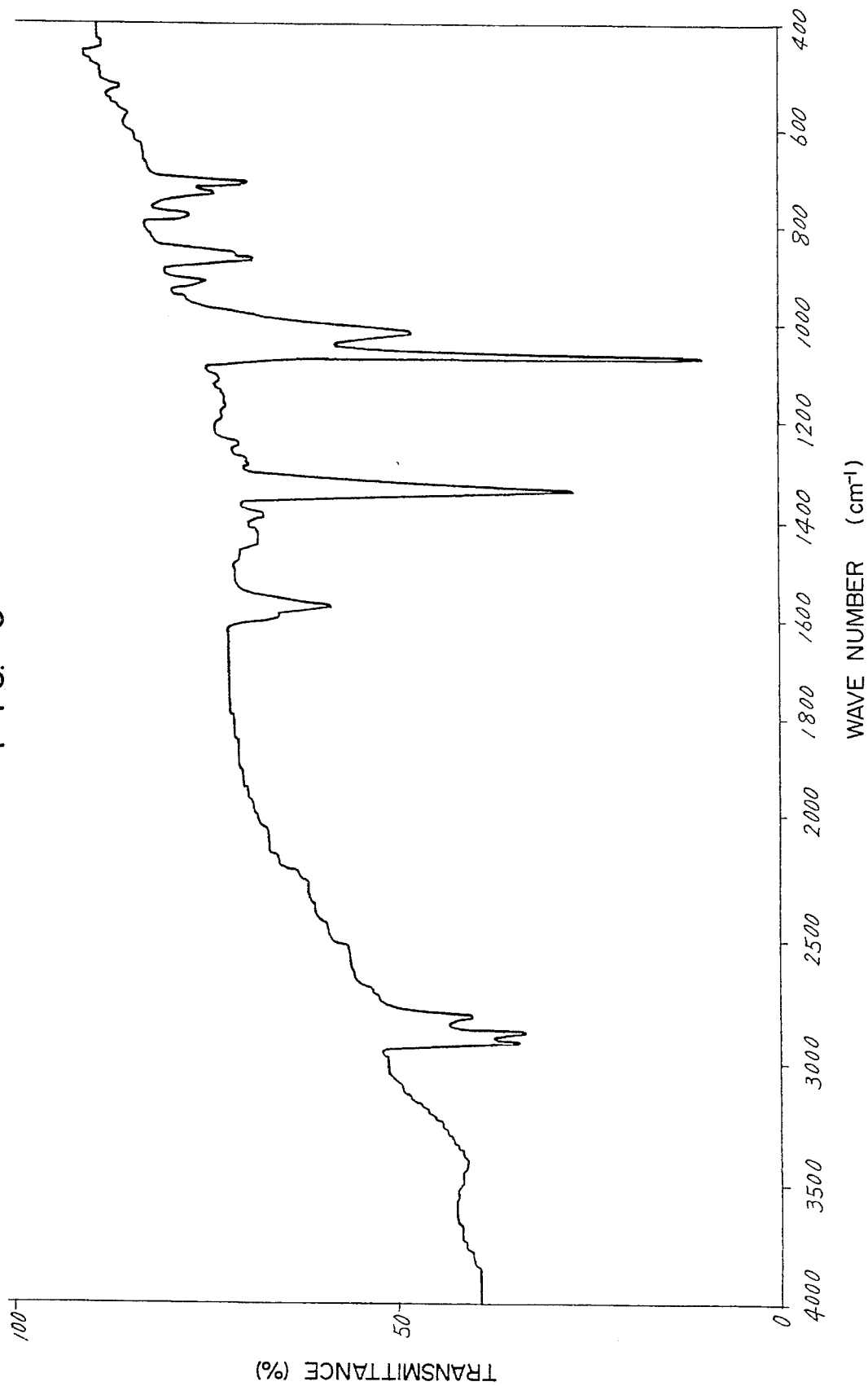
FIG. 5 is IR spectrum of 6-n-butylthio-2,3-dicyanonaphthalene.

(4) IR (KBr method): FIG. 5

SYNTHESIS EXAMPLE 4

Synthesis of 6-n-butylthio-1,3-diiminobenz[f]isoindoline

Figure 6:
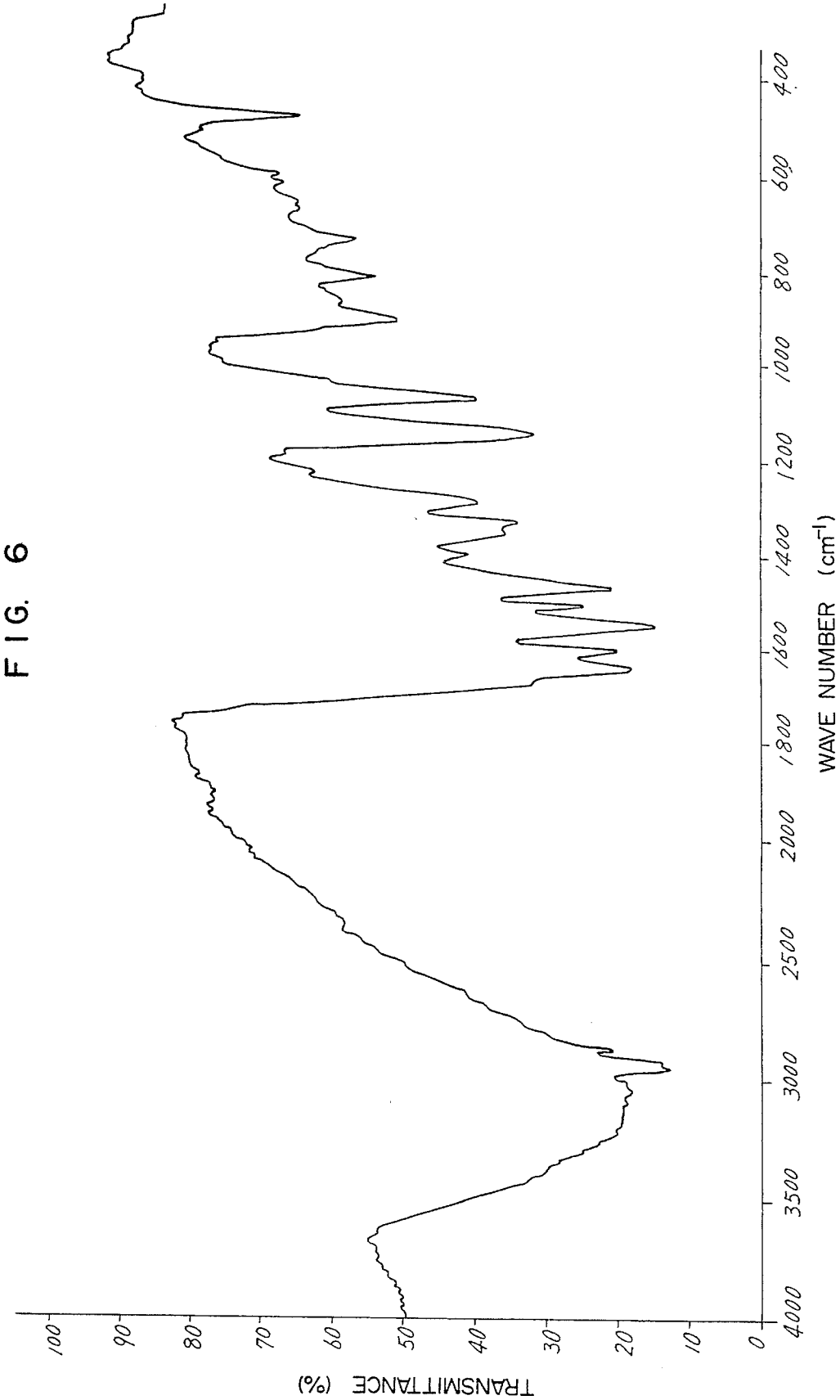
FIG. 6 is IR spectrum of 6-(n-butylthio)- 1,3-diiminobenz[f]isoindoline (KBr method)

In an atmosphere of nitrogen, 30.0 g (0.11 mole) of 6-n-butylthio-2,3-dicyanonaphthalene was added to a solution of sodium methoxide in methanol prepared by adding 1.46 g (64 mmoles) of metallic sodium in 5 portions to 350 ml of anhydrous methanol. While thoroughly stirring the mixture, anhydrous ammonia gas was slowly bubbled at room temperature over a period of about one hour. Then, the mixture was refluxed for about 3 hours, while bubbling anhydrous ammonia gas. After cooling, the yellow solid precipitated was filtered and the residue was thoroughly washed with methanol and dried under reduced pressure to obtain 30 g of 6-n-butylthio- 1,3-diiminobenz[f]isoindoline as a yellow solid. FIG. 6 illustrates its IR spectrum. Without further purification, it was used in the subsequent reaction.

SYNTHESIS EXAMPLE 5

Synthesis of dichlorosilicon-tetra(n-butylthio)-naphthalocyanine

Figure 7:
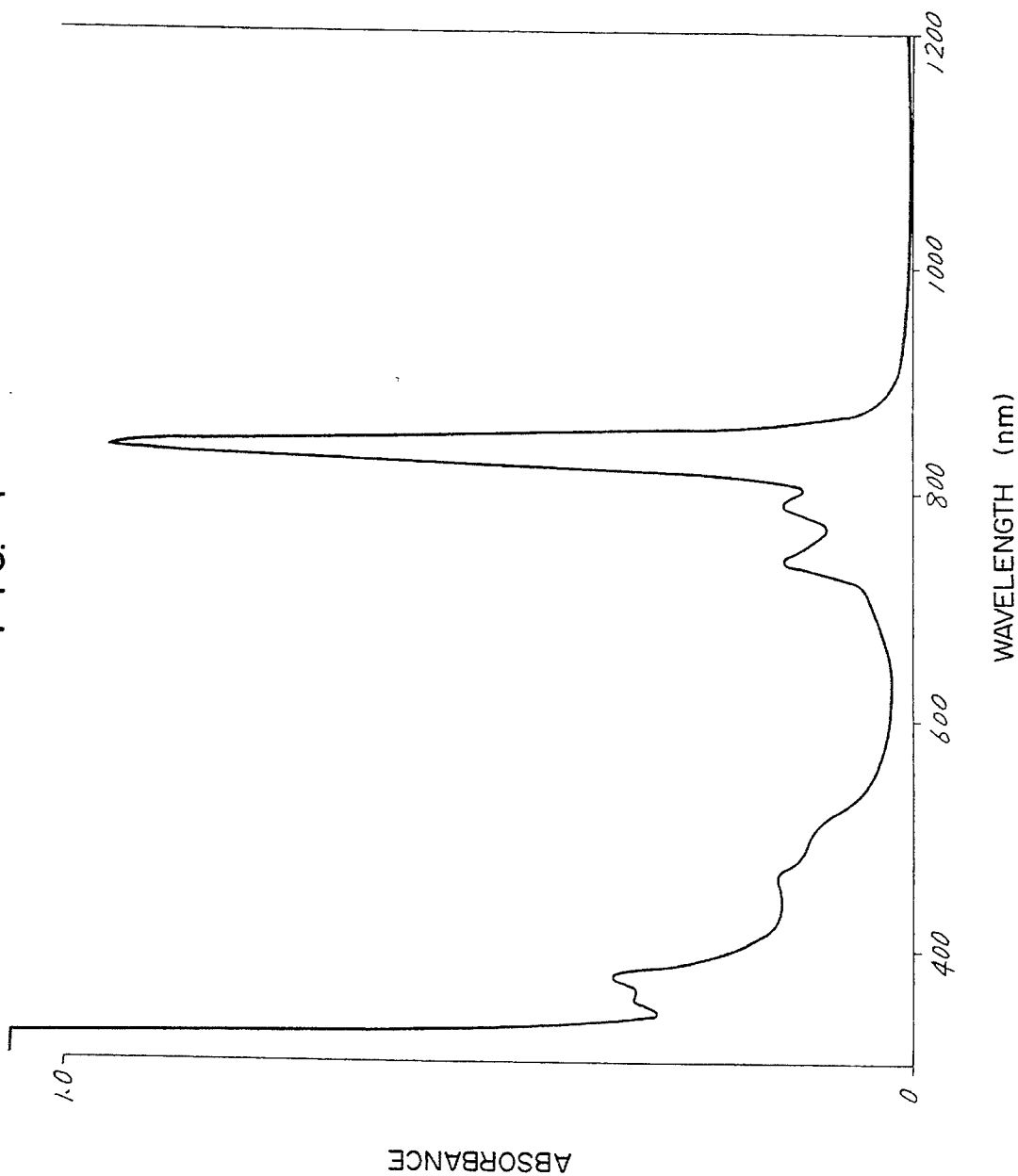
FIG. 7 is electronic spectrum of dichlorosilicon-tetra(n-butylthio)-naphthalocyanine (tetrahydrofuran solution)

In an atmosphere of nitrogen, 25.0 ml (0.218 mole) of silicon tetrachloride was added to a suspension of 10 g (35.3 mmoles) of 6-(n-butylthio)-1,3-diimino-benz[f]isoindoline in 130 ml of anhydrous tetralin, and the mixture was refluxed for about 3 hours. After cooling, 700 ml of methanol was added and the resulting mixture was allowed to stand overnight. The red-brown reaction mixture thus obtained was filtered and the precipitate was thoroughly washed with methanol and dried under reduced pressure. Thus, about 30 g of dichlorosilicon-tetra(n-butylthio)naphthalocyanine was obtained as a deep green solid. Without further purification, it was used in the subsequent reaction. FIG. 7 illustrates its electronic spectrum.

SYNTHESIS EXAMPLE 6

Synthesis of dihydroxysilicon-tetra(n-butylthio)-naphthalocyanine

Figure 8:
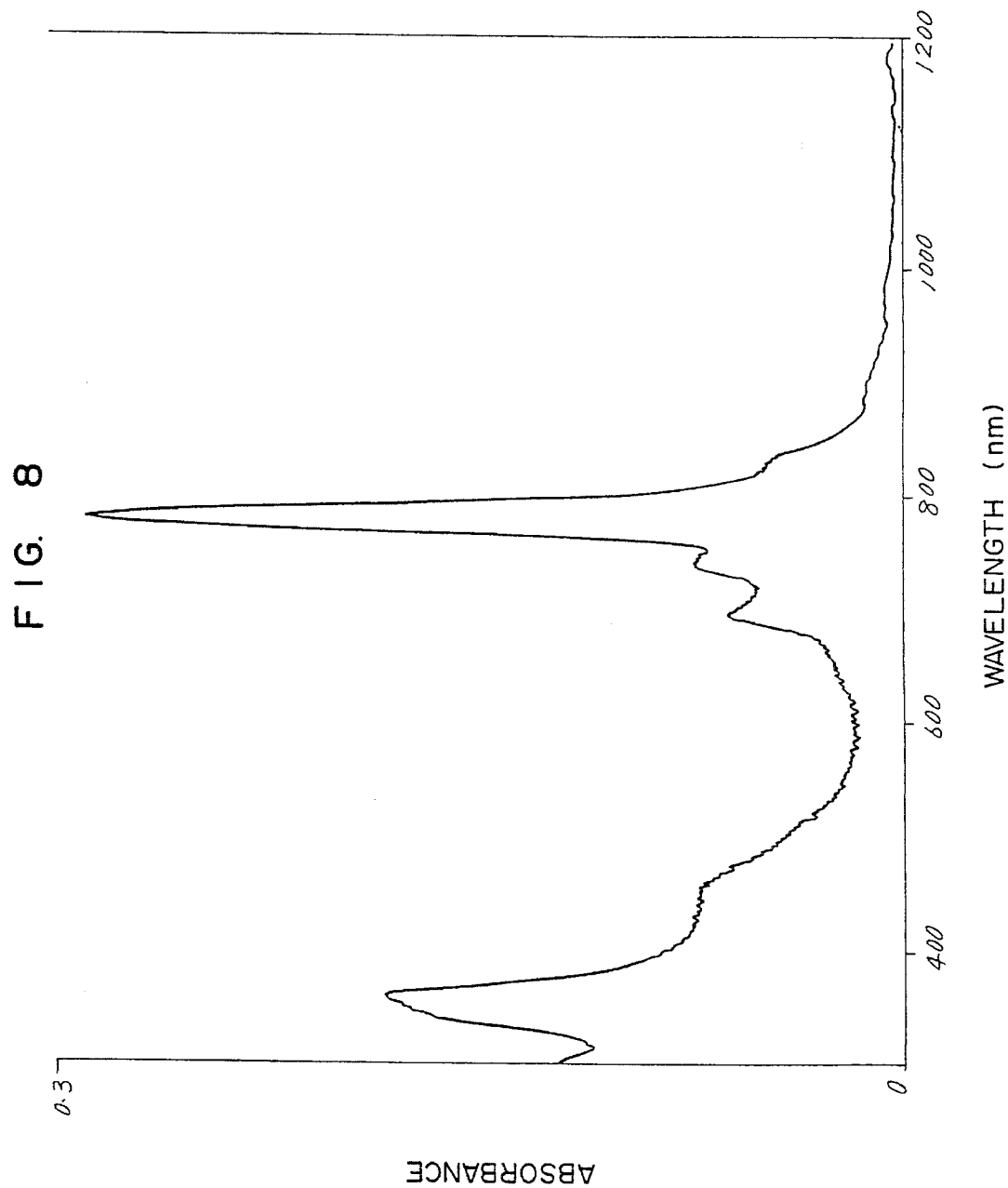
FIG. 8 is electronic spectrum of dihydroxysilicon-tetra(n-butylthio)-naphthalocyanine (tetrahydrofuran solution)

To a mixture consisting of 50 ml of ethanol, 50 ml of aqueous ammonia and 200 ml of water was added 3.1 g (2.7 mmoles) of dichlorosilicon-tetra(n-butylthio)naphthalocyanine. After stirring the mixture for about 3 hours, the reaction mixture was filtered and the precipitate was thoroughly washed with water and then with methanol and dried under reduced pressure to obtain 900 mg of dihydroxysilicon-tetra(n-butylthio)-naphthalocyanine as a deep green solid. Without further purification, it was used in the subsequent reaction. FIG. 8 illustrates its electronic spectrum.

SYNTHESIS EXAMPLE 7

Synthesis of 6-bromo-1,3-diiminobenz[f]isoindoline

Figure 9:
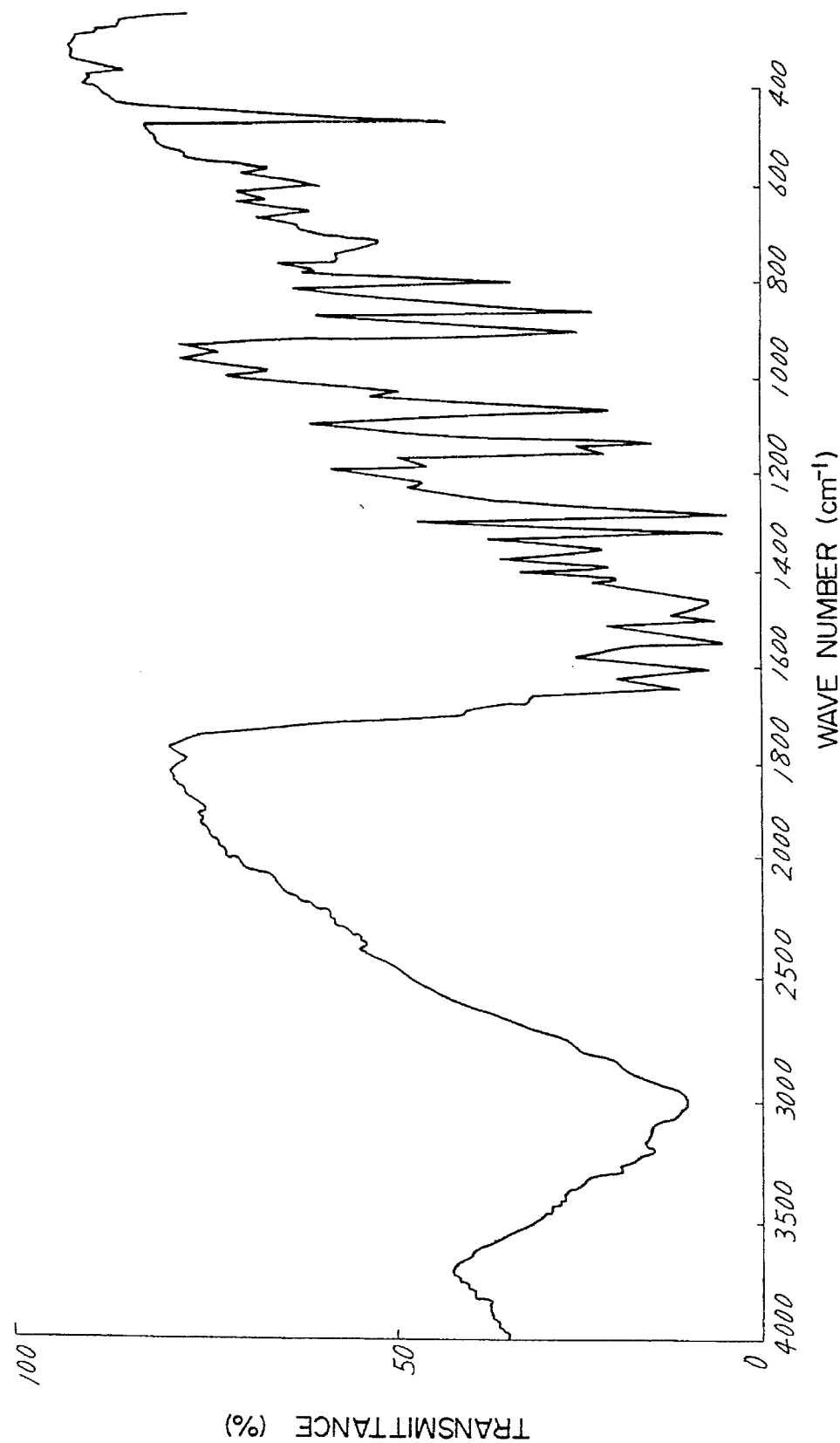
FIG. 9 is IR spectrum of 6-bromo-1,3-diimi-nobenz[f]isoindoline (KBr method)

In an atmosphere of nitrogen, 44.1 g (0.17 mole) of 6-bromo-2,3-dicyanonaphthalene was added to a solution of sodium methoxide in methanol prepared by adding 1.92 g (84 mmoles) of metallic sodium in 5 portions to 270 ml of anhydrous methanol. While thoroughly stirring the mixture, anhydrous ammonia gas was slowly bubbled over a period of one hour at room temperature. Then, the mixture was refluxed while bubbling anhydrous ammonia gas. After cooling, the yellow solid precipitated was filtered, thoroughly washed with methanol and dried under reduced pressure to obtain 45 g of 6-bromo- 1,3-diiminobenz[f]isoindiline as a yellow solid. FIG. 9 illustrates its IR spectrum. Without further purification, it was used in the subsequent reaction.

SYNTHESIS EXAMPLE 8

Synthesis of dichlorosilicon-tetrabromonaphthalocyanine (formula (XX) wherein M is Si; X is chlorine and k, l, m and n are all equal to 1)

Figure 10:
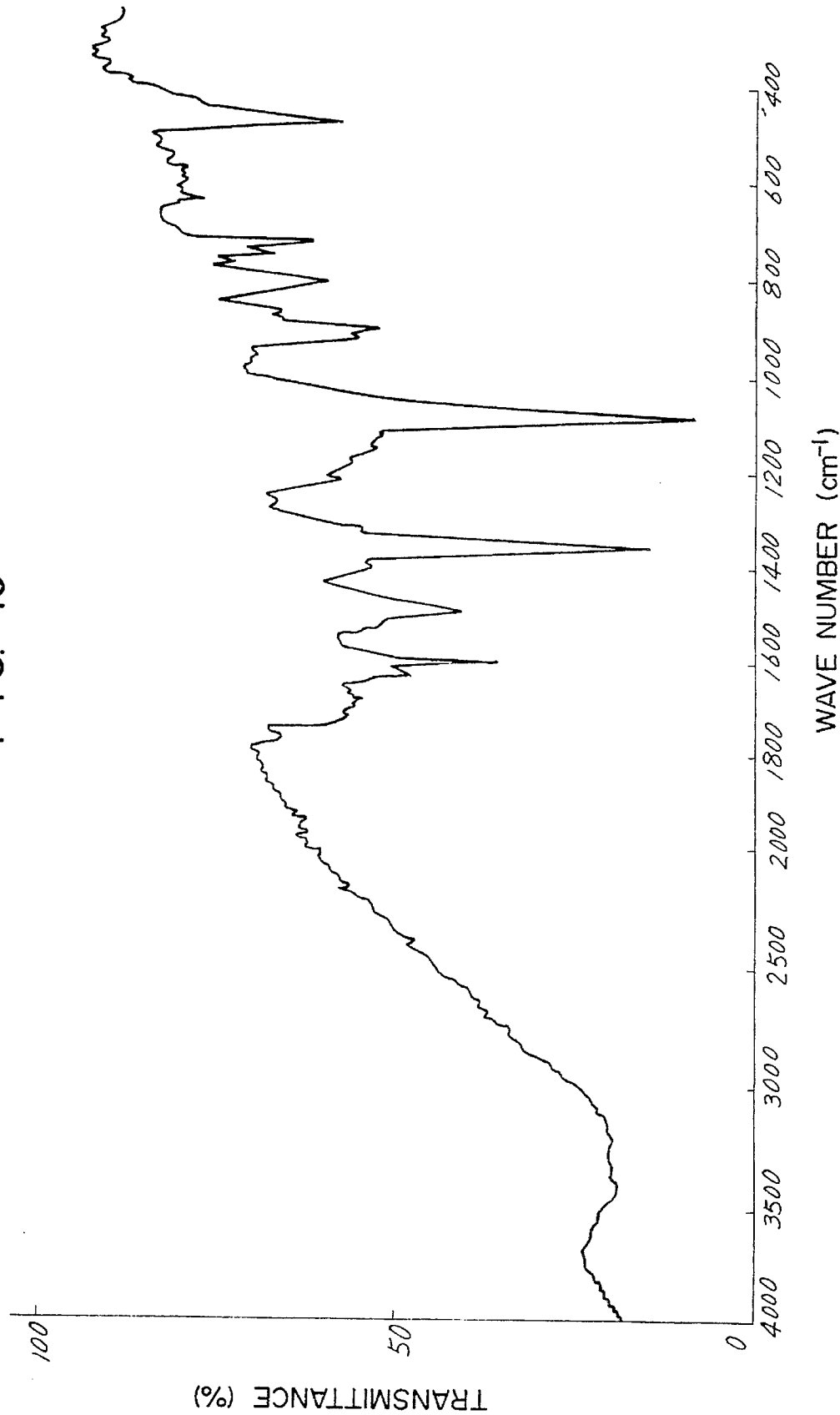
FIG. 10 is IR spectrum of dichlorosilicon-tetrabromonaphthalocyanine (KBr method)
Figure 11:
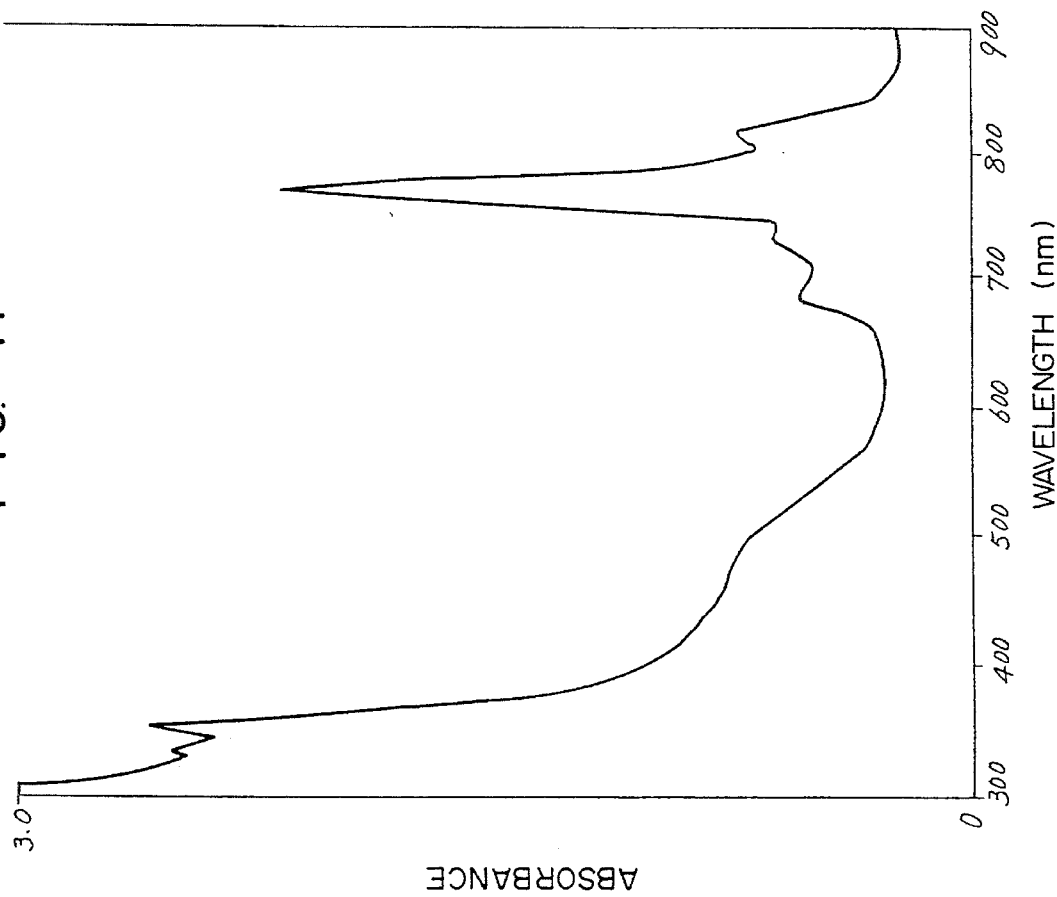
FIG. 11 is electronic spectrum of dichlorosilicon-tetrabromonaphthalocyanine (tetrahydrofuran solution)

In an atmosphere of nitrogen, 54 ml of anhydrous tri-n-butylamine was added to a suspension of 22.5 g (81.8 mmoles) of 6-bromo-1,3-diiminobenz[f]isoindoline in 110 ml of anhydrous tetralin, and then 14.4 ml (0.126 mole) of silicon tetrachloride was added and the resulting mixture was heated under reflux for about 3 hours. After cooling, 700 ml of methanol was added, and the mixture was allowed to stand overnight. The red-brown reaction mixture was filtered, the precipitate was thoroughly washed with methanol and dried under reduced pressure to obtain about 20 g of dichlorosilicon-tetrabromonaphthalo-cyanine (formula (XX) wherein M is Si, X is chlorine atom, and k, l, m and n all represent 1) as a deep green solid. Without further purification, it was used in the subsequent reaction. FIG. 10 illustrates its IR spectrum. FIG. 11 illustrates its electronic spectrum.

SYNTHESIS EXAMPLE 9

Synthesis of dihydroxysilicon-tetrabromonaphthalocyanine (formula (XX) wherein M is Si and k, l, m and n are all equal to 1)

Figure 12:
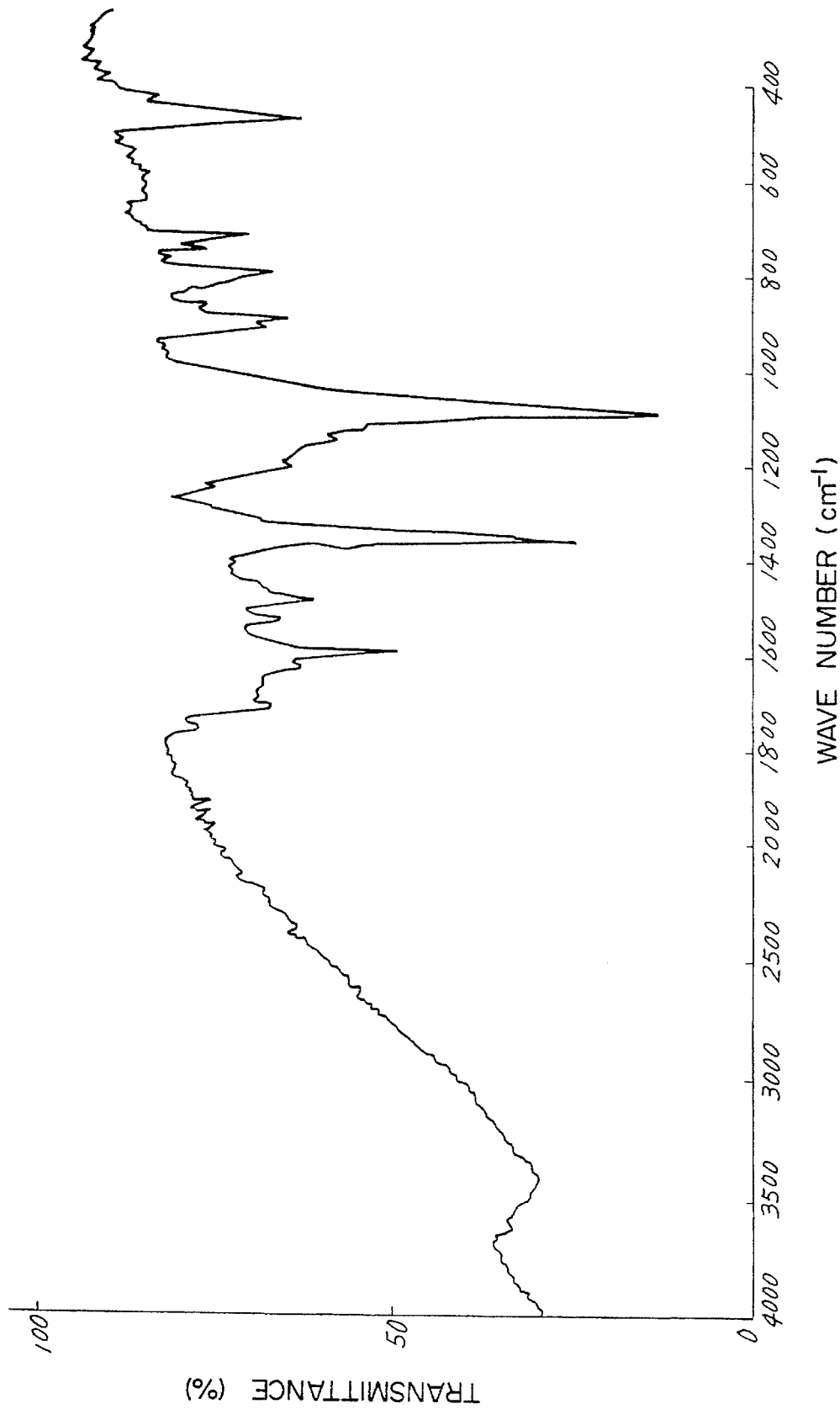
FIG. 12 is IR spectrum of dihydroxysilicon-tetrabromonaphthalocyanine (KBr method)
Figure 13:
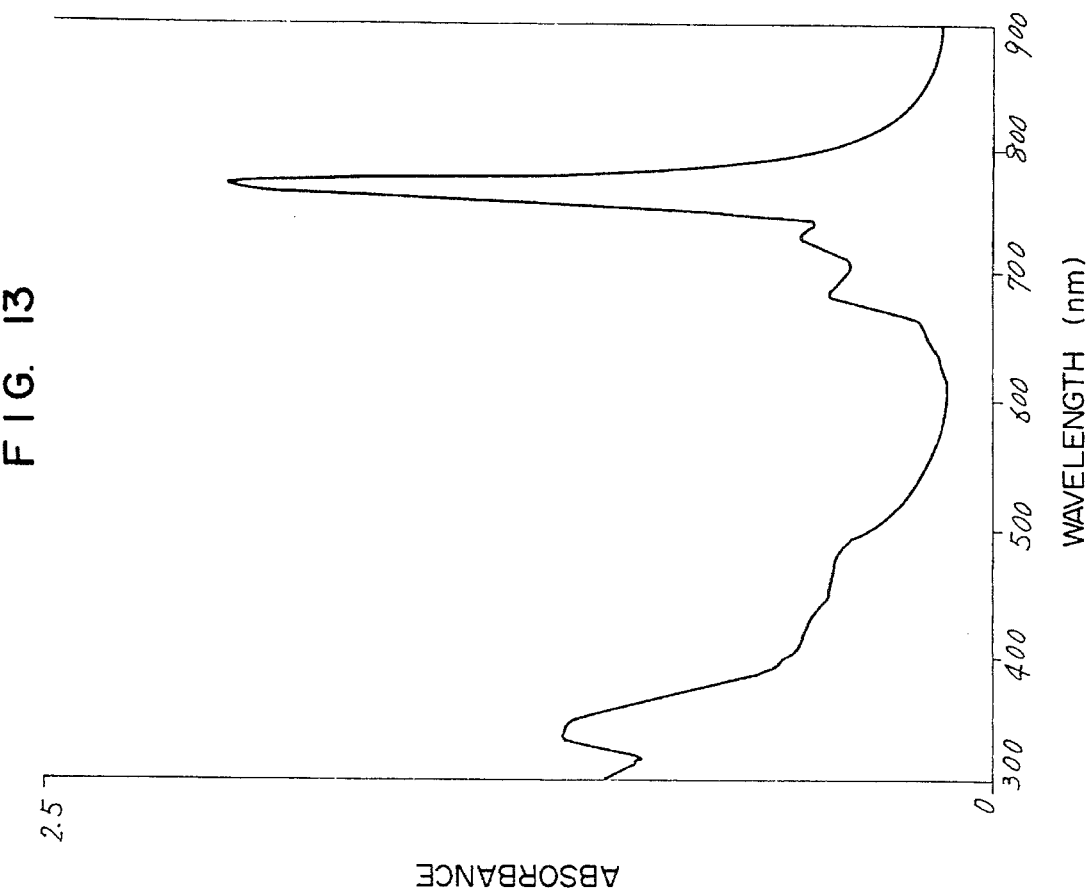
FIG. 13 is electronic spectrum of dihydroxysilicon-tetrabromonaphthalocyanine (tetrahydrofuran solution)

To 250 ml of concentrated sulfuric acid was added 9.7 g (8.6 mmoles) of dichlorosilicon-tetrabromo-naphthalocyanine. The resulting mixture was stirred for about 2 hours. The reaction mixture was poured into about 800 g of ice water and allowed to stand overnight. The precipitate was filtered, thoroughly washed first with water and then with methanol, and it was refluxed in 180 ml of concentrated aqueous ammonia for about one hour. After cooling, it was filtered, thoroughly washed successively with water, methanol and acetone, and dried under reduced pressure. Thus, 8.7 g of dihydroxysilicon-tetrabromonaphthalocyanine (formula (XIX) wherein M is Si and k, l, m and n are all equal to 1) was obtained. Without further purification, it was used in the subsequent reaction. FIG. 12 illustrates its IR spectrum, and FIG. 13 illustrates its electronic spectrum.

SYNTHESIS EXAMPLE 10

Synthesis of bis(tri-n-propylsiloxy)silicon-tetrabromo-naphthalocyanine (formula (VI) wherein M is Si; k, l, m and n are all equal to 1; and Y is tri-n-propylsiloxyl group)

In an atmosphere of nitrogen, 8 ml (33.6 mmoles) of anhydrous tri-n-butylamine was added to a suspension of 2.82 g (2.6 mmoles) of dihydroxysilicon-tetrabromo-naphthalocyanine in 280 ml of anhydrous β-picoline. Then, 7.2 ml (32.8 mmoles) of tri-n-propylchlorosilane was added, and the mixture was refluxed for about 2 hours. After cooling, the mixture was poured into 600 ml of 1/1 mixture of ethanol and water, thoroughly stirred, and allowed to stand overnight. The precipitate was filtered and washed with water. Soluble fraction of this precipitate was dissolved out with hot chloroform, and the resulting chloroform solution was dried over anhydrous sodium sulfate and purified by silica gel column chromatography. The purified product was recrystallized from chloroform. Thus, 0.82 g of a deed green colored crystal was obtained. Referring to the following analyses, it was identified as bis(tri-n-propylsiloxy)silicon-tetrabromonaphthalocyanine (formula (VI) wherein M is Si; k, l, m and n are all equal to 1; and Y is tri-n-propylsiloxyl group).

(1) Melting point: above 300° C.

(2) Elementary analyses:

|  | C | H | N | Br |
|---|---|---|---|---|
| Calcd. (%) | 56.50 | 4.45 | 7.99 | 22.78 |
| Found (%) | 56.28 | 4.39 | 8.04 | 22.45 |

Figure 14:
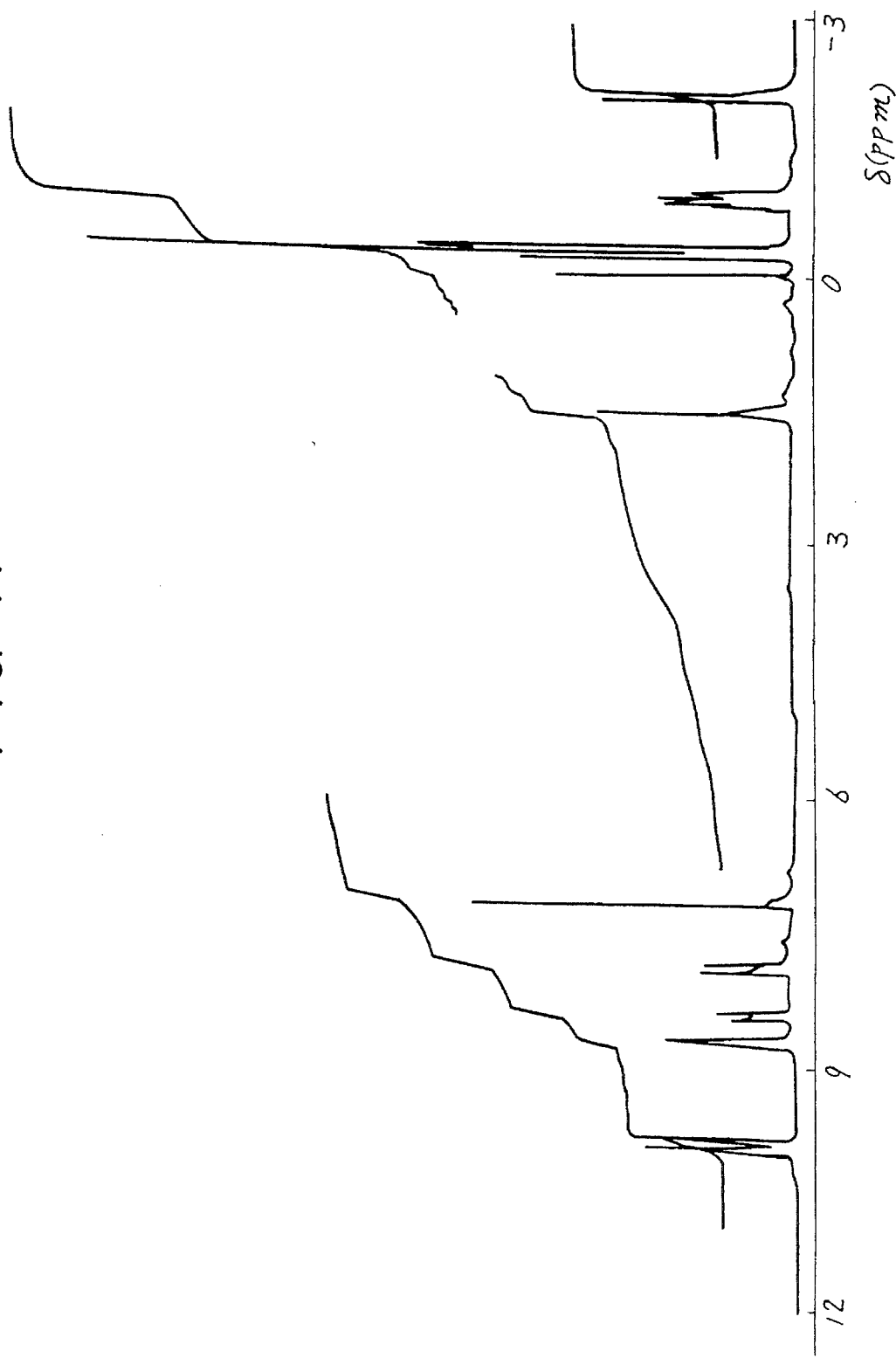
FIG. 14 is NMR spectrum of bis(tri-n-propylsiloxy)silicon-tetrabromonaphthalocyanine.

(3) NMR (FIG. 14): CDCl$_3$
δ10.08 (4H, br-s)
10.01 (4H, br-s)
8.82 (4H, br-s)
8.54 (4H, dd, J=8.85, 3.05 Hz)
8.00 (4H, d, J=8.85 Hz)
−0.29 (18H, t, J=7.17 Hz)
−0.90 (12H, sextet-like m)
−2.08 (12H, t-like m)

Figure 15:
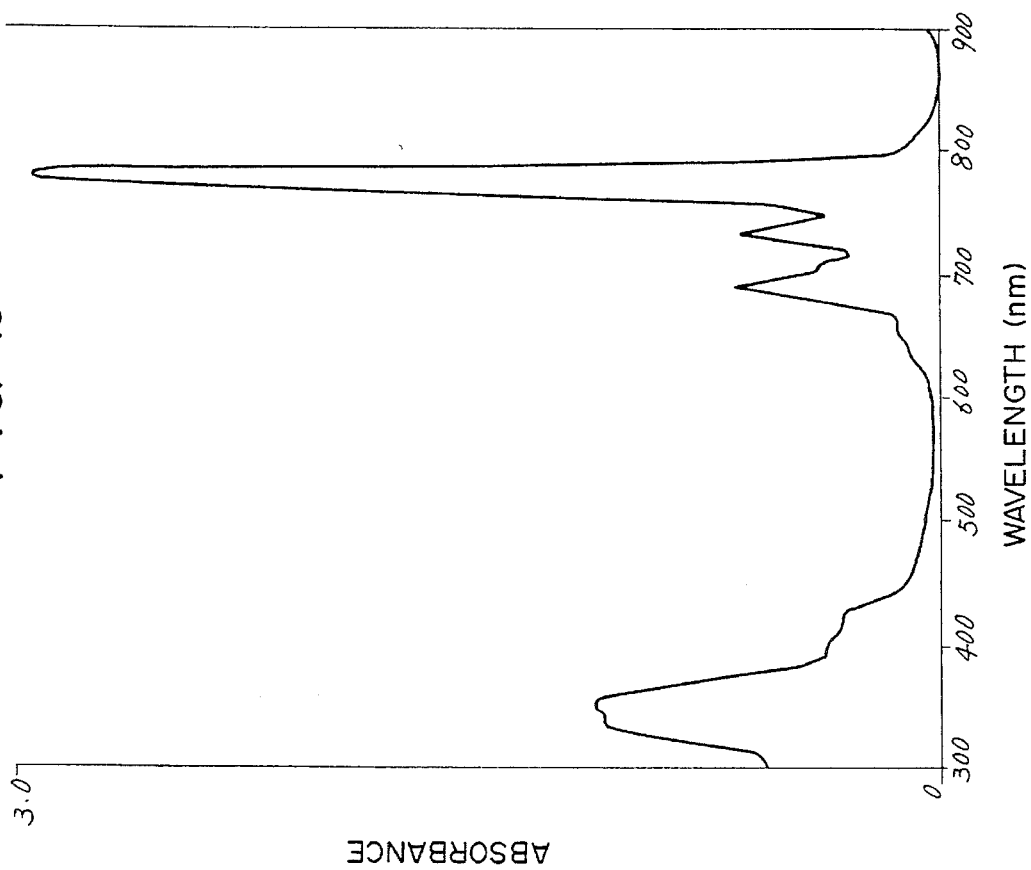
FIG. 15 is electronic spectrum of bis(tri-n-propylsiloxy)silicon-tetrabromonaphthalocyanine.

(4) Electronic spectrum (CHCl$_3$ solution): FIG. 15

Figure 16:
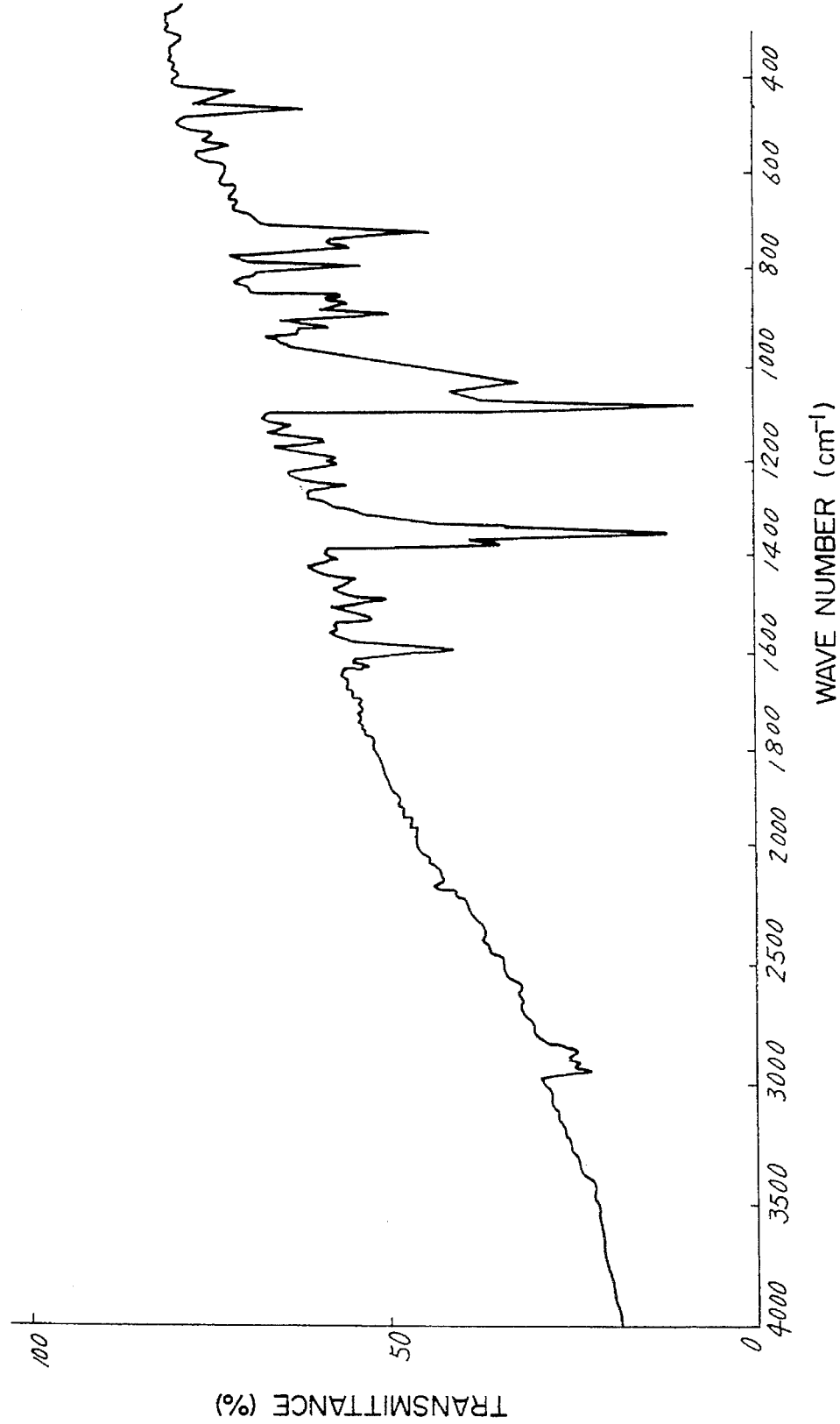
FIG. 16 is IR spectrum of bis(tri-n-propylsiloxy)silicon-tetrabromonaphthalocyanine.

(5) IR spectrum (KBr method): FIG. 16

SYNTHESIS EXAMPLE 11

Bis (tri-n-butylsiloxy) silicon-tetrabromonaphthalocyanine (formula (VI) wherein M is Si; K, l, m and n are equal to 1; and Y is tri-n-butylsiloxyl)

To a suspension of 2.82 g (2.6 mmoles) of dihydroxysilicon-tetrabromonaphthalocyanine in 280 ml of anhydrous β-picoline, 8 ml (33.6 mmoles) of anhydrous tri-n-butylamine was added, and then 8.8 ml (32.8 mmoles) of tri-n-butylchlorosilane was added. After refluxing the mixture for about 2 hours and allowing it to cool, the reaction mixture was treated in the same manner as in Synthesis Example 10 and the product was recrystallized from chloroform to obtain 0.75 g of a deep green crystal. Referring to the following analyses, it was identified as bis (tri-n-butylsiloxy) silicon-tetrabromonaphthalo-cyanine (formula (VI) wherein M is Si; k, Z, m and n are 1; and Y is tri-n-butylsiloxyl group).

(1) Melting point: above 300° C.

(2) Elementary analyses

|  | C | H | N | Br |
|---|---|---|---|---|
| Calcd. (%) | 58.14 | 5.02 | 7.53 | 21.49 |
| Found (%) | 58.36 | 5.11 | 7.51 | 21.03 |

Figure 17:
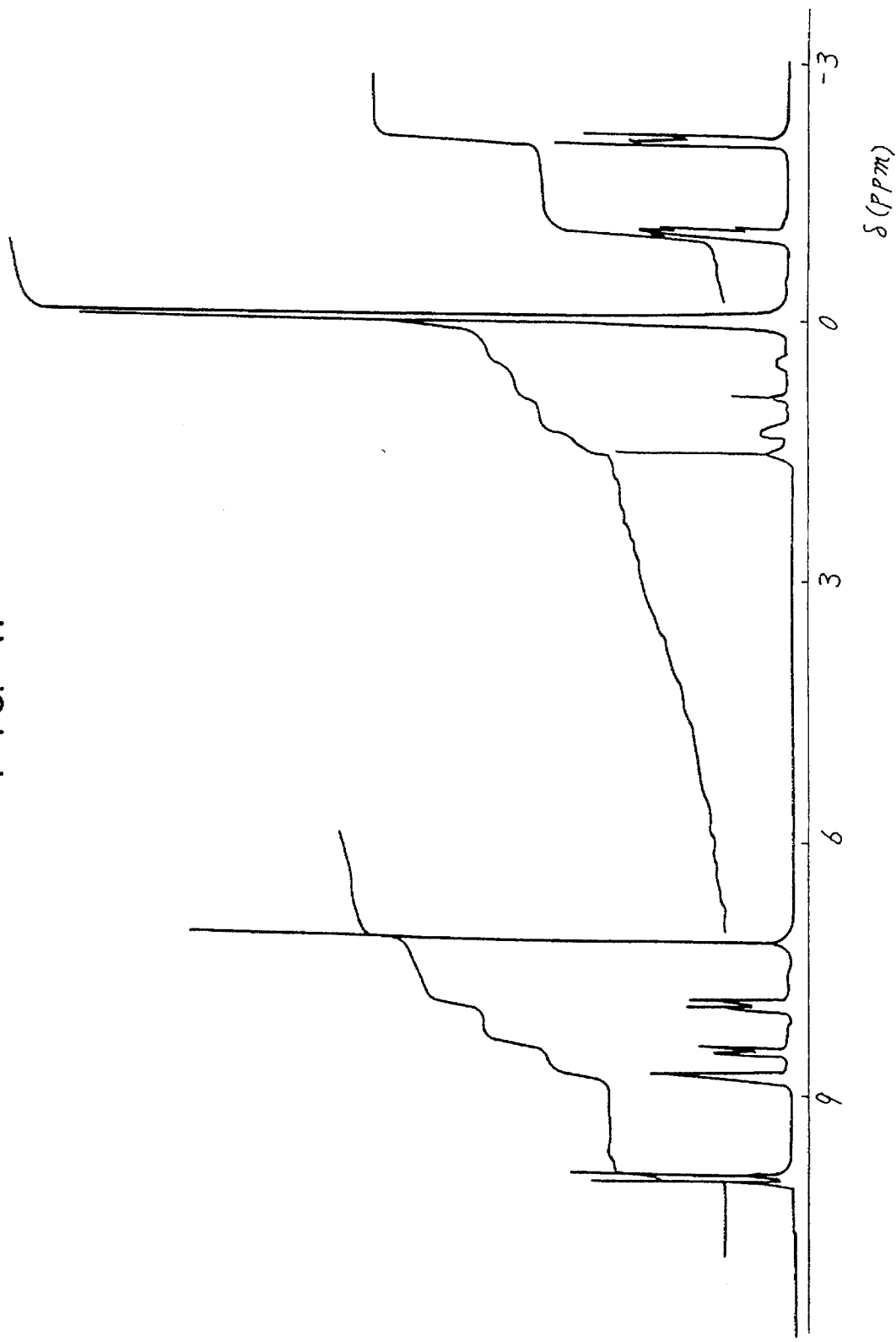
FIG. 17 is NMR spectrum of bis(tri-n-butylsiloxy)-silicon-tetrabromonaphthalocyanine.

(3) NMR (FIG. 17): CDCl$_3$
δ: 10.09 (4H, br-s)
10.02 (4H, br-s)
8.85 (4H, br-s)
8.55 (4H, dd, J=8.85, 3.05 Hz)
8.01 (4H, d, J=8.85 Hz)
0.02 (30H, m)
−0.99 (12H, sextet-like m)
−2.07 (12H, t-like m)

Figure 18:
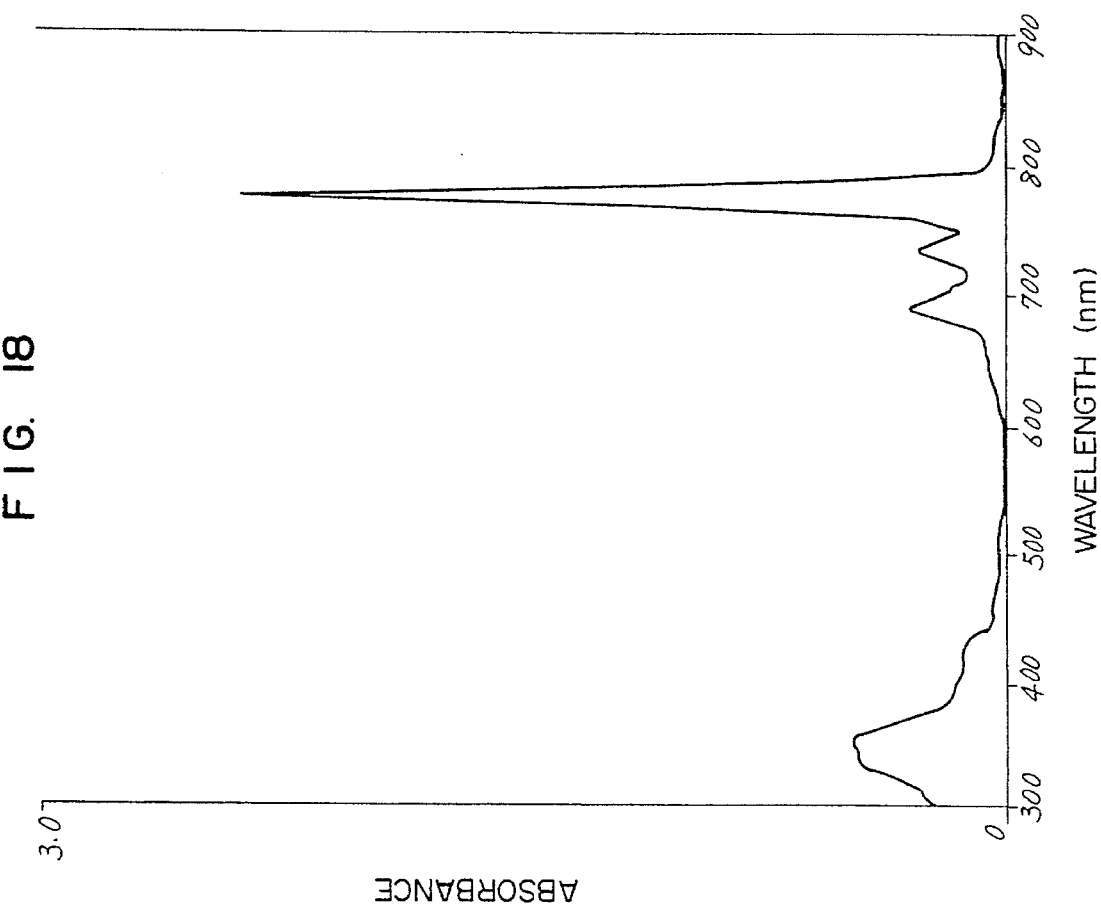
FIG. 18 is electronic spectrum of bis(tri-n-butylsiloxy)silicon-tetrabromonaphthalocyanine.

(4) Electronic spectrum (CHCl$_3$ solution): FIG. 18

Figure 19:
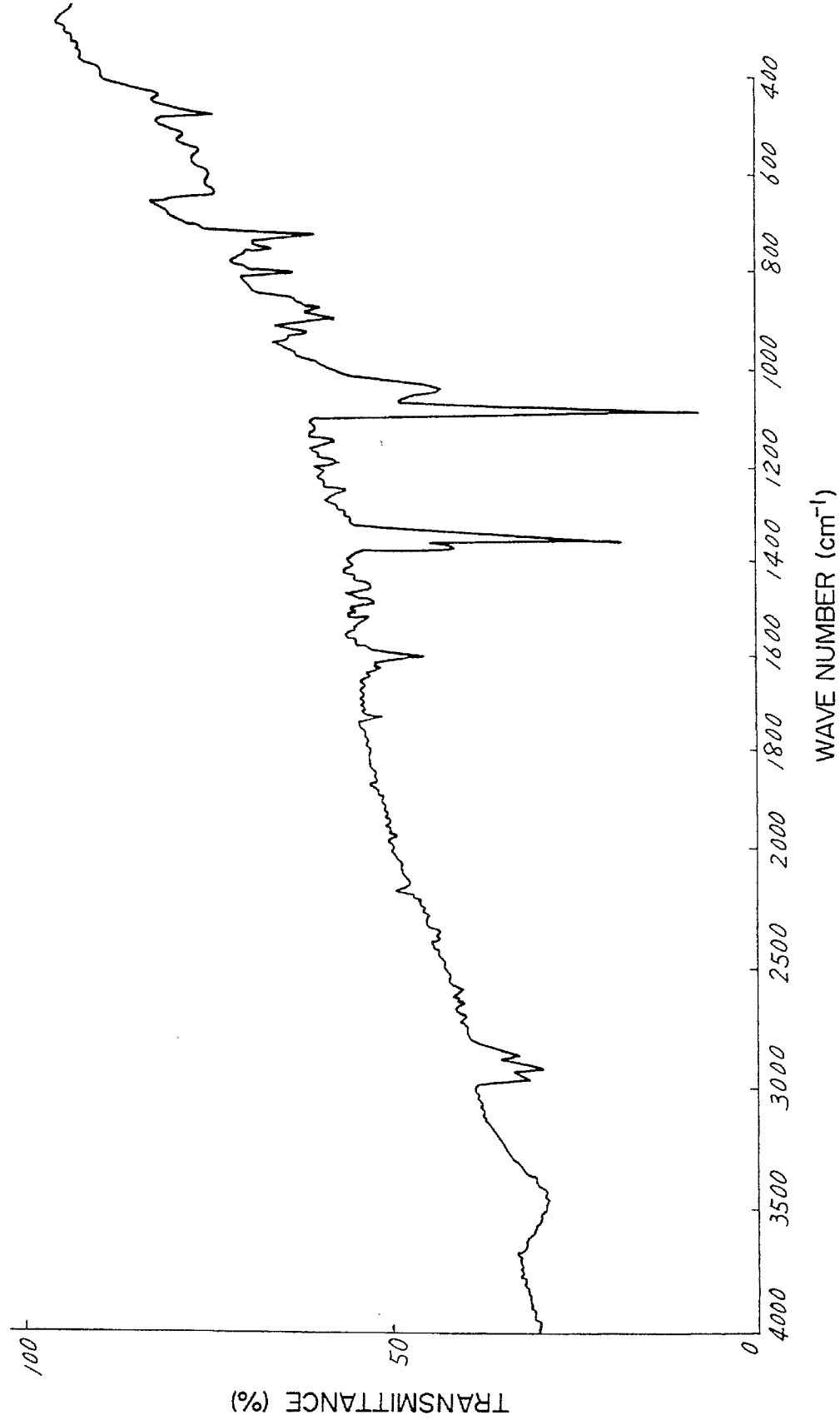
FIG. 19 is IR spectrum of bis(tri-n-butylsiloxy)silicon-tetrabromonaphthalocyanine.

(5) IR spectrum (KBr method): FIG. 19

SYNTHESIS EXAMPLE 12

Synthesis of bis(tri-n-hexylsiloxy)silicon-tetrabromo-naphthalocyanine (formula (VI) wherein M is silicon, k, l, m and n are equal to 1, and Y is tri-n-hexylsiloxyl)

To a suspension of 2.82 g (2.6 mmoles) of dihydroxysilicon-tetrabromonaphthalocyanine in 280 ml of anhydrous β-picoline, 8 ml (33.6 mmoles) of anhydrous tri-n-butylamine was added and then 12 ml (32.8 mmoles) of tri-n-hexylchlorosilane was added. After refluxing the mixture for about 2 hours and allowing it to cool, the reaction mixture was treated in the same manner as in Synthesis Example 10 and the product was recrystallized from hexane/chloroform to obtain 0.78 g of a deep green crystal. Referring to the following analyses, it was identified as bis(tri-n-hexylsiloxy)silicon-tetrabromonaphthalocyanine (formula (VI) wherein M is Si; k, l, m and n are equal to 1 and Y is tri-n-hexylsiloxyl group).

(1) Melting point: 298°–300° C.

(2) Elementary analyses:

|  | C | H | N | Br |
|---|---|---|---|---|
| Calcd. (%) | 60.94 | 5.97 | 6.77 | 19.30 |
| Found (%) | 60.77 | 5.71 | 6.65 | 19.02 |

Figure 20:
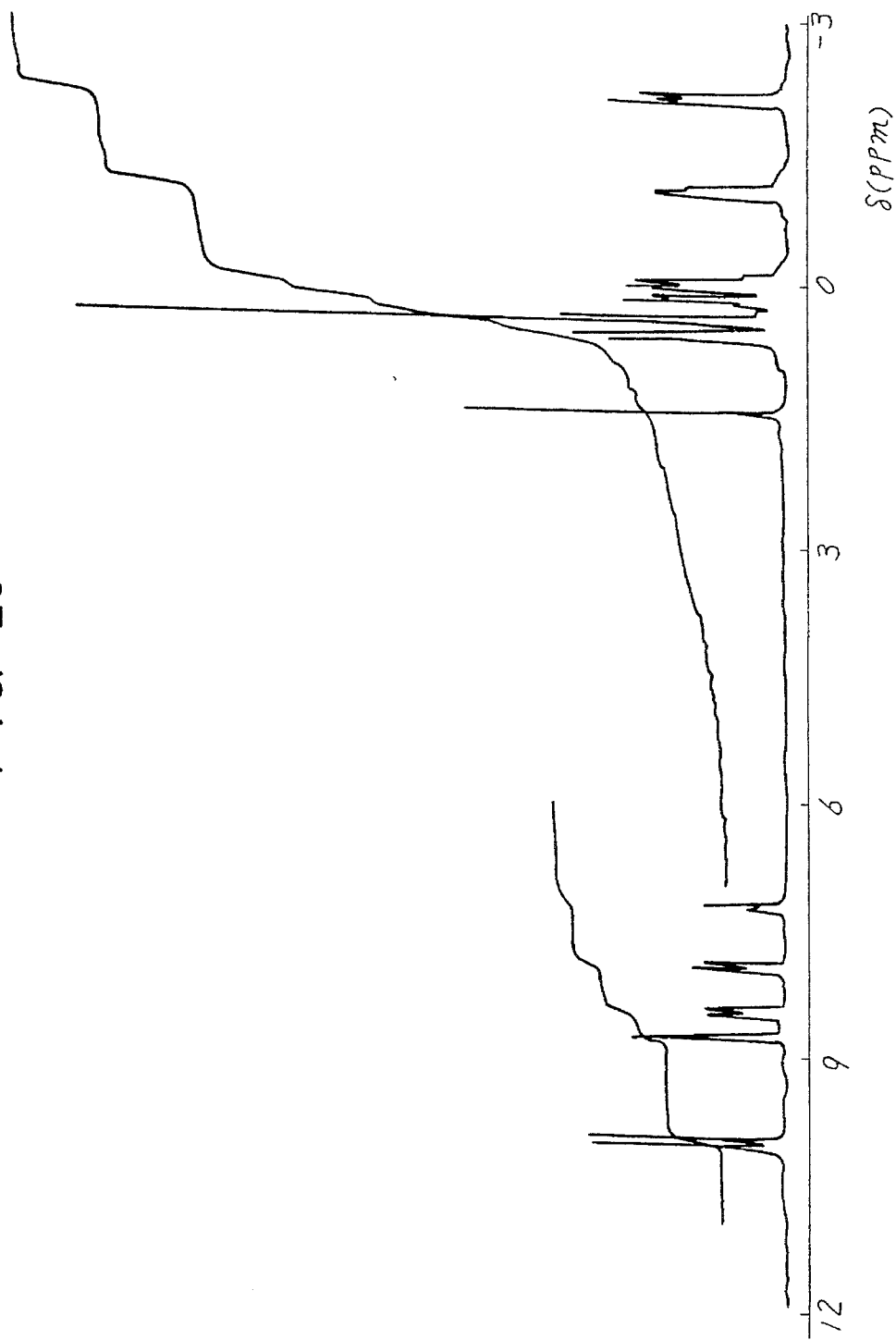
FIG. 20 is NMR spectrum of bis(tri-n-hexylsiloxy)-silicon-tetrabromonaphthalocyanine.

(3) NMR (CDCl$_3$): FIG. 20
δ: 10.06 (4H, br-s)
10.00 (4H, br-s)
8.83 (4H, br-s)
8.53 (4H, dd, J=8.85, 2.44 Hz)
7.99 (4H, dd, J=8.85 Hz)
0.63 (12H, sextet, J=7.32 Hz)
0.45 (18H, t, J=7.32 Hz)
0.22 (12H, quintet, J=7.32 Hz)
0.05 (12H, quintet, J=7.32 Hz)
−1.02 (12H, qintet-like m)
−2.10 (12H, t-like m)

Figure 21:
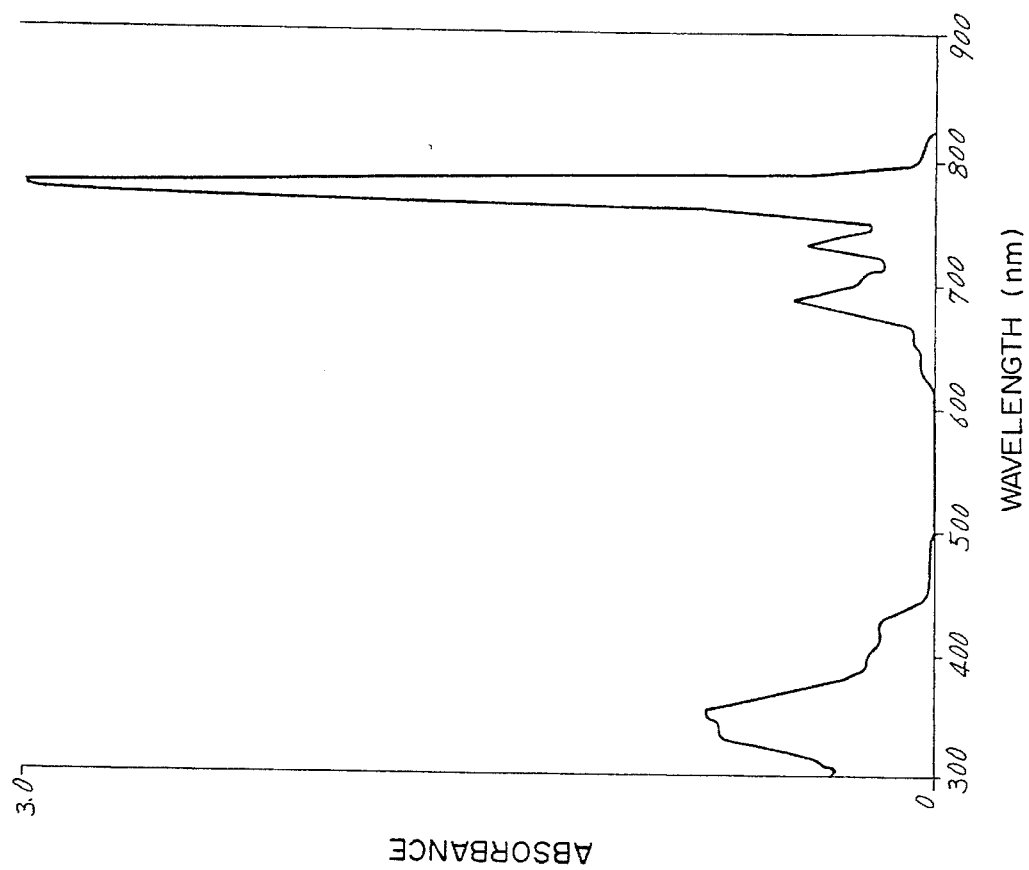
FIG. 21 is electronic spectrum of bis(tri-n-hexylsiloxy)silicon-tetrabromonaphthalocyanine.
Figure 22:
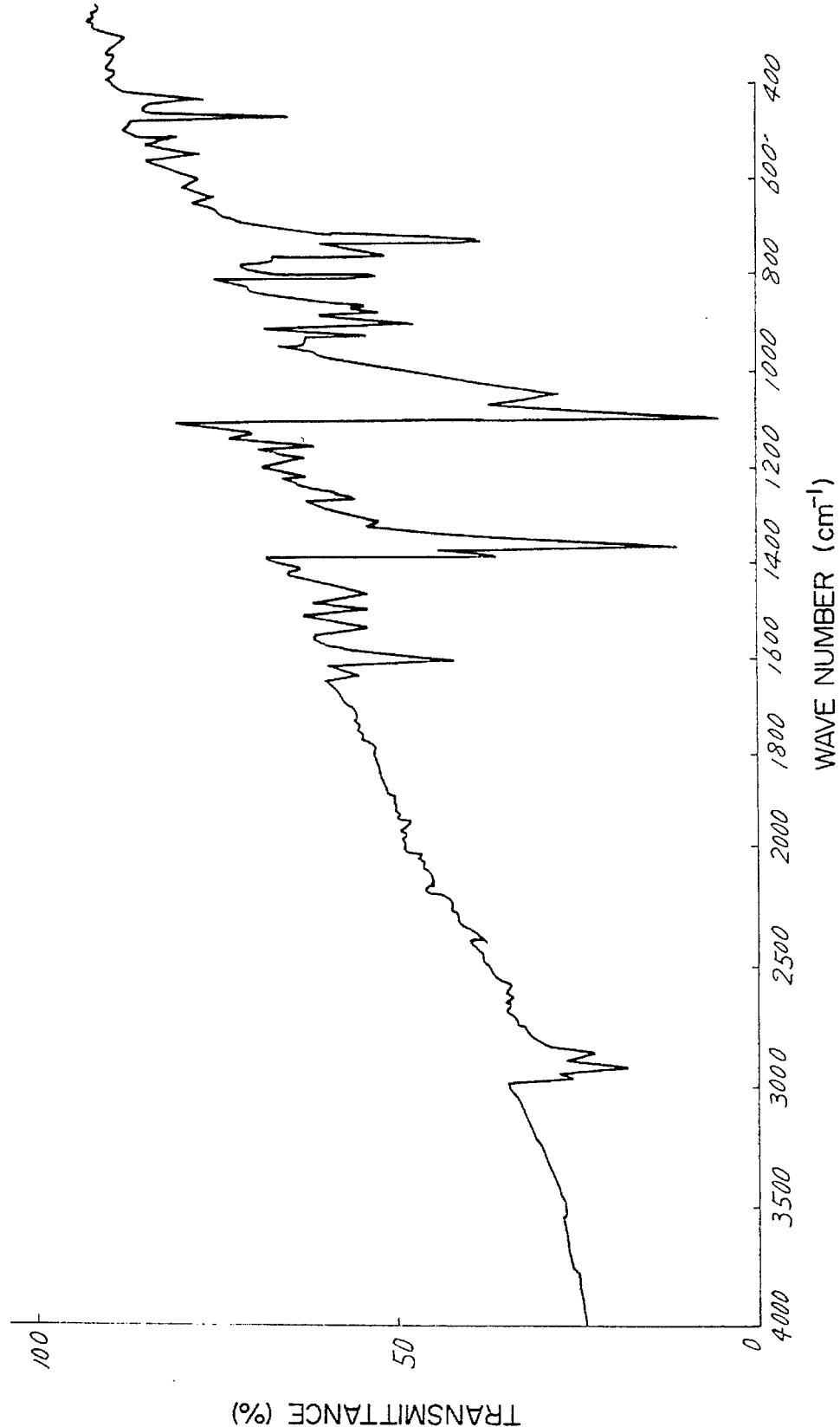
FIG. 22 is IR spectrum of bis(tri-n-hexylsiloxy) silicon-tetrabromonaphthalocyanine.

(4) Electronic spectrum (CHCl$_3$ solution): FIG. 21 (%) IR spectrum (KBr method): FIG. 22

SYNTHESIS EXAMPLE 13

Synthesis of bis(triethylsiloxyl)silicon-tetrabromonaphthalocyanine (formula (VI) wherein M is Si; k, l, m and n are equal to 1 and Y is triethylsiloxyl group)

To a suspension of 2.82 g (2.6 mmoles) of dihydroxysilicon-tetrbromonaphthalocyanine in 100 ml of quinoline was added 10 ml (65 mmoles) of triethylsilanol. The mixture was refluxed for about 3 hours and cooled, and then the reaction mixture was poured into 500 ml of 1/1 mixture of ethanol and water, thoroughly stirred and allowed to stand overnight. The precipitate was filtered and thoroughly washed successively with methanol and chloroform. The crystal thus obtained was washed in Soxhlet extractor with chloroform to obtain 2.1 g of a deep green crystal. Accordingly to the following analyses, this deep green crystal was identified as bis(triethylsiloxy)silicon-tetrabromonaphthalocyanine (formula (VI) wherein M is Si; k, l, m and n are equal to 1, and Y is triethylsiloxyl).

(1) Melting point: 300° C.
(2) Elementary analyses

|  | C | H | N | Br |
|---|---|---|---|---|
| Calcd. (%) | 54.64 | 3.82 | 8.50 | 24.23 |
| Found (%) | 54.18 | 3.62 | 8.81 | 23.94 |

(3) NMR: CDCl$_1$
δ: 10.07 (4H, br-s)
10.00 (4H, br-s)
8.83 (4H, br-s)
8.54 (4H, dd, J=8.85, 3.05 Hz)
8.01 (4H, d, J=8.85 Hz)
−1.04 (18H, t, J=7.32 Hz)
−2.05 (12H, q, J=7.32 Hz)

Figure 23:
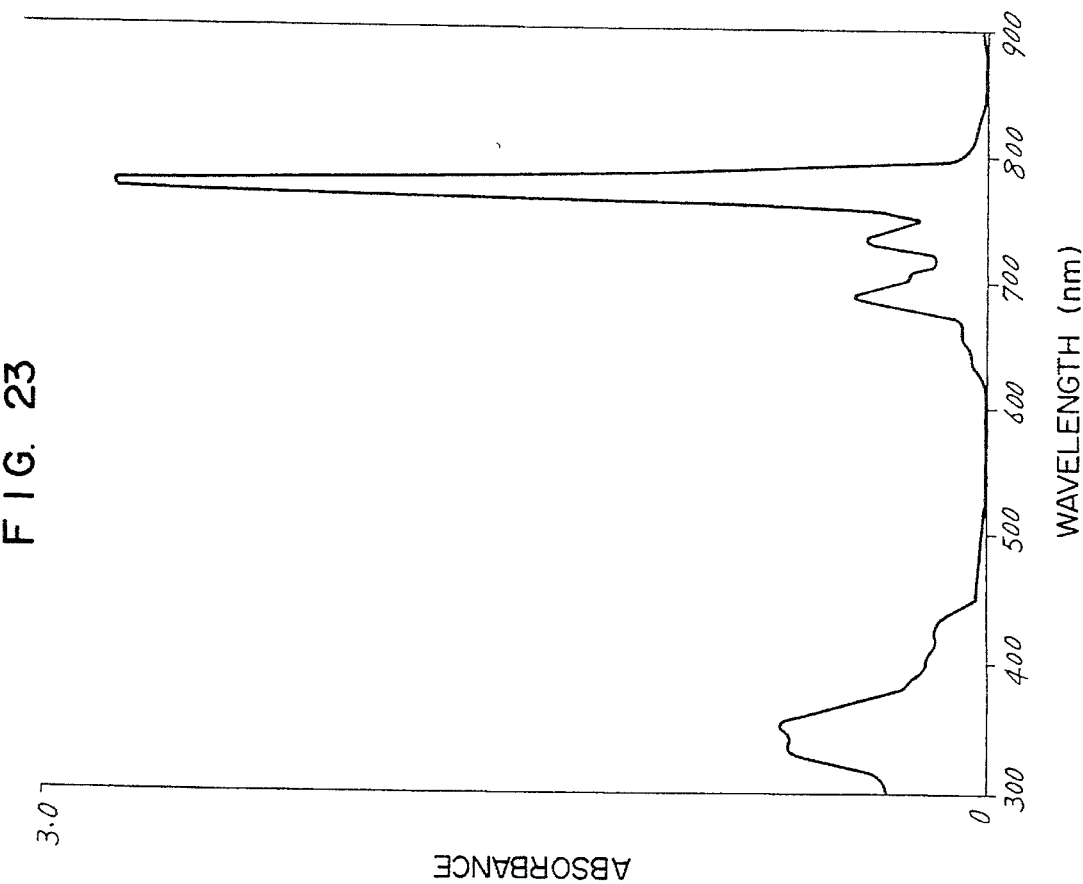
FIG. 23 is electronic spectrum of bis(triethylsiloxy)silicon-tetrabromonaphthalocyanine.
Figure 24:
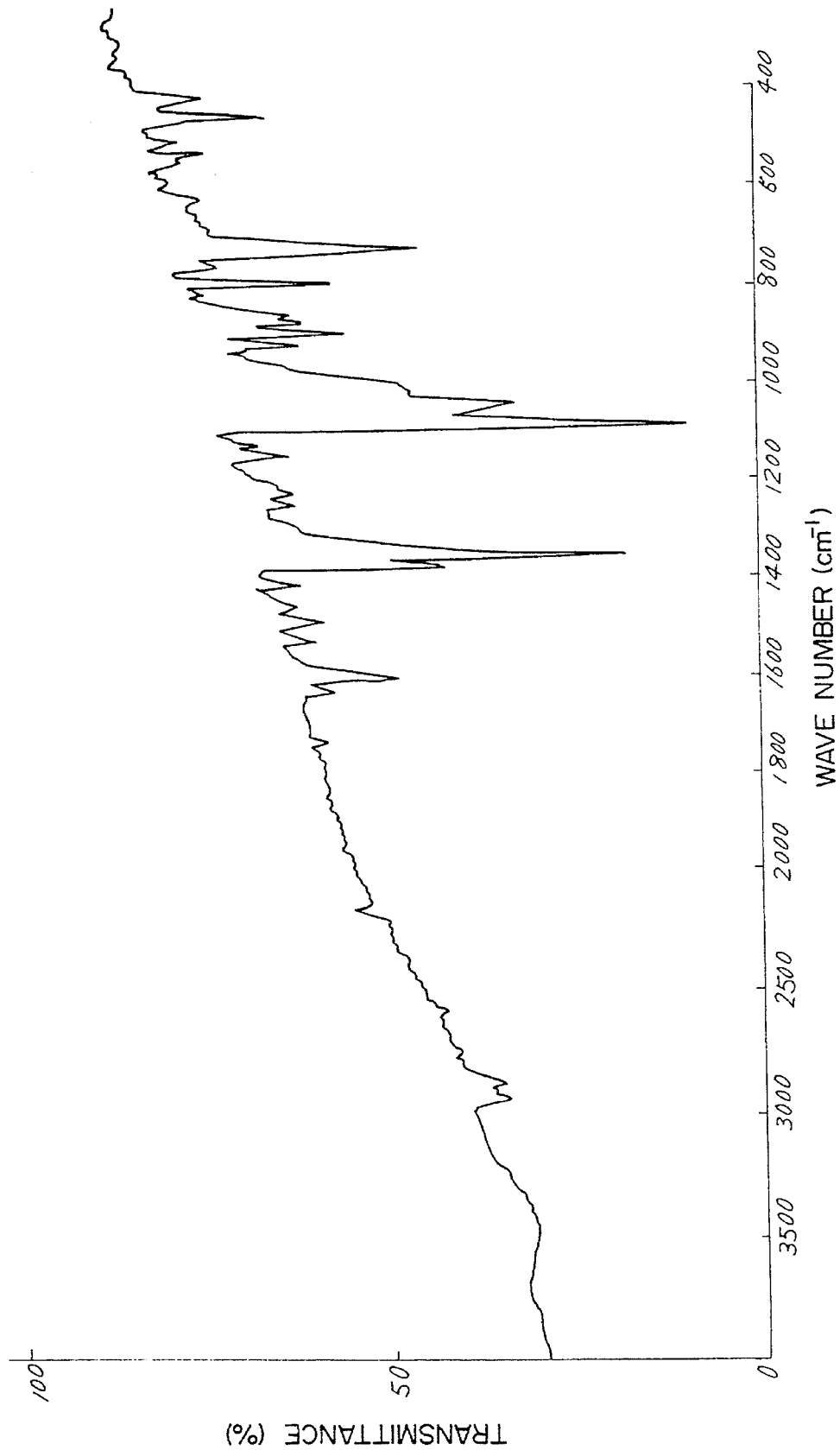
FIG. 24 is IR spectrum of bis(triethylsiloxy)silicon-tetrabromonaphthalocyanine.

(4) Electronic spectrum (CHCl$_3$ solution): FIG. 23
(5) IR spectrum (KBr method): FIG. 24

SYNTHESIS EXAMPLE 14

Synthesis of 6-cyclopentylthio-2,3-dicyanonaphthalene
In a mixed solvent of 200 ml of quinoline and 55 ml of pyridine, 10 g (38.9 mmoles) of 6-bromo-2,3-dicyanonaphthalene and 13 g (79.0 mmoles) of copper cyclopentylthiolate

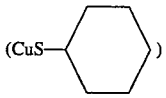

were refluxed for 20 hours until the starting compounds had completely been consumed. After cooling, the reaction mixture was poured into a 1/1 mixture of water and methanol, and the crystal precipitated was collected by filtration. After separating decomposed products and by-products from the crystal thus obtained by means of silica gel column chromatography, the main product was recrystallized from toluene/hexane to obtain 7.85 g (72%) of a light yellow crystal. Referring to the following analyses, it was identified as 6-cyclopentylthio-2,3-dicyanonaphthalene.

(1) Melting point: 164°–166° C.
(2) Elementary analyses:

|  | C | H | N |
|---|---|---|---|
| Calcd. (%) | 72.82 | 5.75 | 9.99 |
| Found (%) | 72.78 | 5.81 | 10.05 |

Figure 25:
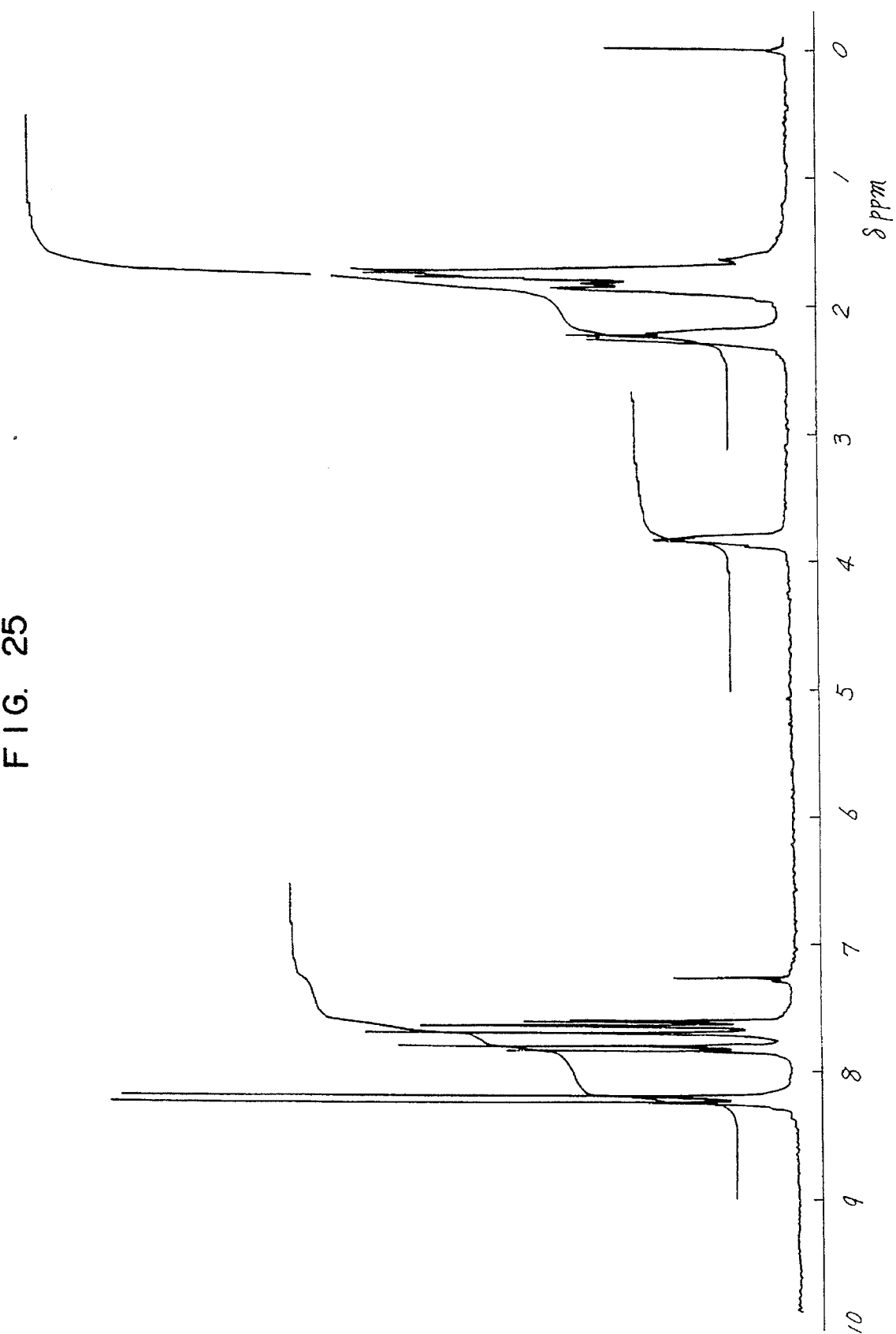
FIG. 25 is NMR spectrum of 6-cyclopentylthio-2,3 -dicyanon-aphthalene.

(3) NMR spectrum (FIG. 25): CDCl$_3$
δ: 8.25 (1H, s)
8.19 (1H, s)
7.82 (1H, d, J=8.85 Hz)
7.70 (1H, s)
7.62 (1H, dd, J=8.85, 1.85 Hz)
3.83 (1H, m)
2.22 (2H, m)
1.90 - 1.60 (6H, m)

Figure 26:
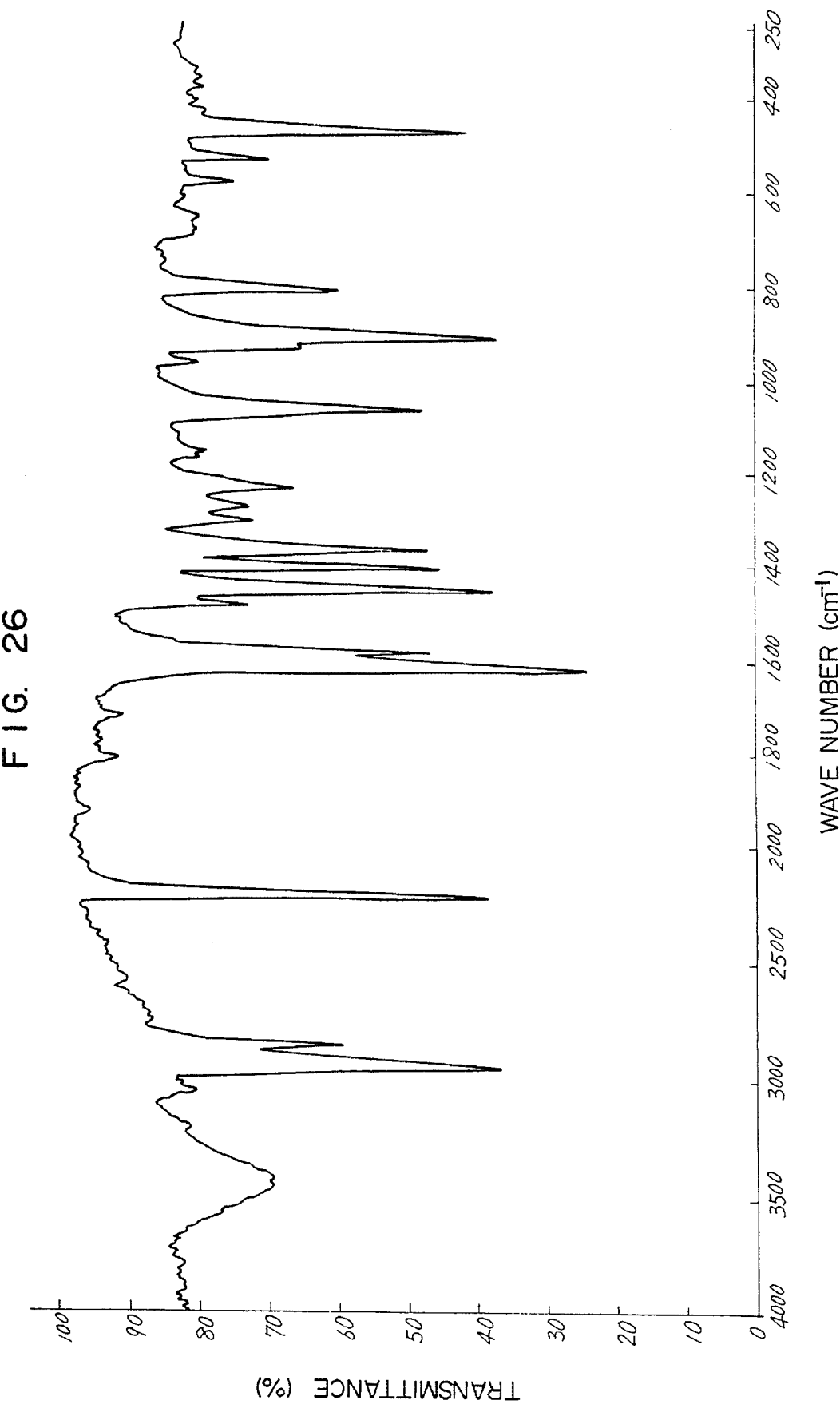
FIG. 26 is IR spectrum of 6-cyclopentylthio-2,3-dicyanonaphthalene.

(4) IR spectrum (KBr method): FIG. 26

SYNTHESIS EXAMPLE 15

Synthesis of 6-cyclohexylthio-2,3-dicyanonaphthalene
Ten grams (38.9 mmoles) of 6-bromo-2,3-dicyanonaphthalene and 14 g (77.9 mmoles) of copper cyclohexylthiolate

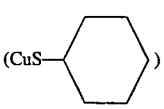

were refluxed in a mixed solvent of 200 ml of quinoline and 55 ml of pyridine for 20 hours until the starting compounds had completely been consumed. After cooling, the reaction mixture was poured into 1/1 mixture of water and methanol, and the deposited precipitate was collected by filtration. After separating decomposed products and by-products present in the crystal thus obtained by silica gel column chromatography, it was recrystallized from toluene/hexane to obtain 7.33 g (63%) of a light yellow crystal. Referring to the following analyses, it was identified as 6-cyclohexylthio-2,3-dicyanonaphthalene.

(1) Melting point: 134°–136° C.
(2) Elementary analyses:

|  | C | H | N |
|---|---|---|---|
| Calcd. (%) | 73.40 | 6.16 | 9.51 |
| Found (%) | 73.14 | 6.03 | 9.44 |

Figure 27:
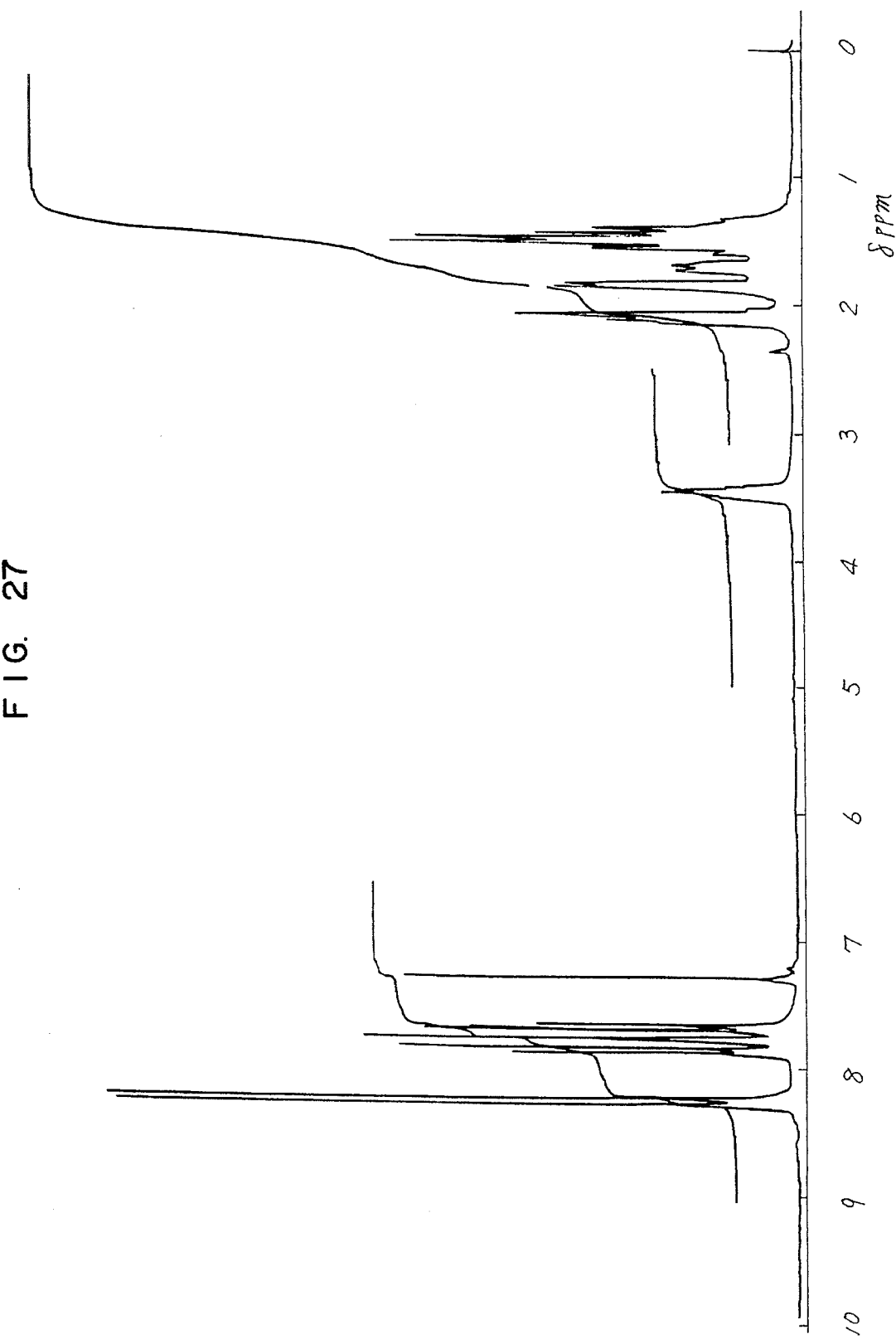
FIG. 27 is NMR spectrum of 6-cyclohexylthio-2,3-dicyanonaphthalene.

(3) NMR spectrum (FIG. 27): CDCl$_3$
δ: 8.26 (1H, s)
8.21 (1H, s)
7.84 (1H, d, J=8.54 Hz)
7.75 (1H, s)
7.62 (1H, dd, J=8.54, 1.83 Hz)
3.43 (1H, m)
2.13 - 2.02 (2H, m)
1.88 - 1.25 (8H, m)

Figure 28:
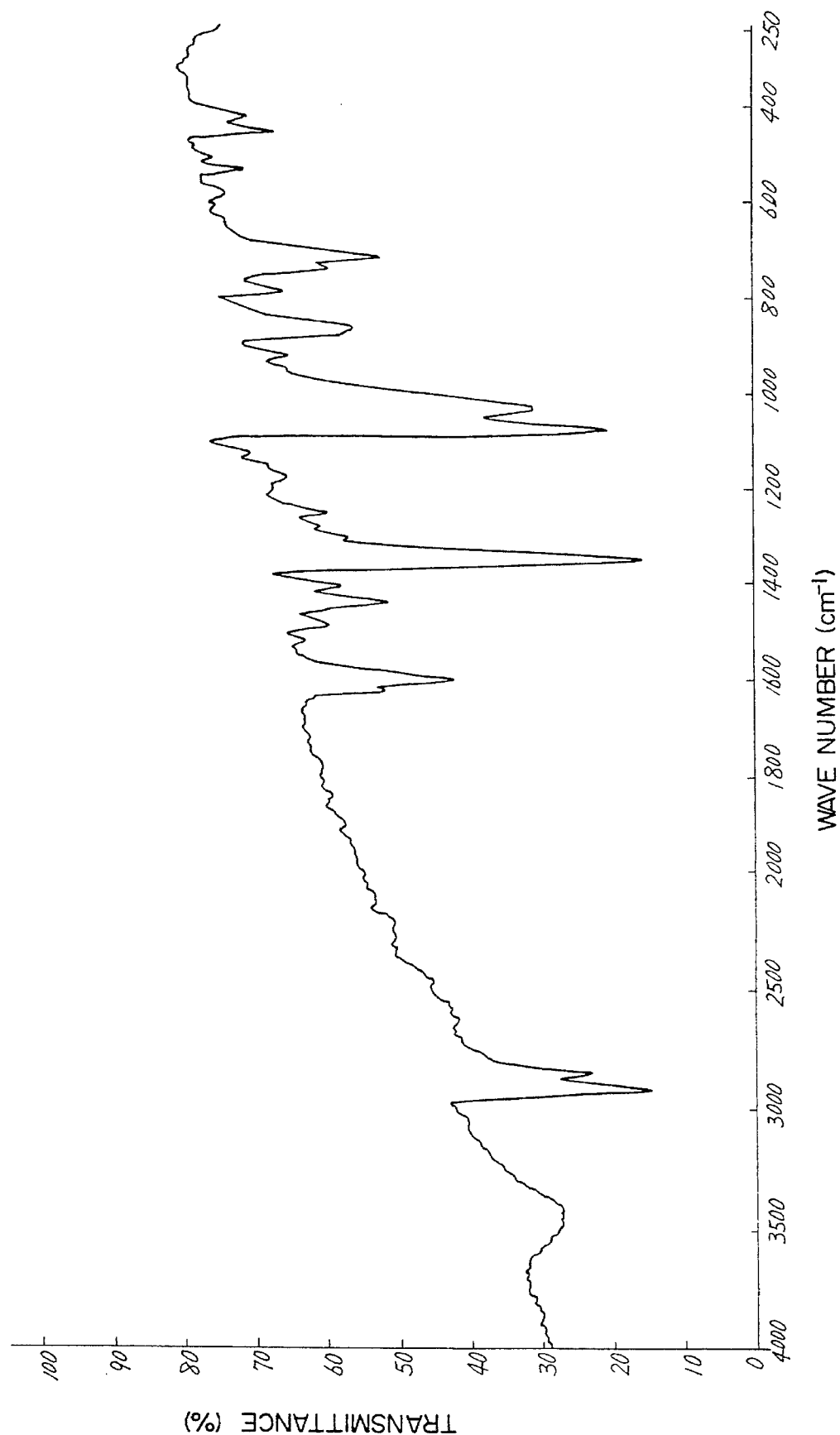
FIG. 28 is IR spectrum of 6-cyclohexylthio-2,3 -dicyanonaphthalene.

(4) IR spectrum (KBr method): FIG. 28

SYNTHESIS EXAMPLE 16

Synthesis of 6-(4-methylcyclohexylthio)-2,3-dicyanonaphthalene

In a mixed solvent of 330 ml of quinoline and 85 ml of pyridine, 10 g (38.9 mmoles) of 6-bromo-2,3-dicyanonaphthalene and 22.6 g (117 mmoles) of copper 4-methylcyclohexylthiolate

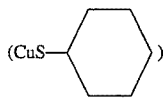

were refluxed for 6 hours. After cooling, the reaction mixture was poured into 1/1 mixture of water and methanol, and the crystal precipitated was collected by filtration. After separating the decomposed products and by-products present in the crystal thus obtained by silica gel column chromatography, it was recrystallized from toluene/hexane to obtain 4.0 g (34%) of a light yellow crystal. Referring to the following analyses, it was identified as 6-(4-methylcyclohexylthio)-2,3-dicyanonaphthalene.

(1) Melting point: 129°–131° C.
(2) Elementary analysis:

|  | C | H | N |
|---|---|---|---|
| Calcd. (%) | 73.99 | 6.54 | 9.08 |
| Found (%) | 73.69 | 6.82 | 9.31 |

Figure 29:
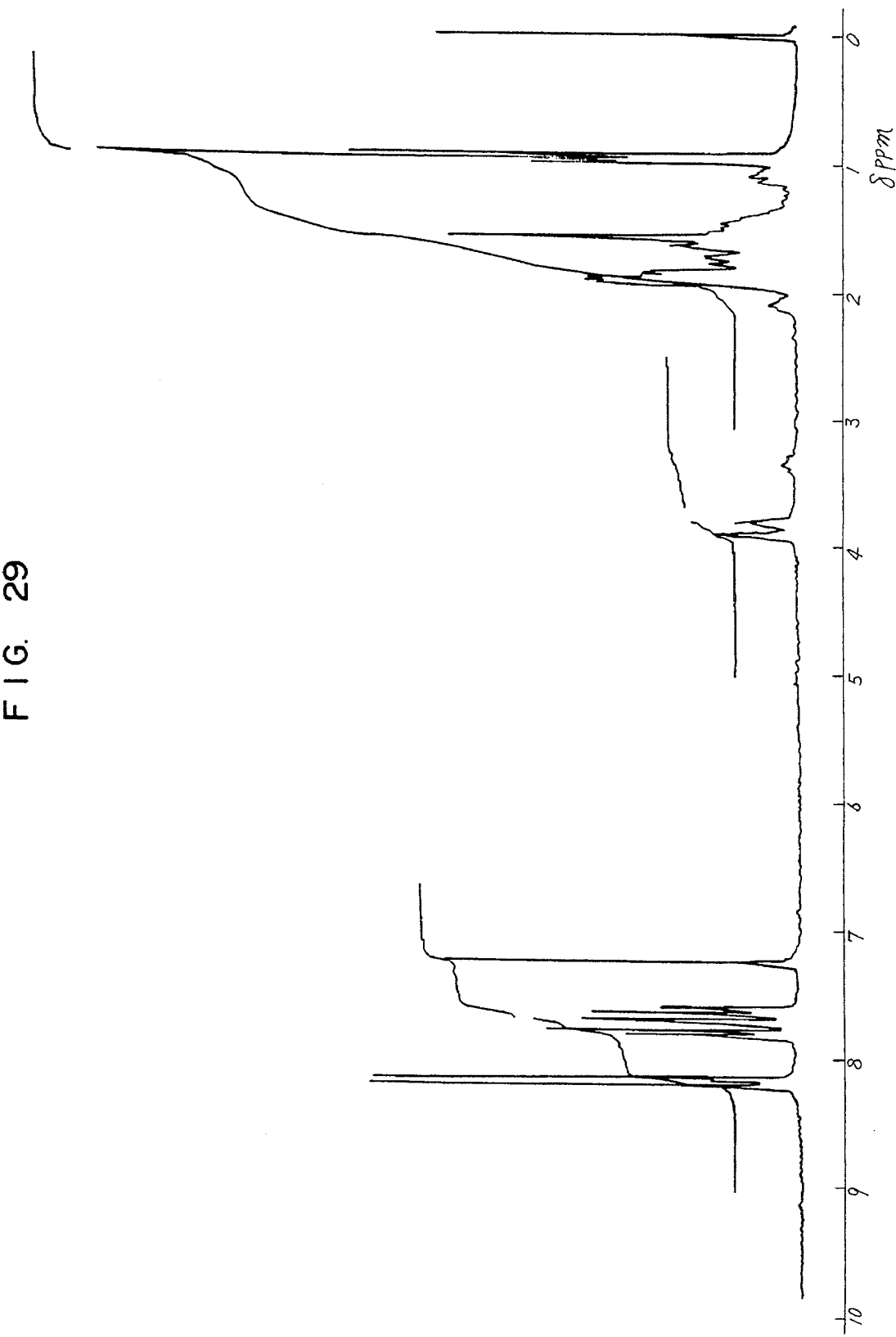
FIG. 29 is NMR spectrum of 6-(4 -methylcyclohexylthio)-2,3-dicyanonaphthalene.

(3) NMR spectrum (FIG. 29): CDCl$_3$
δ: 8.25 (1H, s)
8.19 (1H, s)
7.83 (1H, d, J=8.54 Hz)
7.73 (1H, s)
7.65 (1H, d, J=8.54 Hz)
3.90 - 3.75 (1H, m)
2.00 - 1.30 (9H, m)
1.00 - 0.88 (3H, m)

Figure 30:
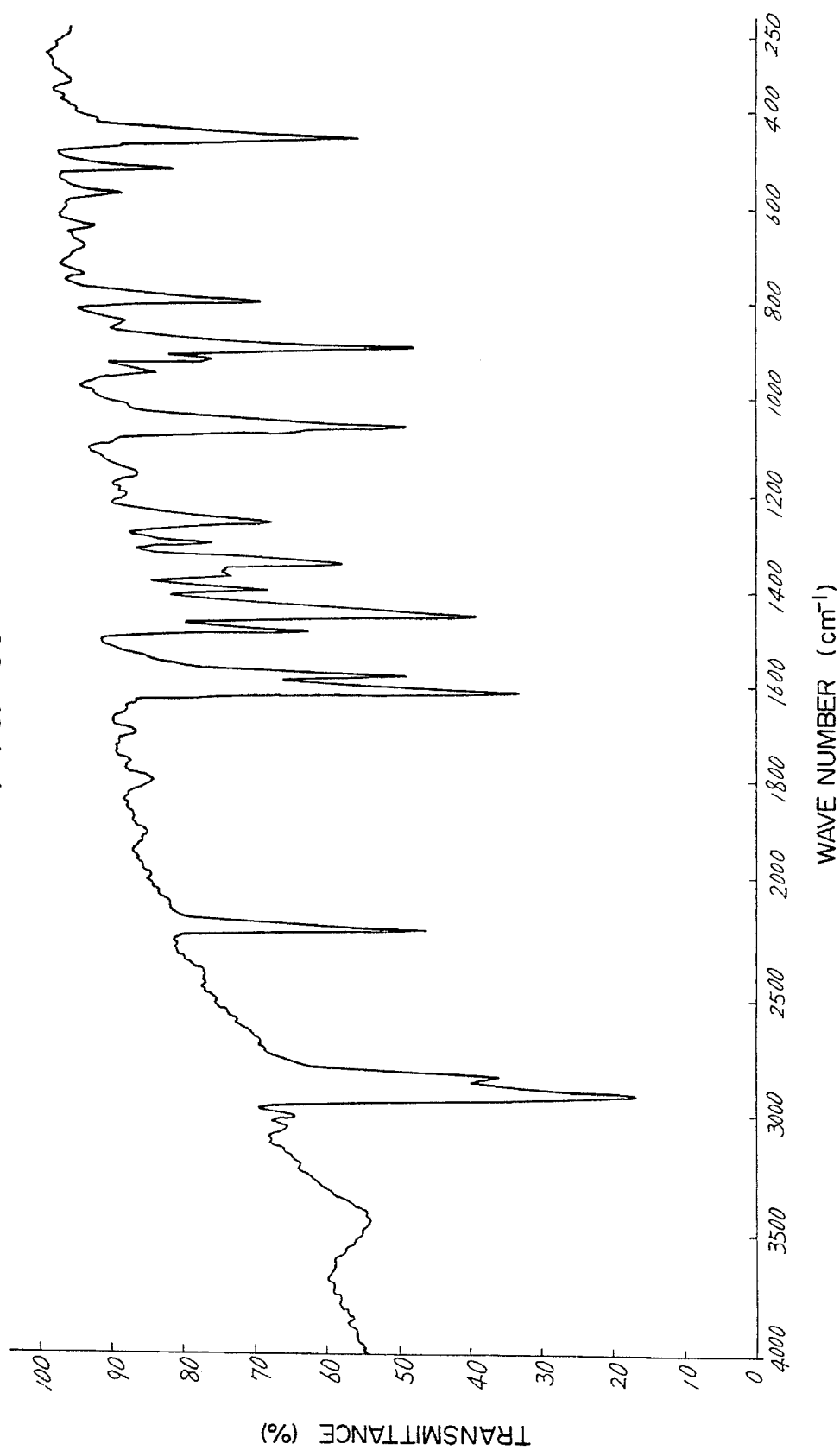
FIG. 30 is IR spectrum of 6-(4-methylcyclohexylthio)-2,3 -dicyanonaphthalene.

(4) IR spectrum (KBr method): FIG. 30

SYNTHESIS EXAMPLE 17

Synthesis of 6-cyclopentylthio-1,3-diiminobenz[f]-isoindoline

To a solution of sodium methoxide in methanol prepared by adding 1.80 g (82.8 mmoles) of metallic sodium to 180 ml of anhydrous methanol in an atmosphere of nitrogen was added 17 g (61.1 mmoles) of 6-cyclopentylthio-2,3-dicyanonaphthalene. The mixture was refluxed for about 2 hours, while bubbling anhydrous ammonia gas. The methanol in the reaction mixture was distilled off under reduced pressure, and the oily product thus obtained was cooled. Water (50 ml) was added to the oily product to crystallize. The crystal was filtered and washed successively with water and ethanol to obtain 17.1 g (95%) of a yellow crystal. Referring to the following analyses, it was identified as 6-cyclopentylthio-1,3-diiminobenz[f]isoindoline.

(1) Elementary analyses:

|  | C | H | N |
|---|---|---|---|
| Calcd. (%) | 68.65 | 6.44 | 14.13 |
| Found (%) | 68.51 | 6.50 | 14.21 |

Figure 31:
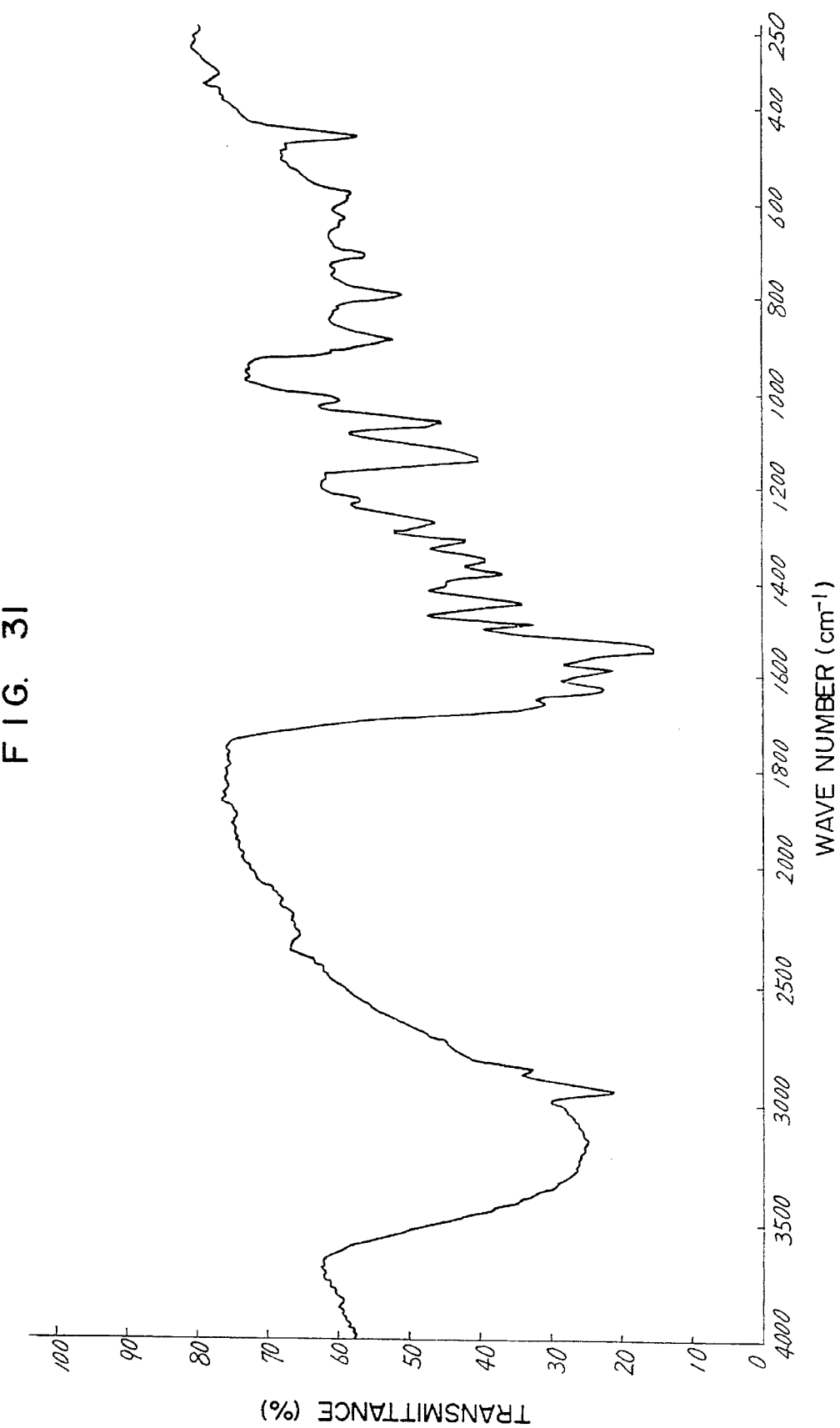
FIG. 31 is IR spectrum of 6 -cyclopentylthio-1,3-diiminobenzo(f)isoindoline.

(2) IR spectrum (KBr method): FIG. 31

SYNTHESIS EXAMPLE 18

Synthesis of 6-cyclohexylthio-1,3-diiminobenz[f]-isoindoline

To a solution of sodium methoxide in methanol prepared by adding 1.75 g (76.3 mmoles) of metallic sodium to 175 ml of anhydrous methanol in an atmosphere of nitrogen was added 30 g (103 mmoles) of 6-cyclohexylthio-2,3-dicyanonaphthalene. Then, the mixture was refluxed for about 2 hours, while bubbling anhydrous ammonia gas. The methanol was distilled off from the reaction mixture under reduced pressure, and the oily product thus obtained was cooled. Then, water was added to the oily product to crystallize. The crystal precipitated was filtered and washed successively with water and ethanol to obtain 31.4 g (98%) of a yellow crystal. Referring to the following analyses, it was identified as 6-cyclohexylthio-1,3-diiminobenz[f]isoindoline.

(1) Elementary analyses:

|  | C | H | N |
|---|---|---|---|
| Calcd. (%) | 69.42 | 6.80 | 13.49 |
| Found (%) | 69.37 | 6.92 | 13.52 |

Figure 32:
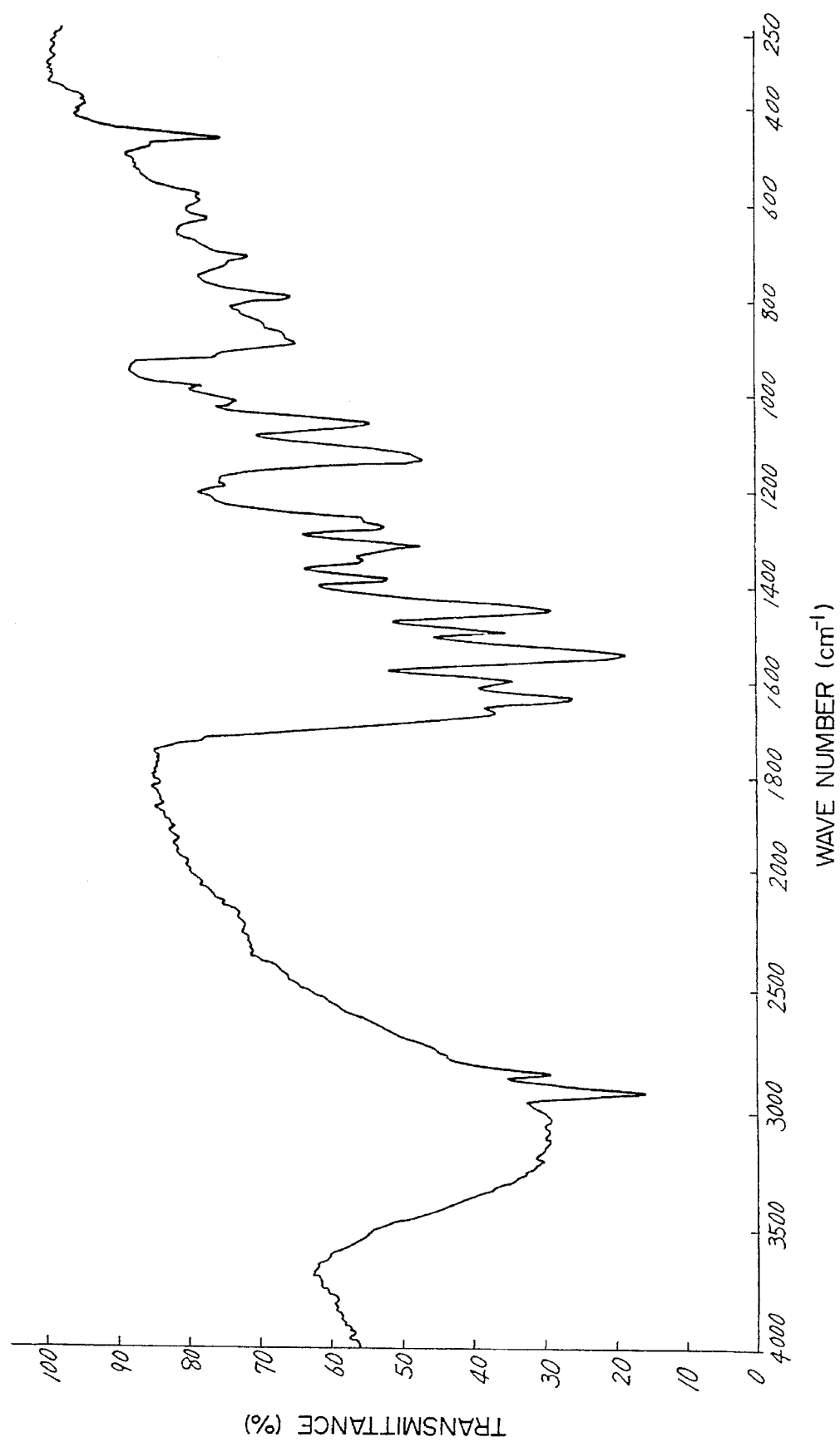
FIG. 32 is IR spectrum of 6-cyclohexylthio-1,3-diiminobenzo(f)-isoindoline.

(2) IR spectrum (KBr method): FIG. 32

SYNTHESIS EXAMPLE 19

Synthesis of dichlorosilicon-tetra(cyclohexylthio)-naphthalocyanine (formula (VIII) wherein M is Si; X is chlorine atom and k, l, m and n are equal to 1)

In an atmosphere of nitrogen, 30 ml (0.262 mole) of silicon tetrachloride was added to a suspension of 27 g (87.3 mmoles) of 6-cyclohexylthio-1,3-diiminobenz[f]isoindoline in 300 ml of anhydrous quinoline. The mixture was slowly heated to 220° C., and reacted at this temperature for 2 hours. After cooling, the reaction mixture was poured into 1.5 liters of methanol, and the crystal precipitated was collected by filtration, washed with methanol and ethanol, and dried under reduced pressure to obtain 28 g (100%) of a dark green crystal. Referring to the following analyses, it was identified as dichlorosilicon-tetra(cyclohexylthio)- naphthalocyanine. Without further purification, it was used in the subsequent reaction.

Figure 33:
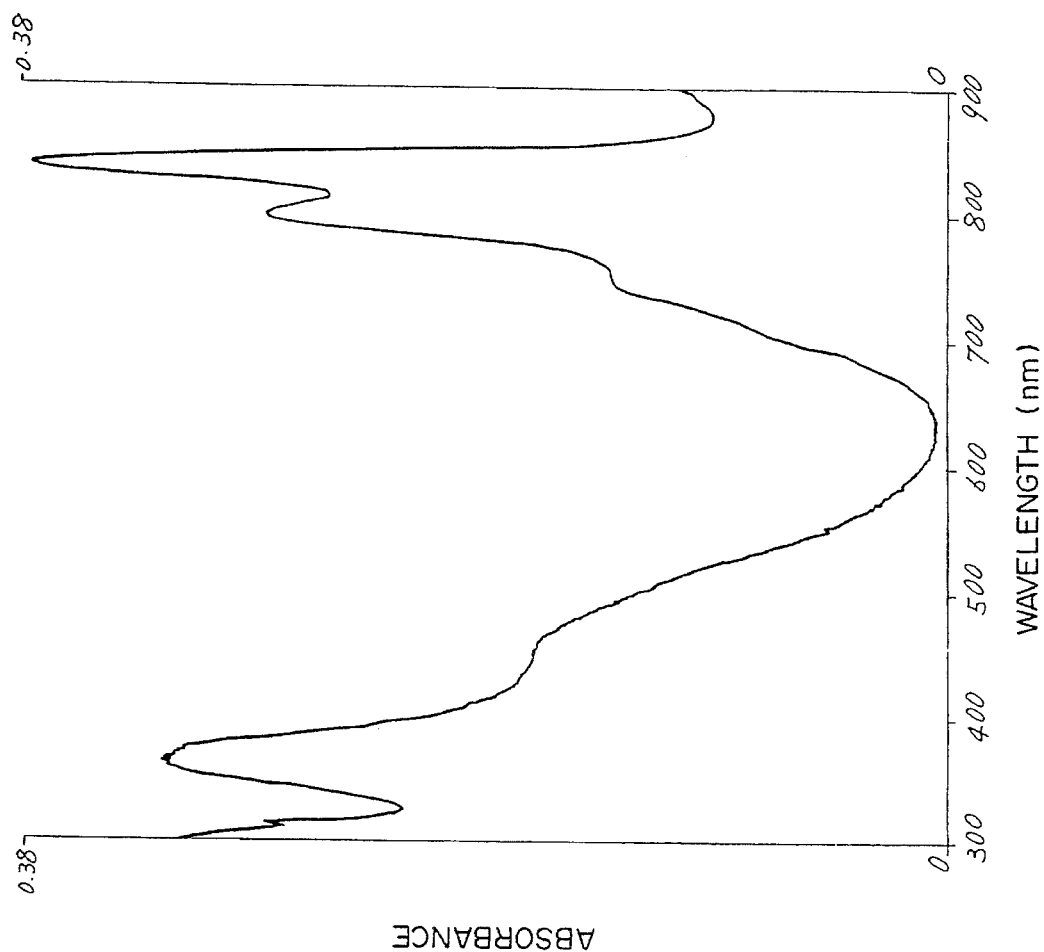
FIG. 33 is electronic spectrum of dichloro-silicon-tetra(cyclohexylthio)-naphthalocyanine.

(1) Electronic spectrum (tetrahydrofuran solution): FIG. 33

Figure 34:
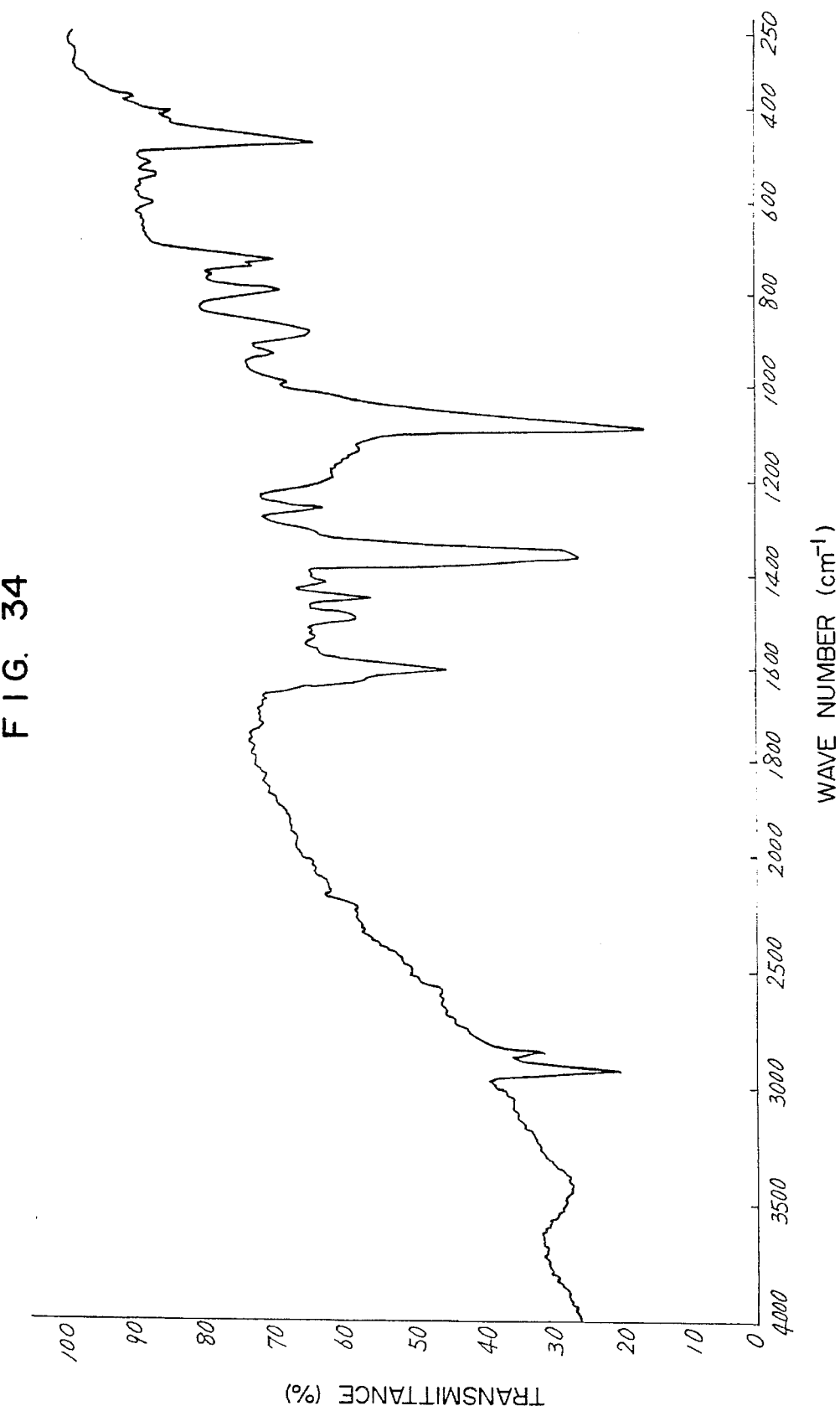
FIG. 34 is IR spectrum of dichlorosilicon-tetra(cyclo-hexylthio)-naphthalocyanine.

(2) IR spectrum (KBr method): FIG. 34

SYNTHESIS EXAMPLE 20

Synthesis of dihydroxysilicon-tetra(cyclopentylthio)-naphthalocyanine (formula (II) wherein M is Si and k, l, m and n are equal to 1)

In an atmosphere of nitrogen, 20 ml (0.174 mmole) of silicon tetrachloride was added to a suspension of 17 g (58 mmoles) of 6-cyclopentylthio-1,3-diimino-benz[f]isoindoline in 200 ml of anhydrous quinoline. The mixture was heated at 220° C. for 2 hours, cooled, poured into a mixed solvent of 400 ml of ethanol and 200 ml of concentrated aqueous ammonia, and refluxed for 6 hours. After cooling, the resulting crystal was collected by filtration, washed successively with methanol and ethanol and dried under reduced pressure to obtain 25.1 g of a dark green crystal. Referring to the following analyses, it was identified as dihydroxysilicon-tetra(cyclopentylthio)naphthalocyanine. Without further purification, it was used in the subsequent reaction.

Figure 35:
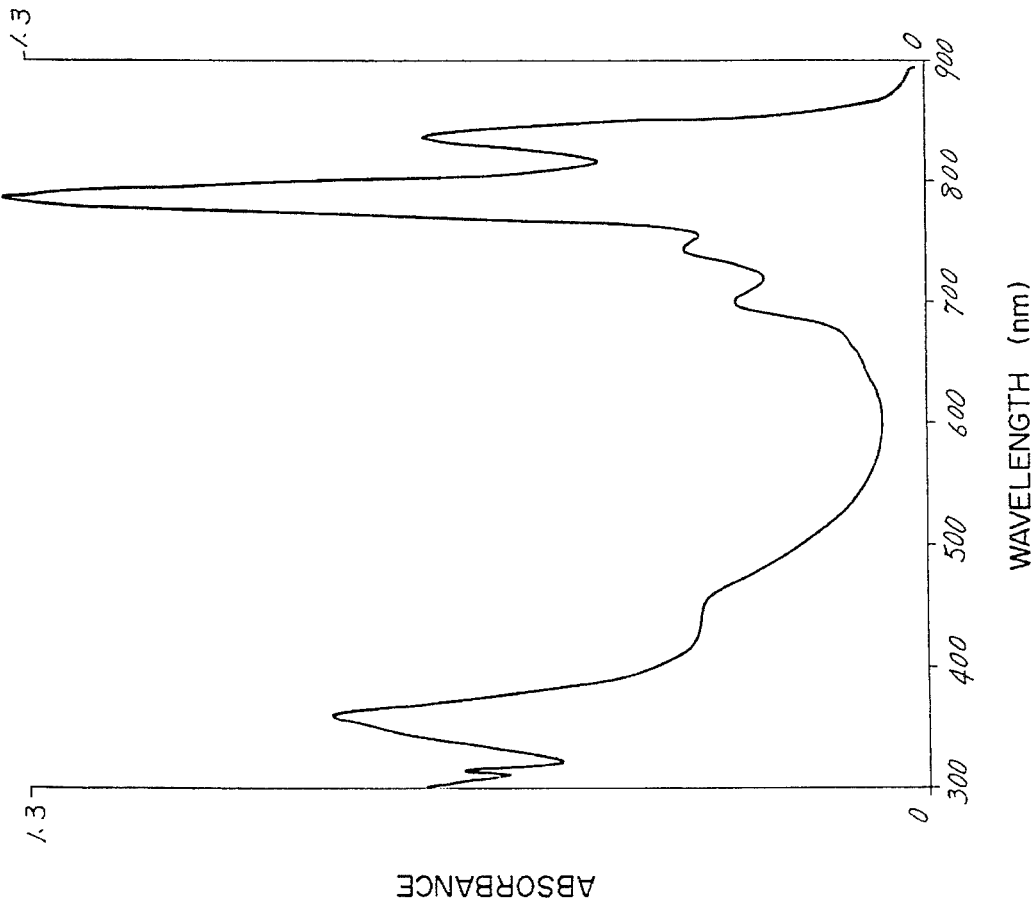
FIG. 35 is electronic spectrum of dihydroxysilicon-tetra(cyclopentylthio)-naphthalocyanine.

(1) Electronic spectrum (tetrahydrofuran solution): FIG. 35

Figure 36:
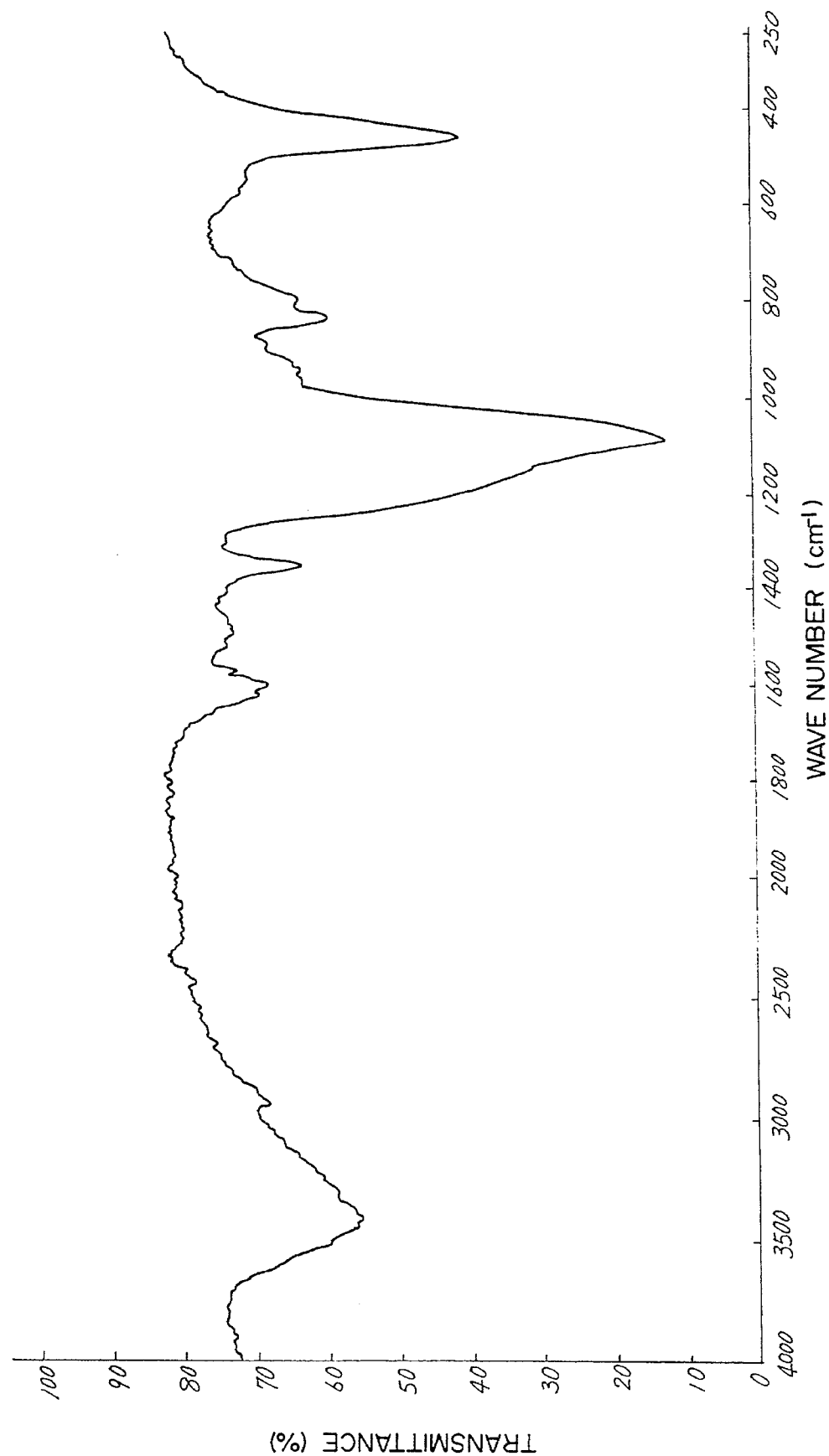
FIG. 36 is IR spectrum of dihydroxy-silicon-tetra(cyclopentylthio)-naphthalocyanine.

(2) IR spectrum (KBr method): FIG. 36

SYNTHESIS EXAMPLE 21

Synthesis of dihydroxysilicon-tetra(cyclohexylthio)-naphthalocyanine (formula (II) wherein M is Si and k, l, m and n are equal to 1)

In a mixed solvent of 300 ml of ethanol and 200 ml of concentrated aqueous ammonia, 25 g (19.7 mmoles) of crude crystal of dichlorosilicon-tetra(cyclohexyl-thio)-naphthalocyanine was refluxed for about 3 hours. After cooling, the reaction mixture was poured into one liter of methanol and the crystal precipitated was collected by filtration, washed with ethanol and dried under reduced pressure to obtain 22.5 g (92.7%) of a dark green crystal. Referring to the following analyses, it was identified as dihydroxysilicon-tetra(cyclohexyl-thio)naphthalocyanine. Without further purification, it was used in the subsequent reaction.

Figure 37:
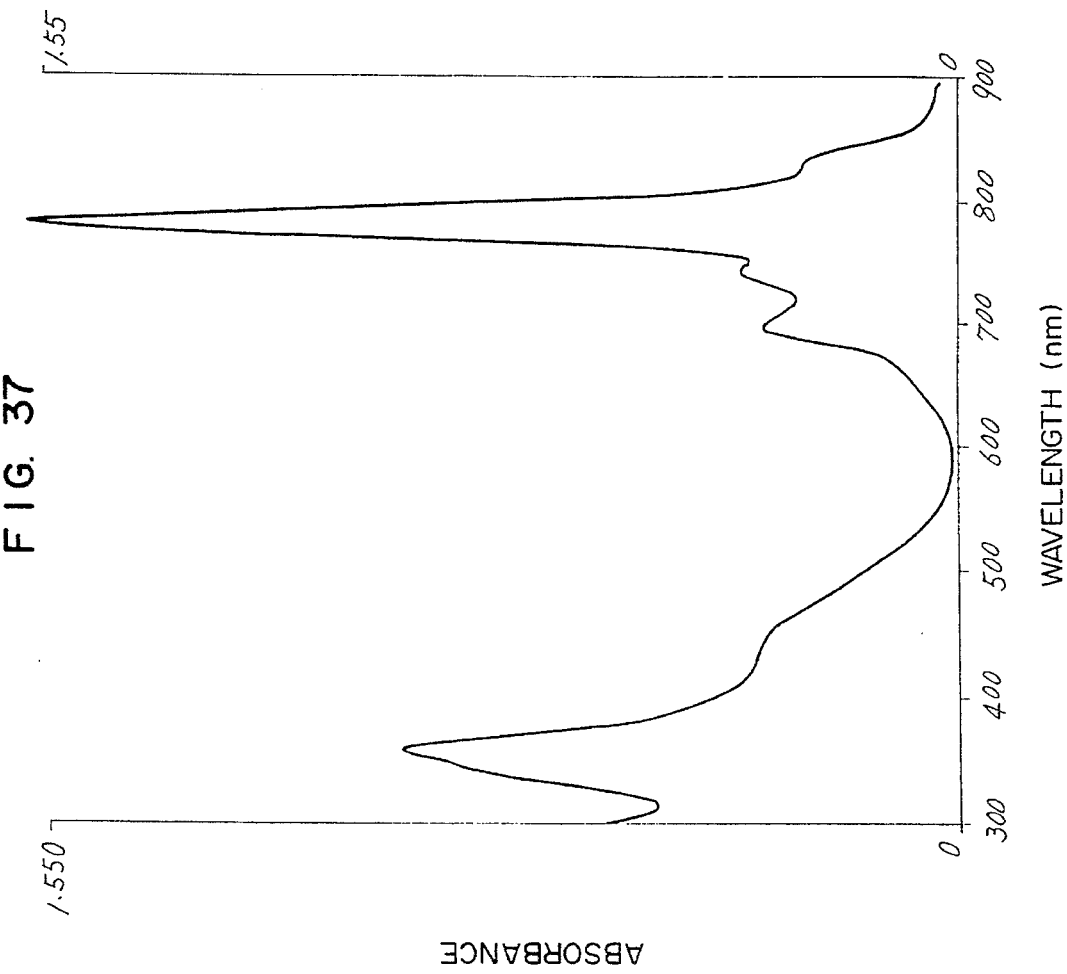
FIG. 37 is electronic spectrum of dihydroxysilicon-tetra(cyclohexylthio)-naphthalocyanine.

(1) Electronic spectrum (tetrahydrofuran solution): FIG. 37

Figure 38:
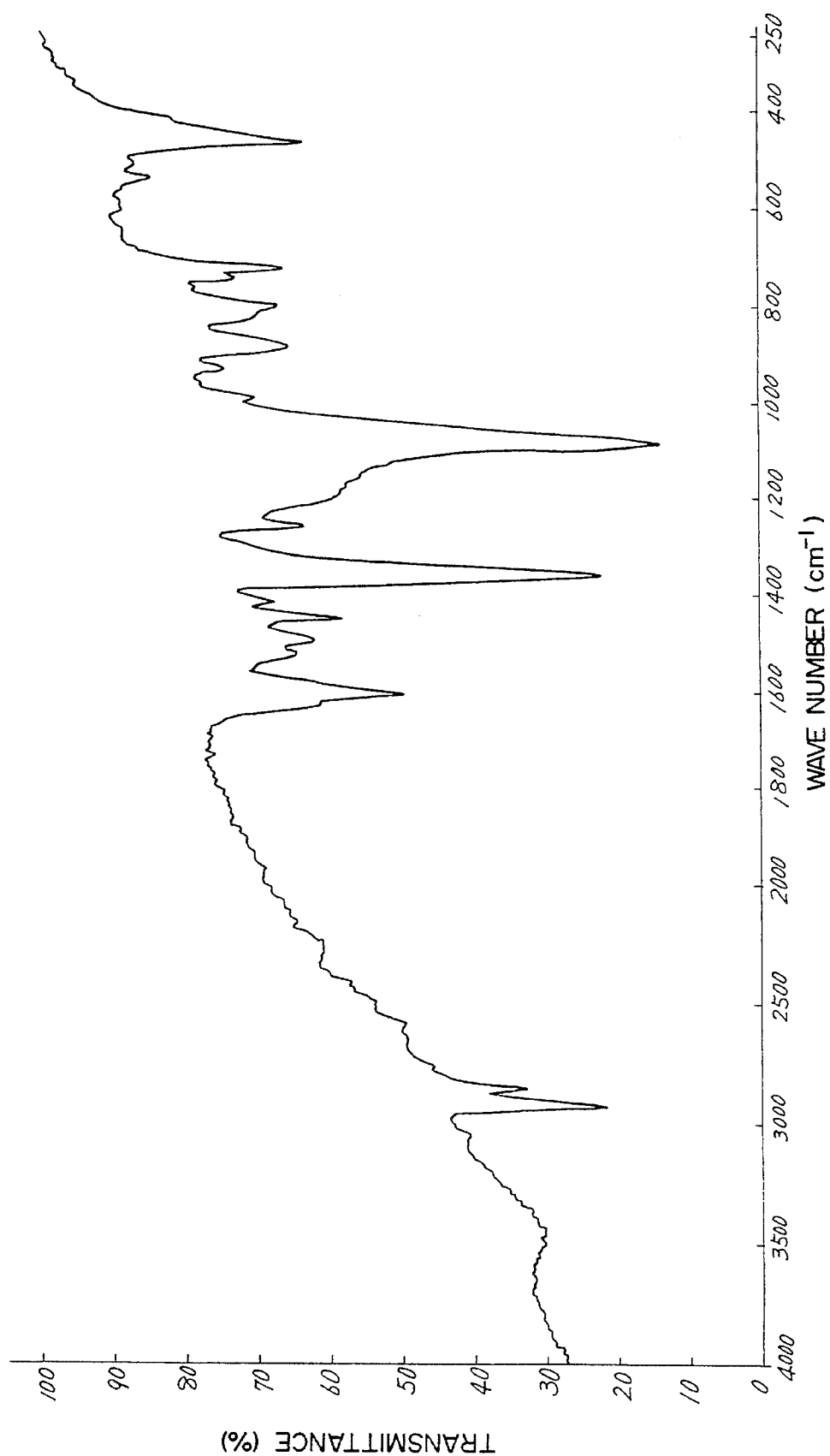
FIG. 38 is IR spectrum of dihydroxysilicon-tetra(cyclohexylthio)-naphthalocyanine.

(2) IR spectrum (KBr method): FIG. 38

SYNTHESIS EXAMPLE 22

Synthesis of dihydroxysilicon-tetra(4-methylcyclohexylthio)naphthalocyanine (formula (II) wherein M is Si and k, l, m and n are equal to 1)

To a solution of sodium methoxide in methanol prepared by adding 0.3 g (13.8 mmoles) of metallic sodium to 30 ml of anhydrous methanol in an atmosphere of nitrogen was added 4 g (13.1 mmoles) of 6-(4-methylcyclo-hexylthio)-2,3-dicyanonaphthalene. The mixture was refluxed for about 2 hours, while bubbling anhydrous ammonia gas. After distilling off the methanol from the reaction mixture under reduced pressure, the yellow oily product thus obtained was washed with water and dried under reduced pressure. Then, it was dissolved into 50 ml of quinoline, 5 ml of silicon tetrachloride was added, and the resulting mixture was heated at 220° C. for 3 hours. After cooling, the reaction mixture was poured into a mixed solvent of 200 ml of ethanol and 100 ml of concentrated aqueous ammonia, and refluxed for 6 hours. After cooling, the crystal was collected by filtration with suction, washed successively with methanol and ethanol and dried under reduced pressure to obtain 3.4 g (80.7%) of a dark green crystal. Referring to the following analyses, it was identified as dihydroxysilicon-tetra(4-methylcyclohexylthio)-naphthalocyanine. Without further purification, it was used in the subsequent reaction.

Figure 39:
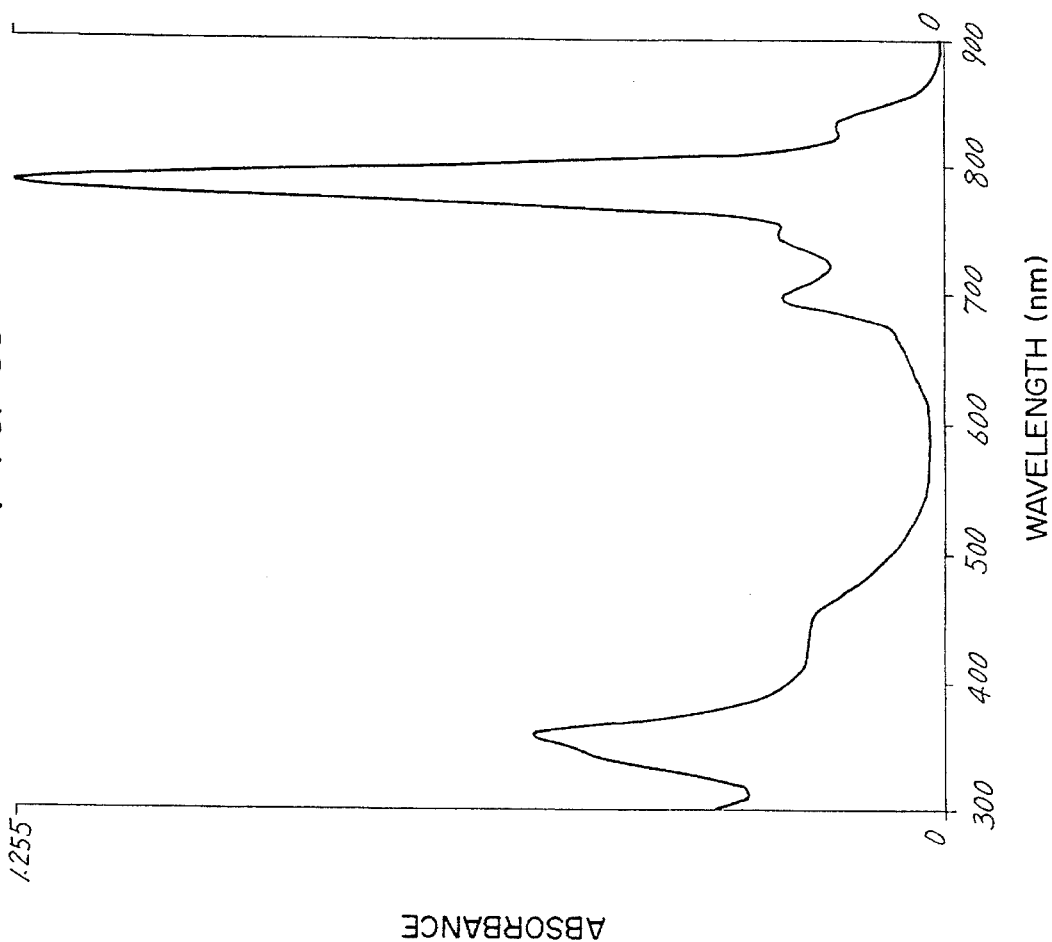
FIG. 39 is electronic spectrum of dihydroxysilicon-tetra(4-methylcyclohexylthio)-naphthalocyanine.

(1) Electronic spectrum (tetrahydrofuran solution): FIG. 39

Figure 40:
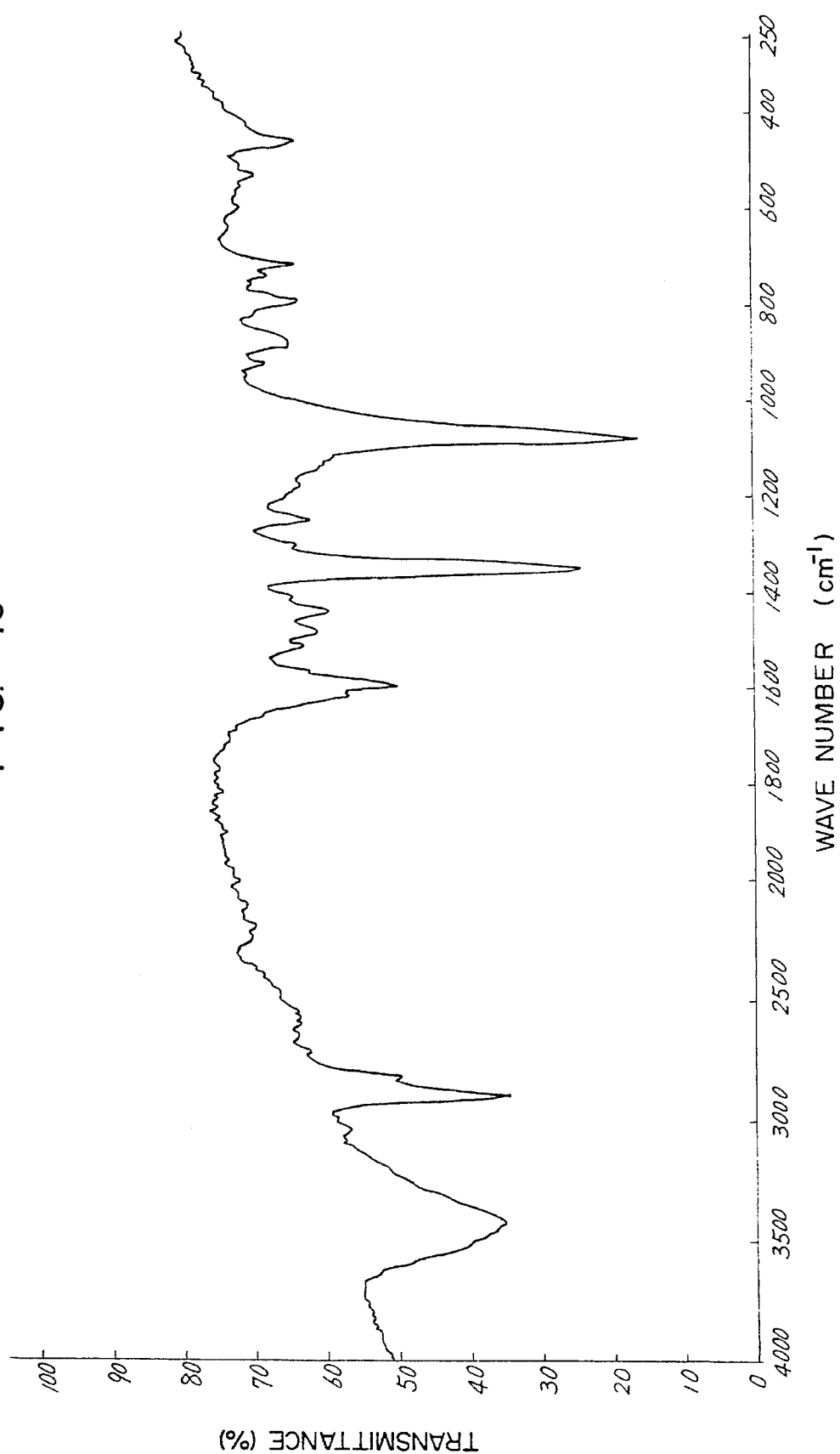
FIG. 40 is IR spectrum of dihydroxy-silicon-tetra(4-methylcyclohexylthio)-naphthalocyanine.

(2) IR spectrum (KBr method): FIG. 40

EXAMPLE 1

Synthesis of bis(tributylsiloxy)silicon-tetra-(cyclopentylthio)naphthalocyanine (Compound (12))

Five grams (4.26 mmoles) of dihydroxysilicon-tetra(cyclopentylthio)naphthalocyanine was dissolved into 150 ml of quinoline. After adding 8 ml (32 mmoles) of tributylsilanol, the mixture was heated at about 200° C. for 2 hours. After cooling, the reaction mixture was poured into 500 ml of 1/1 mixture of methanol and water, and the crystal precipitated was collected by filtration. The crystal was washed successively with methanol and ethanol and dried under reduced pressure. The by-products present in the crystal thus obtained were removed by silica gel flush column chromatography (toluene/cyclohexane elution) to obtain a green colored crystal. It was recrystallized from toluene/methanol mixture to obtain 2.4 g (47.7%) of green crystal. Referring to the following analyses, it was identified as bis-(tributylsiloxy) silicon-tetra(cyclopentylthio)-naphthalocyanine (Compound (12)).

(1) Melting point: 268°–270° C.

(2) Elementary analyses:

|  | C | H | N | S |
| --- | --- | --- | --- | --- |
| Calcd. (%) | 70.27 | 7.05 | 7.16 | 8.16 |
| Found (%) | 70.76 | 7.09 | 7.07 | 8.01 |

Figure 41:
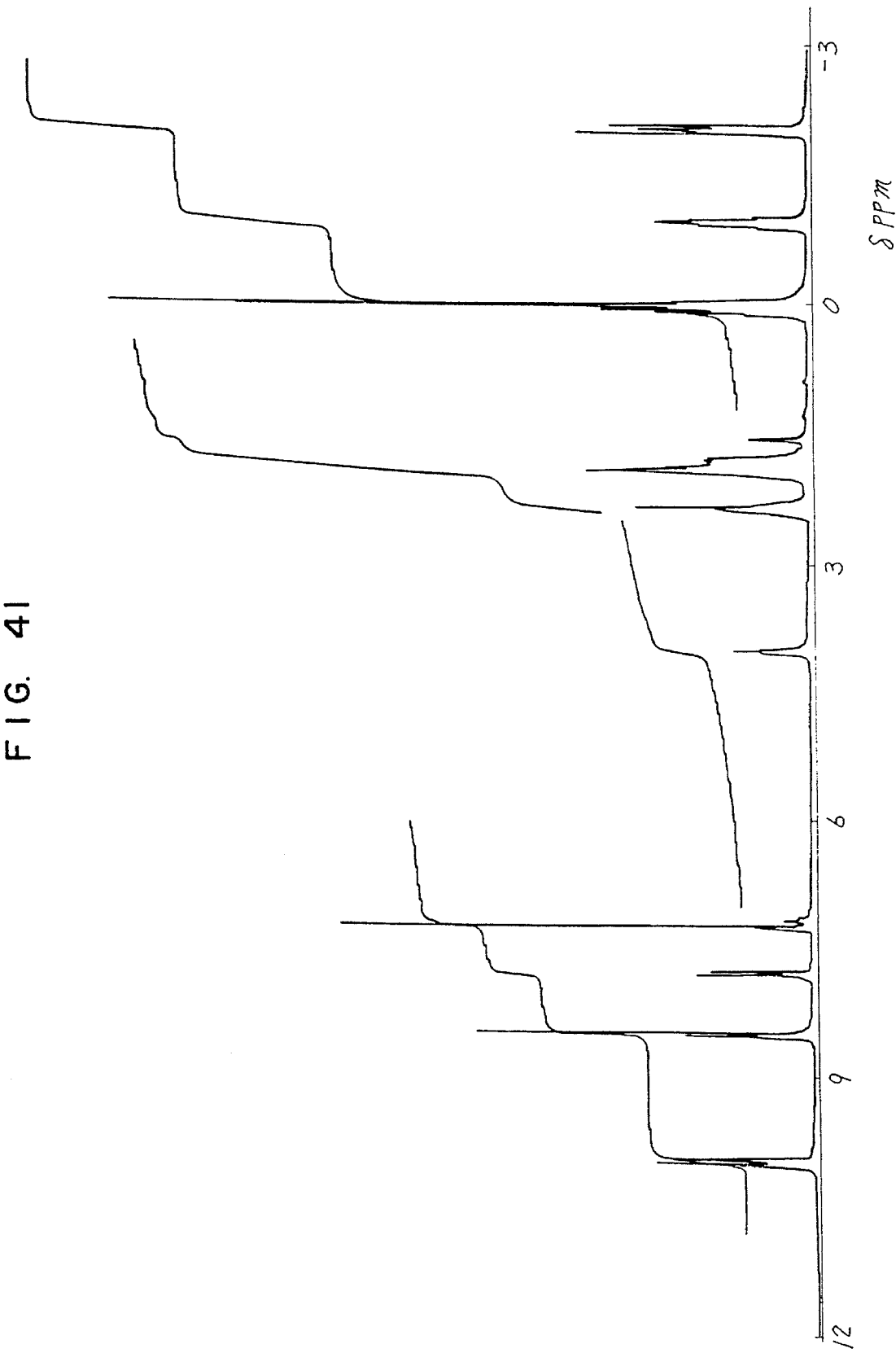
FIG. 41 is NMR spectrum of bis(tributylsiloxy)-silicon-tetra(cyclopentylthio)-naphthalocyanine (Compound (12))

(3) NMR (FIG. 41): $CDCl_3$ 10.00 (4H, brs)

9.96 (4H, brs)

8.52 (4H, d, J=8.85 Hz)

8.50 (4H, brs)

7.82 (4H, dd, J=8.85, 1.83 Hz)

4.05 (4H, m)

2.35 (8H, m)

1.99 - 1.79 (24H, m)

0.00 (30H, m)

−0.96 (12H, m)

−2.02 (12H, m)

Figure 42:
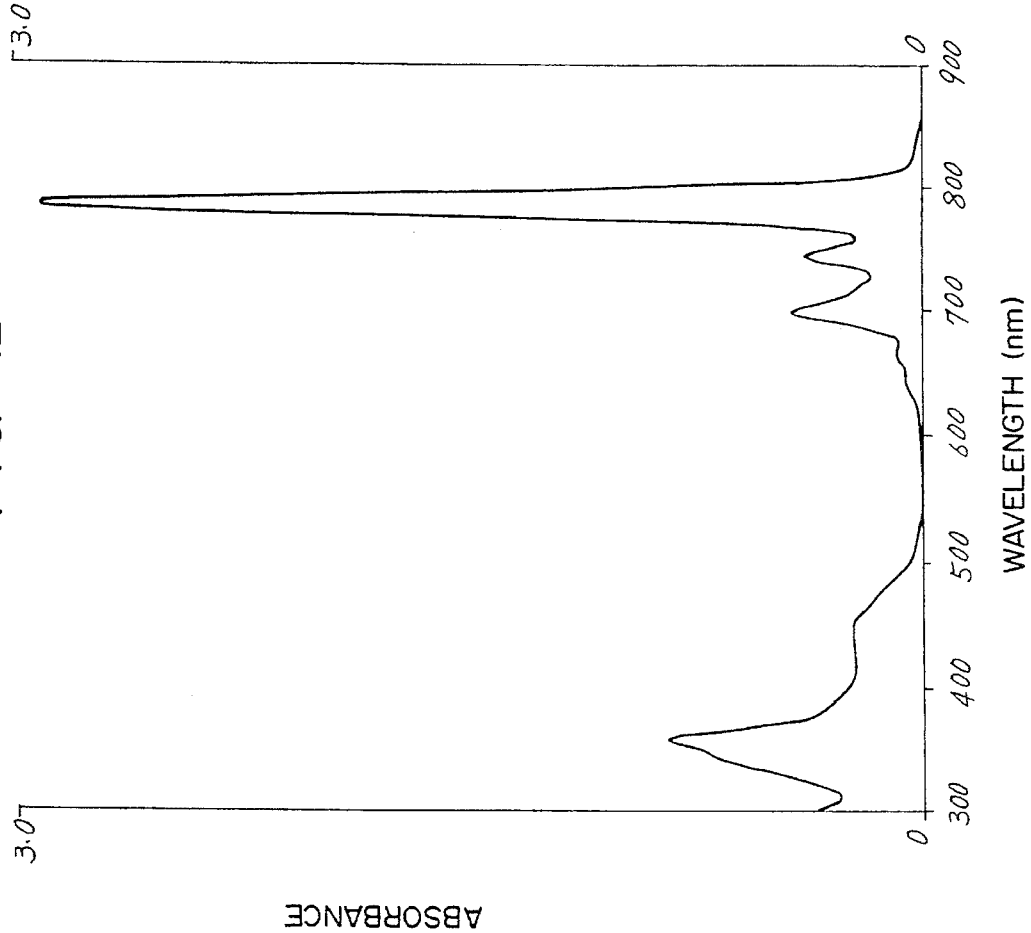
FIG. 42 is electronic spectrum of Compound (12)

(4) Electronic spectrum (tetrahydrofuran solution): FIG. 42

Figure 43:
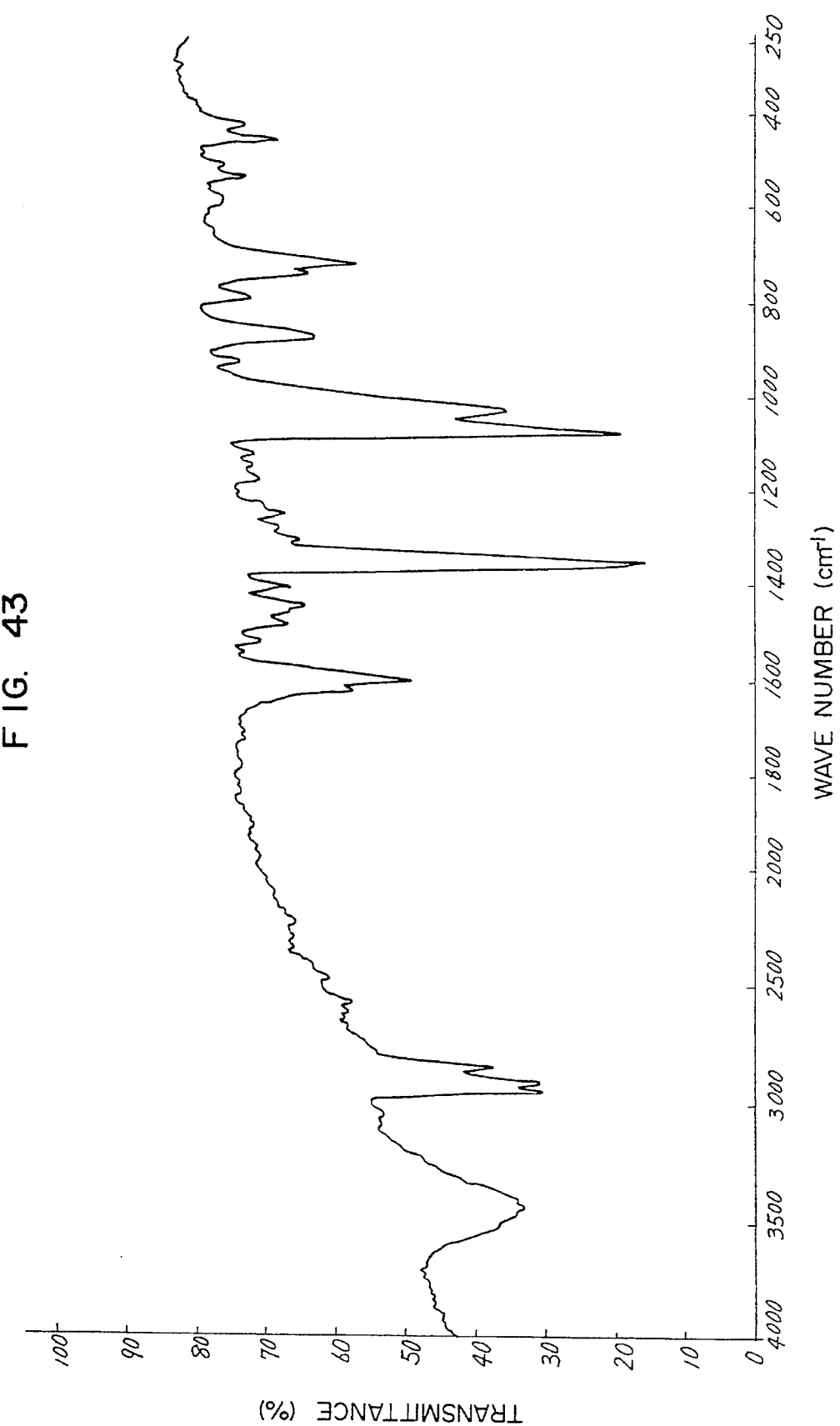
FIG. 43 is IR spectrum of Compound (12)

(5) IR spectrum (KBr method): FIG. 43

EXAMPLE 2

Synthesis of bis(tri-n-butylsiloxy)silicon-tetra-(cyclohexylthio)naphthalocyanine (Compound (11))

Method A

To a solution of 500 mg (3.5 mmoles) of bis(tri-n-butylsiloxy) silicon-tetrabromonaphthalocyanine in a mixture consisting of 55 ml quinoline and 15 ml pyridine was added 1.50 g (10.2 mmoles) of cuprous cyclohexylthiolate synthesized according to the method mentioned in Organic Syntheses, Vol. 42, Page 22. After refluxing the mixture for 20 hours at 160°–170° C. and cooling it, it was poured into 300 ml of methanol. Then, 100 ml of water and 150 ml of toluene were added and thoroughly stirred. The toluene layer was separated, concentrated and separated by alumina column chromatography, after which the product was recrystallized from toluene/methanol. Thus, 285 mg (50%) of a yellow-green crystal was obtained. Referring to the following analyses, it was identified as bis(tri-n-butylsiloxy)-silicon-tetra(cyclohexylthio)naphthalocyanine (Compound (11)).

Method B

Five grams (4.06 mmoles) of dihydroxysilicon-tetra(cyclohexylthio)naphthalocyanine was dissolved into 200 ml of quinoline. After adding 7 ml (28.0 mmoles) of tributylsilanol, the mixture was heated at about 200° C. for 2 hours. After cooling, the reaction mixture was poured into 500 ml of 1/1 mixture of methanol and water, and the crystal precipitated was collected by filtration. After washing it successively with methanol and ethanol, it was dried under reduced pressure and the by-products were removed by silica gel flush column chromatography (toluene/cyclohexane elution) to obtain a green crystal. It was recrystallized from toluene/methanol mixture to obtain 3.5 g (53.7%) of green crystal. Referring to the following analyses, it was identified as bis (tri-n-butylsiloxy) silicon-tetra-(cyclohexylthio) naphthalocyanine (Compound (11)) .

(1) Melting point: 263.5°–265° C.
(2) Elementary analyses:

|  | C | H | N |
| --- | --- | --- | --- |
| Calcd. (%) | 70.80 | 7.30 | 6.88 |
| Found (%) | 70.51 | 7.49 | 6.62 |

Figure 44:
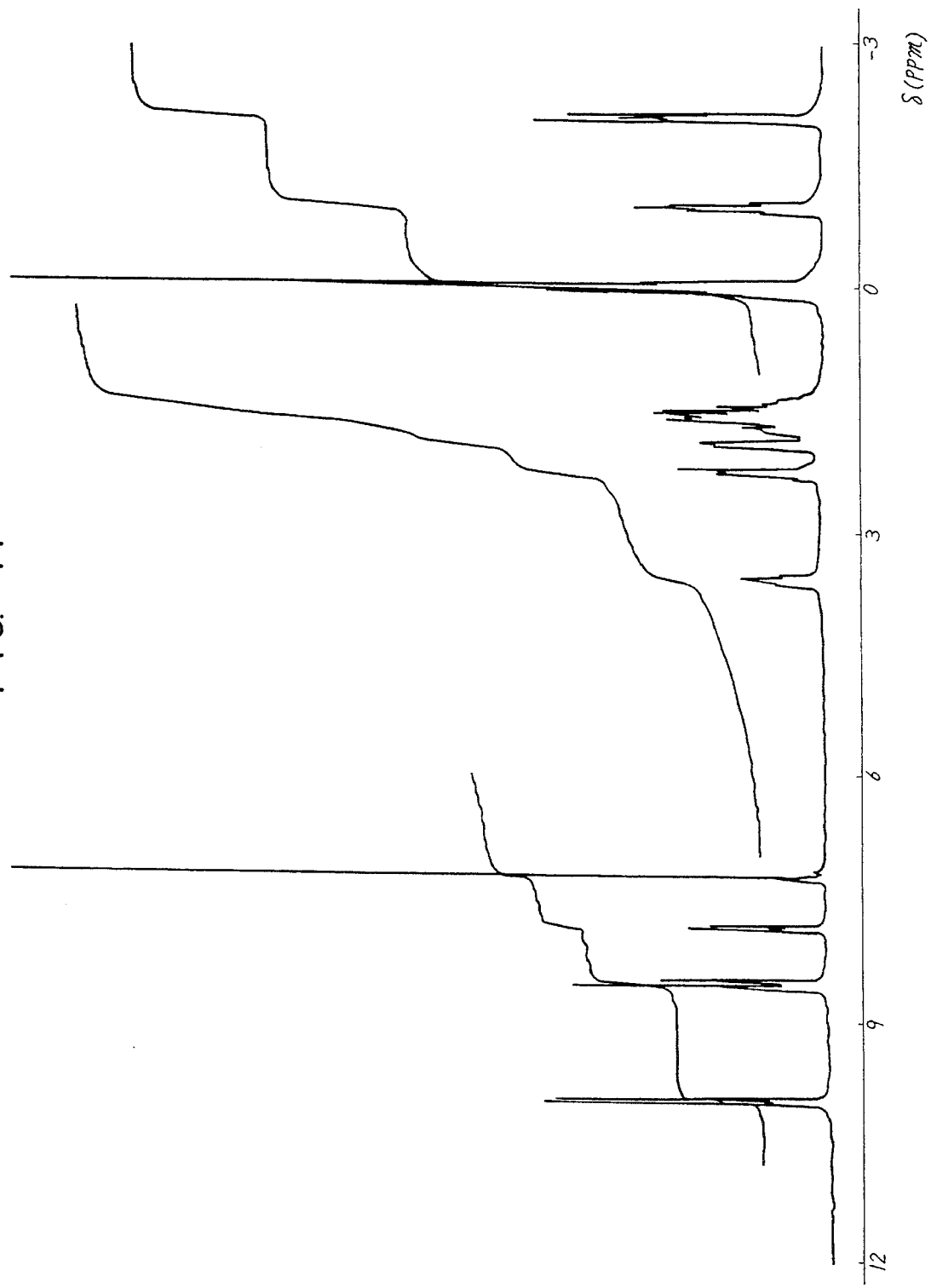
FIG. 44 is NMR spectrum of bis (tri-n-butylsiloxy) silicon-tetra-(cyclohexylthio)-naphthalocyanine [Compound (33)]

(3) NMR spectrum (FIG. 44): $CDCl_3$
 10.03 (4H, br-s)
 9.99 (4H, br-s)
 8.59 (4H, br-s)
 8.55 (4H, d, J=8.85 Hz)
 7.87 (4H, dd, J=1.22, 8.85 Hz)
 3.60 (4H, m)
 2.27 (8H, m)
 1.95 (8H, m)
 1.89 - 1.38 (24H, m)
 0.00 (30H, m)
 –0.96 (12H, sextet-like m)
 –2.06 (12H, t-like m)

Figure 45:
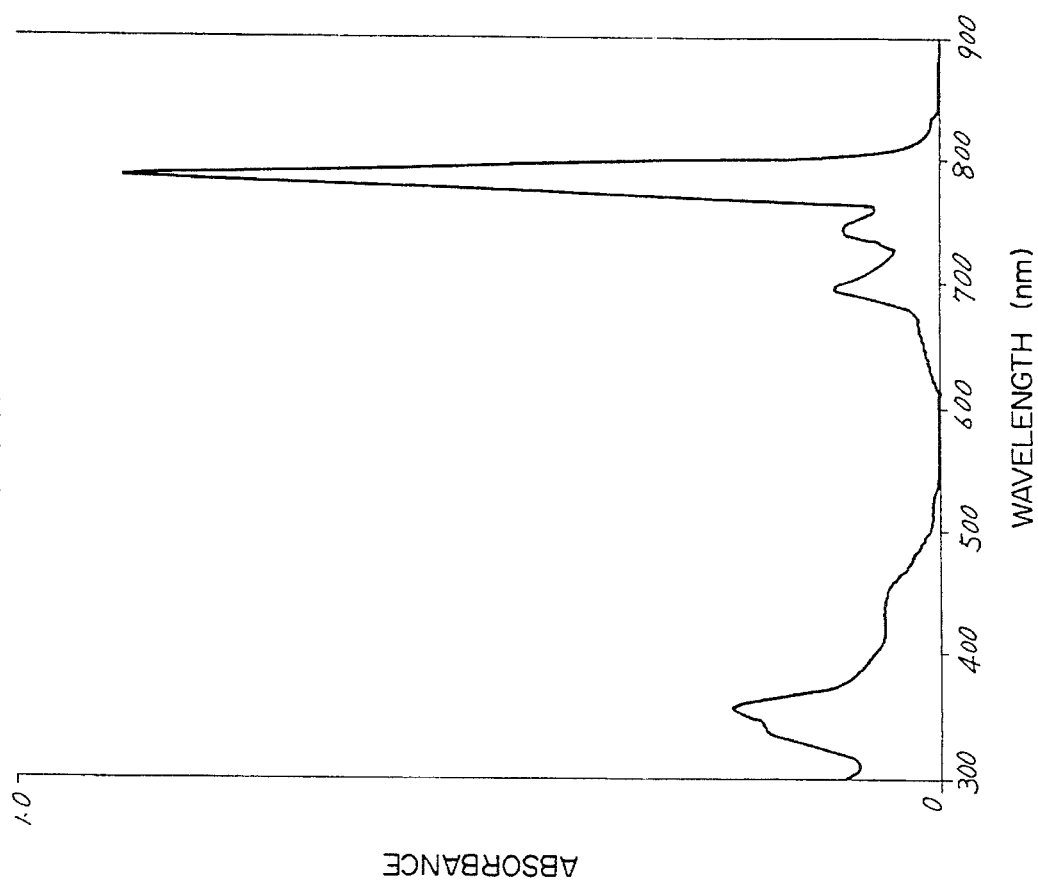
FIG. 45 is electronic spectrum of Compound (33)

(4) Electronic spectrum (methylene chloride solution): FIG. 45

Figure 46:
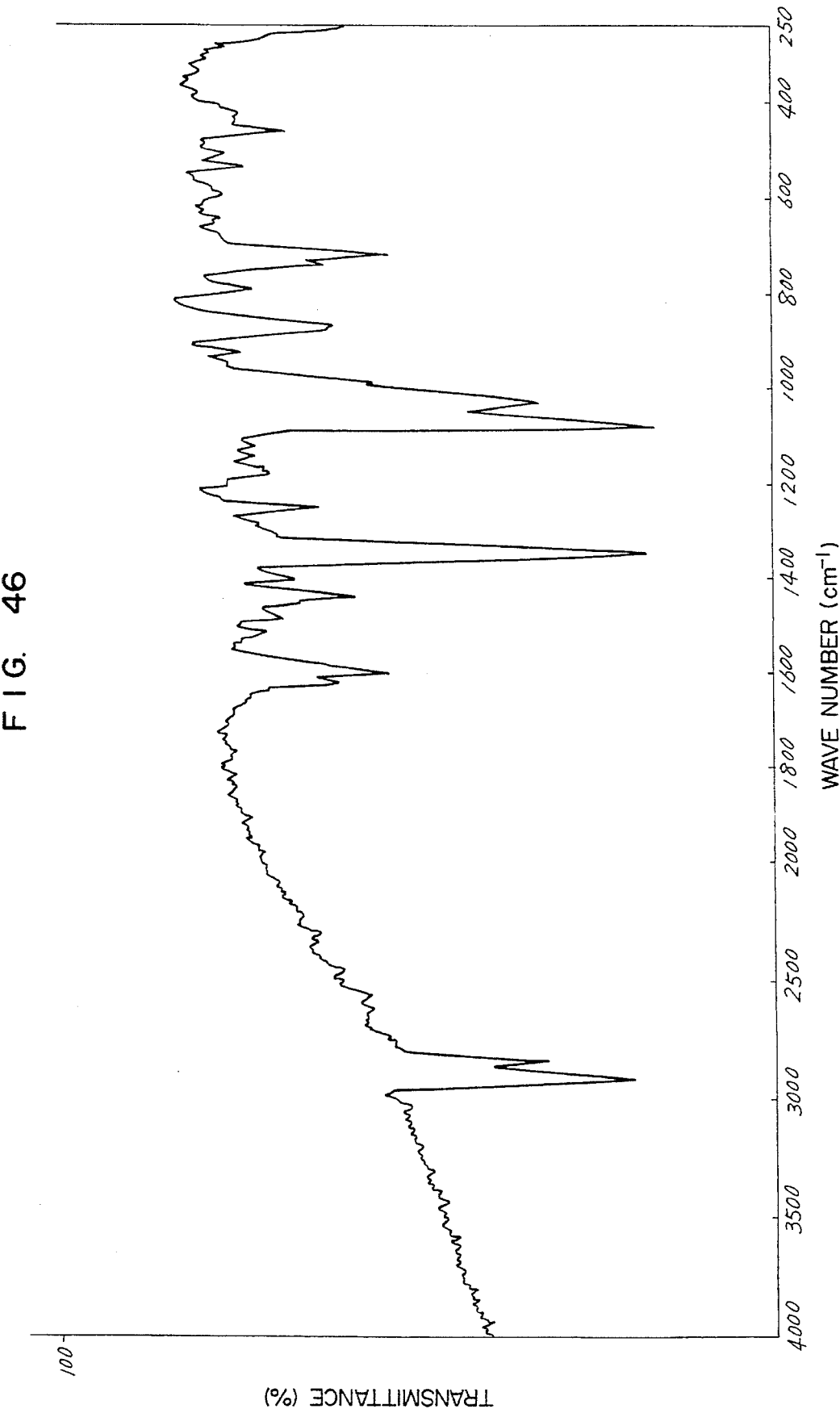
FIG. 46 is IR spectrum of Compound (33)

(5) IR spectrum (KBr method): FIG. 46

EXAMPLE 3

Synthesis of bis(triethylsiloxy)silicon-tetra(cyclo-hexylthio)naphthalocyanine (Compound (7))

Five grams (4.06 mmoles) of dihydroxysilicon-tetra(cyclohexylthio)naphthalocyanine was dissolved into 200 ml of quinoline. After adding 7 ml (45.9 mmoles) of triethylsilanol, the mixture was heated for 2 hours. After cooling, the reaction mixture was poured into 500 ml of 1/1 mixture of methanol and water, and the crystal precipitated was collected by filtration. The crystal thus obtained was washed successively with methanol and ethanol and dried under reduced pressure, and the by-products were removed by silica gel flush column chromatography (toluene/cyclohexane elution) to obtain a green crystal. Recrystallization from toluene/methanol mixture gave 1.72 g (29.1%) of a green crystal. Referring to the following analyses, it was identified as bis (triethylsiloxy) silicon-tetra (cyclohexylthio)naphthalocyanine (Compound (7)).

(1) Melting point: >300° C.
(2) Elementary analyses:

|  | C | H | N | S |
| --- | --- | --- | --- | --- |
| Calcd. (%) | 69.10 | 6.49 | 7.71 | 8.78 |
| Found (%) | 69.07 | 6.58 | 7.79 | 8.83 |

Figure 47:
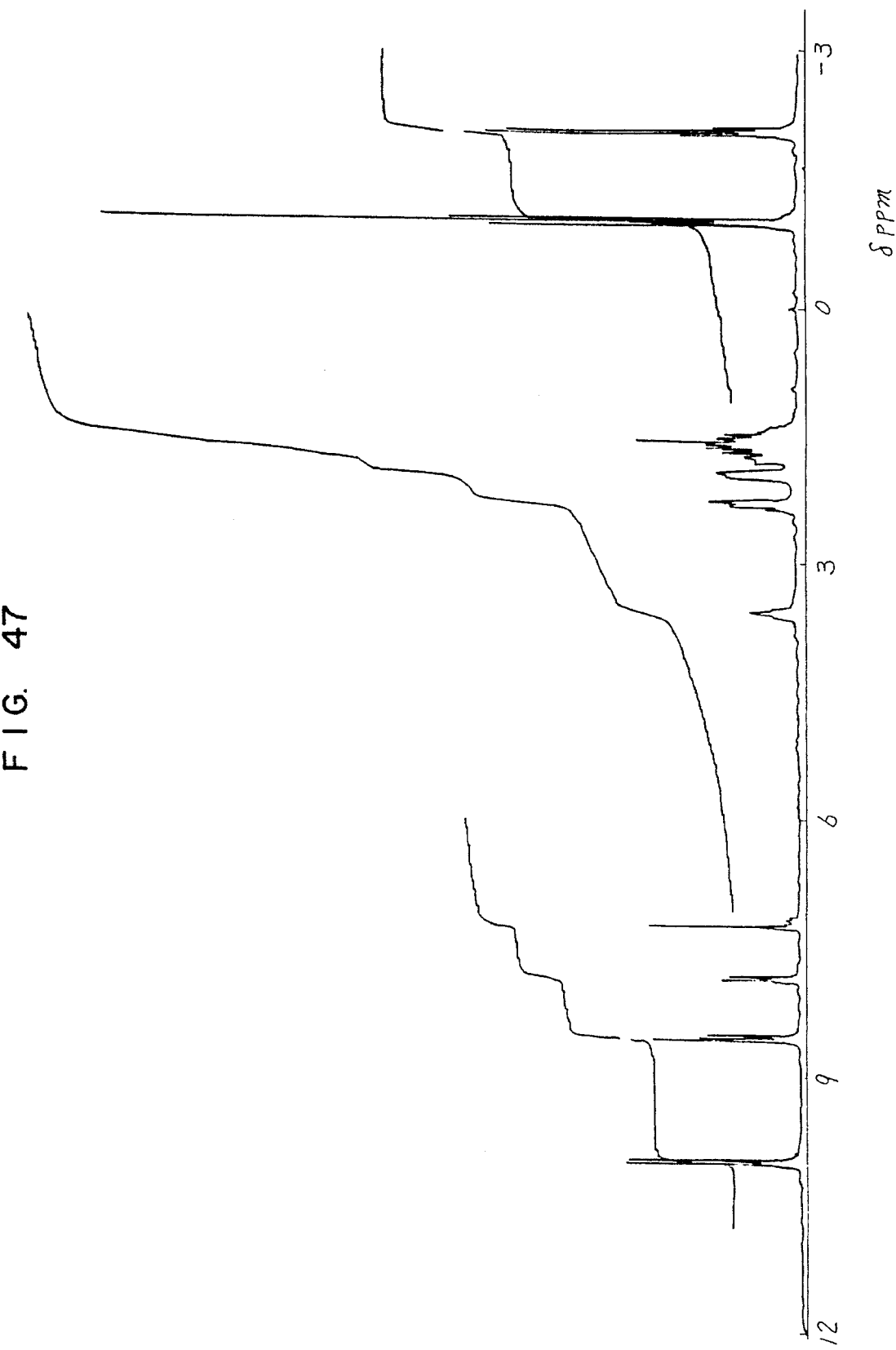
FIG. 47 is NMR spectrum of bis(triethylsiloxy)silicon-tetra(cyclohexylthio)-naphthalocyanine (Compound (7))

(3) NMR spectrum (FIG. 47): $CDCl_3$
 10.04 (4H, brs)
 10.00 (4H, brs)
 8.58 (4H, brs)
 8.54 (4H, d, J=8.85 Hz)
 7.87 (4H, d, J=8.85 Hz)
 3.57 (4H, m)
 2.35 - 2.24 (8H, m)
 1.98 - 1.90 (8H, m)
 1.80 - 1.41 (24H, m)
 –1.02 (18H, t, J=8.24 Hz)
 –2.07 (12H, q, J=8.24 Hz)

Figure 48:
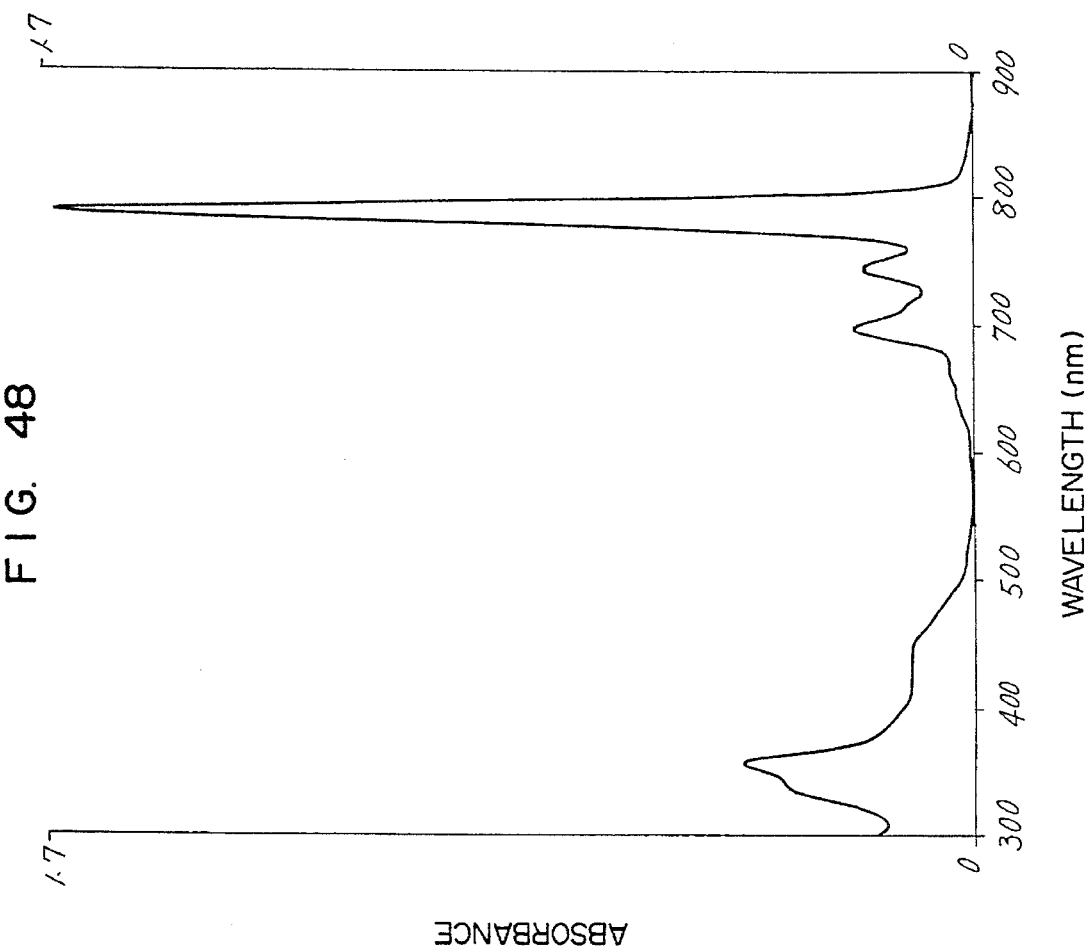
FIG. 48 is electronic spectrum of Compound (7)

(4) Electronic spectrum (tetrahydrofuran solution): FIG. 48

Figure 49:
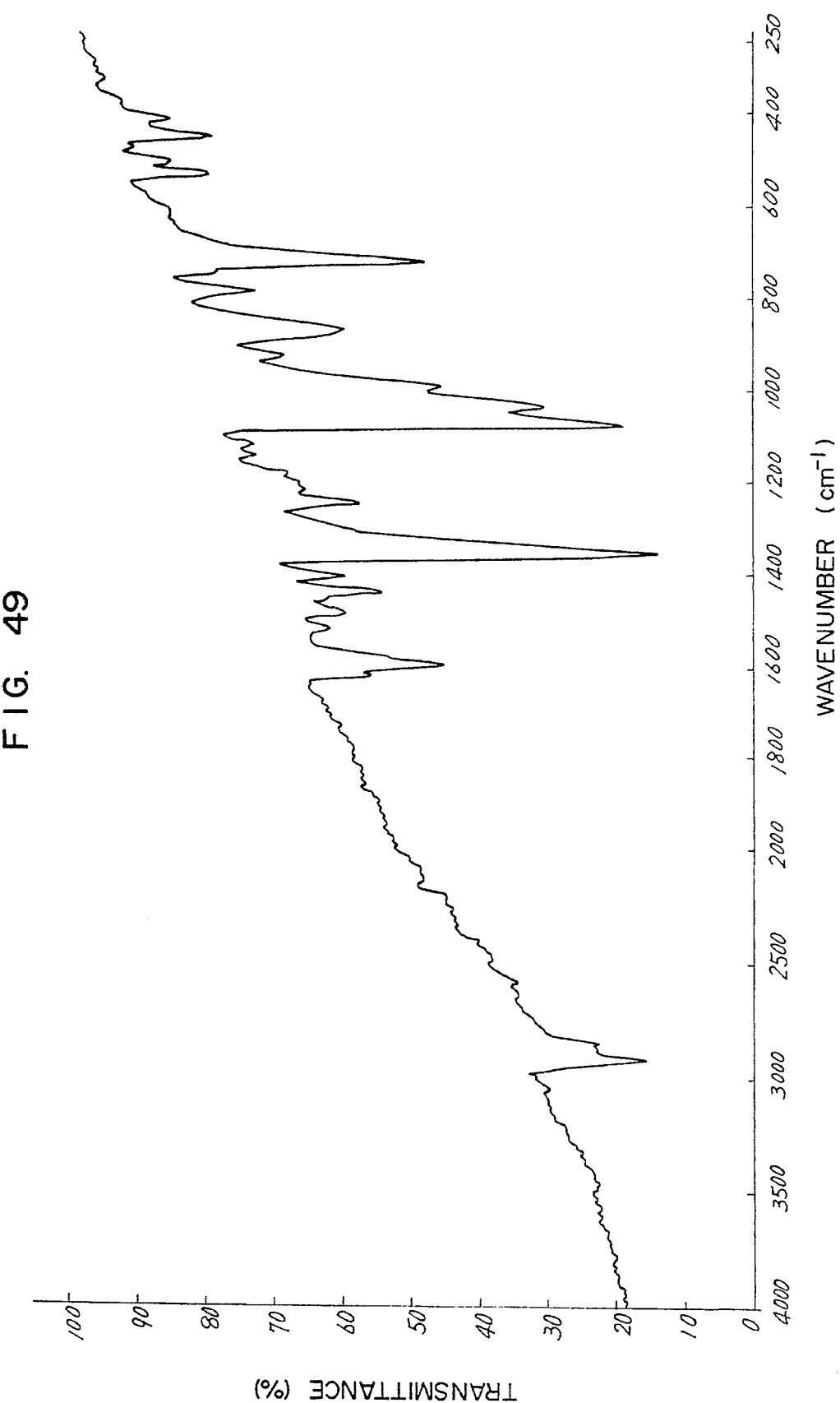
FIG. 49 is IR spectrum of Compound (7)

(5) IR spectrum (KBr method): FIG. 49

EXAMPLE 4

Synthesis of bis(tributylsiloxy)silicon-tetra (4 -methylcyclohexylthio)naphthalocyanine (Compound (19))

Into 70 ml of quinoline was dissolved 1.7 g (1.32 mmoles) of dihydroxysilicon-tetra (4-methylcyclohexylthio)-naphthalocyanine. Then, 2.5 ml (10 mmoles) of tributylsilanol was added, and the resulting mixture was heated at 200° C. for 2 hours. After cooling, the reaction mixture was poured into 300 ml of 1/1 mixture of methanol and water, and the deposited crystal was collected by filtration. It was washed successively with methanol and ethanol and dried under reduced pressure, and by-products were removed by silica gel flush column chromatography (toluene/cyclohexane elution) to obtain a green crystal. Recrystallization from toluene/methanol mixture gave 760 mg (34.2%) of a green crystal. Referring to the following analyses, it was identified as bis(tributylsiloxy) silicon-tetra(4 -methylcyclohexylthio)naphthalocyanine (Compound (19)).

(1) Melting point: 260°–263° C.
(2) Elementary analyses:

|  | C | H | N | S |
| --- | --- | --- | --- | --- |
| Calcd. (%) | 71.30 | 7.54 | 6.68 | 7.61 |
| Found (%) | 71.64 | 7.65 | 6.63 | 7.32 |

Figure 50:
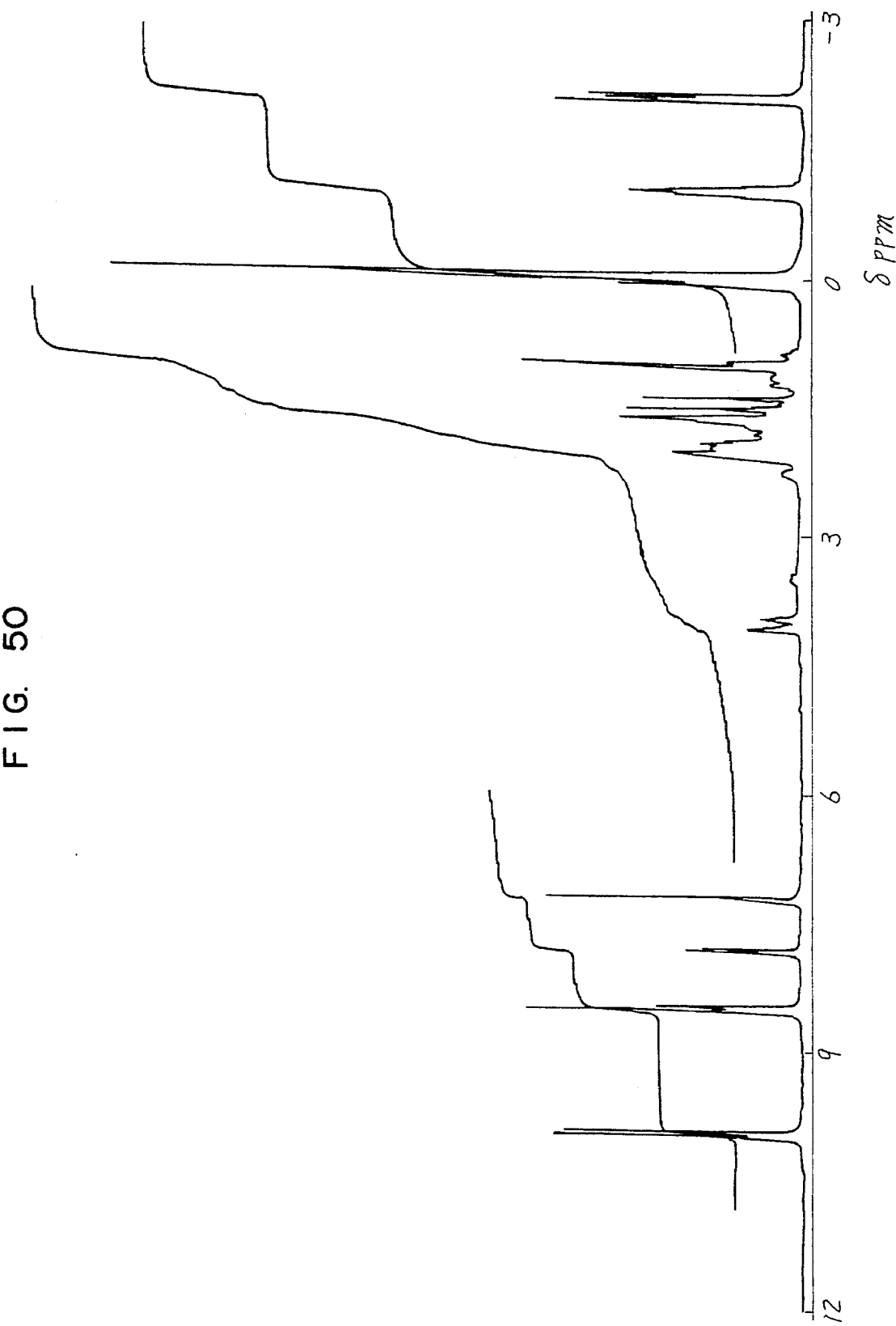
FIG. 50 is NMR spectrum of bis (tributylsiloxy) silicon-tetra(4 -methylcyclohexylthio)-naphthalocyanine (Compound (54) )

(3) NMR spectrum (FIG. 50): $CDCl_3$
 10.01 (4H, brs)
 9.97 (4H, brs)
 8.56 (4H, brs)
 8.54 (4H, d, J=8.55 Hz)

7.86 (4H, d, J=8.55 Hz)
4.11 - 3.99 (4H, m)
2.16 - 0.99 (48H, m)
0.00 (30H, m)
−0.96 (12H, m)
−2.02 (12H, m)

Figure 51:
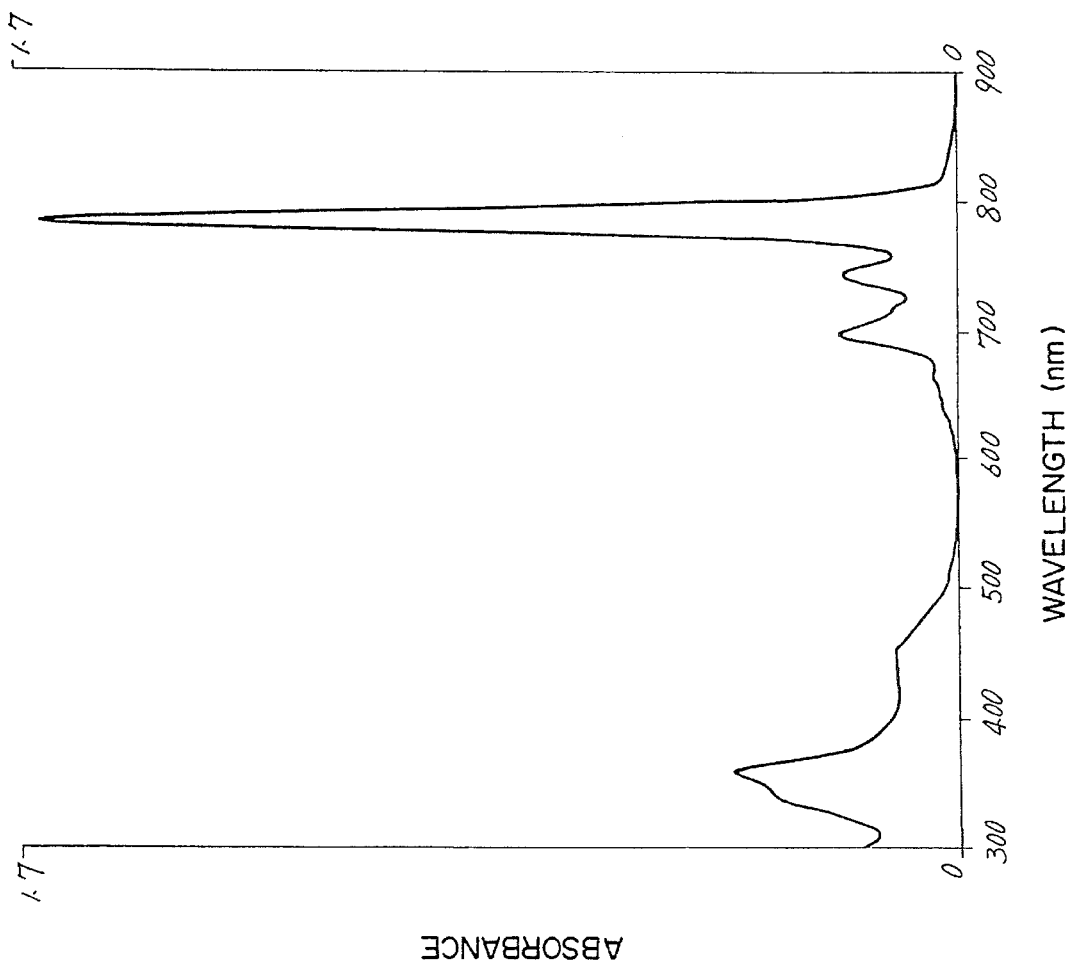
FIG. 51 is electronic spectrum of Compound (54)

(4) Electronic spectrum (tetrahydrofuran solution): FIG. 51

(%) IR spectrum (KBr method): FIG. 52

EXAMPLE 5

Synthesis of bis (tripropylsiloxy) silicon-tetra(cyclohexylethylthio) naphthalocyanine (Compound (42))

Ten grams (48.4 mmoles) of cuprous cyclohexylethylthiolate synthesized according to the method mentioned in Organic Syntheses Vol. 42, Page 22 was added to a solution of 3.0 g (2.14 mmoles) of bis(tripropylsiloxy)silicon-tetrabormonaphthalocyanine in 380 ml of quionline, and the resulting mixture was heated at 160°–170° C. for 10 hours. After cooling, the reaction mixture was poured into one liter of 1/1 mixture of water and methanol, and the crystal precipitated was collected by filtration. The crystal thus obtained was washed successively with methanol and ethanol and dried under reduced pressure, and the by-products were removed by silica gel flush column chromatography (toluene/cyclohexane elution) to obtain a green colored crystal. Recrystallization from toluene/methanol gave 2.0 g (56.5%) of green crystal. Referring to the following analyses, it was identified as bis (tripropylsiloxy) silicon-tetra (cyclohexylethylthio) naphthalocyanine (Compound (42)).

(1) Melting point: >300° C.
(2) Elementary analyses:

|  | C | H | N | S |
|---|---|---|---|---|
| Calcd. (%) | 71.05 | 7.42 | 6.79 | 7.74 |
| Found (%) | 70.81 | 7.53 | 6.92 | 7.52 |

Figure 53:
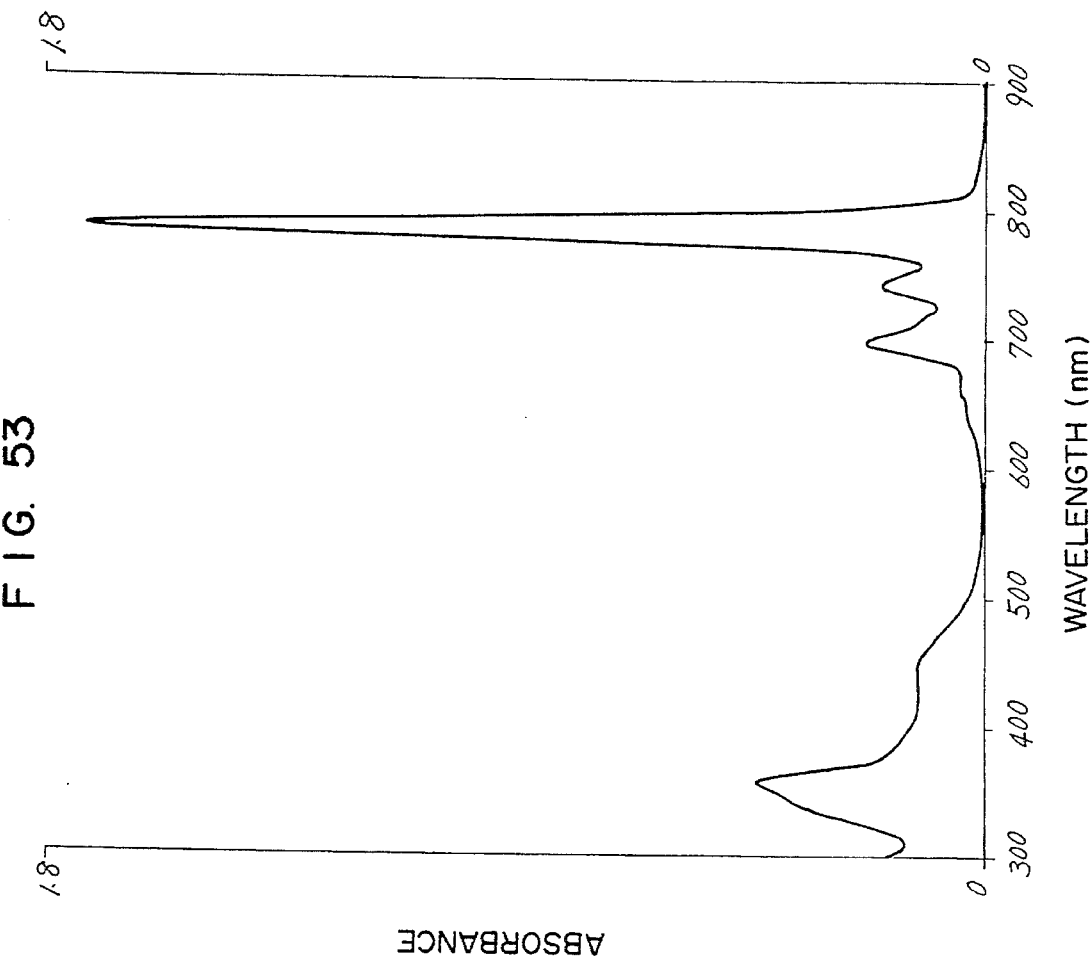
FIG. 53 is electronic spectrum of bis(tripropylsiloxy)-silicon-tetra (cyclohexylethylthio)-naphthalocyanine (Compound (42))

(3) Electronic spectrum (tetrahydrofuran solution): FIG. 53

Figure 54:
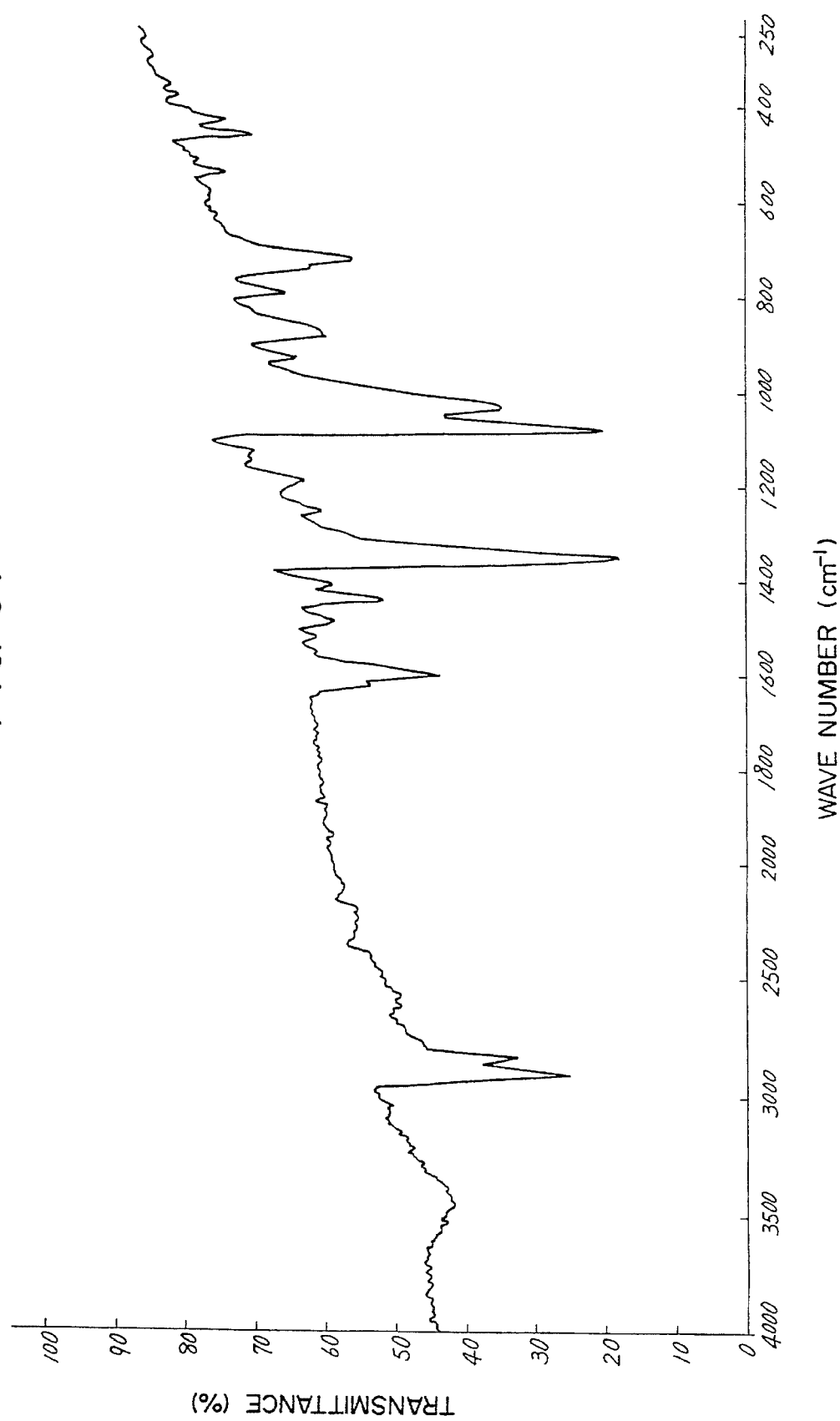
FIG. 54 is IR spectrum of Compound (42)

(4) IR spectrum (KBr method): FIG. 54

EXAMPLE 6

Synthesis of bis(tributylsiloxy)silicon-tetra(cyclohexylethylthio)naphthalocyanine (Compound (41))

Ten grams (78.4 mmoles) of cuprous cyclohexylethylthiolate was added to a solution of 3.0 g (2.02 mmoles) of bis(tributylsiloxy)silicon-tetrabromonaphthalocyanine in 380 ml of quinoline. The mixture was heated at 160°–170° C. for 10 hours. After cooling, the reaction mixture was poured into one liter of 1/1 mixture of water and methanol, and the deposited crystal was collected by filtration. The crystal thus obtained was washed successively with methanol and ethanol and dried under reduced pressure, and by-products were removed by silica gel flush column chromatography (toluene/cyclohexane elution) to obtain a green colored crystal. Recrystallization from toluene/methanol mixture gave 1.9 g (54.0%) of green crystal. Referring to the following analyses, it was identified as bis(tributyl)siloxytetra(cyclohexylethylthio)naphthalocyanine (Compound 41)).

(1) Melting point: 256°–258° C.
(2) Elementary analyses:

|  | C | H | N | S |
|---|---|---|---|---|
| Calcd. (%) | 71.75 | 7.76 | 6.46 | 7.37 |
| Found (%) | 71.50 | 7.90 | 6.50 | 6.92 |

Figure 55:
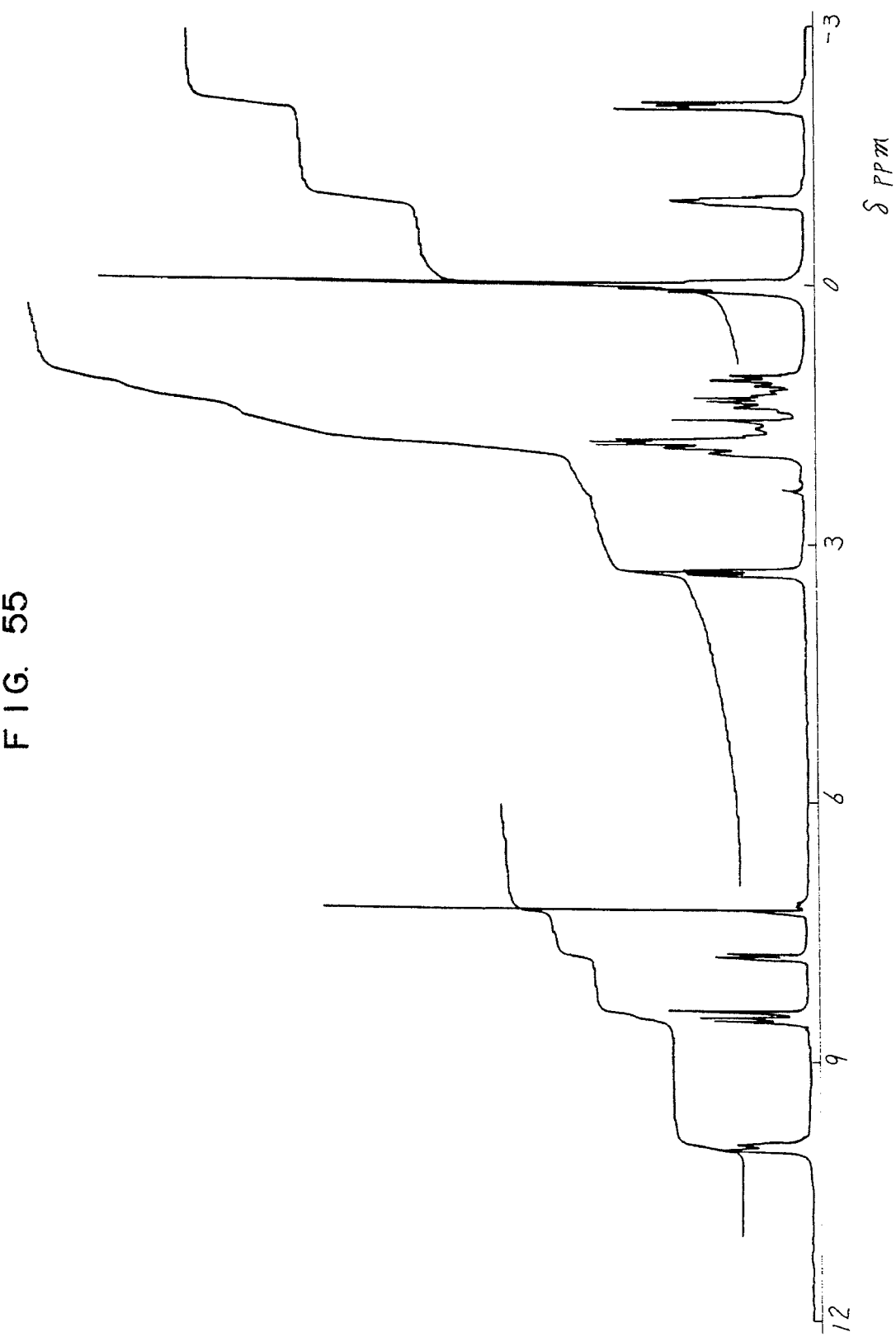
FIG. 55 is NMR spectrum of bis(tributylsiloxy)-silicon-tetra(cyclohexylethylthio)-naphthalocyanine (Compound (41))

(3) NMR spectrum (FIG. 55): $CDCl_3$
10.00 (4H, brs)
9.95 (4H, brs)
8.52 (4H, d, J=8.85 Hz)
8.44 (4H, brs)
7.79 (4H, dd, J=8.85, 1.83 Hz)
3.33 (SH, t, J=4.58 Hz)
1.95 - 1.05 (52H, m)
0.00 (30H, m)
−0.96 (12H, m)
−2.03 (12H, m)

Figure 56:
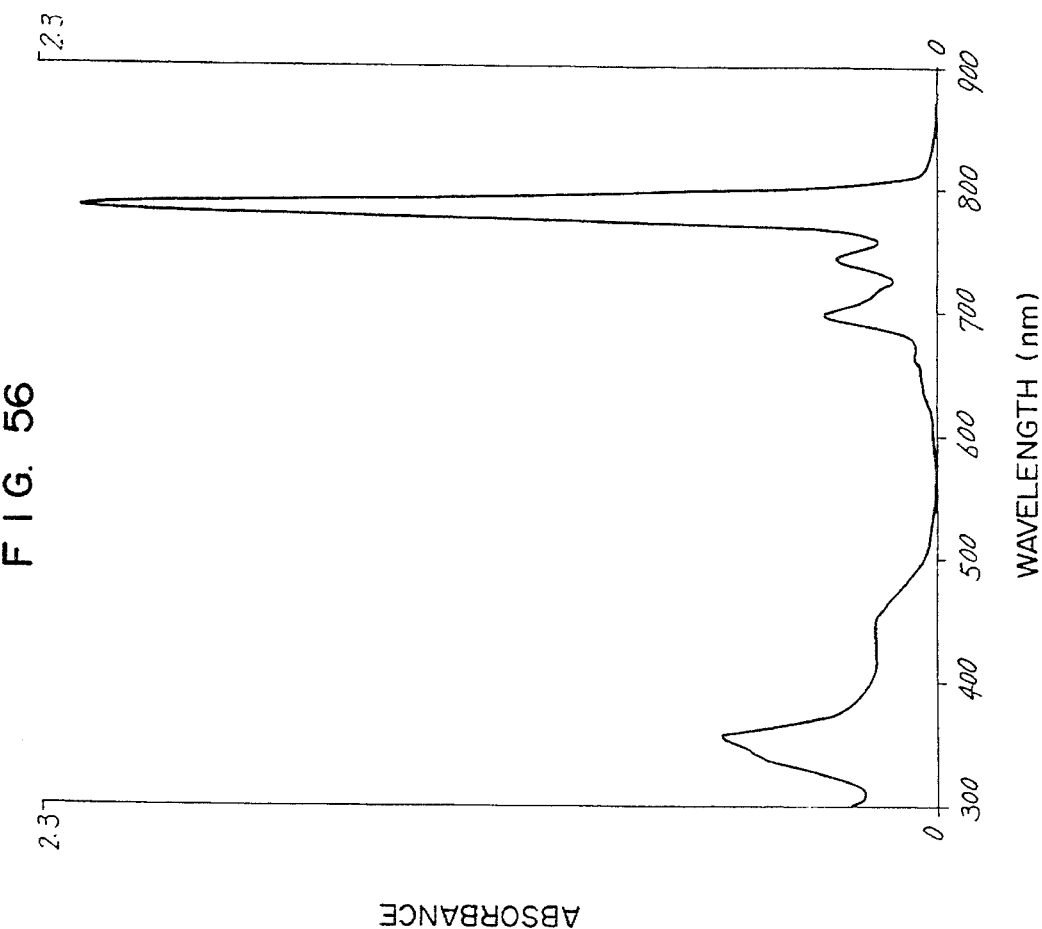
FIG. 56 is electronic spectrum of Compound (41)

(4) Electronic spectrum (tetrahydrofuran solution): FIG. 56

Figure 57:
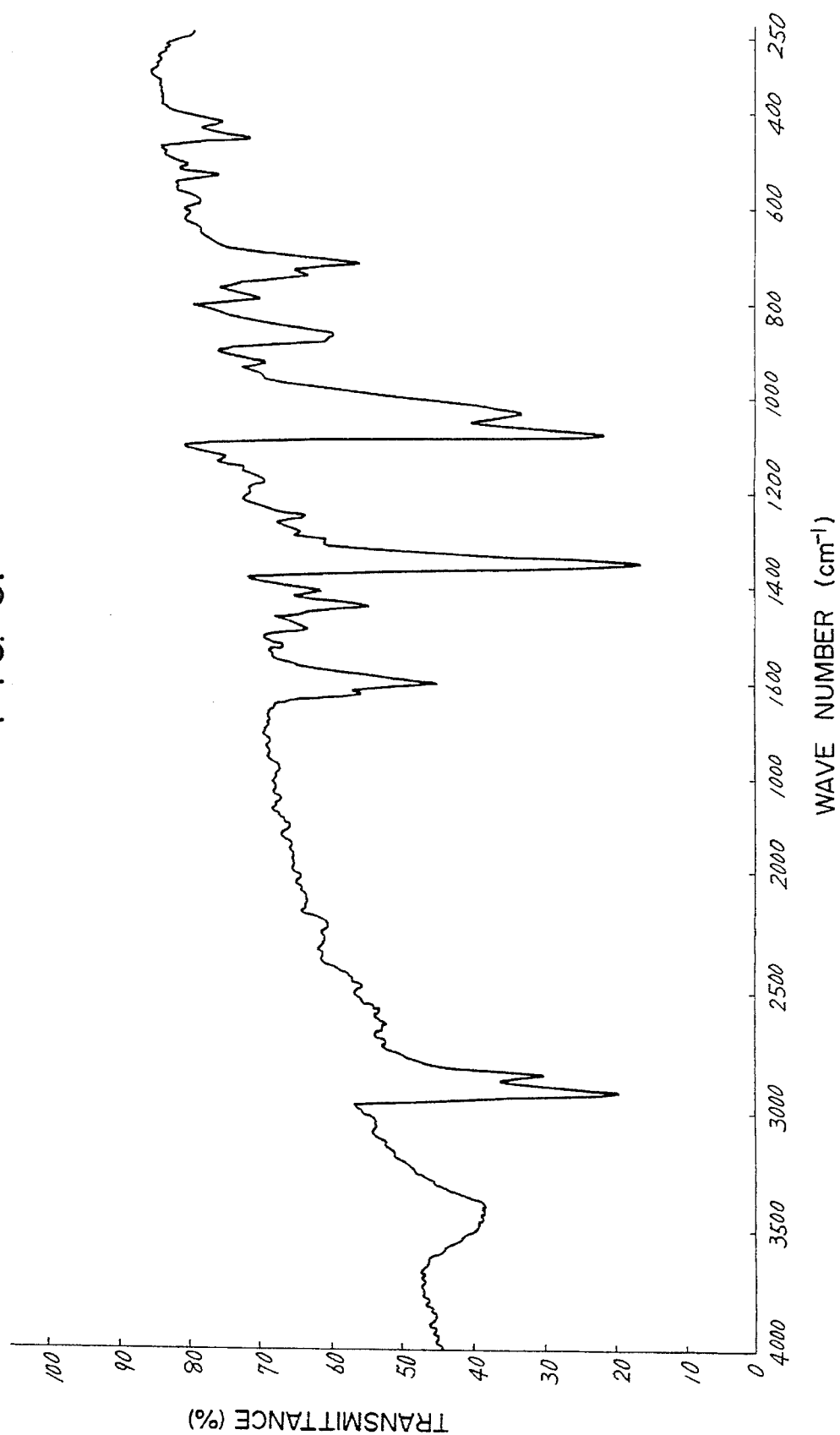
FIG. 57 is IR spectrum of Compound (41)

(5) IR spectrum (KBr method): FIG. 57

EXAMPLE 7

Synthesis of bis(tri-cyclohexylsiloxy)silicon-tetra(n-butylthio)naphthalocyanine (Compound (61))

In an atmosphere of nitrogen, 1.58 g (5.3 mmoles) of tricyclohexylsilanol was added to a solution of 600 mg (0.5 mmole) of dihydroxysilicon-tetra(n-butylthio)naphthalocyanine in anhydrous quinoline. After refluxing the mixture for about 3 hours and cooling it, the quinoline was distilled off under reduced pressure, 70 ml of methanol was added to crystallize, and the latter was collected by filtration to obtain a dark green colored crude crystal. By purifying it by column chromatography, 135 mg of dark green crystal was obtained.

Referring to the following analyses, it was identified as bis (tri-cyclohexylsiloxy) silicon-tetra (n-butylthio)-naphthalocyanine (Compound (61)) .

(1) Melting point: 280°–283° C.
(2) Elementary analyses:

|  | C | H | N |
|---|---|---|---|
| Calcd. (%) | 71.47 | 7.32 | 6.67 |
| Found (%) | 71.30 | 7.62 | 6.63 |

Figure 58:
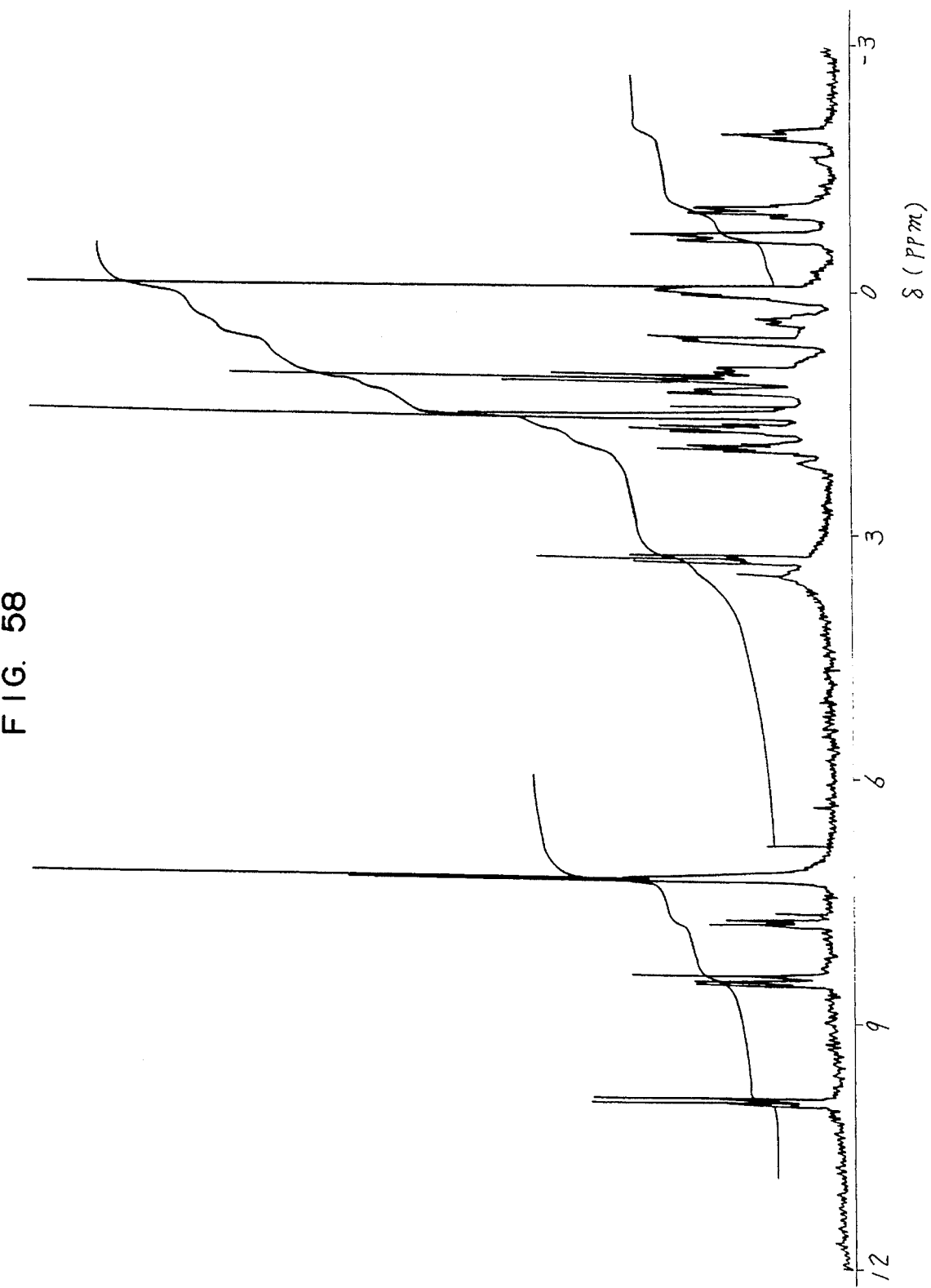
FIG. 58 is NMR spectrum of bis(tri-cyclohexylsiloxy)-silicon-tetra(n-butylthio)-naphthalocyanine (Compound (61))

(3) NMR spectrum (FIG. 58): $CDCl_3$
10.00 (4H, br-s)
9.95 (4H, br-s)
8.52 (4H, d, J=8.85 Hz)
8.46 (4H, d, J=0.62 Hz)
7.79 (4H, dd, J=8.85, 1.83 Hz)
3.32 (SH, t, J=7.32 Hz)
1.94 (8H, quintet-like, J=7.32 Hz)
1.70 (8H, sextet-like, J=7.32 Hz)
1.23 (6H, m)
1.09 (12H, t, J=7.32 Hz)
0.97 (6H, m)
0.60 (12H, m)
0.047 (12H, m)
−0.63 (12H, m)
−0.96 (12H, m)
−0.89 (6H, m)

Figure 59:
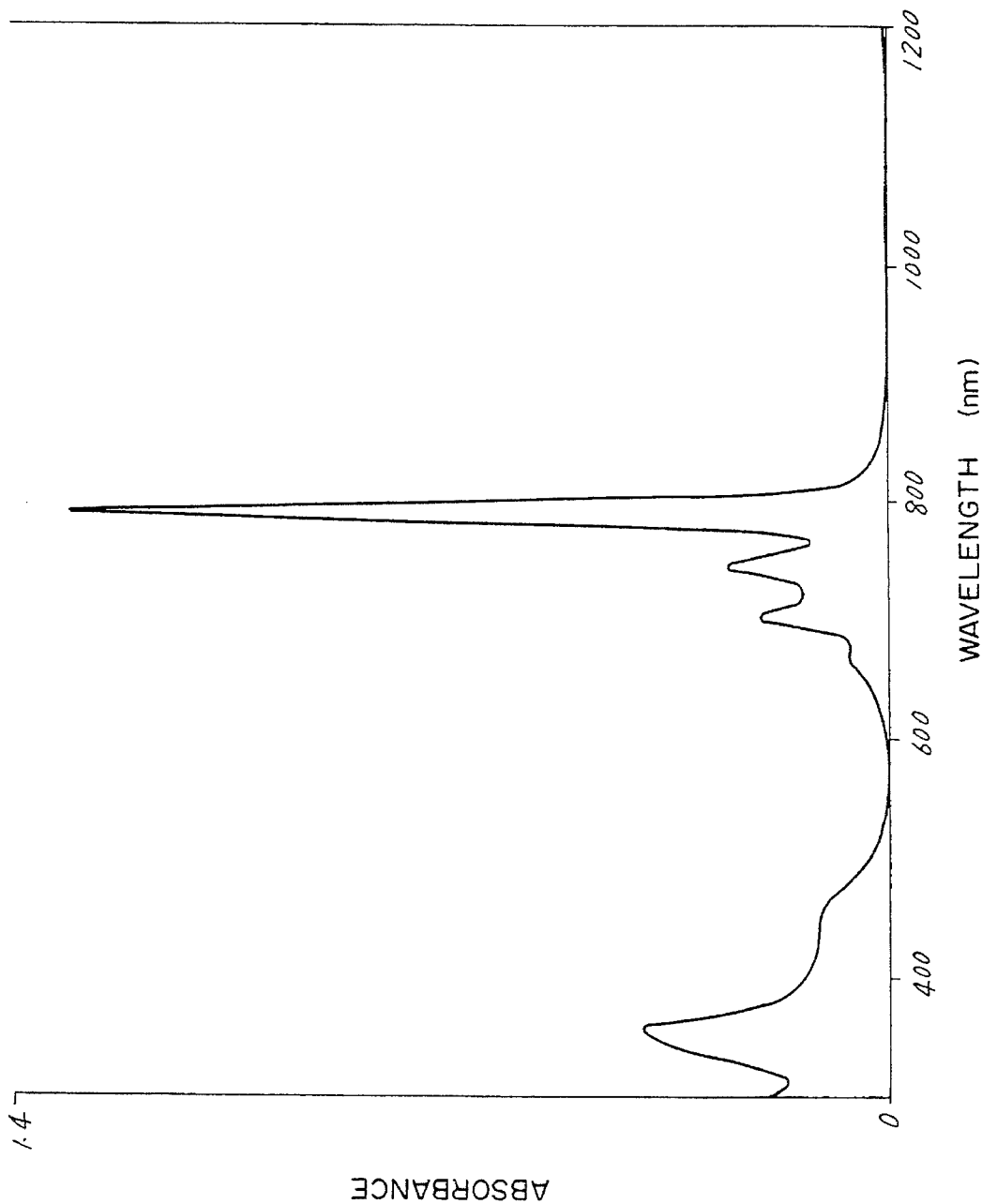
FIG. 59 is electronic spectrum of Compound (61) (tetrahydrofuran solution)

(4) Electronic spectrum (tetrahydrofuran solution): FIG. 59

Figure 60:
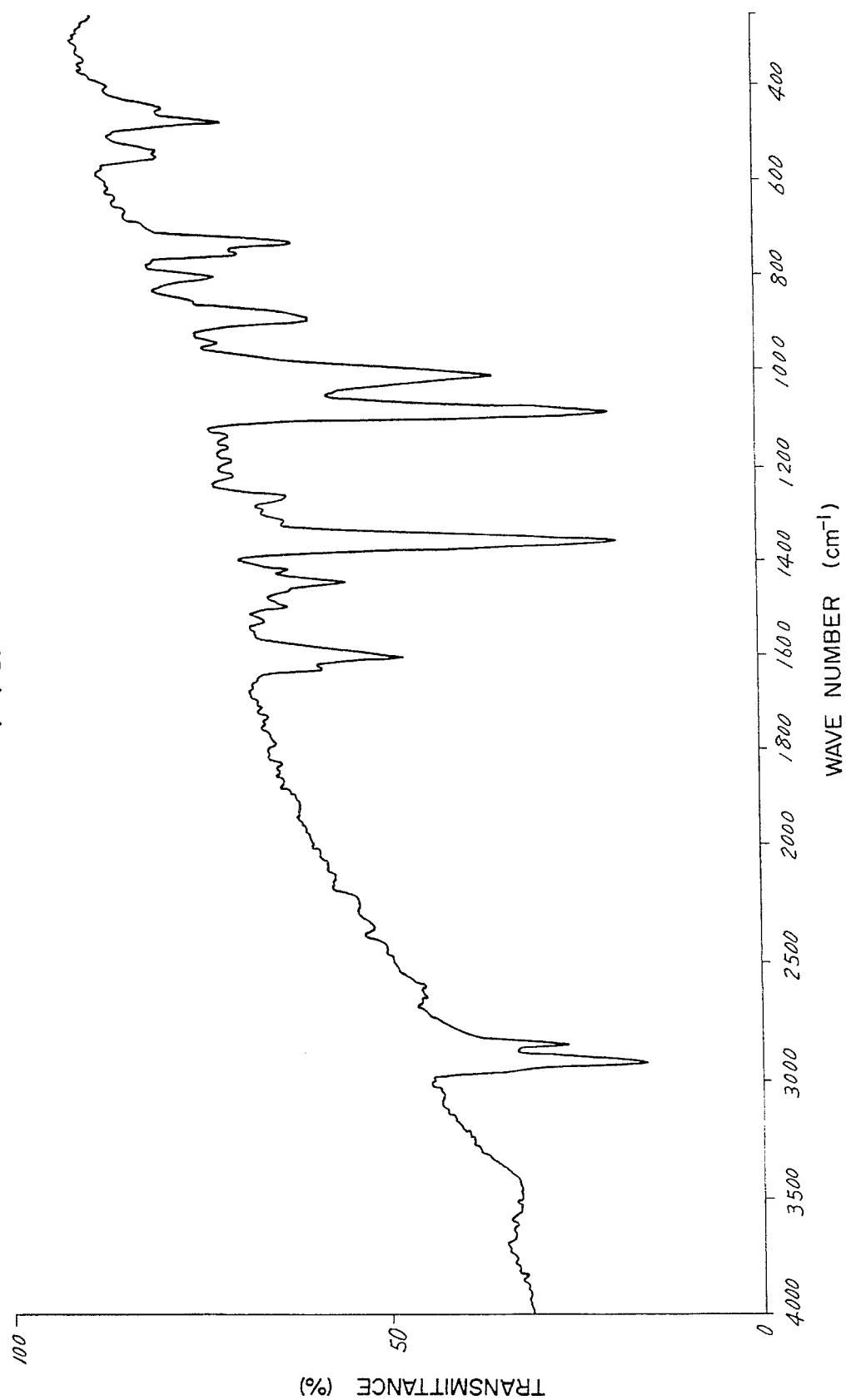
FIG. 60 is IR spectrum of Compound (61) (KBr method)

(5) IR spectrum (KBr method): FIG. 60

EXAMPLE 8

Figure 61:
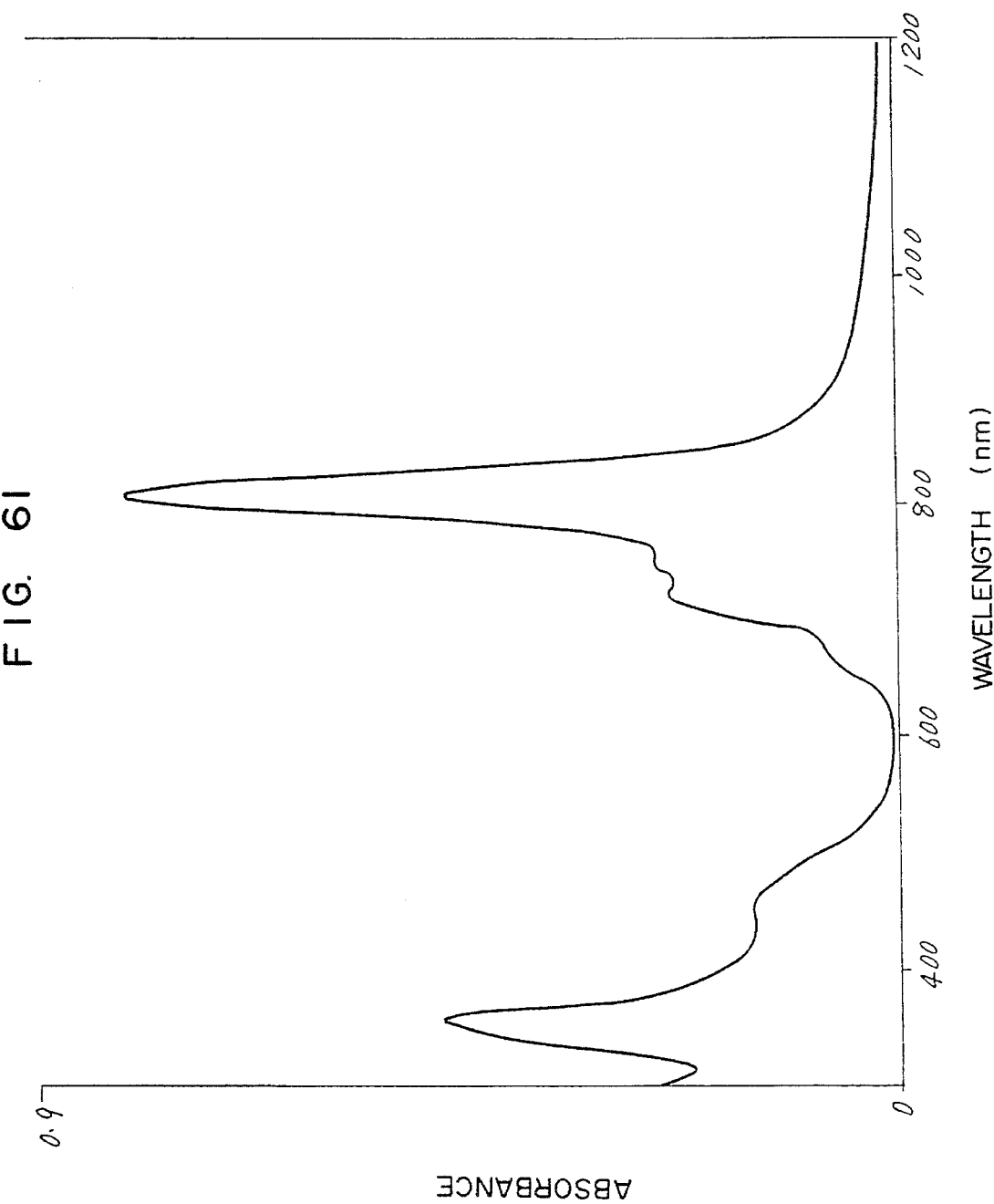
FIG. 61 is absorption spectrum of spin-coated film of Compound (61)
Figure 62:
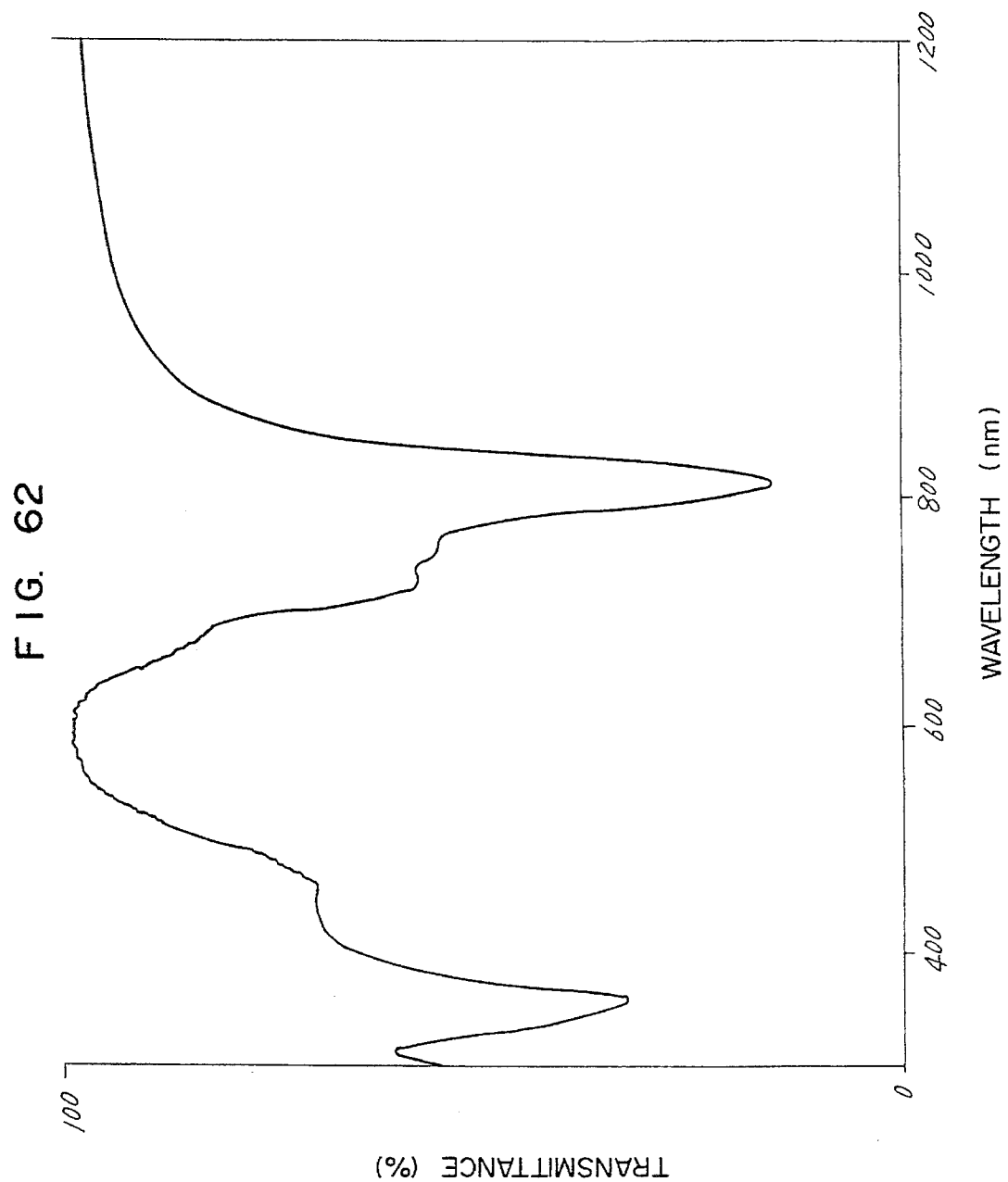
FIG. 62 is transmission spectrum of spin coated film of Compound (61)
Figure 63:
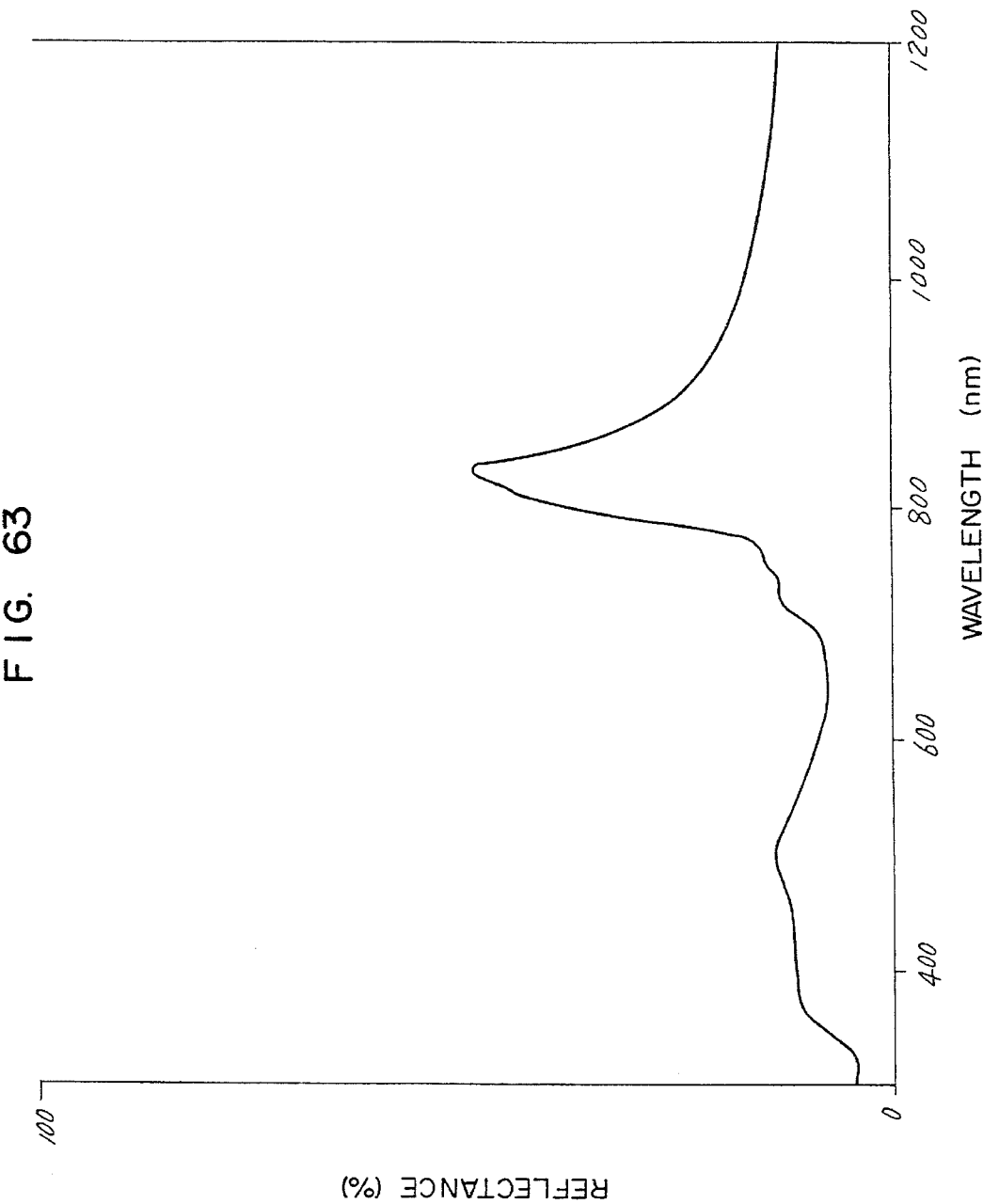
FIG. 63 is 5° specular reflection spectrum of spin coated film (thickness 600 angstroms) of Compound (61)

A solution comprising 1 part by weight of bis(tri-cyclohexylsiloxy)silicon-tetra(n-butylthio)naphthalocyanine (Compound (61)) and 99 parts by weight of carbon tetrachloride was coated onto a glass plate by spin coating method and dried at about 80° C. for 15 minutes to form an organic film having a thickness of about 600 angstroms. FIG. 61 illustrates absorption spectrum of this organic film, FIG. 62 illustrates its transmission spectrum, and FIG. 63 illustrates its 5° specular reflection spectrum. The spectra demonstrate that the organic film of this compound has a high light-absorbing ability and a high reflectance (ca. 50%) in the semi-conductor laser region (780–830 nm).

EXAMPLE 9

Figure 64:
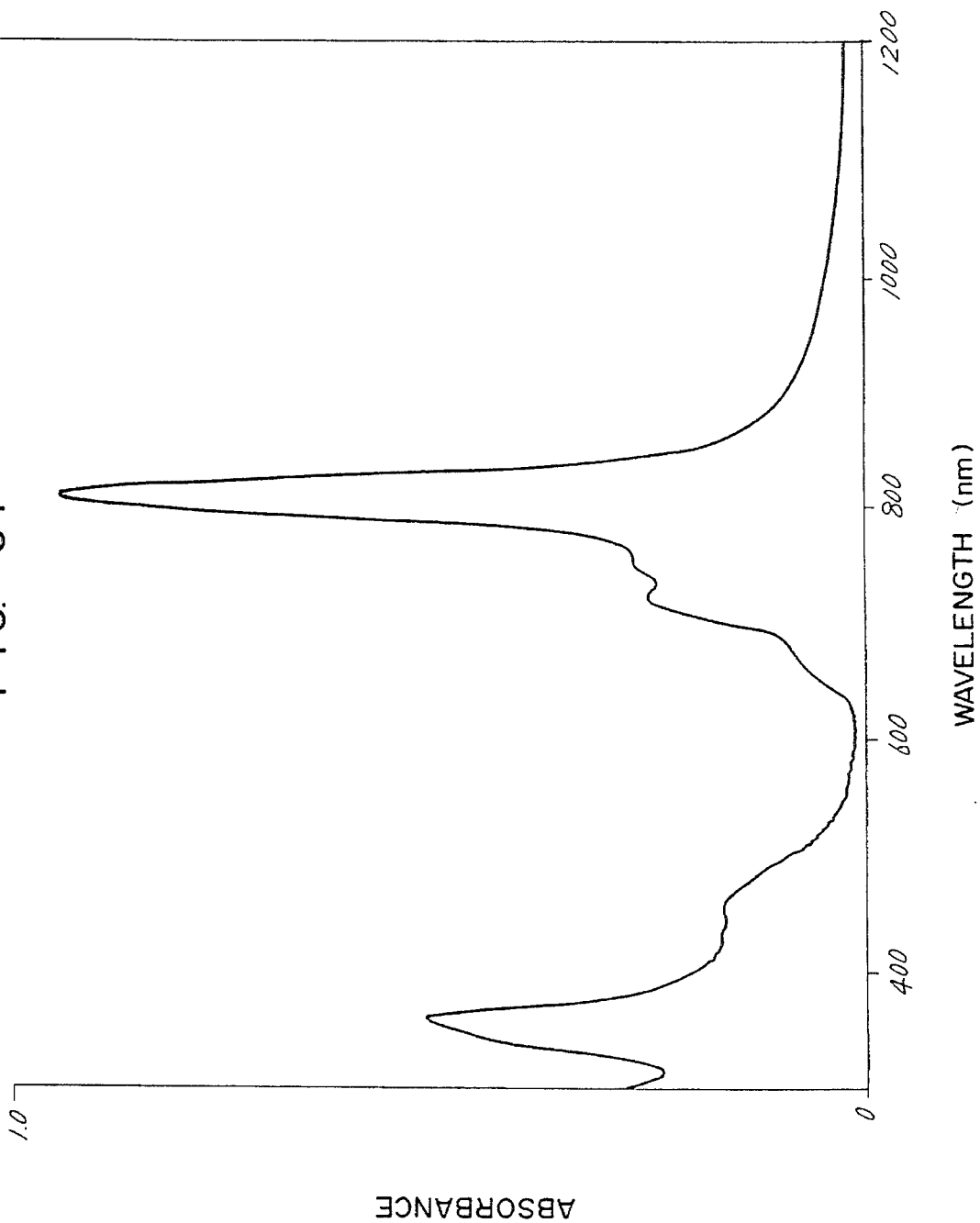
FIG. 64 is absorption spectrum of a film prepared by spin-coating Compound (61) on a polymethyl methacrylate substrate.
Figure 65:
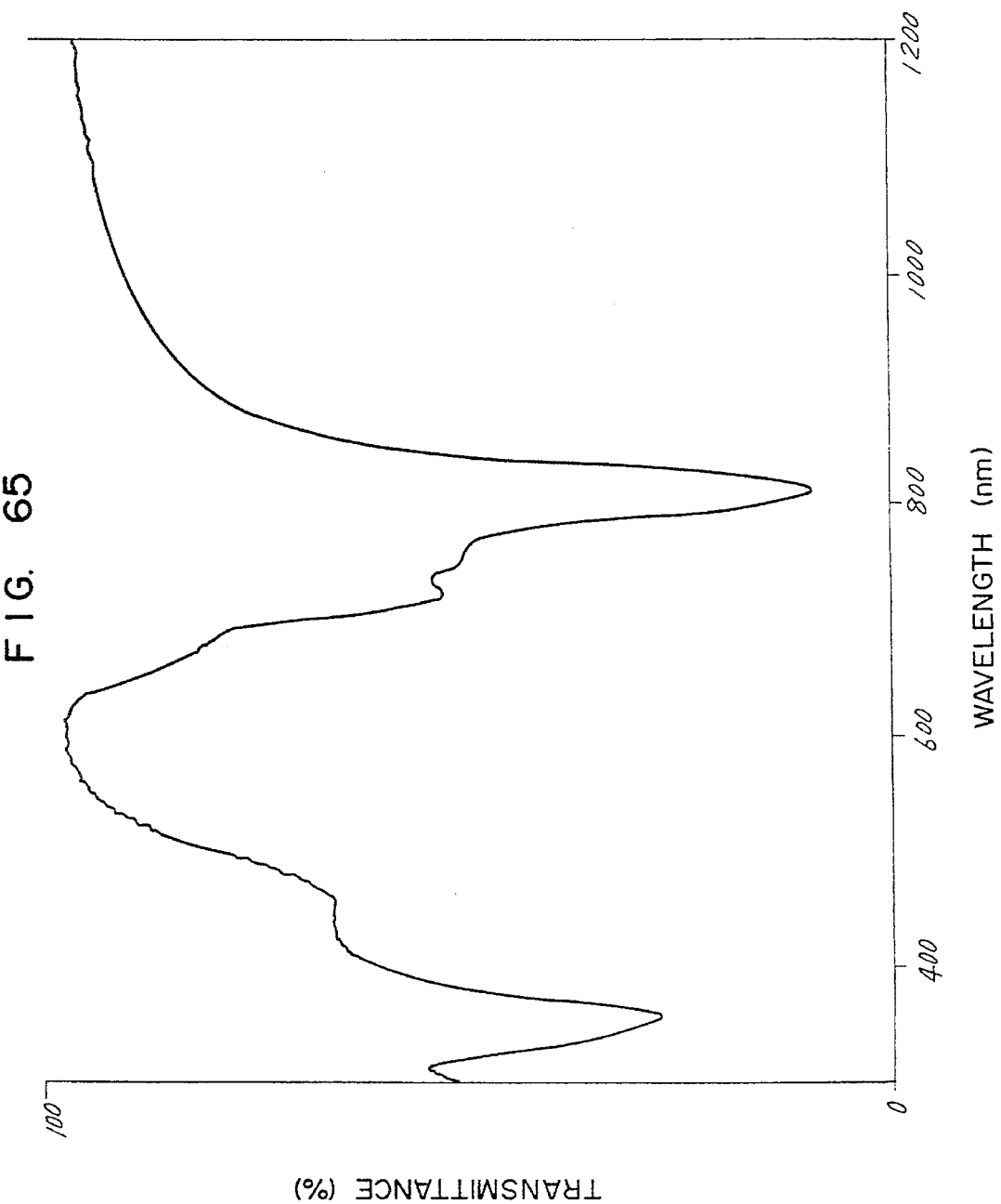
FIG. 65 is transmission spectrum of a film prepared by spin-coating Compound (61) on a polymethyl methacrylate substrate.
Figure 66:
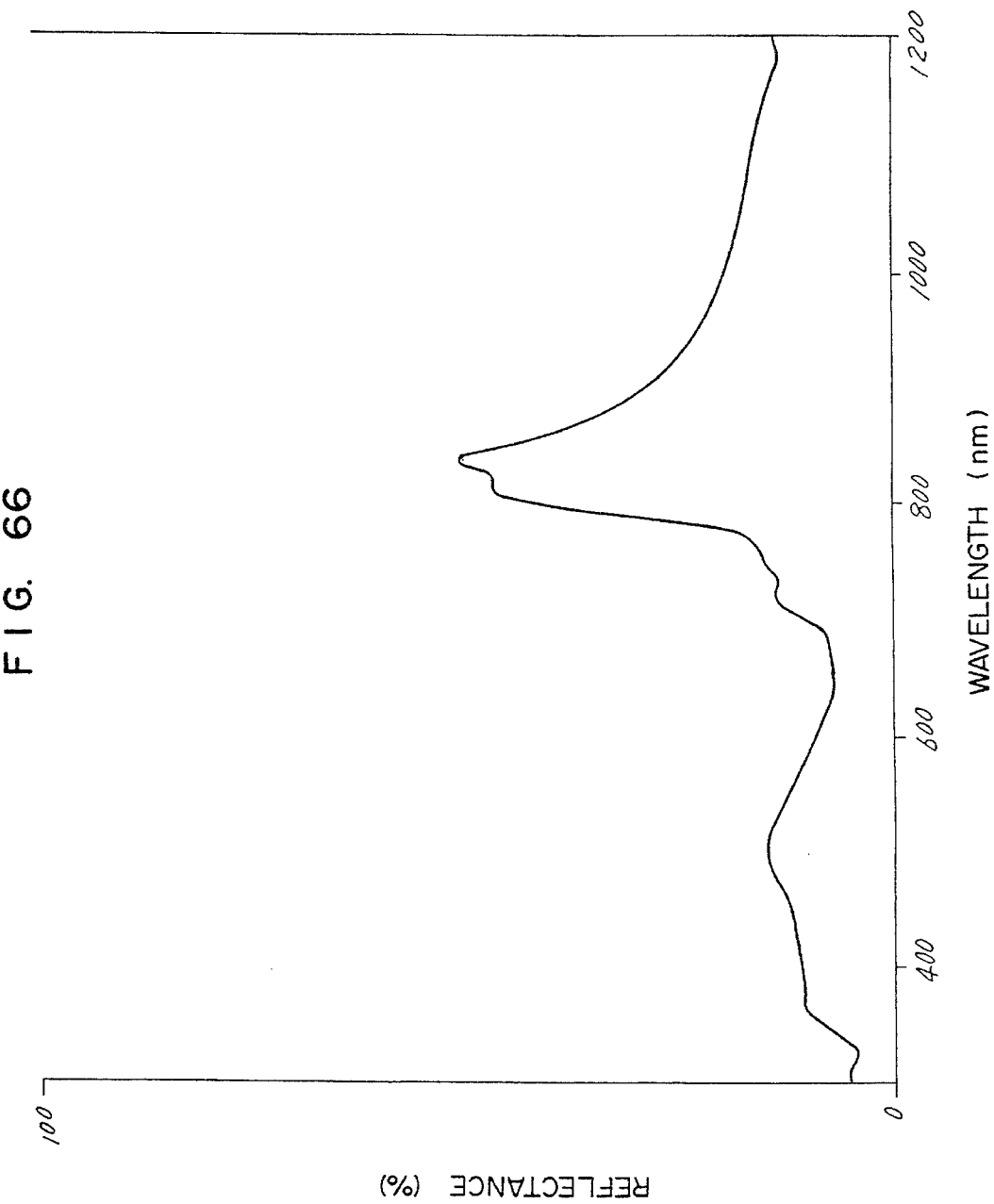
FIG. 66 is 5° specular reflection spectrum of a film prepared by spin-coating Compound (61) on a polymethyl methacrylate substrate.

A solution consisting of 1.5 parts by weight of bis(tricyclohexylsiloxy)silicon-tetra(n-butylthio)naphthalocyanine and 98.5 parts by weight of carbon tetrachloride was coated onto a polymethyl methacrylate plate by spin coating method and dried at about 80° C. for 15 minutes to form an organic film having a thickness of 900 angstroms. FIG. 64, 65 and 66 illustrate absorption spectrum, transmission spectrum and 5° specular reflection spectrum, respectively, of the organic film of this compound formed on polymethyl methacrylate substrate. It was found that, on polymethyl methacrylate substrate, too, an organic film exhibiting a high light absorbing ability and a high reflectance (ca. 50%) in the semiconductor laser region (780–830 nm) could be formed in the same manner as on glass plate.

EXAMPLE 10

Figure 67:
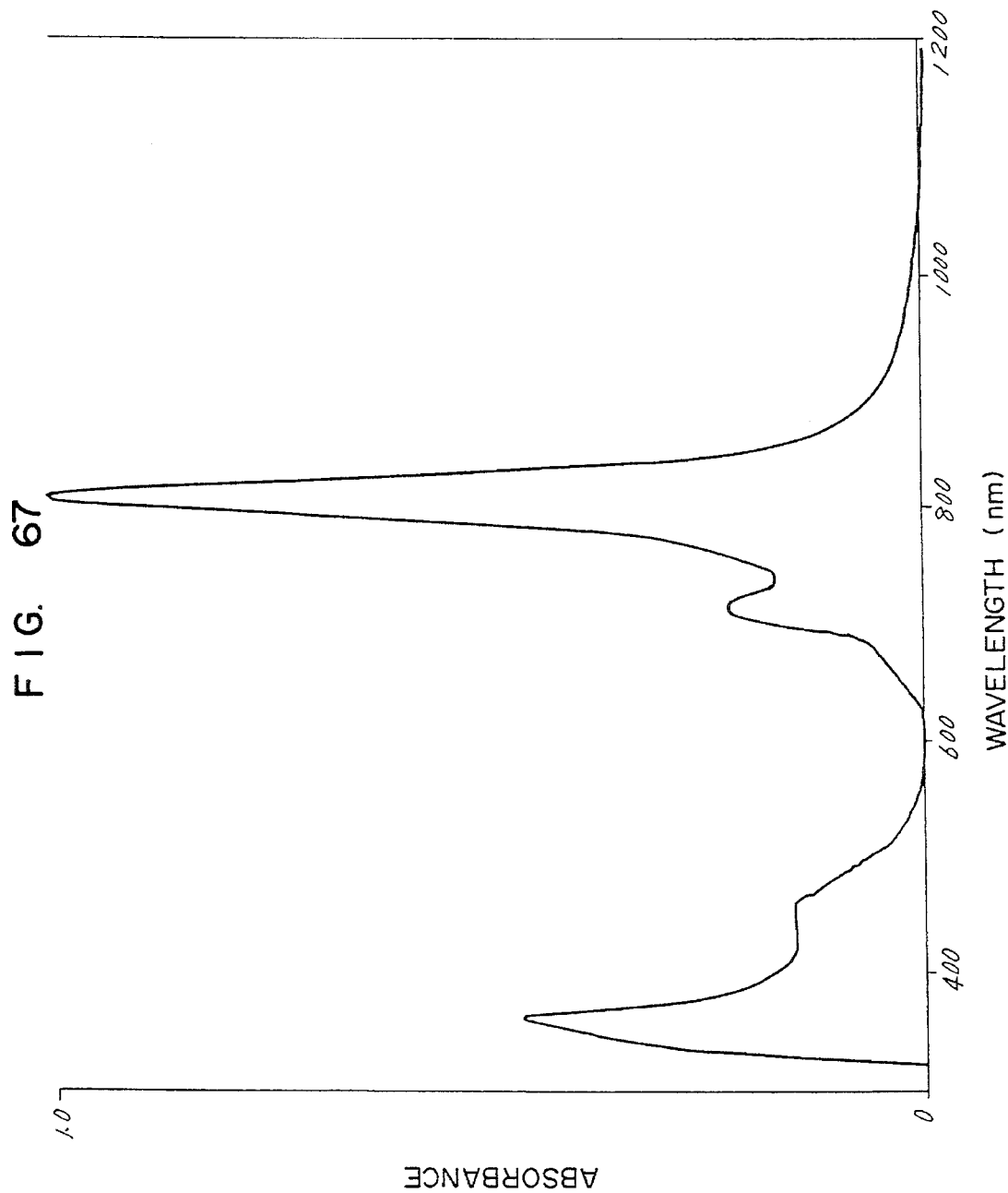
FIG. 67 is absorption spectrum of a spin coated film of bis(tri-n-butylsiloxy)silicon-tetra(cyclohexylthio)-naphthalocyanine (Compound (11))
Figure 68:
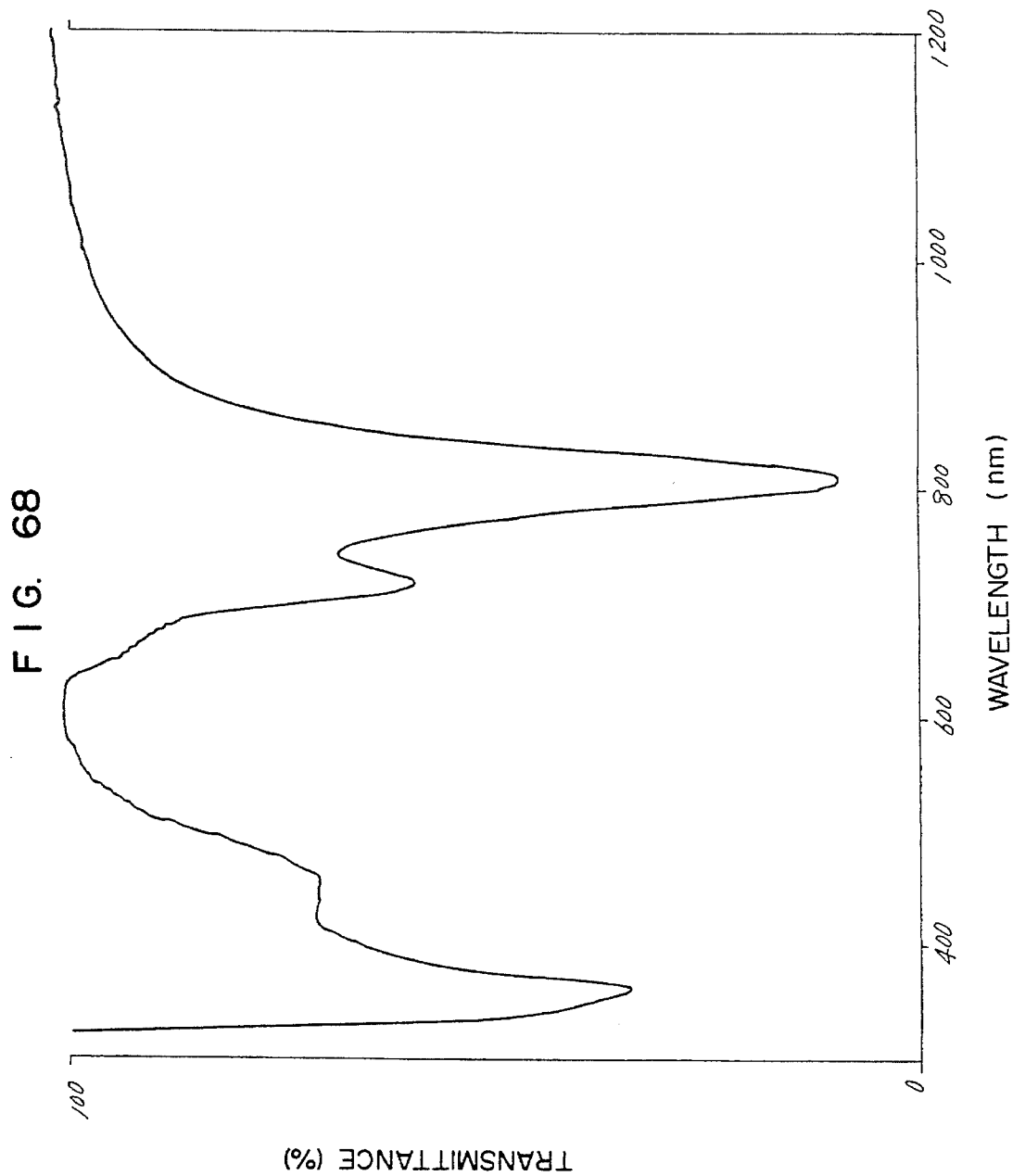
FIG. 68 is transmission spectrum of spin coated film of Compound (11)
Figure 69:
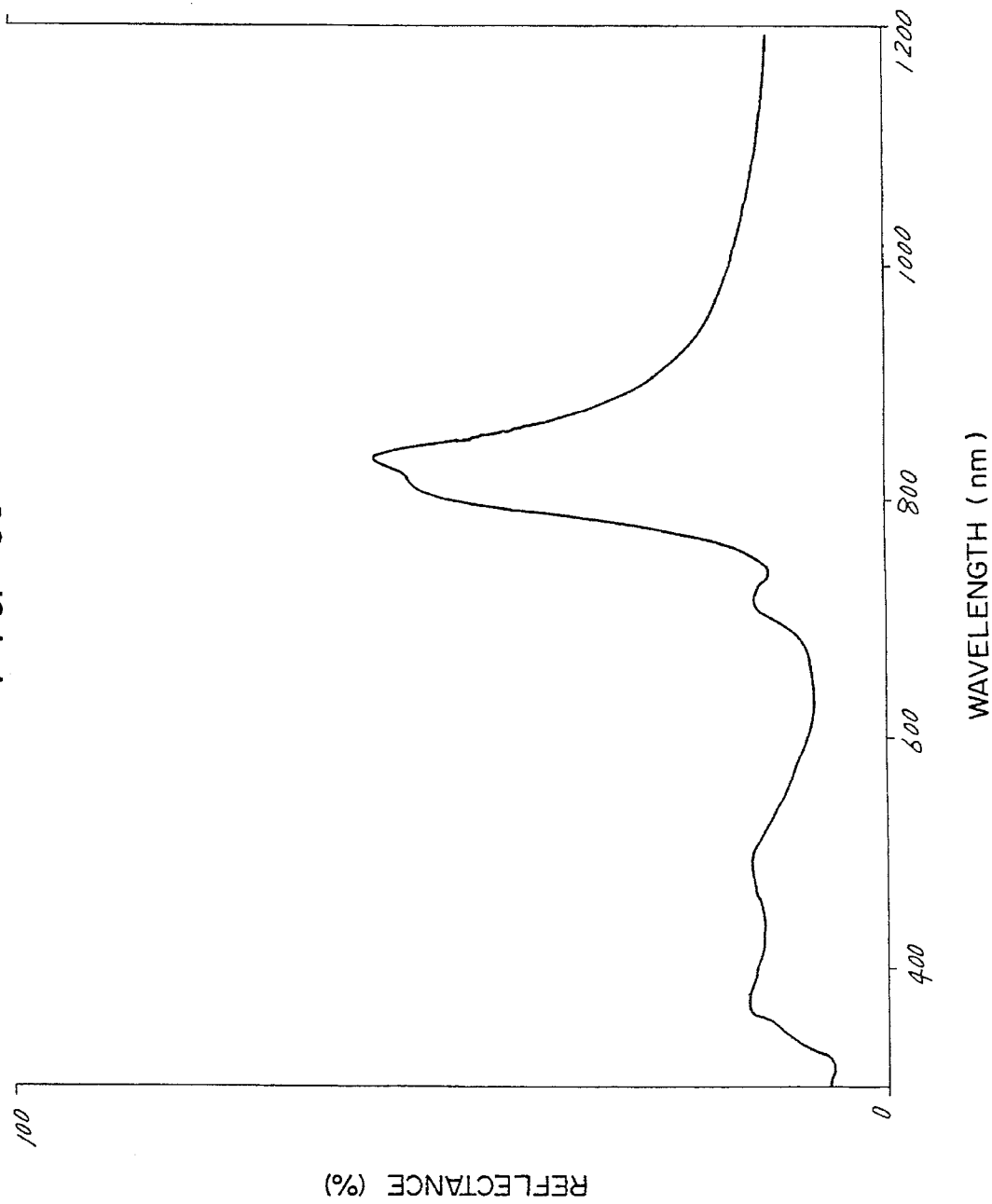
FIG. 69 is 5° specular reflection spectrum of spin coated film (thickness 700 angstroms) of Compound (11)
Figure 70:
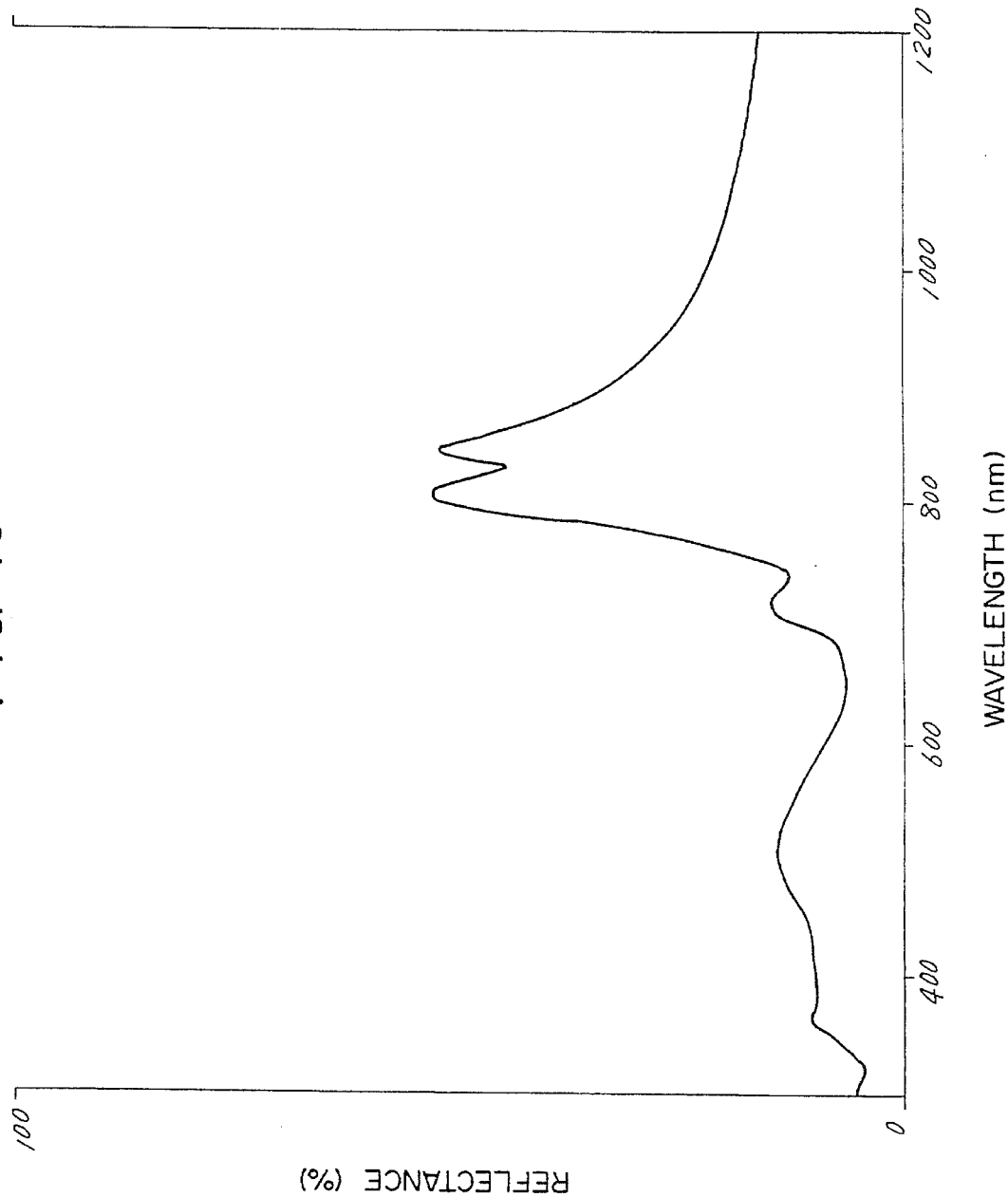
FIG. 70 is 5° specular reflection spectrum of a spin coated film (thickness 900 angstroms) of Compound (11)

A solution consisting of 1 part by weight of bis(tri-n-butylsiloxy)silicon-tetra(cyclohexylthio)naphthalocyanine (Compound (11)) and 99 parts by weight of cyclohexane was coated onto a glass plate by spin coating method and dried at about 80° C. for 15 minutes to form an organic film having a thickness of about 700 angstroms. FIGS. 67, 68 and 69 illustrate absorption spectrum, transmission spectrum and 5° specular reflection spectrum, respectively, of the organic film of this compound. It was found that the film exhibited a high light absorbing ability and a high reflectance (ca. 60%) in the semiconductor laser region (780–830 nm). An organic film having a thickness of 900 angstroms also exhibited a similarly high reflectance (ca. 55%) as shown in FIG. 70.

EXAMPLE 11

Figure 71:
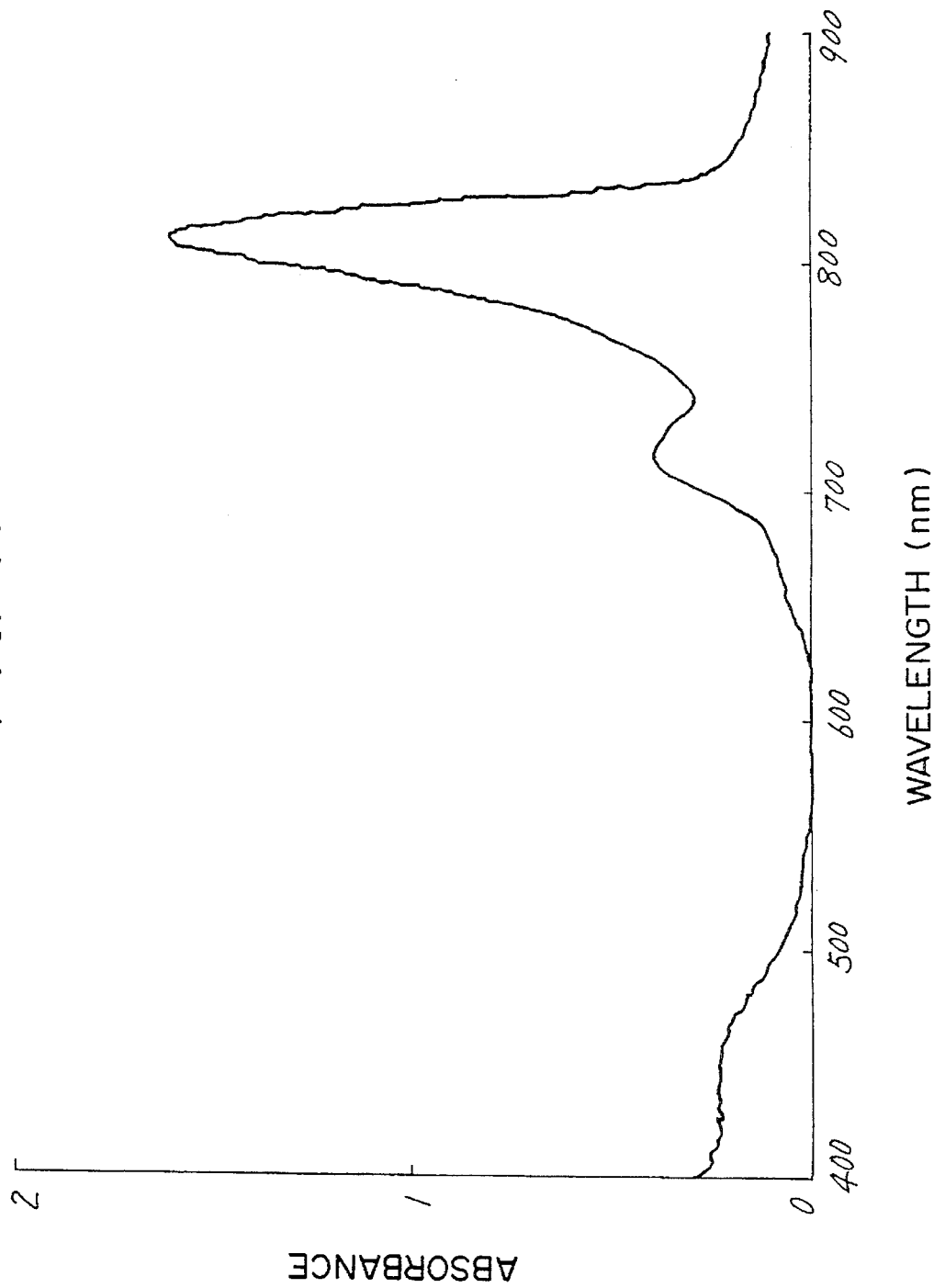
FIG. 71 is absorption spectrum of a film prepared by spin-coating Compound (11) on a polycarbonate substrate.
Figure 72:
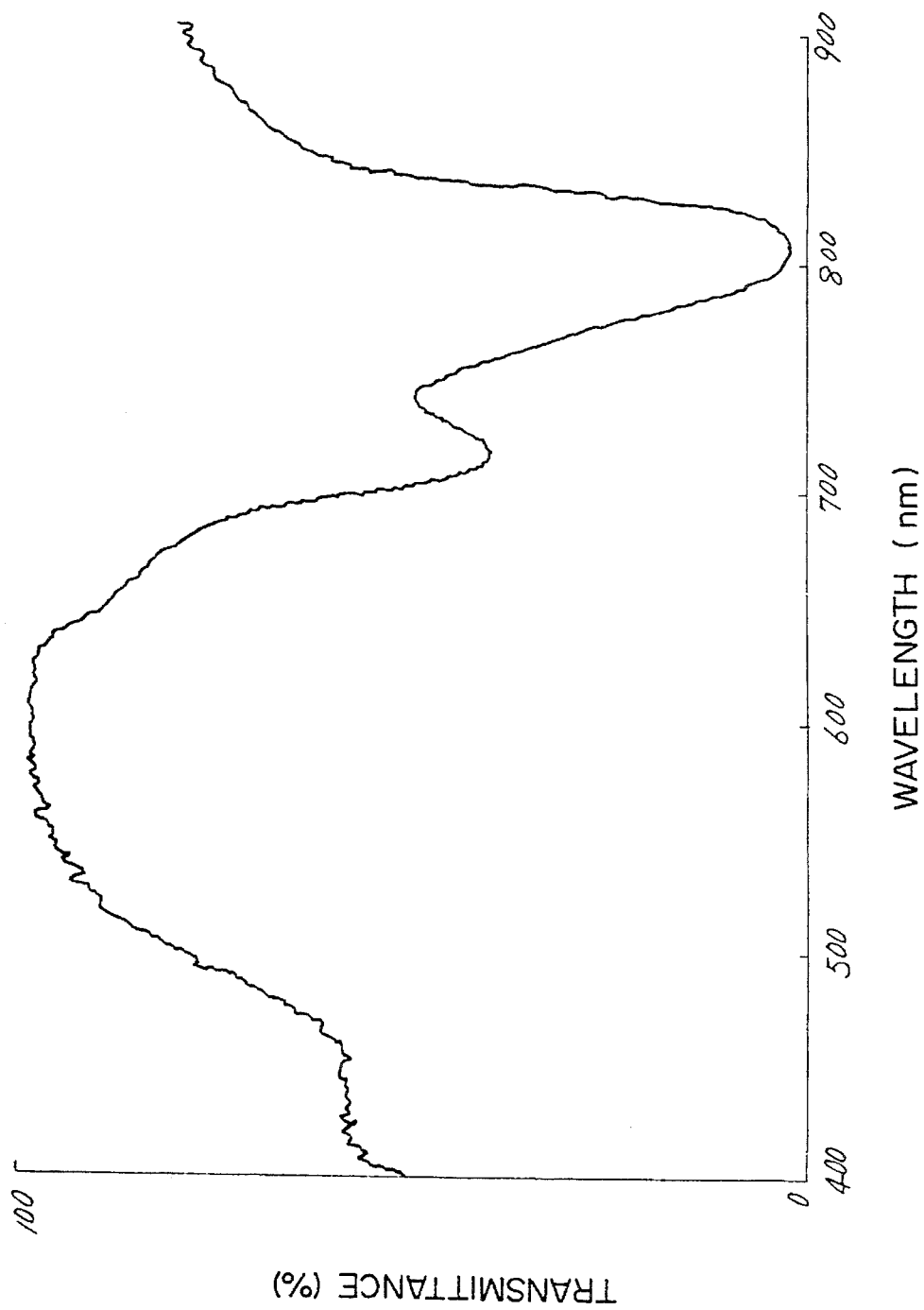
FIG. 72 is transmission spectrum of a film prepared by spin-coating Compound (11) on a polycarbonate substrate.
Figure 73:
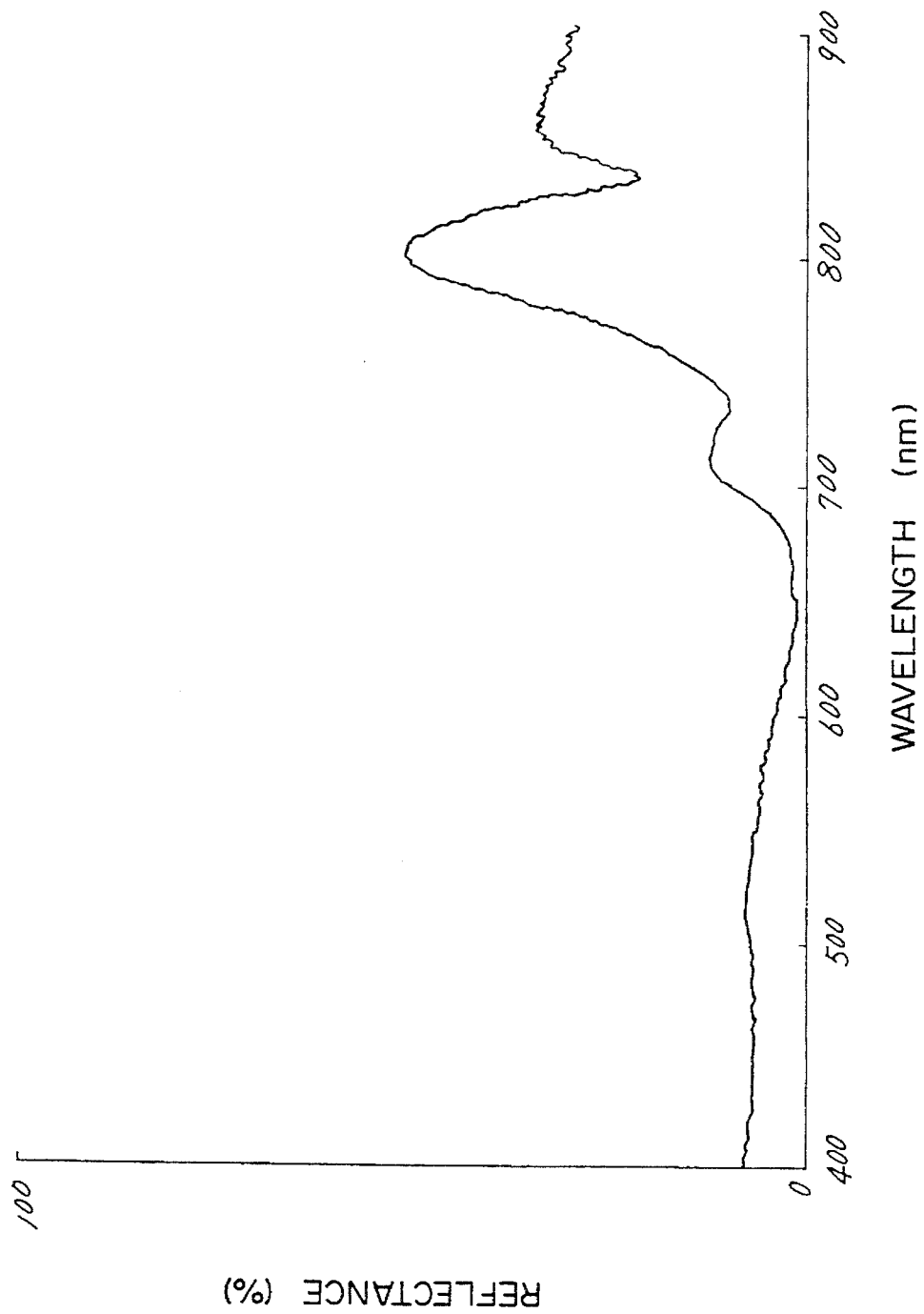
FIG. 73 is specular reflection spectrum of a film prepared by spin-coating Compound (11) on a polycarbonate substrate.

A solution consisting of 1.5 parts by weight of bis(tri-n-butylsiloxy(silicon-tetra(cyclohexylthio)naphthalocyanine (Compound (11)) and 98.5 parts by weight of cyclohexane was coated onto a polycarbonate plate by spin coating method and dried at about 80° C. for 15 minutes to form an organic film having a thickness of about 1,000 angstroms. FIGS. 71, 72 and 73 illustrate absorption spectrum, transmission spectrum and specular reflection spectrum, respectively, of this organic film formed on polycarbonate plate. It was found that, on polycarbonate plate, too, an organic film exhibiting a high light absorbing ability and a high reflectance (ca. 50%) in the semiconductor laser region (780–830 nm) could be formed in the same manner as on glass plate.

EXAMPLE 12

Figure 74:
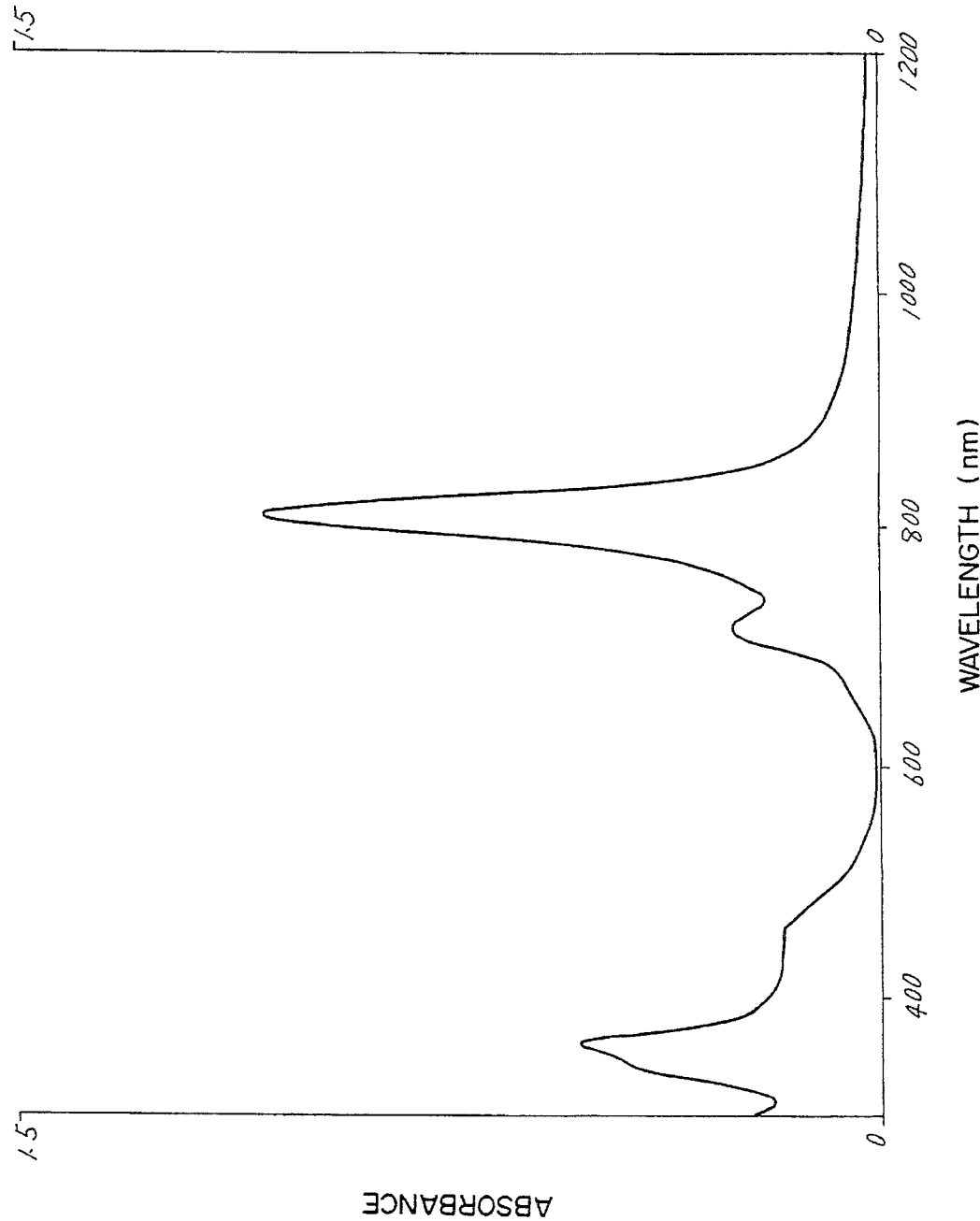
FIG. 74 is absorption spectrum of a film prepared by spin-coating Compound (12) on a polycarbonate substrate.
Figure 75:
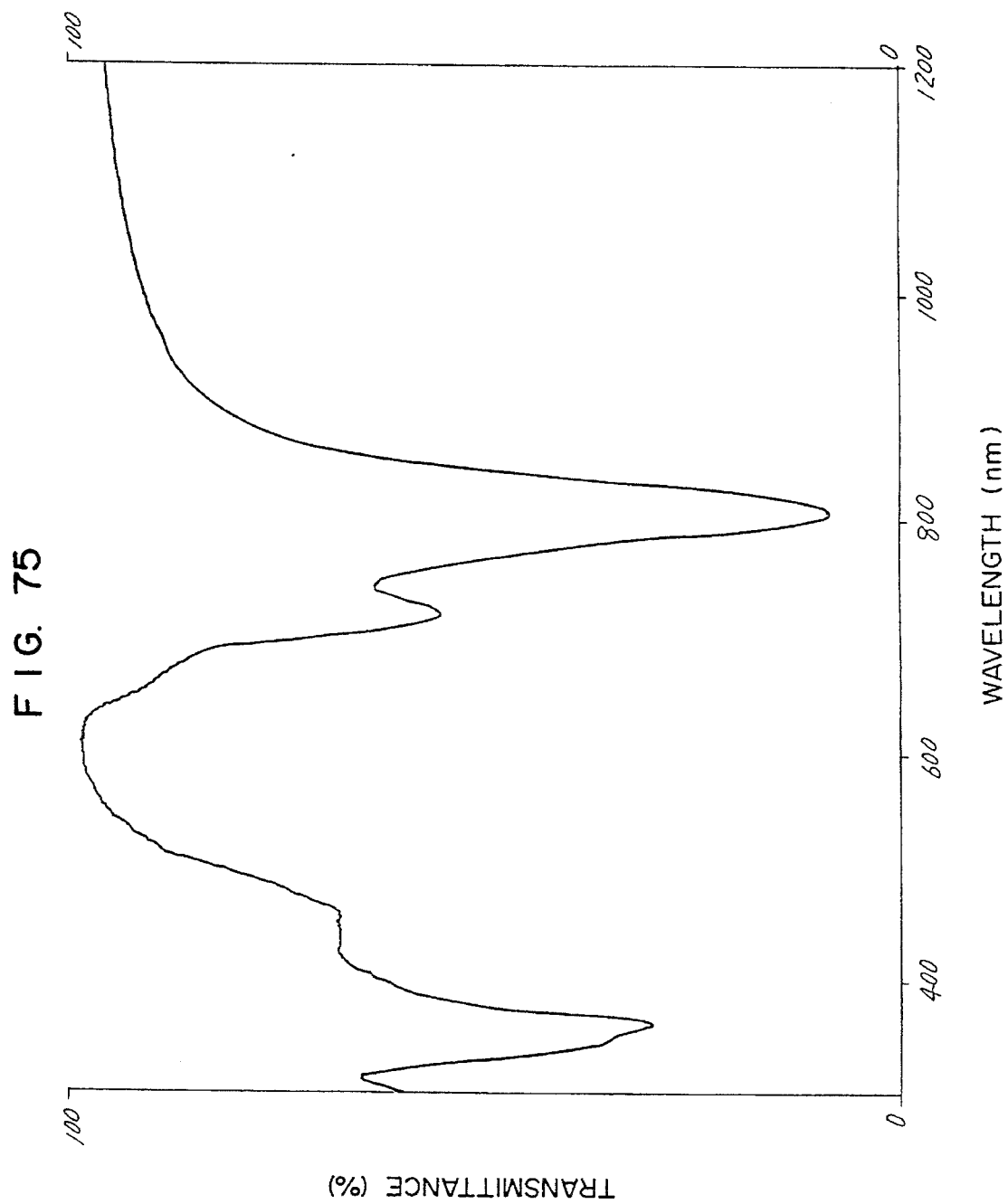
FIG. 75 is transmission spectrum of a film prepared by spin-coating Compound (12) on a polycarbonate substrate.
Figure 76:
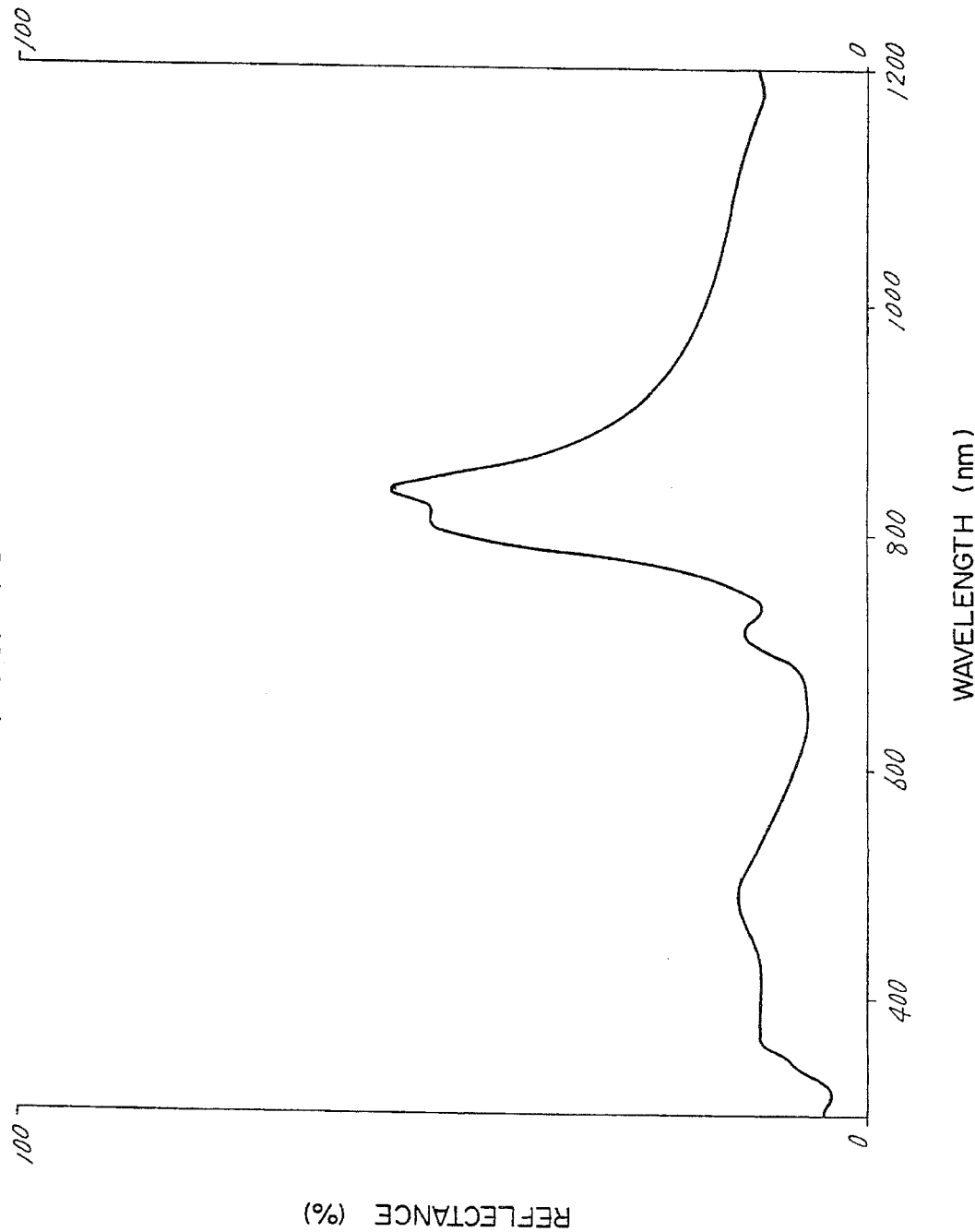
FIG. 76 is 5° specular reflection spectrum of a film prepared by spin-coating Compound (12) on a polycarbonate substrate.

A solution consisting of 1 part by weight of bis(tributylsiloxy)silicon-tetra(cyclopentylthio)naphthalocyanine (Compound (12)) and 99 parts by weight of cyclohexane was coated onto a polycarbonate plate by spin coating method and dried at about 80° C. for 15 minutes to form an organic film having a thickness of about 700 angstroms. FIGS. 74, 75 and 76 illustrate absorption spectrum, transmission spectrum and 5° specular reflection spectrum, respectively, of the organic film of this compound formed on polycarbonate plate. It was found that an organic film exhibiting a high light absorbing ability and a high reflectance (ca. 55%) in the semiconductor laser region (780–830 nm) could be formed on polycarbonate plate, too.

EXAMPLE 13

Figure 77:
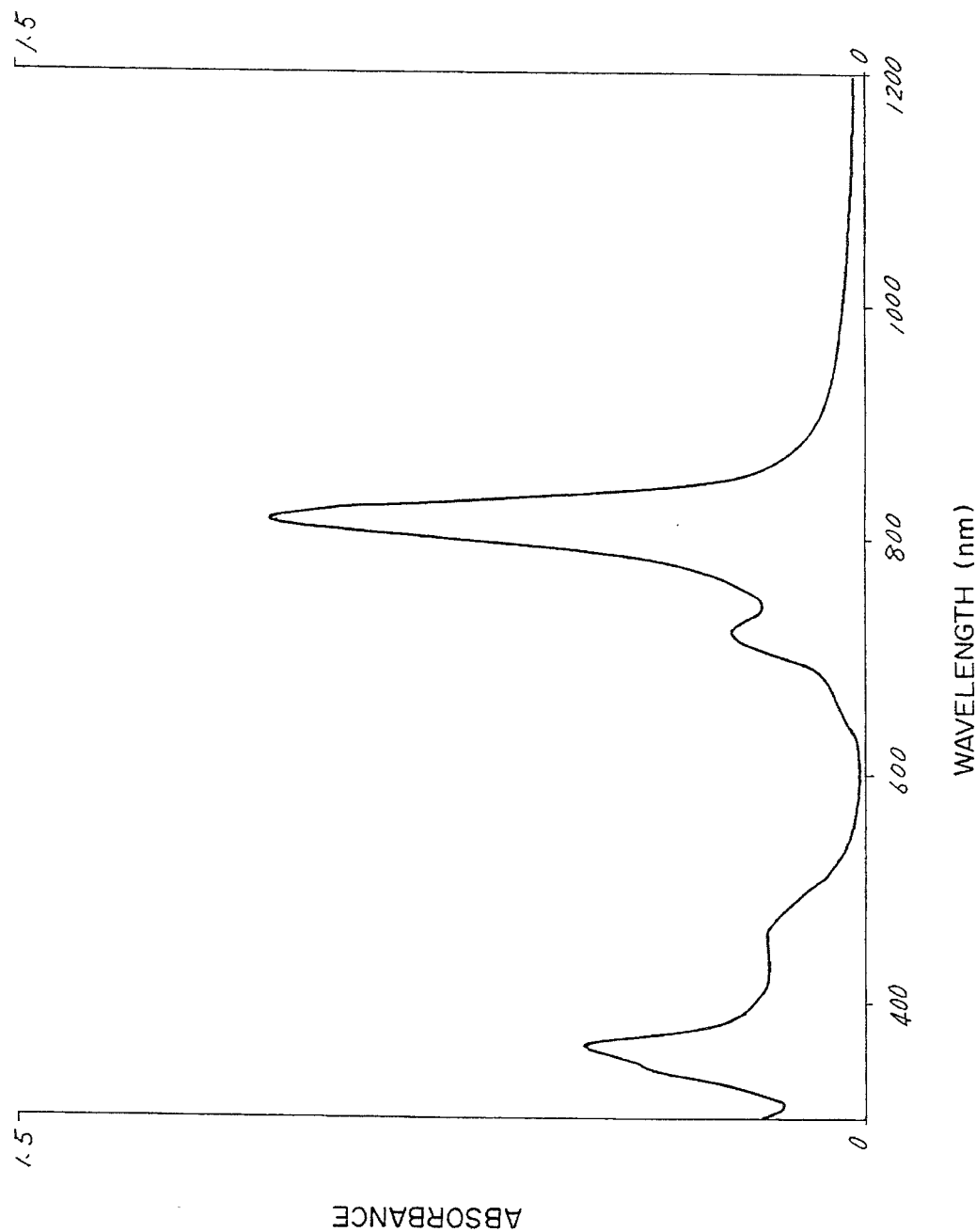
FIG. 77 is absorption spectrum of a film prepared by spin-coating Compound (19) on a polycarbonate substrate.
Figure 78:
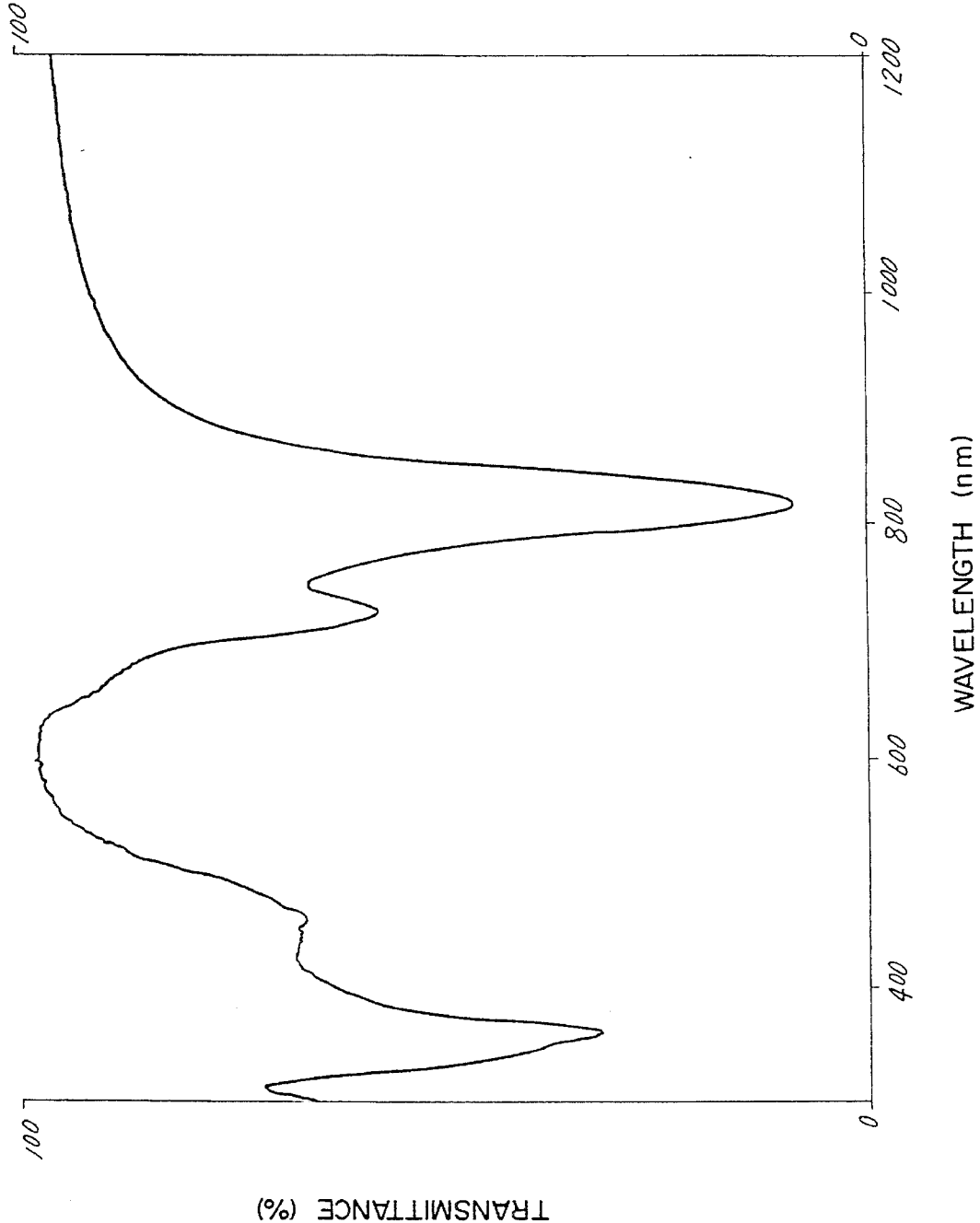
FIG. 78 is transmission spectrum of a film prepared by spin-coating Compound (19) on a polycarbonate substrate.
Figure 79:
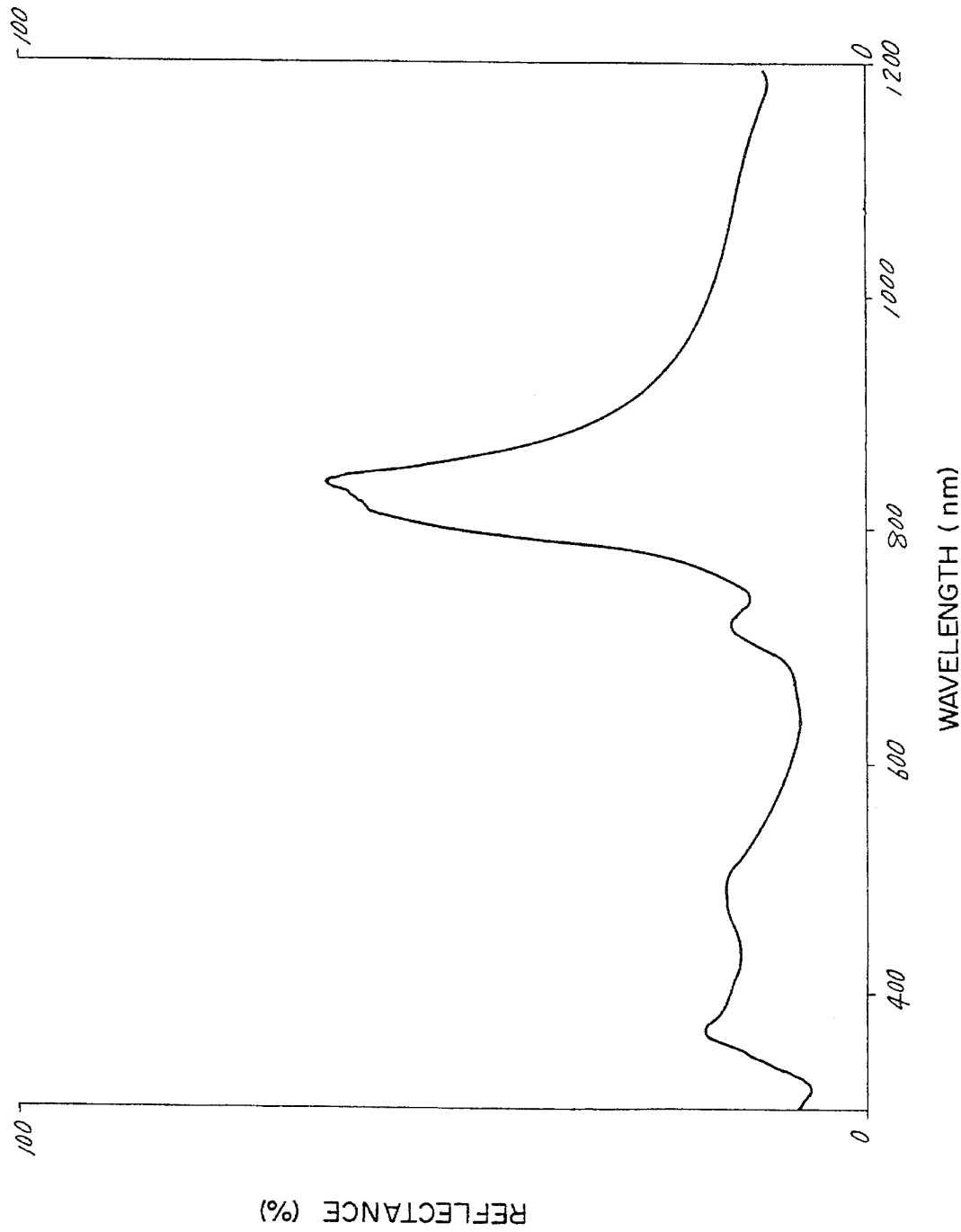
FIG. 79 is 5° specular reflection spectrum of a film prepared by spin-coating Compound (19) on a polycarbonate substrate.

A solution consisting of 1 part by weight of bis(tributylsiloxy)silicon-tetra(4-methylcyclohexylthio)naphthalocyanine (Compound (19)) and 99 parts by weight of cyclohexane was coated onto a polycarbonate plate by spin coating method and dried at about 80° C. for 15 minutes to form an organic film having a thickness of about 720 angstroms. FIGS. 77, 78 and 79 illustrate absorption spectrum, transmission spectrum and 5° specular reflection spectrum, respectively, of the organic film of this compound formed on polycarbonate plate. It was found that an organic film exhibiting a high light absorbing ability and a high reflectance (ca. 62%) in the semiconductor laser region (780–830 nm) could be formed on polycarbonate plate, too.

EXAMPLE 14

Figure 80:
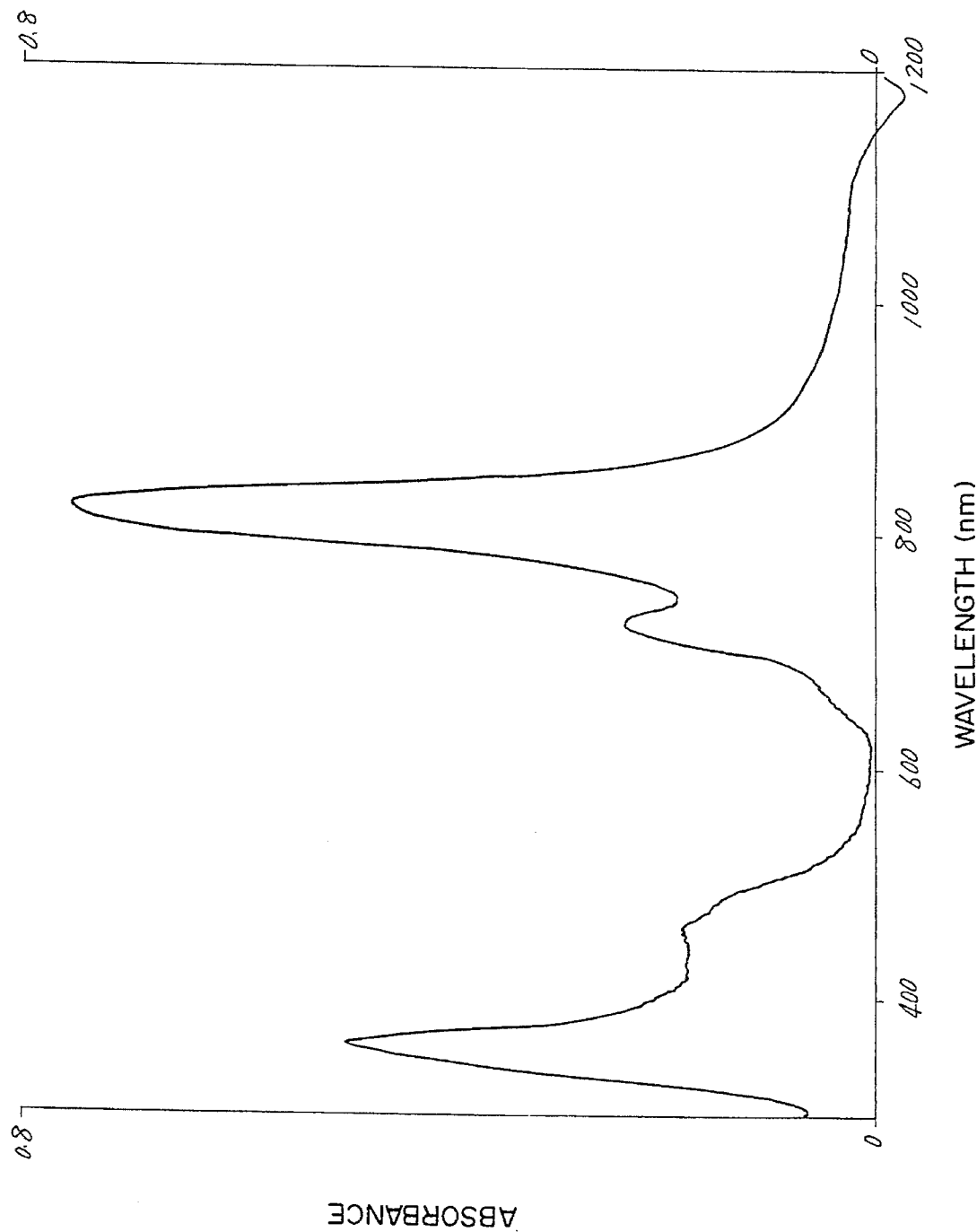
FIG. 80 is absorption spectrum of a film prepared by spin-coating Compound (41) on a polycarbonate substrate.
Figure 81:
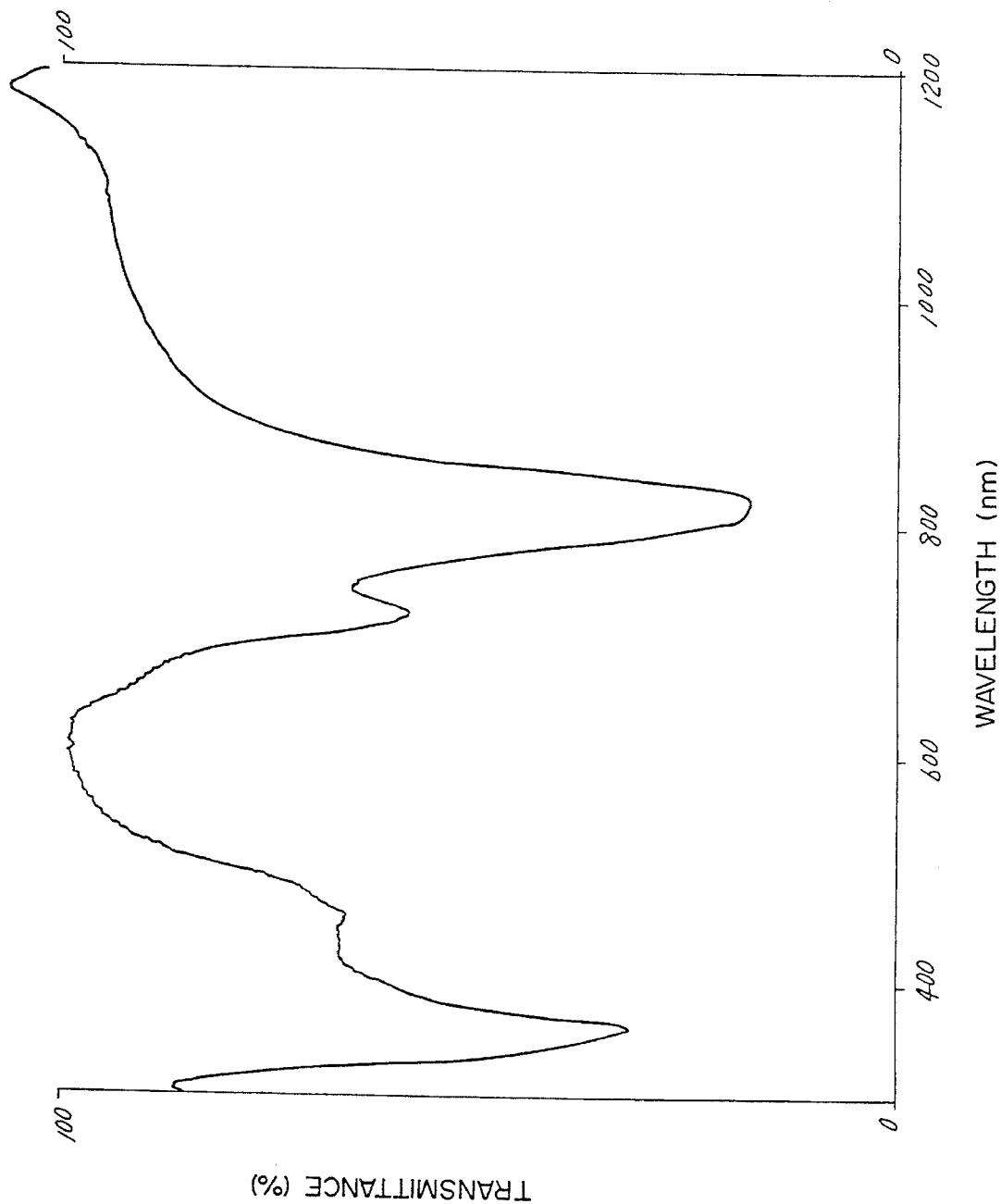
FIG. 81 is transmission spectrum of a film prepared by spin-coating Compound (41) on a polycarbonate substrate.
Figure 82:
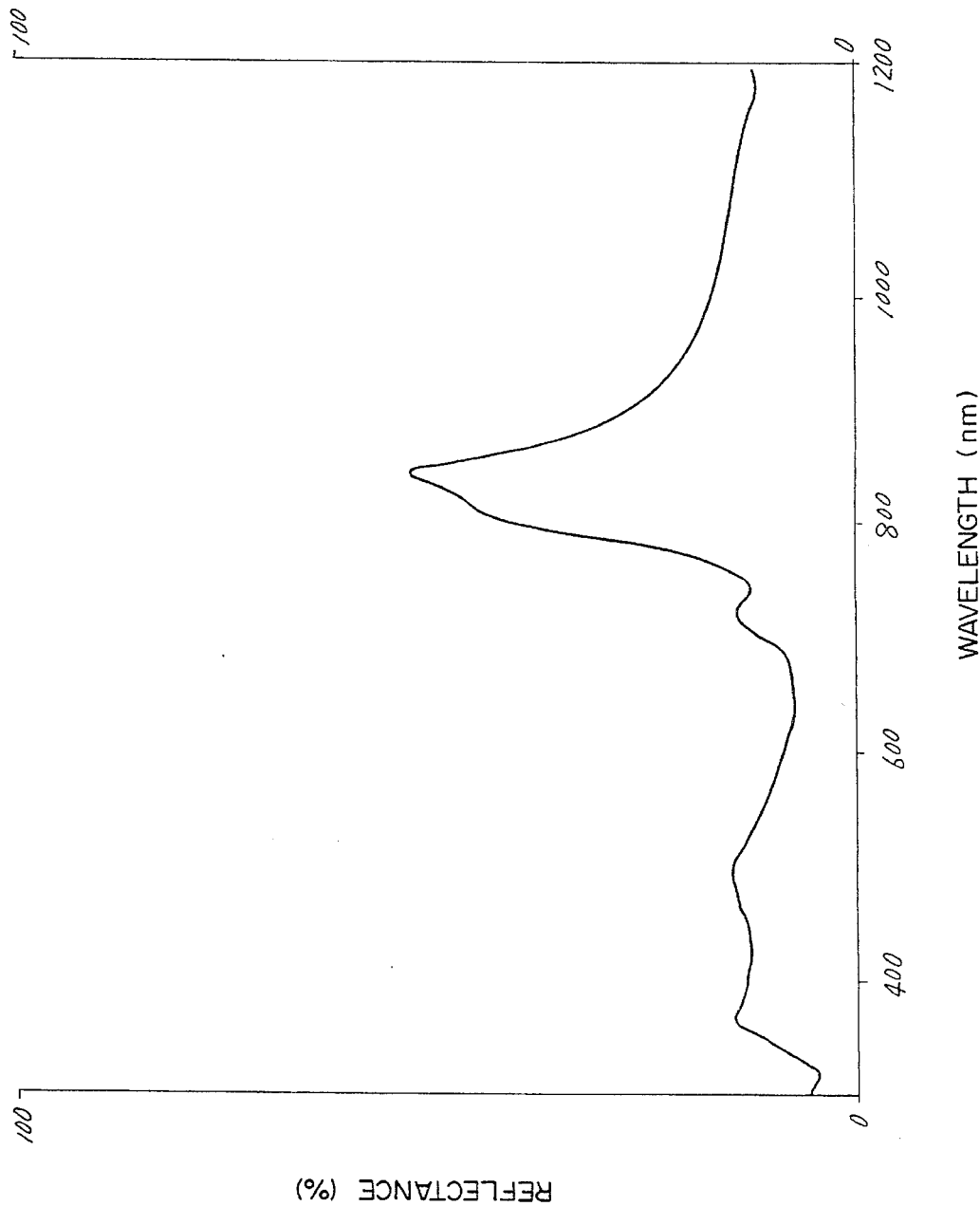
FIG. 82 is 5° specular reflection spectrum of a film prepared by spin-coating Compound (41) on a polycarbonate substrate.

A solution consisting of 1 part by weight of bis(tributylsiloxy)silicon-tetra(cyclohexylethylthio)naphthalocyanine (Compound (41)) and 99 parts by weight of cyclohexane was coated onto a polycarbonate plate by spin coating method and dried at about 80° C. for 15 minutes to form an organic film having a thickness of about 680 angstroms. FIGS. 80, 81 and 82 illustrate absorption spectrum, transmission spectrum and 5° specular reflection spectrum, respectively, of the organic film of this compound formed on polycarbonate plate. It was found that an organic film exhibiting a high light absorbing ability and a high reflectance (ca. 50%) in the semiconductor laser region (780–830 nm) could be formed on polycarbonate plate, too.

COMPARATIVE EXAMPLE 1

Figure 83A:
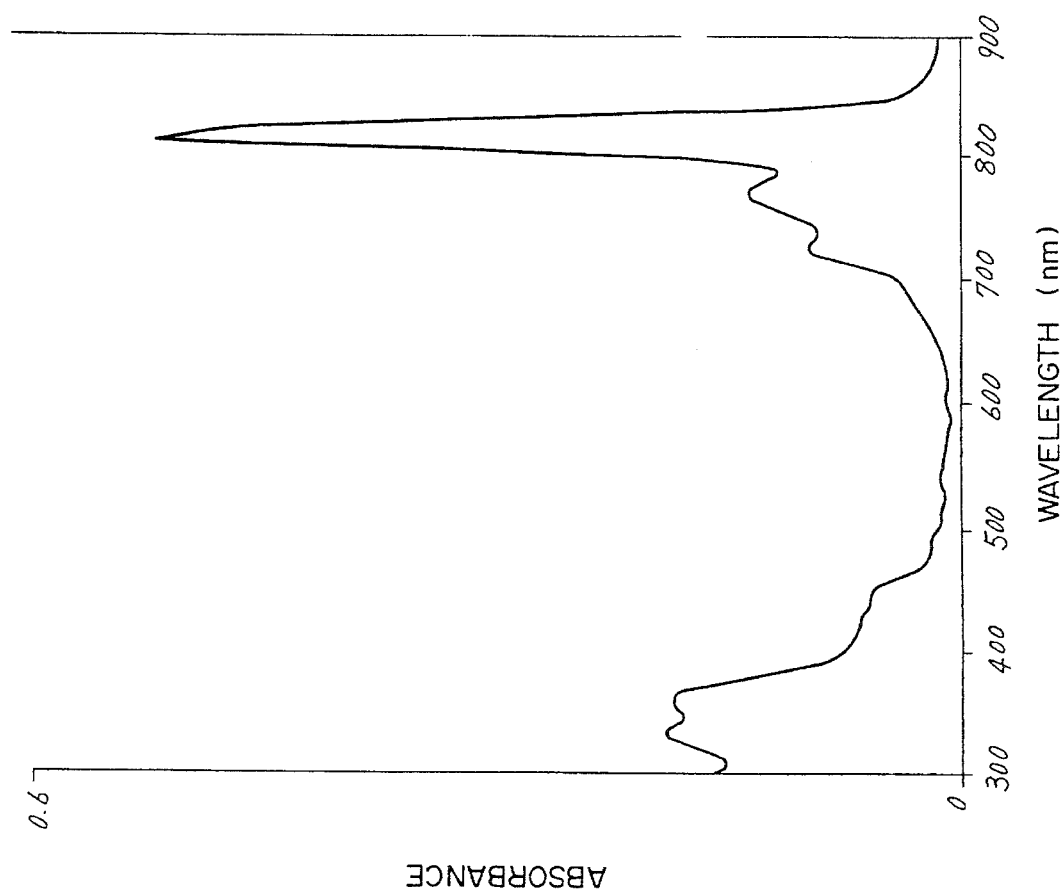
FIG. 83 is electronic spectrum of vanadyl-tetra(t-butyl)-naphthalocyanine in chloroform solution wherein (a) is that at a concentration of $2.37 \times 10^{-6}$M and (b) is that at a concentration of $1.89 \times 10^{-5}$M.
Figure 83B:
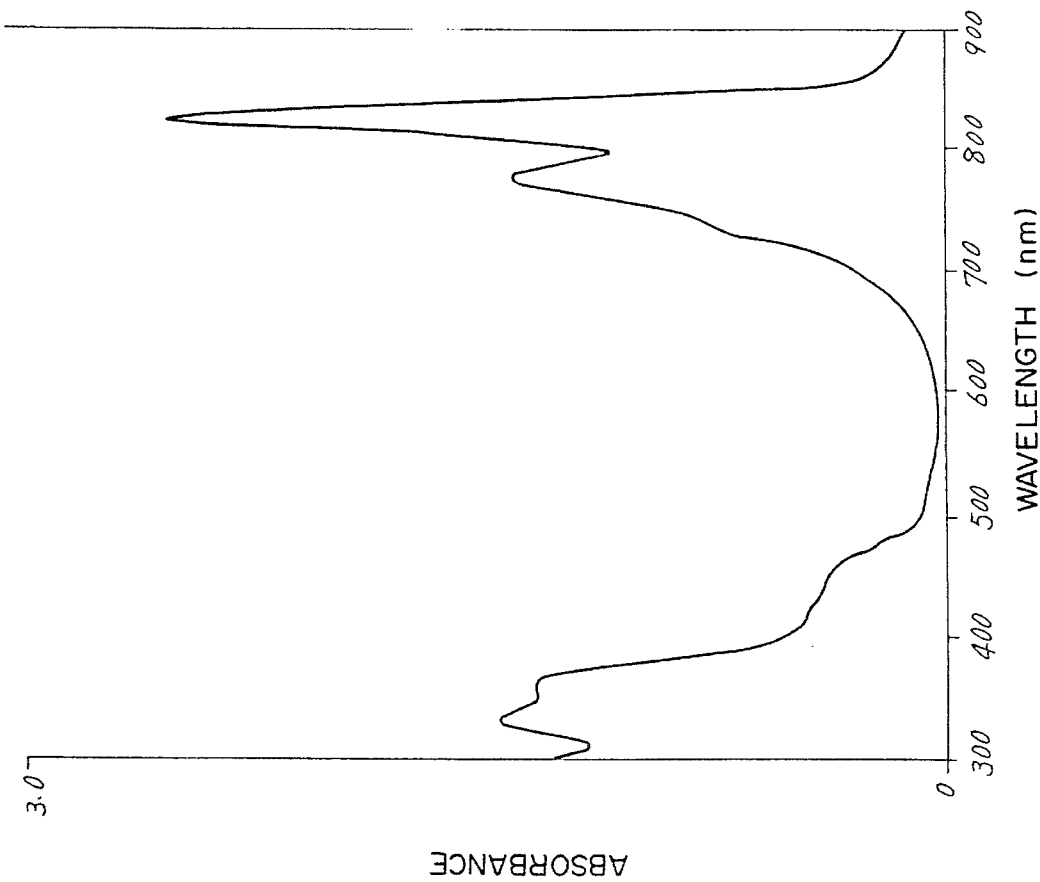
Figure 84:
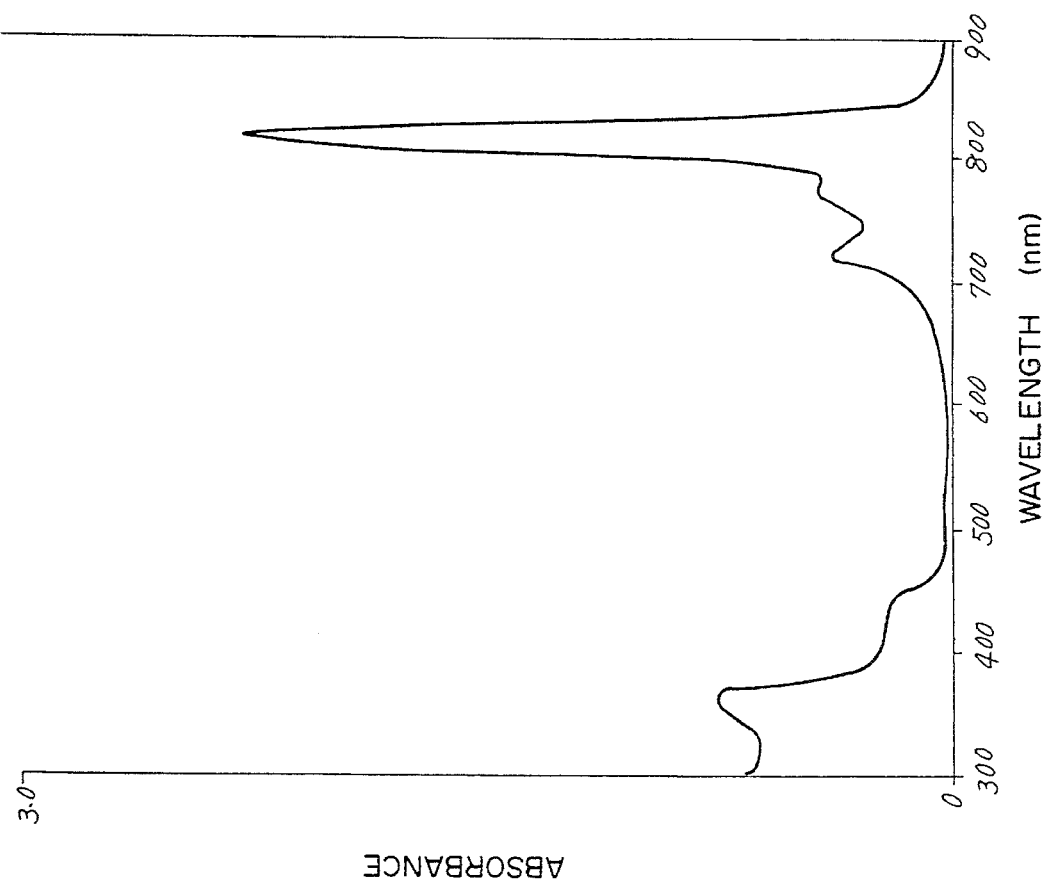
FIG. 84 is electronic spectrum of vanadyl-tetra(t-butyl)-naphthalocyanine in benzene solution at a concentration of $9.5 \times 10^{-6}$M.

FIG. 83 illustrates electronic spectrum, in chloroform solution, of vanadyl-tetra(t-butyl)naphthalocyanine synthesized according to the method mentioned in Zhurnal Obshchei Khimii, Vol. 42, Page 696 (1972). FIG. 84 illustrates its electronic spectrum measured in benzene solution. As seen in these drawings, the shape of absorption waveform of this compound varies with kind of solvent and concentration, and the absorption near 800 nm decreases and that near 720–730 nm increases, as the concentration increases.

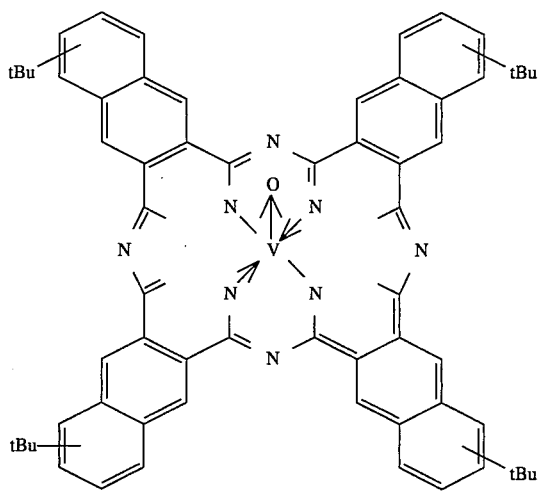

COMPARATIVE EXAMPLE 2

Figure 85:
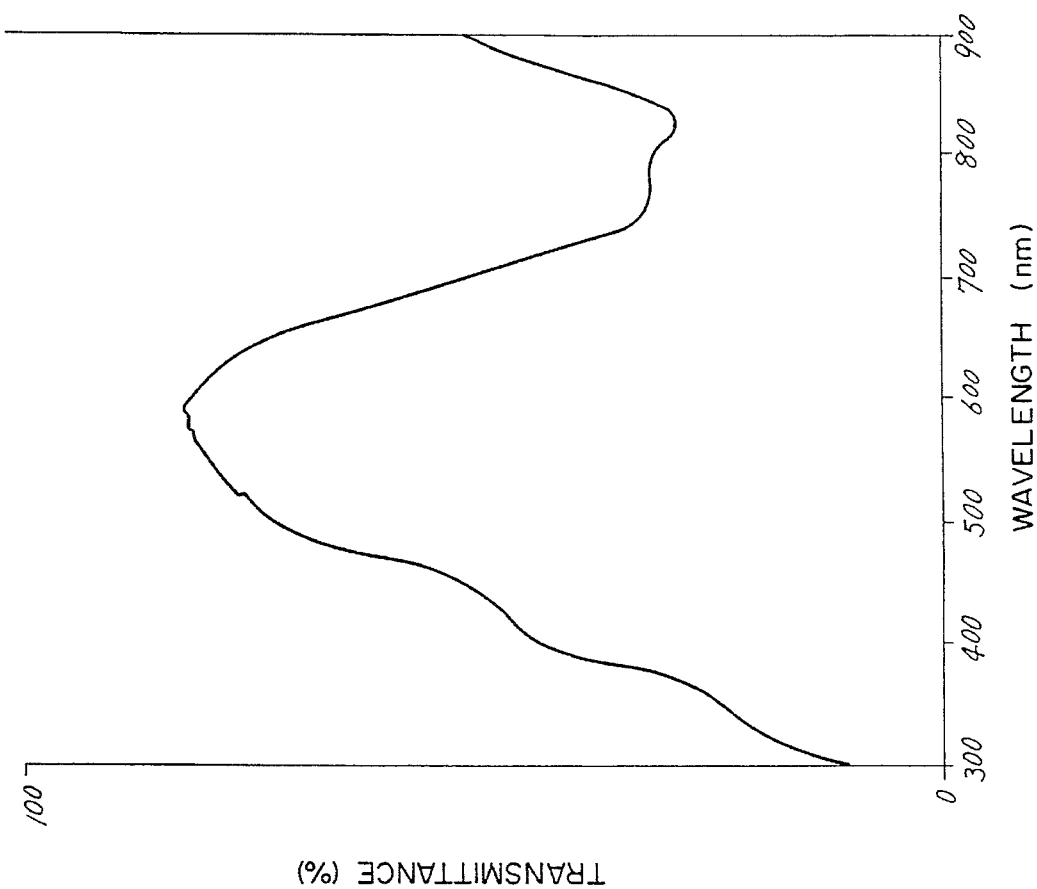
FIG. 85 is transmission spectrum of a spin-coated film of vanadyl-tetra(t-butyl)-naphthalocyanine.
Figure 86:
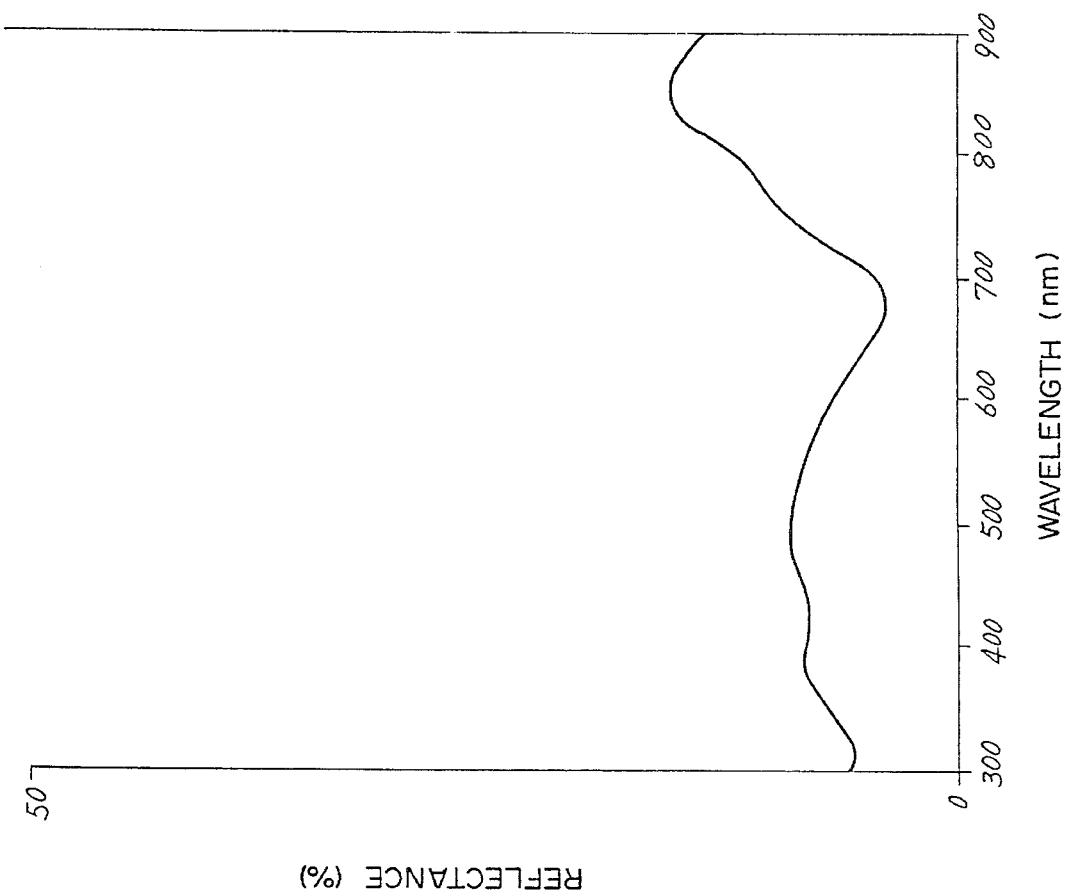
FIG. 86 is 5° specular reflection spectrum of spin-coated film of vanadyl-tetra(t-butyl)-naphthalocyanine.

On a glass plate, a solution of vanadyltetra(t-butyl)naphthalocyanine (the same compound as used in Comparative Example 1) in 1,1,2-trichloroethane was formed into an organic film in the same manner as in Example 8, and its transmission spectrum (FIG. 85) and 5° specular reflection spectrum (FIG. 86) were measured. This organic film did not exhibit high light absorbing ability and high reflectance (20% or below) in the semiconductor laser region (780–830 nm).

EXAMPLE 15

A solution of a naphthalocyanine compound of this invention having a specified concentration was spin-coated on a substrate having a thickness of 1.2 mm and a diameter of 130 mm made of polymethyl methacrylate polymethyl methacrylate 2P or polycarbonate, and dried at about 80° C. for about 15 minutes to form a recording layer. Thickness of this recording layer was measured with Dektak 3030 manufactured by Sloan Co. The optical recording medium thus prepared was placed on a turn table, so that the recording layer came upward, and rotated at a speed of 900 rpm. In this state, 2 MHz pulse signals were recorded in the zone of 40–60 nm as measured from the center by the use of an optical head equipped with a semiconductor laser having an oscillating wavelength of 830 nm and an output of 6 mW as measured on the substrate surface, while projecting laser beams from downside of optical recording medium, i.e. from the side of substrate, and focusing them into the recording layer. Then, the recorded signals were reproduced with the same apparatus as above, while adjusting the output of semiconductor laser at the surface of substrate to 1.0 mW to evaluate CN ratio. The results of evaluation are shown in the following table. The compounds of this invention exhibited an excellent record-regenerating characteristic. In the table, PC means polycarbonate substrate, PMMA means polymethyl methacrylate substrate, and PMMA2P means polymethyl methacryalte 2P substrate.

| Compound No. | Substrate | Solvent | Concentration (% by wt.) | Film thickness (Å) | C/N (dB) |
|---|---|---|---|---|---|
| 2 | PC | Cyclohexane | 1.0 | 700 | 53 |
| 3 | " | " | " | " | " |
| " | PMMA2P | Tetrahydrofuran | " | " | 52 |
| 7 | PC | Cyclohexane | " | 650 | 54 |
| " | PMMA2P | Toluene | " | " | " |
| 8 | " | " | " | 700 | 50 |
| 9 | " | Xylene | " | " | 54 |
| " | PC | Cyclohexane | " | " | 53 |
| " | PMMA | " | " | 730 | 54 |
| 10 | " | " | " | 600 | 52 |
| " | PC | " | " | 700 | 53 |
| 11 | PMMA2P | " | " | 600 | " |
| " | PC | " | " | 700 | 55 |
| 12 | " | " | " | 680 | 54 |
| " | PMMA | " | " | 700 | 51 |
| 13 | " | " | " | 600 | 53 |
| 15 | PC | " | " | 740 | " |
| 26 | " | " | " | 720 | 51 |
| 30 | " | " | " | 650 | 55 |
| 33 | " | " | " | 700 | 54 |
| 41 | " | " | " | " | 53 |
| 44 | " | " | " | 650 | 51 |
| 50 | " | " | " | 700 | 54 |
| 51 | " | " | " | " | 53 |
| 52 | " | " | " | 680 | 52 |
| 54 | " | " | " | 670 | " |
| 58 | " | " | " | 650 | 51 |
| 61 | " | " | " | 700 | 53 |
| 61 | " | " | " | 670 | 54 |
| " | PMMA | Carbon tetrachloride | " | 700 | " |
| 62 | " | Carbon tetrachloride | " | 800 | 52 |
| 75 | Carbon | " | " | 680 | 51 |
| " | PC | Cyclohexane | " | 700 | 54 |
| 82 | PMMA | Carbon tetrachloride | " | 750 | 53 |
| 90 | " | Carbon tetrachloride | " | 670 | 51 |
| 80 | " | Carbon tetrachloride | " | 740 | 54 |
| 96 | " | Carbon tetrachloride | " | 730 | 53 |
| 97 | " | Carbon tetrachloride | " | 770 | 52 |
| " | PC | Cyclohexane | " | 740 | 53 |
| 103 | " | " | " | 780 | 54 |
| 105 | " | " | " | 800 | 54 |

COMPARATIVE EXAMPLE 3

OVNc(t-$C_4H_9$)$_4$ dissolved in chloroform was spin-coated onto a polymethyl methacrylate substrate having a thickness of 1.2 mm and a diameter of 130 mm in the same manner as in Example 15 to form a recording layer. Thickness of this recording layer was about 1,000 angstroms. The recording material thus obtained was recorded and regenerated in the same manner as in Example 15. As a result, CN ratio was 39 dB, and the writing and reading of signals were not good.

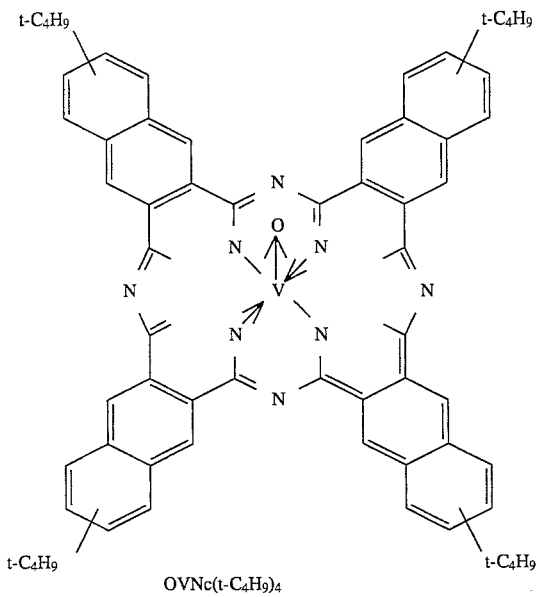

OVNc(t-C<sub>4</sub>H<sub>9</sub>)<sub>4</sub>

EXAMPLE 16

Figure 87:
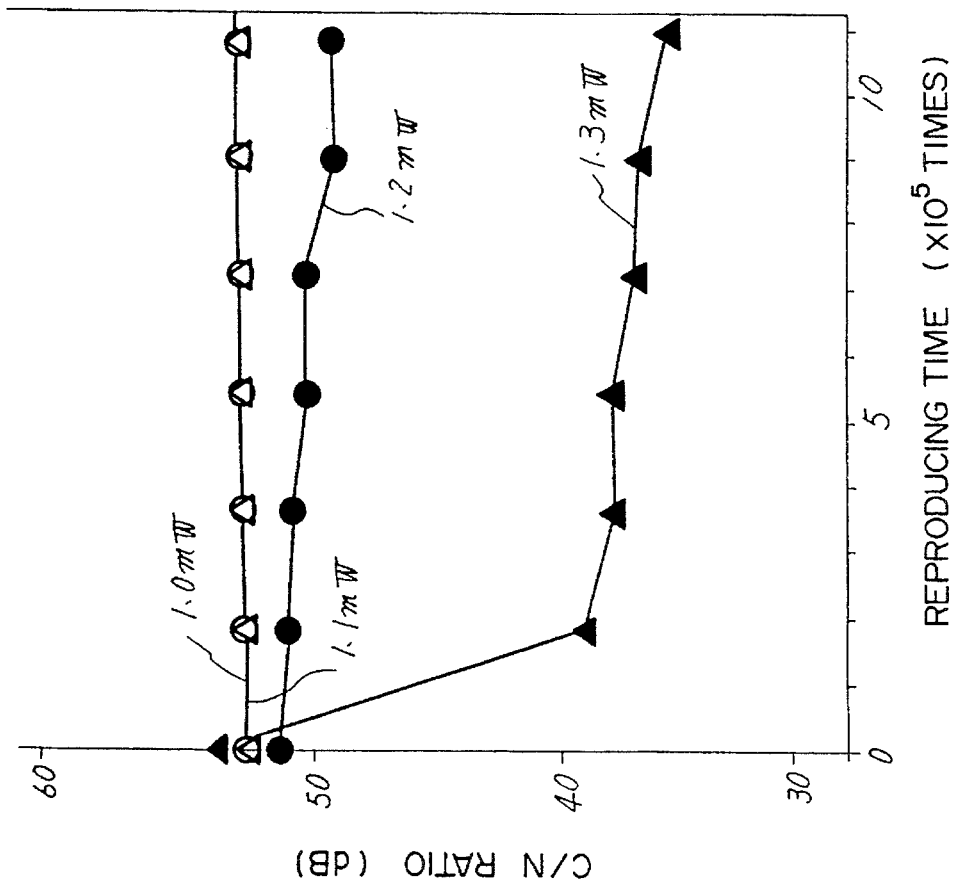
FIG. 87 is a graph evaluating the CN ratio expressing the regeneration deterioration characteristics of Compound (11)

The above-mentioned naphthalocyanine derivative (11) of this invention was dissolved into cyclohexane to prepare a 1% solution, with which a recording film layer having a thickness of 700 angstroms was formed on a polycarbonate substrate having a thickness of 1.2 mm by spin coating method. The recording medium thus obtained was irradiated with semiconductor laser (wavelength 830 nm) from the substrate side, and the recording characteristics were evaluated.. As a result, it was possible to carry out recording at a beam diameter of 1.6 microns, at a line speed of 6.5 m/sec., at 6.4 mW. On the other hand, stability to reproduction deterioration was evaluated by the following method. First, writing was carried out by irradiating it with an intermittent semiconductor laser light (output 10 mW at the time of lighting) having a frequency of 3.7 MHz, and regeneration was carried out by continuously and repeatedly irradiating semiconductor laser light (wavelength 830 nm). As a result, CN ratio did not change and maintained a value of 52 dB even if the reproducing light of 1.0 mW was repeatedly irradiated $10^6$ times as shown in FIG. 87. Similarly, no change in CN ratio was observed when a reproducing light of 1.1 mW was used. However, a tendency of slight decrease in CN ratio was observed when the reproducing light of 1.2 mW was used.

COMPARATIVE EXAMPLE 4

A recording film layer having a thickness of 500 angstroms was formed on a glass substrate by spin-coating cyanine dye NK-2905 (manufactured by Nippon Kankoshikiso Kenkyujo) dissolved in dichloroethane. This recording medium was irradiated with laser light in the same manner as in Example 16. As a result, recording could be effected at 4.8 MW. On the other hand, stability to reproduction deterioration was evaluated with 0.5 mW reproducing light. As a result, reflectance began to decrease when irradiation number reached about $4\times10^4$. After an irradiation number of $10^6$, CN value decreased to 70% of the initial value.

EXAMPLE 17

A recording film layer having a thickness of 700 angstroms was formed on a polycarbonate substrate by spin-coating naphthalocyanine derivative (9) of this invention dissolved in cyclohexane. This recording medium was irradiated with a semiconductor laser having a wavelength of 830 nm from the side of polycarbonate substrate, and the recording characteristics were evaluated. As a result, recording could be effected at beam diameter of 1.6 microns, at a line speed of 6.5 m/sec., at 6.9 mW. On the other hand, stability to reproduction deterioration was evaluated by repeatedly irradiating it with a reading light of 1.0 mW. As a result, no change in CN ratio was observed even if irradiation was repeated $10^6$ times.

EXAMPLE 18

A recording film layer having a film thickness of 720 angstroms was formed on a glass substrate by spin-coating naphthalocyanine derivative (13) of this invention dissolved in cyclohexane. When this recording medium was irradiated with laser light in the same manner as in Example 17, recording could be effected at 6.6 mW. Stability to reproduction deterioration was evaluated in the same manner as above. As a result, no change in CN ratio was found even if irradiation was repeated $10^6$ times.

EXAMPLE 19

Naphthalocyanine derivative (12) of this invention and polystyrene were dissolved into toluene at a ratio of 1:1. Using this solution, a recording film layer having a thickness of 1,500 angstroms was prepared by spin coating method. When this recording medium was irradiated with laser light in the same manner as in Example 17, recording could be effected at 9.6 mW. On the other hand, stability to regeneration deterioration was also evaluated similarly. As a result, no change in CN ratio was found even if irradiation was repeated $10^6$ times.

EXAMPLE 20

A recording film layer having a thickness of 700 angstroms was formed on a polycarbonate substrate having a thickness of 1.2 mm by spin-coating naphthalocyanine derivative (10) of this invention dissolved in cyclohexane. The recording medium thus obtained was irradiated with 830 nm semiconductor laser from the substrate side, and its recording characteristic was evaluated. As a result, recording could be effected at a beam diameter of 1.6 microns, at a line speed of 7.5 m/sec, at 4.6 mW. On the other hand, stability to reproduction deterioration was evaluated by repeatedly irradiating it with 0.9 mW reading light. As a result, no change in CN ratio was found if the irradiation was repeated $10^6$ times.

COMPARATIVE EXAMPLE 5

A recording film layer having a thickness of 500 angstroms was formed on a glass substrate by spin-coating cyanine dye NK-2873 (manufactured by Nippon Kankoshikiso Kenkyujo) dissolved in dichlorethane. The recording medium thus obtained was irradiated with laser light in the same manner as in Example 17. As a result, recording could be effected at 5.2 mW. In the evaluation of stability to reproduction deterioration, however, CN ratio began to decrease when irradiation number reached about $10^4$ and it decreased to 70% of initial value after the irradiation number reached $10^6$.

EXAMPLE 21

A recording film layer having a thickness of 600 angstroms was formed on a polymethyl methacrylate substrate by spin-coating naphthalocyanine derivative (10) of this invention dissolved in cyclohexane. When this recording medium was irradiated with laser light in the same manner as in Example 17, recording could be effected at 4.4 mW. In the evaluation of stability to reproduction deterioration, no change in CN ratio was found even if irradiation was repeated $10^6$ times.

EXAMPLE 22

A recording film layer having a thickness of 500 angstroms was formed on a polymethyl methacrylate substrate by spin-coating naphthalocyanine derivative (2) of this invention dissolved in cyclohexane. This recording medium was irradiated with laser light in the same manner as in Example 17. As a result, recording could be effected at 4.9 mW. In the evaluation of stability to reproduction deterioration, no change in CN ratio was found even if irradiation was repeated $10^6$ times.

EXAMPLE 23

A recording film layer having a thickness of 800 angstroms was formed on a glass substrate by spin-coating naphthalocyanine derivative (8) of this invention dissolved in toluene. This recording medium was irradiated with laser light in the same manner as in Example 17. As a result, recording could be effected at 4.2 mW. In the evaluation of stability to reproduction deterioration, no change in CN ratio was found even if irradiation was repeated $10^6$ times.

EXAMPLE 24

A recording film layer having a thickness of 600 angstroms was prepared by spin-coating naphthalocyanine derivative (14) of this invention dissolved in cyclohexane onto a polycarbonate substrate having a thickness of 1.2 mm. It was evaluated at a line speed of 5 m/sec. in the same manner as in Example 17. As the result, recording could be effected at 7.4 mW. In the evaluation of stability to regeneration deterioration, no change in CN ratio was found even if irradiation was repeated $10^6$ times.

EXAMPLE 25

A 2:1 mixture of naphthalocyanine derivative (11) of this invention and polystyrene was dissolved into methyl ethyl ketone. Using this solution, a recording film layer having a thickness of 600 angstroms was formed on a glass substrate. In an evaluation similar to Example 17, recording sensitivity was 4.8 mW and reproduction deterioration was $10^6$ or above.

EXAMPLE 26

A 0.8% by weight solution was prepared by dissolving naphthalocyanine derivative (18) of this invention into butanol. Using this solution, a recording layer having a thickness of 400 angstroms was formed on a glass substrate having a thickness of 1.2 mm. The recording medium thus obtained was irradiated with 830 nm semiconductor laser from the substrate side, and the recording characteristic was evaluated. As a result, recording could be effected at a $1/e^2$ beam diameter of 1.6 microns, at a line speed of 7.6 m/sec., at 7.8 mW. On the other hand, in the evaluation of regeneration deterioration, a reading light of 1.0 mW was repeatedly irradiated. As a result, no change in CN ratio was found even if irradiation was repeated $10^6$ times.

EXAMPLE 27

Naphthalocyanine derivative (25) of this invention was dissolved into butanol to prepare 1.0% by weight solution. Using this solution, a recording layer having a thickness of 600 angstroms was formed on a glass substrate having a thickness of 1.2 mm by spin coating method. This recording medium was irradiated with 830 nm semiconductor laser from the side of substrate, and its recording characteristic was evaluated. As a result, recording could be effected at $1/e^2$ beam diameter of 1.6 microns, at a line speed of 7.6 m/sec., at 8.6 mW. On the other hand, in the evaluation of stability to reproduction deterioration, a reading light of 1.0 mW was repeatedly irradiated. As a result, no change in CN ratio was found even if irradiation was repeated $10^6$ times.

EXAMPLE 28

A 2:1 mixture of naphthalocyanine derivative (10) of this invention and polystyrene was dissolved into 1,1,2-trichloroethane. Using this solution, a recording layer having a thickness of 800 angstroms was formed on a glass substrate having a thickness of 1.2 mm by spin coating method. This recording medium was irradiated with 830 nm semiconductor laser light from the substrate side, and its recording characteristic was evaluated. As a result, recording could be effected at a line speed of 8 m/sec., at 6 mW. When a reading light of 0.9 mW was repeatedly irradiated, no change in CN ratio was found even if the irradiation was repeated $10^6$ times.

EXAMPLE 29

Figure 88:
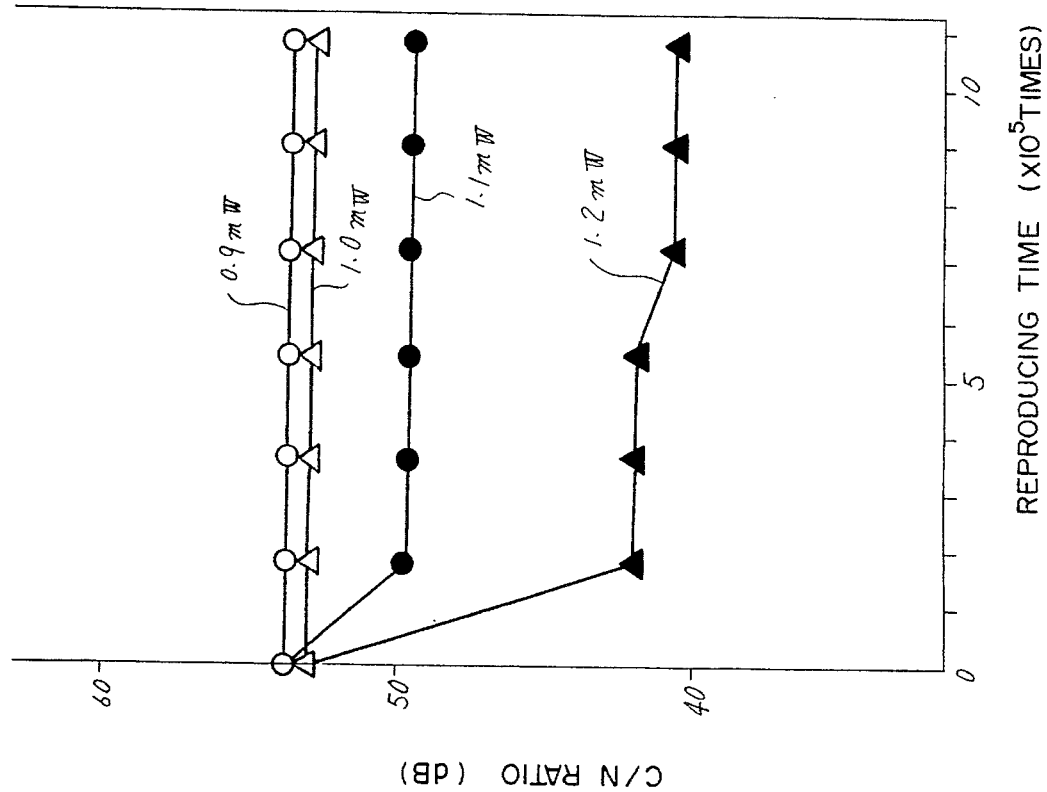
FIG. 88 is a graph evaluating the CN ratio expressing the regeneration deterioration characteristics of naphthalocyanine compound (61).

A recording layer having a thickness of 700 angstroms was formed on a polymethyl methacrylate substrate by spin-coating naphthalocyanine derivative (61) of this invention dissolved in carbon tetrachloride. This recording medium was irradiated with laser light in the same manner as in Example 17. As a result, recording could be effected at 7.3 mW. Stability to reproduction deterioration was also evaluated similarly. As a result, no change in CN ratio was found and the CN ratio maintained a value of 53 dB even if 1.0 mW regenerating light was repeatedly ($10^6$ times) irradiated, as shown in FIG. 88. Further, no change in CN ratio was found when a regenerating light of 1.1 mW was used. However, a slight decreasing tendency in CN ratio was found when 1.2 mW regenerating light was used.

EXAMPLE 30

A recording film layer having a thickness of 740 angstroms was formed on a polymethyl methacrylate substrate by spin-coating naphthalocyanine derivative (62) of this invention dissolved in carbon tetrachloride. This recording medium was irradiated with 830 nm semiconductor laser from the substrate side, and its recording characteristic was evaluated. As the result, recording could be effected at a beam diameter of 1.6 microns, at a line speed of 6.5 m/sec., at 6.5 mW. On the other hand, in the evaluation of stability to regeneration deterioration, a reading light of 1.0 mW was

EXAMPLE 31

A recording film layer having a thickness of 690 angstroms was formed on a glass substrate by spin coating naphthalocyanine derivative (106) of this invention dissolved in tetrahydrofuran. This recording medium was irradiated with laser light in the same manner as in Example 30. As the result, recording could be effected at 6.6 mW. Further, stability to regeneration deterioration was also evaluated similarly. As the result, no change in CN ratio was found even if irradiation was repeated $10^6$ times.

EXAMPLE 32

Naphthalocyanine derivative (96) of this invention and polystyrene were dissolved in toluene at a ratio of 1:1. Using this solution, a recording film layer having a thickness of 1,600 angstroms was formed on a glass substrate by spin coating method. This recording medium was irradiated with laser beam in the same manner as in Example 30. As the result, recording could be effected at 9.8 mW. Stability to regeneration deterioration was also evaluated similarly. As the result, no change in CN ratio was found even if irradiation was repeated $10^6$ times.

EXAMPLE 33

A recording film layer having a thickness of 750 angstroms was formed on a polymethyl methacrylate substrate having a thickness of 1.2 mm by spin-coating naphthalocyanine derivative (97) of this invention dissolved in carbon tetrachloride. This recording medium was irradiated with 830 nm semiconductor laser light from the substrate side, and its recording characteristic was evaluated. As the result, recording could be effected at a beam diameter of 1.6 microns, at a line speed of 7.5 m/sec., at 5.7 mW. On the other hand, in the evaluation of stability to regeneration deterioration, a reading light of 0.9 mW was repeatedly irradiated. As the result, no change in CN was found even if irradiation was repeated $10^6$ times.

EXAMPLE 34

A recording film layer having a thickness of 670 angstroms was formed on a polymethyl methacrylate substrate by spin-coating naphthlocyanine derivative (62) of this invention dissolved in carbon tetrachloride. This recording medium was irradiated with laser light in the same manner as in Example 33. As the result, recording could be effected at 5.4 mW. In the evaluation of stability to regeneration deterioration, no change in CN ratio was found even if irradiation was repeated $10^6$ times.

EXAMPLE 35

A recording film layer having a thickness of 570 angstroms was formed on a polymethyl methacrylate substrate by spin-coating naphthalocyanine derivative (70) of this invention dissolved in carbon tetrachloride. When this recording medium was irradiated with laser light in the same manner as in Example 33, recording could be effected at 5.3 mW. In the evaluation of stability to regeneration deterioration, no change in CN ratio was found even if irradiation was repeated $10^6$ times.

EXAMPLE 36

A recording film layer having a thickness of 770 angstroms was formed on a glass substrate by spin-coating naphthalocyanine derivative (87) of this invention dissolved in toluene. When this recording medium was irradiated with laser light in the same manner as in Example 33, recording could be effected at 5.1 mW. In the evaluation of stability to regeneration deterioration, no change in CN ratio was found even if irradiation was repeated $10^6$ times.

EXAMPLE 37

A recording film layer having a thickness of 640 angstroms was formed on a polymethyl methacrylate substrate having a thickness of 1.2 mm by spin-coating naphthalocyanine derivative (91) of this invention dissolved in carbon tetrachloride. In the same manner as in Example 33, it was evaluated at a line speed of 5 m/sec. As the result, recording could be effected at 7.1 mW. Stability to regeneration deterioration was also evaluated. As the result, no change in CN ratio was found even if irradiation was repeated $10^6$ times.

EXAMPLE 38

A 2:1 mixture of naphthalocyanine derivative (61) of this invention and polystyrene was dissolved into methyl ethyl ketone. Using this solution, a recording film layer having a thickness of 770 angstroms was formed on a glass substrate. It was evaluated in the same manner as in Example 33. As the result, recording sensitivity was 6.3 mW, and regeneration deterioration was $10^6$ or above.

EXAMPLE 39

Naphthalocyanine derivative (66) of this invention was dissolved into tetrahydrofuran to prepare a 0.8% by weight solution. A recording layer having a thickness of 550 angstroms was formed on a glass substrate having a thickness of 1.2 mm by spin-coating the above-mentioned solution. This recording medium was irradiated with 830 nm semiconductor laser from the substrate side, and its recording characteristic was evaluated. As the result, recording could be effected at $1/e^2$ beam diameter of 1.6 microns, at a line speed of 7.6 m/sec., at 7.8 mW. On the other hand, in the evaluation of stability to regeneration deterioration, a reading light of 1.0 mW wa repeatedly irradiated. As the result, no change in CN ratio was found even if irradiation was repeated $10^6$ times.

EXAMPLE 40

Naphthalocyanine derivative (79) of this invention was dissolved into toluene to prepare a 1.0% by weight solution. Using this solution, a recording layer having a thickness of 630 angstroms was formed on a glass substrate having a thickness of 1.2 mm by spin coating method. This recording medium was irradiated with 830 nm semiconductor laser from the substrate side, and its recording characteristic was evaluated. As the result, recording could be effected at $1/e^2$ beam diameter of 1.6 microns, at a line speed of 7.6 m/sec., at 7.1 mW. On the other hand, in the evaluation of stability to regeneration deterioration, a reading light of 1.0 mW was repeatedly irradiated. As the result, no change in CN ratio was found even if irradiation was repeated $10^6$ times.

EXAMPLE 41

A 2:1 mixture of naphthalocyanine derivative (96) of this invention and polystyrene was dissolved into 1,1,2-trichlorethane. Using this solution, a recording layer having a thickness of 770 angstroms was formed on a glass substrate having a thickness of 1.2 mm by spin coating method. This recording medium was irradiated with 830 nm semiconductor laser light from the substrate side, and its recording characteristic was evaluated. As the result, recording could be effected at a line speed of 8 m/sec., at 6 mW. When a reading light of 0.9 mW was repeatedly irradiated, no change in CN ratio was found even if irradiation was repeated $10^6$ times.

The naphthalocyanine derivatives of this invention represented by formula (I) are soluble in saturated hydrocarbon type, aromatic, halogen-containing, and ether type solvents. They can be purified and their purity can be improved easily. Their absorption does not change with kind of solvent and concentration, and they have a very high ability to absorb semiconductor laser light.

Since the naphthalocyanine derivatives of this invention are excellent in the solubility in saturated hydrocarbon solvents and carbon tetrachloride, it is unnecessary to provide a solvent-resistant protecting layer on the surface of polymethyl methacrylate substrate or polycarbonate substrate used as a substrate of optical recording medium, owing to which a recording layer can easily be formed on a substrate. Further, there is a tendency that, among the naphthalocyanine derivatives of this invention, naphthalocyanine derivatives wherein the substituents Y and $R^1$ linked to central metal M have at least one cycloalkyl group or alkyl group having cycloalkyl group as substituent have a higher melting point than naphthalocyanine compounds having straight or branched chain alkyl group of identical carbon number in place of the above-mentioned substituent, owing to which they are improved in stability to regenerating laser light.

Further, owing to the use of the naphthalocyanine derivative represented by formula (I), the optical recording medium of this invention exhibits a high sensitivity characteristic and it can use laser light as an effective writing and reading electromagnetic energy.

What is claimed is:

1. A naphthalocyanine derivative represented by the formula:

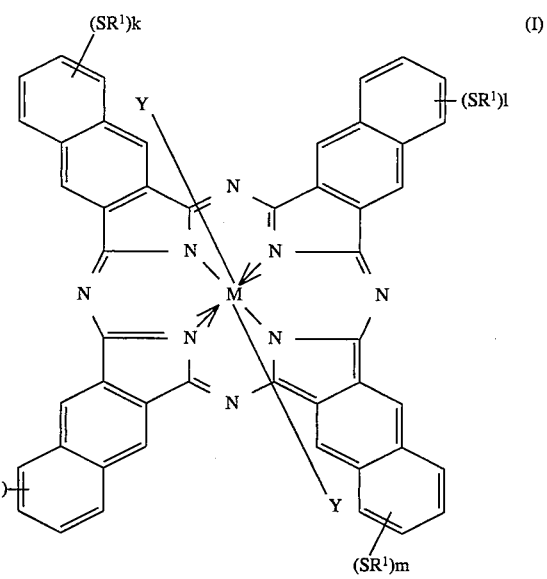

wherein M represents Si, Ge or Sn; the two symbols Y, identical or different, each represents group $R^2O$ or group $R^3R^4R^5SiO$; k, l, m and n each represents zero or an integer of 1 to 4, provided that (k+l+m+n) is 1 or greater; $R^1$ is a cycloalkyl group, an alkyl group having a cycloalkyl group as a substituent, a straight chain alkyl group or a branched-chain alkyl group, provided that $R^1$ in number of (k+l+m+n) may be identical or different from one another; and $R^2$, $R^3$, $R^4$ and $R^5$, identical or different from one another, each represents a cycloalkyl group, an alkyl group having a cycloalkyl group as substituent, an alkoxyl group, a straight chain alkyl group, a branched chain alkyl group or an alkenyl group; provided that the formula must have at least one cycloalkyl group or alkyl group having a cycloalkyl group as substituent.

2. A naphthalocyanine derivative according to claim 1, wherein M in the formula (I) is Si or Ge.

3. A naphthalocyanine derivative according to claim 1, wherein k, l, m and n in the formula (I) are all equal to 1.

4. A naphthalocyanine derivative according to claim 1, wherein the two symbols Y in formula (I) both represent $R^3R^4R^5SiO$ group.

5. A naphthalocyanine derivative according to claim 1, wherein symbols $R^1$ in formula (I) independently represent a cycloalkyl group having 3 to 22 carbon atoms.

6. A naphthalocyanine derivative according to claim 1, wherein symbols $R^1$ in formula (I) independently represent an alkyl group having a cycloalkyl group as a substituent.

7. A naphthalocyanine derivative according to claim 1, wherein symbols $R^1$ in formula (I) independently represent a straight chain alkyl group.

8. A naphthalocyanine derivative according to claim 1, wherein symbols $R^1$ in formula (I) independently represent a branched chain alkyl group.

9. A naphthalocyanine derivative according to claim 1, wherein $R^1$, $R^2$, $R^3$, $R^4$ and $R^5$, are independently a cycloalkyl group or a alkyl group having a cycloalkyl group as a substituent.

10. An optical recording medium comprising a recording layer composed mainly of a naphthalocyanine derivative of formula (I) according to claim 1 formed on a substrate.

11. An optical recording medium according to claim 10, wherein the recording layer is composed mainly of a naphthalocyanine derivative of formula (I) wherein M is Si or Ge.

12. An optical recording medium according to claim 10, wherein the recording layer is composed mainly of a naphthalocyanine derivative of formula (I) wherein k, l, m and n are independently an integer of 1.

13. An optical recording medium according to claim 10, wherein the recording layer is composed mainly of a naphthalocyanine derivative of formula (I) wherein the two symbols Y both represent $R^3R^4R^5SiO$ group.

14. An optical recording medium according to claim 10, wherein the recording layer is composed mainly of a naphthalocyanine derivative of formula (I) wherein all the symbols $R^1$ represent a cycloalkyl group having 3 to 22 carbon atoms.

15. An optical recording medium according to claim 10, wherein the recording layer is composed mainly of a naphthalocyanine derivative of formula (I) wherein all the symbols $R^1$ represent an alkyl group having a cycloalkyl group as a substituent.

16. An optical recording medium according to claim 10, wherein the recording layer is composed mainly of a naphthalocyanine derivative of formula (I) wherein all the symbols $R^1$ represent a straight chain alkyl group.

17. An optical recording medium according to claim 10, wherein the recording layer is composed mainly of a naphthalocyanine derivative of the formula (I) wherein all the symbols $R^1$ represent a branched chain alkyl group.

18. A process for producing a naphthalocyanine derivative represented by the formula (I) according to claim 1, which comprises reacting a naphthalocyanine derivative represented by the formula:

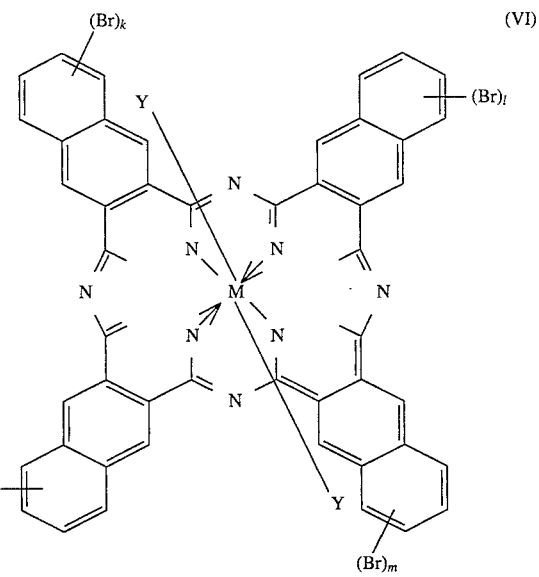

wherein k, l, m, n, M and Y are as defined in the formula (I), by heating with an excessive amount of copper (I) thiolate represented by the formula:

$$CuSR^1 \qquad (VII)$$

wherein $R^1$ is as defined in formula (I).

19. A process according to claim 18, wherein M in the formulas (I) and (VI) is Si or Ge.

20. A process according to claim 18, wherein k, l, m and n in formulas (VI) and (I) are individually an integer of 1.

21. A process for producing a naphthalocyanine derivative according to claim 18, wherein the two symbols Y in formulas (VI) and (I) both represent $R^3R^4R^5SiO$ group.

22. A process for producing a naphthalocyanine derivative according to claim 18, wherein symbols $R^1$ in formulas (VII) and (I) are independently a cycloalkyl group having 3 to 22 carbon atoms.

23. A process for producing a naphthalocyanine derivative according to claim 18, wherein symbols $R^1$ in formulas (VII) and (I) are independently an alkyl group having a cycloalkyl group as a substituent.

24. A process for producing a naphthalocyanine derivative according to claim 18, wherein symbols $R^1$ in formulas (VII) and (I) are independently a straight chain alkyl group.

25. A process for producing a naphthalocyanine derivative according to claim 18, wherein symbols $R^1$ in formulas (VII) and (I) are independently a branched chain alkyl group.

* * * * *